US012179325B2

(12) United States Patent
Neuhoff et al.

(10) Patent No.: US 12,179,325 B2
(45) Date of Patent: Dec. 31, 2024

(54) POWERED FASTENER DRIVER

(71) Applicant: MILWAUKEE ELECTRIC TOOL CORPORATION, Brookfield, WI (US)

(72) Inventors: Mitchell T. Neuhoff, Waukesha, WI (US); Mark C. Hughes, Waukesha, WI (US); Jacob N. Zimmerman, Pewaukee, WI (US); Ivan N. Zozulya, Waukesha, WI (US); Travis W. Leathrum, Milwaukee, WI (US); Troy C. Thorson, Cedarburg, WI (US); Michael B. Koeppel, Wittenberg, WI (US); Bradley S. Houskamp, Wauwatosa, WI (US); Lokeshwaran Rajendran, West Allis, WI (US); Mitchell A. Ellena, West Allis, WI (US); David C. Graf, Greendale, WI (US); Caleb M. Schober, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/110,595

(22) Filed: Feb. 16, 2023

(65) Prior Publication Data

US 2023/0264332 A1 Aug. 24, 2023

Related U.S. Application Data

(60) Provisional application No. 63/381,488, filed on Oct. 28, 2022, provisional application No. 63/351,473, (Continued)

(51) Int. Cl.
*B25C 1/00* (2006.01)
*B25C 1/06* (2006.01)

(52) U.S. Cl.
CPC ................ *B25C 1/003* (2013.01); *B25C 1/06* (2013.01)

(58) Field of Classification Search
CPC ................................. B25C 1/003; B25C 1/06
(Continued)

(56) References Cited

U.S. PATENT DOCUMENTS 2,575,455 A 11/1951 Lang
2,580,444 A 1/1952 Lang
(Continued)

FOREIGN PATENT DOCUMENTS

CN 1308120 C 4/2007
CN 201098880 Y 8/2008
(Continued)

OTHER PUBLICATIONS

International Search Report and Written Opinion for Application No. PCT/US2023/013198 dated Jul. 26, 2023 (15 pages).
(Continued)

*Primary Examiner* — Thomas M Wittenschlaeger
*Assistant Examiner* — Katie L Gerth
(74) *Attorney, Agent, or Firm* — Michael Best & Friedrich LLP

(57) ABSTRACT

A powered fastener driver includes a housing, a nosepiece extending from the housing, a driver blade movable within the nosepiece between a ready position and a driven position the driver blade comprising a plurality of drive teeth on a first side of the driver blade and a plurality of locking projections on a second side of the driver blade, a piston coupled to the driver blade for movement therewith, a driver cylinder within which the piston is movable, a storage chamber cylinder containing pressurized gas therein and in fluid communication with the driver cylinder, a first end of the driver cylinder being affixed to a corresponding first end
(Continued)

of the storage chamber cylinder, and a latch actuator assembly adjacent the driver blade, wherein the latch actuator assembly includes a latch to engage one of the plurality of locking projections to prevent the driver blade from moving toward the driven position.

27 Claims, 85 Drawing Sheets

Related U.S. Application Data filed on Jun. 13, 2022, provisional application No. 63/311,488, filed on Feb. 18, 2022.

(58) Field of Classification Search
USPC .......................................................... 227/107
See application file for complete search history.

(56) References Cited

U.S. PATENT DOCUMENTS 2,624,879 A 1/1953 Baird
2,632,890 A 3/1953 Tietig
2,666,201 A 1/1954 Van Orden
2,701,360 A 2/1955 Lang
3,330,462 A 7/1967 Colechia et al.
3,496,840 A 2/1970 Wandel et al.
3,524,576 A 8/1970 Bader
3,558,031 A 1/1971 Hillier
3,568,908 A 3/1971 Bader
3,628,715 A 12/1971 Maynard et al.
3,654,832 A 4/1972 Lana
3,672,738 A 6/1972 Buttriss
3,688,966 A 9/1972 Perkins et al.
3,703,981 A 11/1972 Smith
3,708,097 A 1/1973 Fisher
3,762,733 A 10/1973 Lana
3,854,648 A 12/1974 Inzoli et al.
3,858,780 A 1/1975 Perkins et al.
3,863,824 A 2/1975 Bakoledis
3,930,297 A 1/1976 Potucek et al.
3,934,779 A 1/1976 Dent
3,945,551 A 3/1976 Sato et al.
4,014,488 A 3/1977 Potucek et al.
4,053,094 A 10/1977 Males
4,149,297 A 4/1979 Monacelli
4,251,017 A 2/1981 Doyle et al.
4,299,021 A 11/1981 Williams
4,433,782 A 2/1984 Figge et al.
4,442,965 A 4/1984 Leistner
4,509,669 A 4/1985 Elliesen
4,585,154 A 4/1986 Fealey et al.
4,600,135 A 7/1986 Mukoyama
4,609,135 A 9/1986 Elliesen
4,669,648 A 6/1987 Monacelli
4,679,719 A 7/1987 Kramer
4,684,050 A 8/1987 Masas
4,731,917 A 3/1988 Krowl
4,763,824 A 8/1988 Ebihara
4,815,647 A 3/1989 Chou
4,821,937 A 4/1989 Rafferty
4,932,480 A 6/1990 Golsch
4,942,996 A 7/1990 Wolfberg et al.
5,025,971 A 6/1991 Schafer et al.
5,038,993 A 8/1991 Schafer et al.
5,094,380 A 3/1992 Nasiatka
5,135,152 A 8/1992 Uno et al.
5,193,730 A 3/1993 Tanaka et al.
5,201,449 A 4/1993 Miller
5,267,682 A 12/1993 Okouchi
5,297,713 A 3/1994 Perra et al.
5,441,192 A 8/1995 Sugita et al.
5,474,222 A 12/1995 Kanai et al.
5,529,234 A 6/1996 Juneau
5,558,264 A 9/1996 Weinstein
5,579,975 A 12/1996 Moorman
5,605,271 A 2/1997 Russell
5,628,445 A 5/1997 Braddock et al.
5,634,582 A 6/1997 Morrison, Jr. et al.
5,662,257 A 9/1997 Mukoyama et al.
5,683,024 A 11/1997 Eminger et al.
5,697,541 A 12/1997 Burke et al.
5,743,455 A 4/1998 Holliday
5,772,098 A 6/1998 Crutcher
5,794,831 A 8/1998 Velan et al.
5,803,338 A 9/1998 Singer et al.
5,911,350 A 6/1999 Bolger et al.
6,032,848 A 3/2000 Smolinski
6,095,393 A 8/2000 Smolinski
6,123,241 A 9/2000 Walter et al.
6,145,724 A * 11/2000 Shkolnikov ............... B25C 1/08
227/8
6,152,346 A 11/2000 Laubach
6,199,739 B1 3/2001 Mukoyama et al.
6,213,371 B1 4/2001 Cabrera
6,371,348 B1 4/2002 Canlas et al.
6,371,352 B1 4/2002 Mochizuki
6,393,711 B1 5/2002 Freund
6,394,332 B2 5/2002 Akiba
6,422,447 B1 7/2002 White et al.
6,431,428 B1 8/2002 Chen
6,431,430 B1 8/2002 Jalbert et al.
6,443,348 B2 9/2002 Lamb
6,488,195 B2 12/2002 White et al.
6,499,643 B1 12/2002 Hewitt
6,502,737 B2 1/2003 Akiba
6,516,989 B1 2/2003 Sun
6,592,014 B2 7/2003 Smolinski
6,595,840 B1 7/2003 Jaensch et al.
6,612,476 B2 9/2003 Smolinski
6,641,018 B2 11/2003 Akiba
6,672,498 B2 1/2004 White et al.
6,675,999 B2 1/2004 Mukoyama et al.
6,679,406 B2 1/2004 Sakai et al.
6,685,078 B2 2/2004 Wohlwend et al.
6,695,196 B2 2/2004 Hamada et al.
6,769,193 B1 8/2004 Meisner
6,776,320 B2 8/2004 Sprenger et al.
6,776,322 B2 8/2004 Villela et al.
6,779,699 B2 8/2004 Aoki et al.
6,779,700 B2 8/2004 Bruins et al.
6,796,477 B2 9/2004 Chen
6,820,788 B2 11/2004 Akiba
6,824,036 B2 11/2004 Walter
D501,383 S 2/2005 Fang et al.
6,883,696 B1 4/2005 Steinbrunner et al.
6,889,711 B2 5/2005 Vetoretti et al.
6,905,052 B2 6/2005 Sakai et al.
6,913,179 B1 7/2005 Chen
6,948,647 B1 9/2005 Niblett et al.
6,955,281 B1 10/2005 Wei
6,957,757 B1 10/2005 Huang
6,966,476 B2 11/2005 Jalbert et al.
6,966,477 B1 11/2005 Chien-Kuo et al.
6,968,945 B2 11/2005 Bruins et al.
6,974,062 B2 12/2005 Akiba
6,986,450 B2 1/2006 Matthews et al.
7,000,294 B2 2/2006 Kakuda et al.
7,004,366 B2 2/2006 Schiestl et al.
7,021,251 B2 4/2006 Ohmori et al.
7,048,164 B2 5/2006 Favre-Bulle et al.
7,066,371 B2 6/2006 Villela et al.
7,086,573 B1 8/2006 Wen
7,108,079 B2 9/2006 Sakai et al.
7,111,364 B2 9/2006 Bader et al.
7,131,563 B2 11/2006 Wen
7,131,564 B2 11/2006 Matthews et al.
7,134,586 B2 11/2006 McGee et al.
7,137,186 B2 11/2006 Wojcicki et al.
7,137,541 B2 11/2006 Baskar et al.
7,143,920 B2 12/2006 Panasik et al.
7,175,064 B2 2/2007 Schell et al.
7,194,988 B2 3/2007 Ohmori et al.
7,210,607 B2 5/2007 Niblet et al.

(56) References Cited

U.S. PATENT DOCUMENTS 7,222,767 B1 5/2007 Yang
7,225,962 B2 6/2007 Porth et al.
7,240,817 B2 7/2007 Higuchi
7,275,505 B2 10/2007 Moeller et al.
7,285,877 B2 10/2007 Gorti et al.
7,299,963 B2 11/2007 Moeller et al.
7,306,052 B2 12/2007 Vahabi-nNjad et al.
7,320,422 B2 1/2008 Schell et al.
7,331,098 B2 2/2008 Matthews et al.
7,344,054 B2 3/2008 Sakai et al.
7,444,963 B2 11/2008 Tanaka
7,455,207 B2 11/2008 Wojcicki et al.
7,469,811 B2 12/2008 Shima et al.
7,490,746 B2 2/2009 Sakai et al.
7,494,036 B2 2/2009 Shima et al.
7,520,029 B2 4/2009 Jonsson
7,546,938 B2 6/2009 Panasik et al.
7,565,989 B2 7/2009 Lai et al.
7,575,139 B2 8/2009 Thompson
7,617,959 B2 11/2009 Yang
7,628,304 B2 12/2009 Yamamoto et al.
7,641,089 B2 1/2010 Schell et al.
7,654,430 B2 2/2010 Cho et al.
7,677,426 B2 3/2010 Tillinghast et al.
7,681,661 B2 3/2010 Sakai et al.
7,686,199 B2 3/2010 Gross et al.
7,699,201 B2 4/2010 Hagan et al.
7,721,817 B2 5/2010 McGee et al.
7,721,928 B2 5/2010 Chen et al.
7,726,536 B2 6/2010 Gross et al.
7,727,003 B2 6/2010 Ceroll et al.
7,739,807 B2 6/2010 Grant
7,748,097 B1 7/2010 Matthews et al.
7,775,412 B2 8/2010 Nemeth
7,815,081 B2 10/2010 Gist et al.
7,854,360 B2 12/2010 Suda
7,866,521 B2 1/2011 Gross et al.
7,886,950 B2 2/2011 Lin et al.
7,896,212 B2 3/2011 Uejima et al.
7,917,997 B2 4/2011 Jonsson
7,918,374 B2 4/2011 Gardner et al.
7,922,054 B2 4/2011 Cole, Jr.
7,931,180 B2 4/2011 Lai
7,942,299 B2 5/2011 Steinbrunner et al.
7,950,556 B2 5/2011 Hagan
7,975,777 B2 7/2011 Krondorfer et al.
8,006,883 B2 8/2011 Schell et al.
8,035,955 B2 10/2011 Parks et al.
8,042,717 B2 10/2011 Lam et al.
8,051,919 B2 11/2011 Hagan et al.
8,052,021 B2 11/2011 Wu
8,056,785 B2 11/2011 Gosis et al.
RE42,987 E 12/2011 Akiba
8,087,556 B2 1/2012 Oomori et al.
8,104,658 B2 1/2012 Yu
8,123,096 B2 2/2012 Lijima et al.
8,167,056 B2 5/2012 Ito et al.
8,167,182 B2 5/2012 Shima et al.
8,172,118 B2 5/2012 Niblett et al.
8,215,528 B2 7/2012 Matsunaga et al.
8,231,039 B2 7/2012 Buck et al.
8,235,270 B2 8/2012 Gosis et al.
8,276,798 B2 10/2012 Moeller et al.
8,282,328 B2 10/2012 Gardner et al.
8,302,832 B2 11/2012 Porth et al.
8,308,034 B2 11/2012 Shibata et al.
8,313,012 B2 11/2012 Shima et al.
8,336,748 B2 12/2012 Hlinka et al.
8,336,749 B2 12/2012 Largo
8,347,978 B2 1/2013 Forster et al.
8,348,695 B2 1/2013 Puzio et al.
8,397,970 B2 3/2013 Iijima et al.
8,408,327 B2 4/2013 Forster et al.
8,412,179 B2 4/2013 Gerold et al.
8,413,867 B2 4/2013 Gardner et al.
8,434,566 B2 5/2013 Forster et al.
8,439,242 B2 5/2013 Tanji et al.
8,443,913 B2 5/2013 Nagasaka et al.
8,464,921 B2 6/2013 Shima et al.
8,479,963 B2 7/2013 Kitagawa et al.
8,485,407 B2 7/2013 Liu et al.
8,544,561 B2 10/2013 Aihara
8,550,417 B2 10/2013 Lee et al.
8,556,148 B2 10/2013 Schell et al.
8,573,322 B2 11/2013 Nagasaka et al.
8,602,284 B2 12/2013 Tillinghast et al.
8,622,271 B2 1/2014 Shima et al.
8,657,173 B2 2/2014 Uejima et al.
8,672,205 B2 3/2014 Leitner
8,684,245 B2 4/2014 Canlas, Jr. et al.
8,690,036 B2 4/2014 Schell et al.
8,701,956 B2 4/2014 Takemura et al.
8,733,610 B2 5/2014 Pedicini
8,746,526 B2 6/2014 Hlinka et al.
8,752,744 B2 6/2014 Okouchi et al.
D713,705 S 9/2014 Mina et al.
8,857,692 B2 10/2014 Shima et al.
8,931,677 B2 1/2015 Porth et al.
8,939,340 B2 1/2015 Gardner et al.
8,939,341 B2 1/2015 Pedicini et al.
8,960,516 B2 2/2015 Lijima et al.
8,960,635 B2 2/2015 Brendel et al.
8,985,424 B2 3/2015 Miyashita
8,998,057 B2 4/2015 Gathers
9,016,397 B2 4/2015 Kuroyanagi et al.
9,046,119 B2 6/2015 Choi
9,221,162 B2 12/2015 Kitagawa et al.
9,242,359 B2 1/2016 Staples et al.
9,321,162 B2 4/2016 Adachi et al.
9,333,632 B2 5/2016 Tanji
9,457,461 B2 10/2016 Francis et al.
9,469,021 B2 10/2016 Gregory et al.
9,486,904 B2 11/2016 Gregory et al.
9,498,871 B2 11/2016 Gregory et al.
9,522,464 B2 12/2016 Segura et al.
9,533,408 B2 1/2017 Forster et al.
9,555,530 B2 1/2017 Pedicini et al.
9,604,352 B2 3/2017 Kobayashi et al.
9,636,811 B2 5/2017 Segura
9,643,305 B2 5/2017 Gregory et al.
9,649,755 B2 5/2017 Gregory et al.
9,662,777 B2 5/2017 Pomeroy et al.
9,664,045 B2 5/2017 Mina et al.
9,664,387 B2 5/2017 Gerold et al.
9,669,529 B2 6/2017 Ishizawa et al.
9,731,408 B2 8/2017 Groer et al.
9,827,658 B2 11/2017 Gregory et al.
9,873,189 B2 1/2018 Gerold et al.
9,889,547 B2 2/2018 Marks
9,937,608 B2 4/2018 Hahn et al.
10,045,606 B2 8/2018 Cirincione, II et al.
10,150,208 B2 12/2018 Lin
10,160,108 B2 12/2018 Beck
10,173,310 B2 1/2019 Wyler et al.
10,215,219 B1 2/2019 Morley
D843,192 S 3/2019 Reed
10,220,497 B2 3/2019 Vandenberg
10,232,498 B2 3/2019 Nishida et al.
10,265,840 B2 4/2019 Anstett et al.
10,286,539 B2 5/2019 Francis et al.
10,307,903 B2 6/2019 Reed
D854,820 S 7/2019 Jablonski et al.
10,350,741 B2 7/2019 Brendel et al.
10,414,030 B2 9/2019 Vandenberg
10,414,033 B2 9/2019 Ekstrom et al.
10,421,176 B2 9/2019 Vandenberg
10,427,289 B2 10/2019 Segura et al.
10,456,897 B2 10/2019 Grandjean et al.
10,493,607 B2 12/2019 Jaskot et al.
10,500,713 B2 12/2019 Velderman et al.
10,576,616 B2 3/2020 Hays et al.
10,632,600 B2 4/2020 Pomeroy et al.
10,632,601 B2 4/2020 Pomeroy et al.
10,654,154 B2 5/2020 Schnell et al.

(56) References Cited

U.S. PATENT DOCUMENTS 10,668,608 B2 6/2020 Meyer
10,710,227 B2 7/2020 Pomeroy et al.
10,711,610 B2 7/2020 Mina et al.
10,717,178 B2 7/2020 Yamamoto et al.
10,744,629 B2 8/2020 Ishizawa
10,759,029 B2 9/2020 Schnell et al.
10,759,034 B2 9/2020 Dye
10,773,366 B2 9/2020 Kamimoto et al.
10,800,021 B2 10/2020 Tanaka
10,843,318 B2 11/2020 Kobori et al.
10,850,377 B2 12/2020 Steurer
10,875,166 B2 12/2020 Ueda
10,888,981 B2 1/2021 Gregory et al.
10,898,996 B2 1/2021 Heeb et al.
10,898,997 B2 1/2021 Yamamoto et al.
10,926,390 B2 2/2021 Dittrich et al.
10,926,391 B2 2/2021 Jablonski et al.
10,940,579 B2 3/2021 Watanabe et al.
10,946,506 B1 3/2021 Ueda
10,960,523 B1 3/2021 Connors
10,987,790 B2 4/2021 Garber
11,007,629 B2 5/2021 Yamamoto et al.
11,034,005 B2 6/2021 Suarez
11,052,522 B2 7/2021 Ishikawa et al.
11,072,058 B2 7/2021 Wyler et al.
11,123,849 B2 9/2021 Ishikawa et al.
11,161,230 B2 11/2021 Canlas, Jr. et al.
11,179,836 B2 11/2021 Gregory et al.
11,185,967 B2 11/2021 Oouchi
11,192,236 B2 12/2021 Velderman et al.
11,224,960 B2 1/2022 Garces et al.
11,229,995 B2 1/2022 Gregory et al.
11,279,014 B2 3/2022 Yamamoto et al.
11,298,811 B2 4/2022 Lin
11,305,413 B2 4/2022 Zhou et al.
11,338,422 B2 5/2022 Yamamoto et al.
11,376,722 B2 7/2022 Kondou et al.
11,498,194 B2 * 11/2022 Wechselberger ....... B25C 1/047
11,518,012 B2 12/2022 Takeuchi et al.
11,571,794 B2 * 2/2023 Bierdeman ............. B25C 1/041
11,590,638 B2 * 2/2023 Sato .......................... B25C 7/00
11,633,840 B2 * 4/2023 Liu ........................... B25C 1/06
227/8
2002/0017548 A1 2/2002 Jalbert et al.
2002/0079111 A1 6/2002 Camp
2002/0117531 A1 8/2002 Schell et al.
2002/0125294 A1 9/2002 Villela et al.
2003/0015565 A1 1/2003 Lee
2003/0183049 A1 10/2003 Bader et al.
2004/0050888 A1 3/2004 Warner
2004/0148786 A1 8/2004 Achterberg et al.
2005/0006426 A1 1/2005 Walter
2005/0133552 A1 6/2005 Lawrence
2006/0022002 A1 2/2006 Marks
2006/0104732 A1 5/2006 Huang
2006/0108391 A1 5/2006 Leasure
2006/0162302 A1 7/2006 Terrell
2006/0261128 A1 11/2006 Wen
2006/0261129 A1 11/2006 McGee et al.
2006/0273132 A1 12/2006 Leasure et al.
2007/0080278 A1 4/2007 Wen
2007/0090148 A1 4/2007 Cho et al.
2007/0108250 A1 5/2007 Odoni et al.
2007/0194077 A1 8/2007 Lee
2007/0215668 A1 9/2007 Tabacco et al.
2007/0267458 A1 11/2007 Chen
2008/0000939 A1 1/2008 Walsh et al.
2008/0006673 A1 1/2008 Chou et al.
2008/0017685 A1 1/2008 Buck et al.
2008/0017686 A1 1/2008 Buck
2008/0017687 A1 1/2008 Buck et al.
2008/0073404 A1 3/2008 Hylton
2008/0110652 A1 5/2008 Wen
2008/0148915 A1 6/2008 Nickels et al.
2008/0164295 A1 7/2008 Wu et al.
2009/0120281 A1 5/2009 Yang
2009/0134191 A1 5/2009 Phillips
2009/0166394 A1 7/2009 Gyorkos
2009/0277939 A1 11/2009 Ou
2010/0001034 A1 1/2010 Huang
2010/0243286 A1 9/2010 Hoshino et al.
2011/0049215 A1 3/2011 Mcafee et al.
2011/0067895 A1 3/2011 Nobe et al.
2011/0198381 A1 * 8/2011 McCardle ................. B25C 1/06
227/8
2011/0235679 A1 9/2011 Cordeiro et al.
2011/0303428 A1 12/2011 Roth et al.
2011/0303728 A1 12/2011 Franz et al.
2011/0303733 A1 12/2011 Fielitz et al.
2011/0308829 A1 12/2011 Yang
2012/0113571 A1 5/2012 Merhar, III et al.
2012/0160889 A1 6/2012 Tanji
2013/0206811 A1 8/2013 Zhao et al.
2013/0320063 A1 12/2013 Gregory et al.
2013/0320064 A1 12/2013 Gregory et al.
2014/0001229 A1 1/2014 Ichikawa et al.
2014/0034701 A1 2/2014 Komazaki
2014/0047722 A1 2/2014 Onose et al.
2014/0076954 A1 3/2014 Miller et al.
2014/0097217 A1 4/2014 Walsh
2014/0158740 A1 6/2014 Akutsu et al.
2014/0263535 A1 9/2014 Rajani et al.
2015/0136434 A1 5/2015 Aoki et al.
2015/0266201 A1 9/2015 Nakashima
2015/0283690 A1 10/2015 Welte et al.
2016/0229043 A1 * 8/2016 Wyler ........................ B25C 1/06
2016/0271748 A1 9/2016 Gerold et al.
2016/0288305 A1 * 10/2016 McCardle ............... B25C 1/047
2016/0368126 A1 12/2016 Liu et al.
2017/0259422 A1 9/2017 Takeyama et al.
2017/0361442 A1 12/2017 Fairbanks et al.
2017/0361443 A1 12/2017 Sareault et al.
2018/0126528 A1 * 5/2018 Pomeroy ................... B25C 5/13
2018/0126529 A1 * 5/2018 Pomeroy ................. B25C 1/008
2019/0111552 A1 4/2019 Nagao
2019/0224831 A1 7/2019 Yamamoto et al.
2019/0224832 A1 7/2019 Watanabe et al.
2019/0224833 A1 7/2019 Watanabe et al.
2019/0275625 A1 9/2019 Weissenfels
2019/0291248 A1 9/2019 Vandenberg
2020/0030954 A1 1/2020 Wolf et al.
2020/0030955 A1 1/2020 Kurth et al.
2020/0114500 A1 * 4/2020 Bierdeman ............. B25C 1/047
2020/0130156 A1 4/2020 Takeuchi et al.
2020/0194747 A1 6/2020 Rudolph et al.
2020/0215672 A1 7/2020 Pomeroy et al.
2020/0230791 A1 7/2020 Pomeroy et al.
2020/0316766 A1 10/2020 Machida
2020/0391364 A1 12/2020 Yasutomi et al.
2020/0391365 A1 12/2020 Tanaka
2020/0398413 A1 12/2020 Tanaka
2021/0031351 A1 2/2021 Tanaka
2021/0107125 A1 4/2021 Gregory et al.
2021/0154818 A1 5/2021 Watanabe et al.
2021/0197352 A1 7/2021 Ueda
2021/0229251 A1 7/2021 Dittrich et al.
2021/0237253 A1 8/2021 Moss et al.
2021/0276170 A1 9/2021 Li et al.
2021/0299834 A1 9/2021 Canlas, Jr. et al.
2021/0299835 A1 9/2021 Ward et al.
2021/0299837 A1 9/2021 Garces et al.
2021/0347022 A1 11/2021 Leathrum et al.
2021/0347023 A1 * 11/2021 Carrier ...................... B25C 1/06
2021/0347025 A1 11/2021 Wyler et al.
2021/0347026 A1 11/2021 Wyler et al.
2021/0362311 A1 11/2021 Garces et al.
2021/0387318 A1 12/2021 Ueda
2022/0040810 A1 2/2022 Schlosser et al.
2022/0055204 A1 2/2022 Velderman et al.
2022/0065283 A1 3/2022 Pöltinger et al.
2022/0080571 A1 3/2022 Gregory et al.
2022/0105614 A1 4/2022 Robinson et al.
2022/0134525 A1 * 5/2022 Bandy ................... B25C 5/1665
227/123

(56) References Cited

U.S. PATENT DOCUMENTS

| | | | |
|---|---|---|---|
| 2022/0178147 | A1 | 6/2022 | Schuss, Jr. et al. |
| 2022/0184786 | A1 | 6/2022 | Tse et al. |
| 2022/0388136 | A1 | 12/2022 | Rux |

FOREIGN PATENT DOCUMENTS

| | | | |
|---|---|---|---|
| CN | 201300400 | Y | 9/2009 |
| CN | 101259611 | B | 4/2010 |
| CN | 101905455 | A | 12/2010 |
| CN | 201848826 | U | 6/2011 |
| CN | 102303308 | A | 1/2012 |
| CN | 102205531 | B | 11/2014 |
| CN | 103372845 | B | 7/2015 |
| CN | 204525371 | U | 8/2015 |
| CN | 204640154 | U | 9/2015 |
| CN | 205166854 | U | 4/2016 |
| CN | 205967636 | U | 2/2017 |
| CN | 108145658 | A | 6/2018 |
| CN | 207509150 | U | 6/2018 |
| CN | 207824808 | U | 9/2018 |
| CN | 209615401 | U | 11/2019 |
| CN | 209773603 | U | 12/2019 |
| CN | 112077794 | A | 12/2020 |
| DE | 6926965 | U | 11/1969 |
| DE | 2248956 | A1 | 4/1973 |
| DE | 2428774 | A1 | 12/1975 |
| DE | 2439147 | A1 | 2/1976 |
| DE | 9001996 | U1 | 4/1990 |
| DE | 4121256 | A1 | 1/1993 |
| DE | 19906680 | A1 | 8/2000 |
| DE | 10125846 | A1 | 12/2001 |
| DE | 102004032788 | A1 | 2/2006 |
| DE | 202006008503 | U1 | 8/2006 |
| DE | 102005045915 | A1 | 3/2007 |
| DE | 102005000145 | A1 | 5/2007 |
| DE | 102006027575 | A1 | 12/2007 |
| DE | 102006046842 | A1 | 4/2008 |
| DE | 102006053149 | A1 | 5/2008 |
| DE | 202010012259 | U1 | 12/2010 |
| DE | 202013103822 | U1 | 11/2013 |
| DE | 202021102698 | U1 | 11/2021 |
| EP | 1582300 | A2 | 10/2005 |
| EP | 2883664 | A1 | 6/2015 |
| EP | 3653341 | A1 | 5/2020 |
| EP | 3653342 | A2 | 5/2020 |
| EP | 3517254 | B1 | 11/2021 |
| WO | WO0214026 | A2 | 2/2002 |
| WO | WO2004048046 | A1 | 6/2004 |
| WO | WO2006036046 | A1 | 4/2006 |
| WO | WO2012006312 | A1 | 1/2012 |
| WO | WO2012082850 | A2 | 6/2012 |
| WO | WO2012113443 | A1 | 8/2012 |
| WO | WO2012114292 | A1 | 8/2012 |
| WO | WO2014119168 | A1 | 8/2014 |
| WO | WO2016177795 | A1 | 11/2016 |
| WO | WO2017090376 | A1 | 6/2017 |
| WO | WO2020008768 | A1 | 1/2020 |
| WO | WO2021001196 | A1 | 1/2021 |
| WO | WO2021084993 | A1 | 5/2021 |
| WO | WO2021242305 | A1 | 12/2021 |

OTHER PUBLICATIONS

Siding Tips, “Siding Tips,” available at <https://www.sidingtips.ca/> web page visited Feb. 22, 2023 (2 pages).

Amazon, “BOSTITCH VSA4 Vinyl Siding Adaptor Kit,” available at <https://www.amazon.com/BOSTITCH-VSA4-Vinyl-Siding-Adaptor/dp/B000EDRQRI> web page visited Feb. 22, 2023 (8 pages).

Dewalt, “20V MAX Lithium-Ion 15-Degree Cordless Roofing Nailer Kit with 2.0 Ah Battery Charger and Bag,” available at <https://www.homedepot.com/p/DEWALT-20V-MAX-Lithium-Ion-15-Degree-Cordless-Roofing-Nailer-Kit-with-2-0Ah-Battery-Charger-and-Bag-DCN45RND1/312302764> web page visited Feb. 22, 2023 (5 pages).

* cited by examiner

POWERED FASTENER DRIVER

CROSS-REFERENCE TO RELATED APPLICATIONS

This application claims priority to U.S. Provisional Patent Application No. 63/311,488 filed on Feb. 18, 2022, U.S. Provisional Patent Application No. 63/351,473 filed on Jun. 13, 2022, and U.S. Provisional Patent Application No. 63/381,488 filed on Oct. 28, 2022, the entire contents of each of which are incorporated herein by reference.

FIELD OF THE INVENTION

The present invention relates to powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver comprising a housing, a nosepiece extending from the housing, a driver blade movable within the nosepiece between a ready position and a driven position, a piston coupled to the driver blade for movement therewith, a driver cylinder within which the piston is movable, and a storage chamber cylinder containing pressurized gas therein and in fluid communication with the driver cylinder, a first end of the driver cylinder being affixed to a corresponding first end of the storage chamber cylinder. The storage chamber cylinder includes a plurality of pockets defined on an inner surface of the storage chamber cylinder proximate the first end of the storage chamber cylinder. The pockets at least partially surround the driver cylinder and each have an open end facing a second end of the storage chamber cylinder opposite the first end.

The present invention provides, in another aspect, a powered fastener driver comprising a housing, a nosepiece extending from the housing, a driver blade movable within the nosepiece between a ready position and a driven position, a piston coupled to the driver blade for movement therewith, a driver cylinder within which the piston is movable, and a storage chamber cylinder containing pressurized gas therein and in fluid communication with the driver cylinder. The piston includes a first portion to which the driver blade is affixed and an annular, second portion surrounding the first portion, and wherein the first and second portions are composed of two distinct materials.

The present invention provides, in another aspect, a method of manufacturing a piston for a powered fastener driver. The method includes forming a first portion of the piston to which a driver blade is attachable. The method also includes press-fitting an annular, second portion of the piston around an exterior periphery of the first portion of the piston. The method further includes machining an outer diameter of the second portion to a value that is nominally less than an inner diameter of a driver cylinder within which the piston is insertable.

The present invention provides, in another aspect, a powered fastener driver comprising a housing, a nosepiece extending from the housing, a driver blade movable within the nosepiece between a ready position and a driven position, a piston coupled to the driver blade for movement therewith, a driver cylinder within which the piston is movable, and a storage chamber cylinder containing pressurized gas therein and in fluid communication with the driver cylinder. The nosepiece includes an attachment portion a tubular portion extending from the mount portion. The attachment portion is coupled to the storage chamber cylinder. The attachment portion and the tubular portion of the nosepiece are formed of one continuous piece of material.

The present invention provides, in another aspect, a powered fastener driver comprising a housing, a nosepiece extending from the housing, a driver blade movable within the nosepiece between a ready position and a driven position along a driving axis, a drive mechanism operatively coupled with the driver blade to drive the driver blade, a canister magazine coupled to the nosepiece in which collated fasteners are receivable, and a pusher mechanism coupled to the nosepiece for individually transferring collated fasteners in the canister magazine to a driver channel in the nosepiece. A first of the fasteners transferred into the driver channel is oriented at an oblique angle relative to the driving axis when received within the driver channel.

The present invention provides, in another aspect, a powered fastener driver comprising a housing, a nosepiece extending from the housing, a driver blade movable within the nosepiece between a ready position and a driven position, a drive mechanism operatively coupled with the driver blade to drive the driver blade, a canister magazine coupled to the nosepiece in which collated fasteners are receivable, and a pusher mechanism coupled to the nosepiece for individually transferring collated fasteners in the canister magazine to a driver channel in the nosepiece, a first guidance dongle adjacent the nosepiece, and a second guidance dongle adjacent the nosepiece opposite the first guidance dongle. The first guidance dongle is configured to locate a target on a workpiece and the second guidance dongle is configured to guide a nail as it exits the powered fastener driver.

The present invention provides, in yet another aspect, a powered fastener driver comprising a housing including a head portion, a handle portion extending therefrom, the handle portion including a first end coupled with the head portion and an opposite, second end, and a drive unit portion, a nosepiece extending from the housing, a driver blade movable within the nosepiece along a driving axis, a drive mechanism operatively coupled with the driver blade to drive the driver blade, and a canister magazine configured to receive coiled fasteners. The canister magazine includes a nail plate, a hollow support post extending therefrom, and an adjustment post slidably and rotatably disposed within the hollow support post. The adjustment post includes a plurality of axial detents, a plurality of radial detents, and a plurality of locking grooves. The radial detents indicate where the hollow support post is locked axially with respect to the adjustment post and the axial detents indicate where the hollow support post is aligned with at least one locking groove.

The present invention provides, in still another aspect, a powered fastener driver comprising a housing, a nosepiece extending from the housing, a driver blade movable within the nosepiece between a ready position and a driven position along a driving axis, a drive mechanism operatively coupled with the driver blade to drive the driver blade, and a pusher mechanism coupled to the nosepiece for individually transferring to a driver channel in the nosepiece. At least a portion of the housing is covered with a heat reducing exterior coating, wherein the heat reducing exterior coating is a reflective coating configured to reflect sunlight from the fastener driver.

The present invention provides, in another aspect, a powered fastener driver comprising a housing, a nosepiece extending from the housing, a workpiece contact bracket at least partially surrounding the nosepiece, wherein the workpiece contact bracket slides on the nosepiece, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, a lifting mechanism disposed within the housing and operable to move the driver blade to the ready position, and a sensor bracket positioned within the housing. The sensor bracket includes an elongated body formed with a first sensor pocket having a first sensor disposed therein for detecting angular motion of the lifting mechanism and a second sensor pocket having a second sensor disposed therein for detecting linear motion of the workpiece contact bracket.

The present invention provides, in yet another aspect, a powered fastener driver comprising a housing, a nosepiece extending from the housing, a workpiece contact bracket at least partially surrounding the nosepiece, wherein the workpiece contact bracket slides on the nosepiece, a driver blade movable within the nosepiece between a ready position and a driven position, and a drive mechanism operatively coupled with the driver blade to drive the driver blade. The nosepiece includes a tail extending outwardly at least partially along a length of the nosepiece and the workpiece contact bracket includes an internal bore having a tail socket extending at least partially along a length of the workpiece contact bracket, wherein the tail of the nosepiece fits into the tail socket of the workpiece contact bracket to form a slip fit elongated dovetail joint between the nosepiece and the workpiece contact bracket.

The present invention provides, in yet another aspect, a power tool comprising a housing, a motor within the housing, and a dual-purpose hook assembly affixed to the housing. The dual-purpose hook assembly includes a hinge bracket, a clasp, and a hook having a belt hook portion and a rafter hook portion perpendicular to the belt hook portion. The hook is rotatable between a first position in which the hook is engaged with the clasp and the belt hook portion is parallel with a face of the housing to allow the power tool to be hung on a belt and a second position in which the hook is disengaged from the clasp and the hook is rotated away from the housing to allow the power tool to be hung on a portion of a structure.

The present invention provides, in yet another aspect, a powered fastener driver comprising a housing, a nosepiece extending from the housing, a workpiece contact bracket at least partially surrounding the nosepiece, wherein the workpiece contact bracket slides on the nosepiece and wherein the workpiece contact bracket includes a first lockout tab, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, a dry-fire lockout bracket adjacent the nosepiece, and a dry-fire lockout rotatably disposed on the dry-fire lockout bracket adjacent the nosepiece and including a second lockout tab. The dry-fire lockout is movable between a first position in which the second locking tab of the dry-fire lockout blocks the first locking tab on the workpiece contact bracket to prevent movement of the workpiece contact bracket and prevent dry firing of the powered fastener driver and a second position in which the second locking tab of the dry-fire lockout bypasses the first locking tab on the workpiece contact bracket to allow movement of the workpiece contact bracket and allow the powered fastener driver to actuate.

The present invention provides, in yet another aspect, a powered fastener driver comprising a housing, a nosepiece extending from the housing, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, a canister magazine coupled to the nosepiece in which collated fasteners are receivable, and a pusher mechanism coupled to the nosepiece for individually transferring collated fasteners in the canister magazine to a driver channel in the nosepiece, wherein a portion of a nail loaded into the driver channel of the nosepiece extends beyond and end of the nosepiece and is exposed.

The present invention provides, in yet another aspect, a powered fastener driver comprising a housing, a nosepiece extending from the housing, a driver blade movable within the nosepiece between a ready position and a driven position the driver blade comprising a plurality of drive teeth on a first side of the driver blade and a plurality of locking projections on a second side of the driver blade, a piston coupled to the driver blade for movement therewith, a driver cylinder within which the piston is movable, a storage chamber cylinder containing pressurized gas therein and in fluid communication with the driver cylinder, a first end of the driver cylinder being affixed to a corresponding first end of the storage chamber cylinder, and a latch actuator assembly adjacent the driver blade, wherein the latch actuator assembly includes a latch to engage one of the plurality of locking projections to prevent the driver blade from moving toward the driven position.

The present invention provides, in yet another aspect, a powered fastener driver comprising a housing, a nosepiece extending from the housing, a driver blade movable within the nosepiece between a ready position and a driven position the driver blade comprising a plurality of drive teeth on a first side of the driver blade and a plurality of locking projections on a second side of the driver blade, a piston coupled to the driver blade for movement therewith, a driver cylinder within which the piston is movable, a storage chamber cylinder containing pressurized gas therein and in fluid communication with the driver cylinder, a first end of the driver cylinder being affixed to a corresponding first end of the storage chamber cylinder, a latch actuator assembly adjacent the driver blade, wherein the latch actuator assembly includes a latch to engage one of the plurality of locking projections to prevent the driver blade from moving toward the driven position, and a lifting mechanism having a rotatable lifter with a cam formed thereon, wherein as the lifter rotates the cam moves a shuttle operably coupled to the latch to disengage the latch from the plurality of locking projections to allow the driver blade to move to the driven position.

The present invention provides, in yet another aspect, a powered fastener driver comprising a housing, a nosepiece extending from the housing, a driver blade movable within the nosepiece between a ready position and a driven position the driver blade comprising a plurality of drive teeth on a first side of the driver blade and a plurality of locking projections on a second side of the driver blade, a piston coupled to the driver blade for movement therewith, a driver cylinder within which the piston is movable, a storage chamber cylinder containing pressurized gas therein and in fluid communication with the driver cylinder, a first end of the driver cylinder being affixed to a corresponding first end of the storage chamber cylinder, wherein the storage chamber cylinder includes a sensor port that is in fluid communication with an interior of the storage chamber cylinder and a sensor is disposed within the sensor port to detect at least one property within the storage chamber cylinder.

The present invention provides, in yet another aspect, a powered fastener driver comprising a housing, a nosepiece extending from the housing, a driver blade movable within the nosepiece between a ready position and a driven position the driver blade, a piston coupled to the driver blade for movement therewith, wherein the piston includes a generally cylindrical core having a guide disposed around the core, and a seal disposed around the guide, a driver cylinder within which the piston is movable, and a storage chamber cylinder containing pressurized gas therein and in fluid communication with the driver cylinder, a first end of the driver cylinder being affixed to a corresponding first end of the storage chamber cylinder.

The present invention provides, in yet another aspect, a powered fastener driver comprising a housing, a nosepiece extending from the housing, a driver blade movable within the nosepiece between a ready position and a driven position the driver blade comprising a plurality of drive teeth on a first side of the driver blade and a plurality of locking projections on a second side of the driver blade, a piston coupled to the driver blade for movement therewith, a driver cylinder within which the piston is movable, a storage chamber cylinder containing pressurized gas therein and in fluid communication with the driver cylinder, a first end of the driver cylinder being affixed to a corresponding first end of the storage chamber cylinder, a latch actuator assembly adjacent the driver blade, wherein the latch actuator assembly includes a latch to engage one of the plurality of locking projections to prevent the driver blade from moving toward the driven position, and a lifting mechanism having a rotatable lifter with a plurality of drive pins that engage the drive teeth on the driver blade to move the driver blade to the ready position, wherein the lifter further comprises a cam formed on an upper surface thereof to actuate the latch assembly and release the driver blade to the driven position and a magnet nested within the cam, wherein the magnet is sensed by a sensor to de-energize a motor coupled to the lifter when the driver blade is moved to the ready position.

The present invention provides, in yet another aspect, a powered fastener driver comprising a housing, a nosepiece extending from the housing, a workpiece contact bracket at least partially surrounding the nosepiece, wherein the workpiece contact bracket is movable relative to the nosepiece and wherein the workpiece contact bracket is sized and shaped to removably receive an accessory thereon, wherein the accessory is fitted over the workpiece contact bracket and rotated into position on the workpiece contact bracket, and wherein the accessory centers the workpiece contact bracket relative to an exterior wall covering, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, and a lifting mechanism disposed within the housing and operable to move the driver blade to the ready position.

The present invention provides, in yet another aspect, a siding tip for a powered fastener driver, the siding tip comprising a generally cylindrical body having a disk-shaped base and a cylindrical peripheral sidewall extending from the disk-shaped base, a first tab extending radially inward from the cylindrical sidewall and spaced axially apart from the disk-shaped base, and a second tab extending radially inward from the cylindrical sidewall and spaced axially apart from the disk-shaped base, wherein the first tab and the second tab fit over a workpiece contact bracket of a fastener driver and the siding tip is rotatable to engage the workpiece contact bracket to lock the siding tip on the workpiece contact bracket.

The present invention provides, in yet another aspect, a powered fastener driver comprising a housing, a nosepiece extending from the housing, a workpiece contact bracket at least partially surrounding the nosepiece, wherein the workpiece contact bracket is movable relative to the nosepiece, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, a lifting mechanism disposed within the housing and operable to move the driver blade to the ready position, and a light source extending from the housing in the same direction as the nosepiece, wherein the light source illuminates a workpiece during use.

The present invention provides, in yet another aspect, a powered fastener driver comprising a housing, a nosepiece extending from the housing, a workpiece contact bracket at least partially surrounding the nosepiece, wherein the workpiece contact bracket is movable relative to the nosepiece, a driver blade movable within the nosepiece between a ready position and a driven position, wherein the driver blade includes an actuator tooth, a piston coupled to the driver blade for movement therewith, a driver cylinder within which the piston is movable, a storage chamber cylinder containing pressurized gas therein and in fluid communication with the driver cylinder, a lifting mechanism disposed within the housing and operable to move the driver blade to the ready position, and a fastener delivery mechanism disposed adjacent the nosepiece, wherein the fastener delivery mechanism is actuated by the actuator tooth on the driver blade as the driver blade is returned to the ready position to load a fastener into the nosepiece.

The present invention provides, in still another aspect, a method of operating a powered fastener driver, the method comprising detecting a temperature within a storage chamber cylinder, monitoring the temperature, determining whether the temperature exceeds a predetermined threshold, and slowing a firing rate of the powered fastener driver, when the temperature exceeds the predetermined threshold.

The present invention provides, in another aspect, a siding tip for a powered fastener driver that includes a generally U-shaped body, a first tab extending rearward from the U-shaped body, a second tab extending rearward from the U-shaped body on an opposite side of the body from the first tab, a first guide tip extending forward from the U-shaped body, and a second guide tip extending forward from the U-shaped body on an opposite side of the body from the first guide tip.

The present invention provides, in still another aspect, a powered fastener driver that includes a housing, a nosepiece extending from the housing, a driver blade movable within the nosepiece between a ready position and a driven position the driver blade comprising a plurality of drive teeth on a first side of the driver blade and a plurality of locking projections on a second side of the driver blade; a piston coupled to the driver blade for movement therewith, a driver cylinder within which the piston is movable, and a motor disposed within the housing for driving a lifting mechanism to move the driver blade to the ready position, the motor including a motor hall board with a temperature sensor disposed therein to measure an air temperature between the motor hall board and one or more stator coils within the motor.

Other features and aspects of the invention will become apparent by consideration of the following detailed description and accompanying drawings.

BRIEF DESCRIPTION OF THE DRAWINGS

FIG. 119 is a left side plan view of a gas-spring powered fastener driver in accordance with another embodiment of the invention.

FIG. 120 is a right side plan view of the fastener driver of FIG. 120.

FIG. 121 is a front plan view of the fastener driver of FIG. 120.

FIG. 122 is a plan view of a wear pad of the fastener driver of FIG. 120.

FIG. 123 is another plan view of the wear pad of FIG. 122.

FIG. 124 is a plan view of another wear pad of the fastener driver of FIG. 120.

FIG. 125 is another plan view of the wear pad of FIG. 124.

FIG. 126 is a perspective view of an abrasion resistant plate of the fastener driver of FIG. 120.

FIG. 127 is a plan view of the abrasion resistant plate of FIG. 126.

FIG. 128 is another plan view of the abrasion resistant plate of FIG. 126.

FIG. 129 is a perspective view of a workpiece contact bracket of the fastener driver of FIG. 120.

FIG. 130 is another perspective view of the workpiece contact bracket of FIG. 129.

Figure 131:
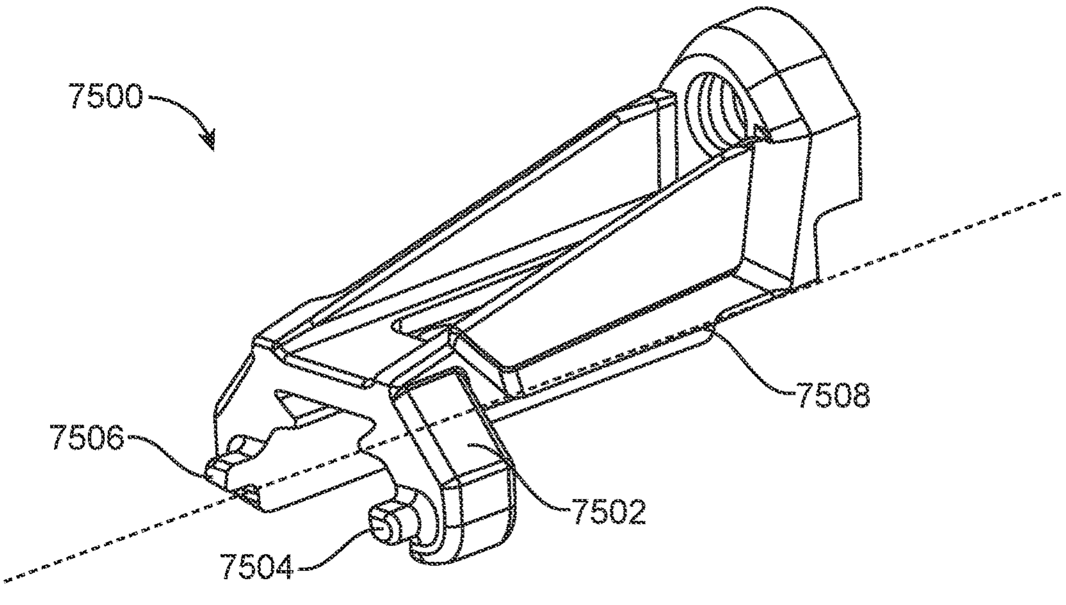

FIG. 131 is a perspective view of another workpiece contact bracket.

Figure 132:
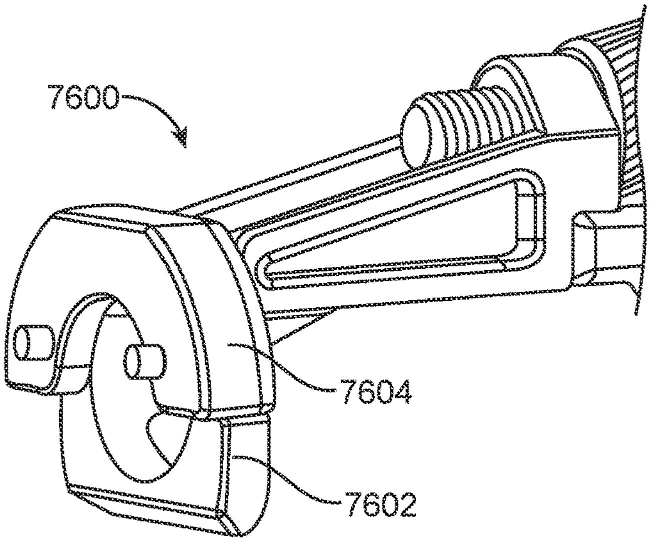

FIG. 132 is a perspective view of yet another workpiece contact bracket.

Figure 133:
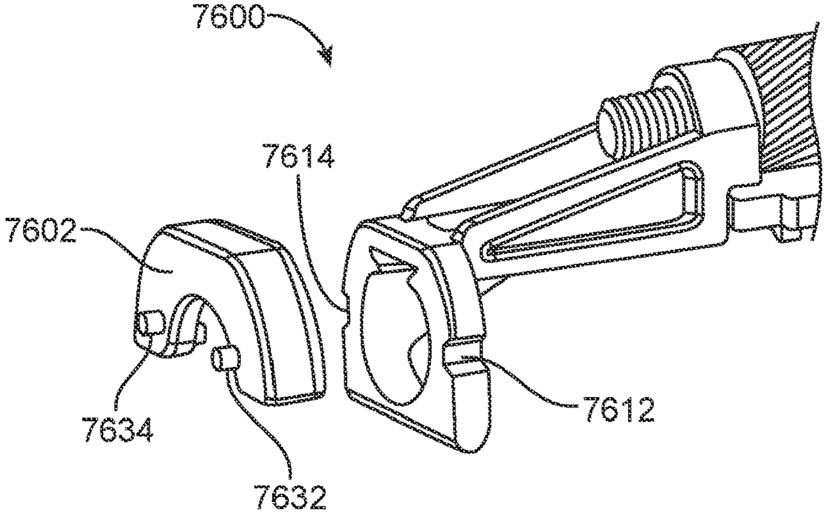

FIG. 133 is another perspective view of the workpiece contact bracket of FIG. 132.

Figure 134:
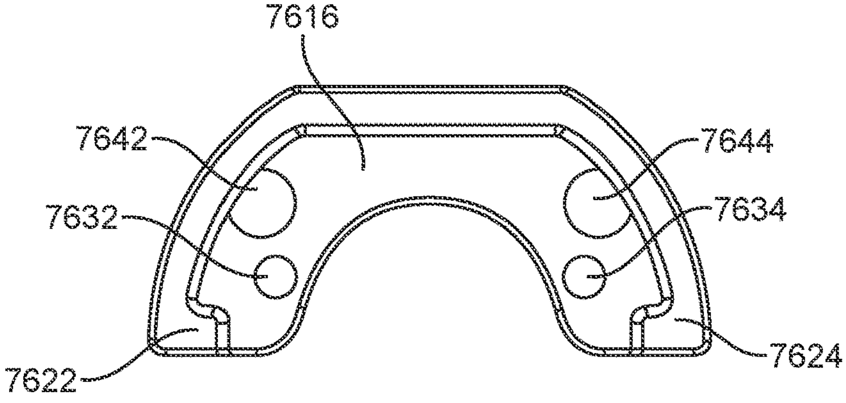

FIG. 134 is a plan view of a siding tip for the workpiece contact bracket of FIG. 132.

Figure 135:
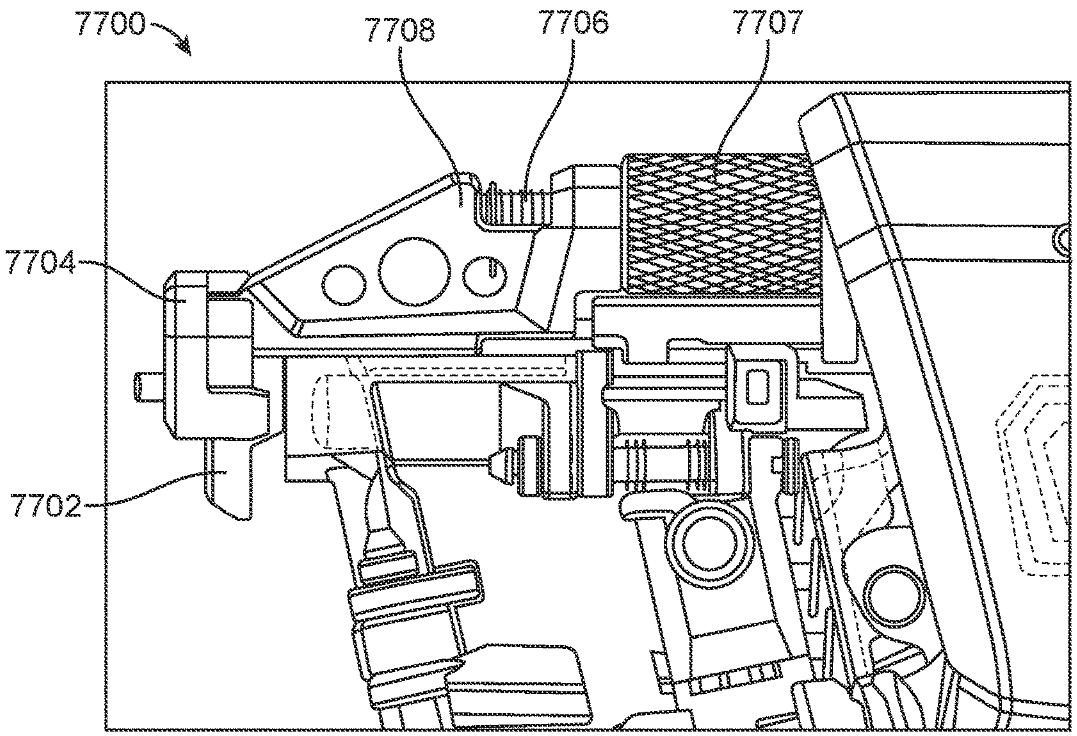

FIG. 135 is a plan view of yet another workpiece contact bracket.

Figure 136:
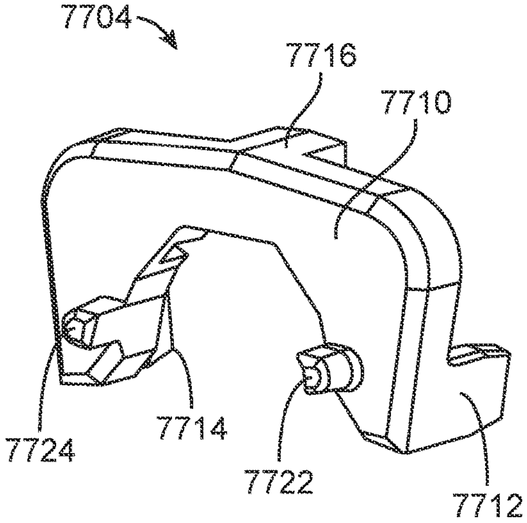

FIG. 136 is a perspective view of another fastener driver accessory.

Figure 137:
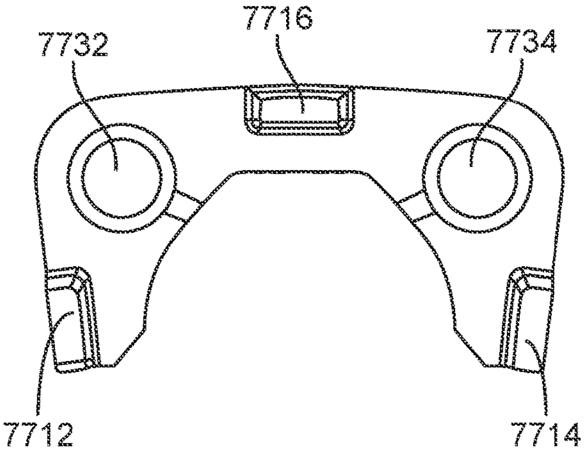

FIG. 137 is a plan view of another fastener driver accessory.

Figure 138:
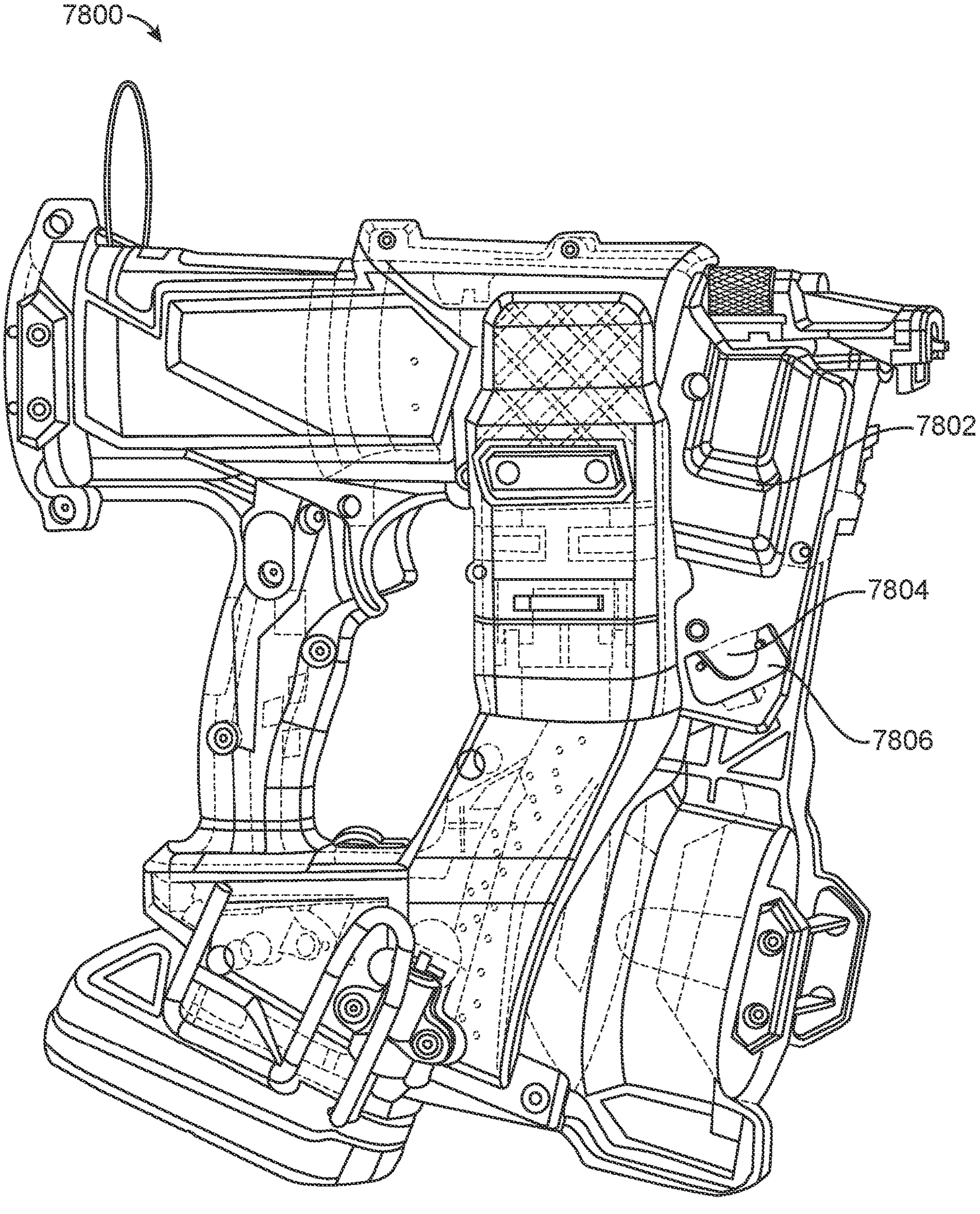

FIG. 138 is a side plan view of another gas-spring fastener driver.

Figure 139:
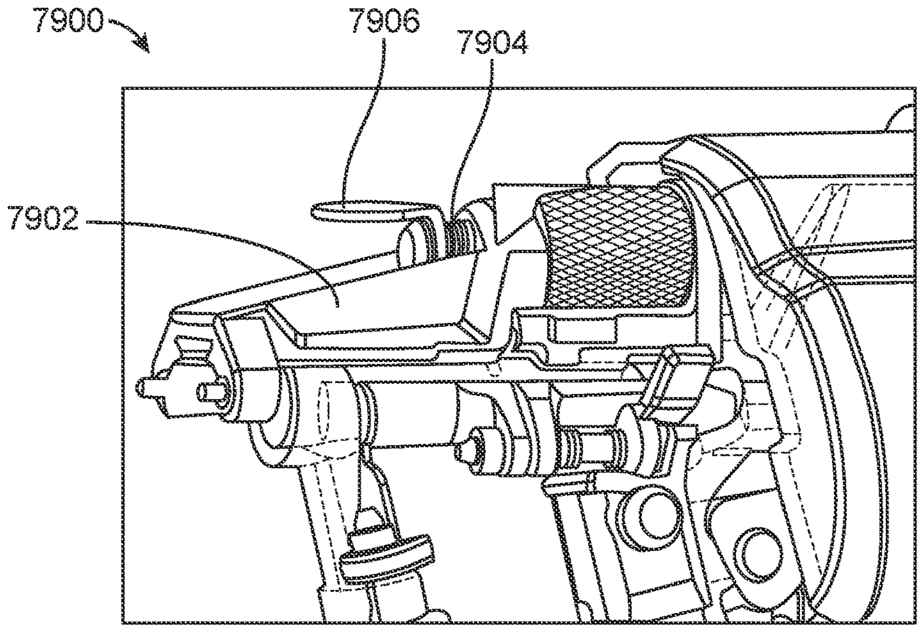

FIG. 139 is a perspective view of still another gas-spring fastener driver.

Figure 140:
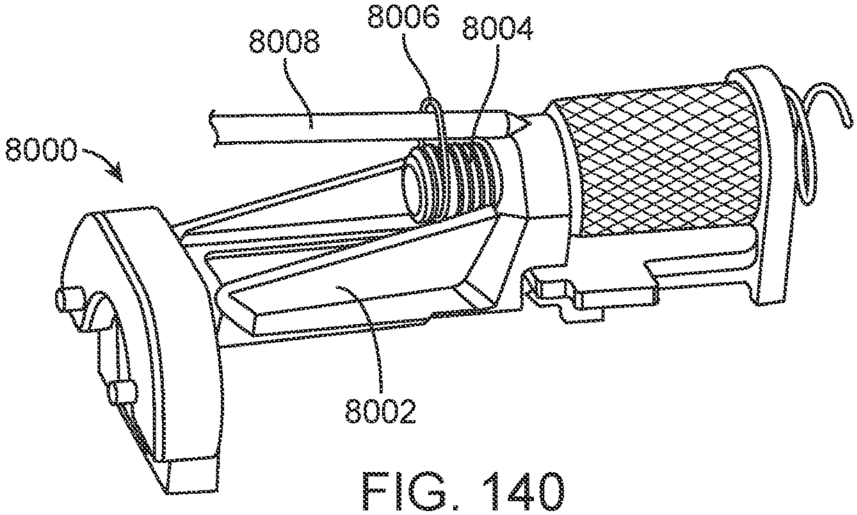

FIG. 140 is a perspective view of yet still another gas-spring fastener driver.

Figure 141:
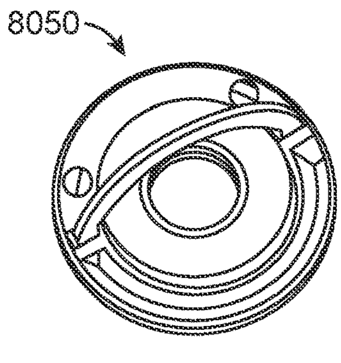

FIG. 141 is a perspective view of a retainer for a workpiece contact bracket.

Figure 142:
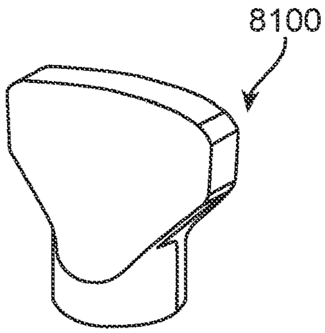

FIG. 142 is a perspective view of another retainer for a workpiece contact bracket.

Figure 143:
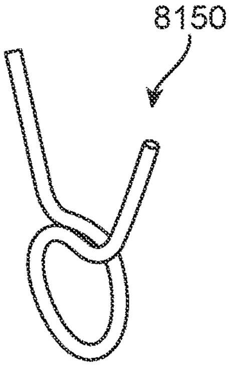

FIG. 143 is a perspective view of yet another retainer for a workpiece contact bracket.

Figure 144:
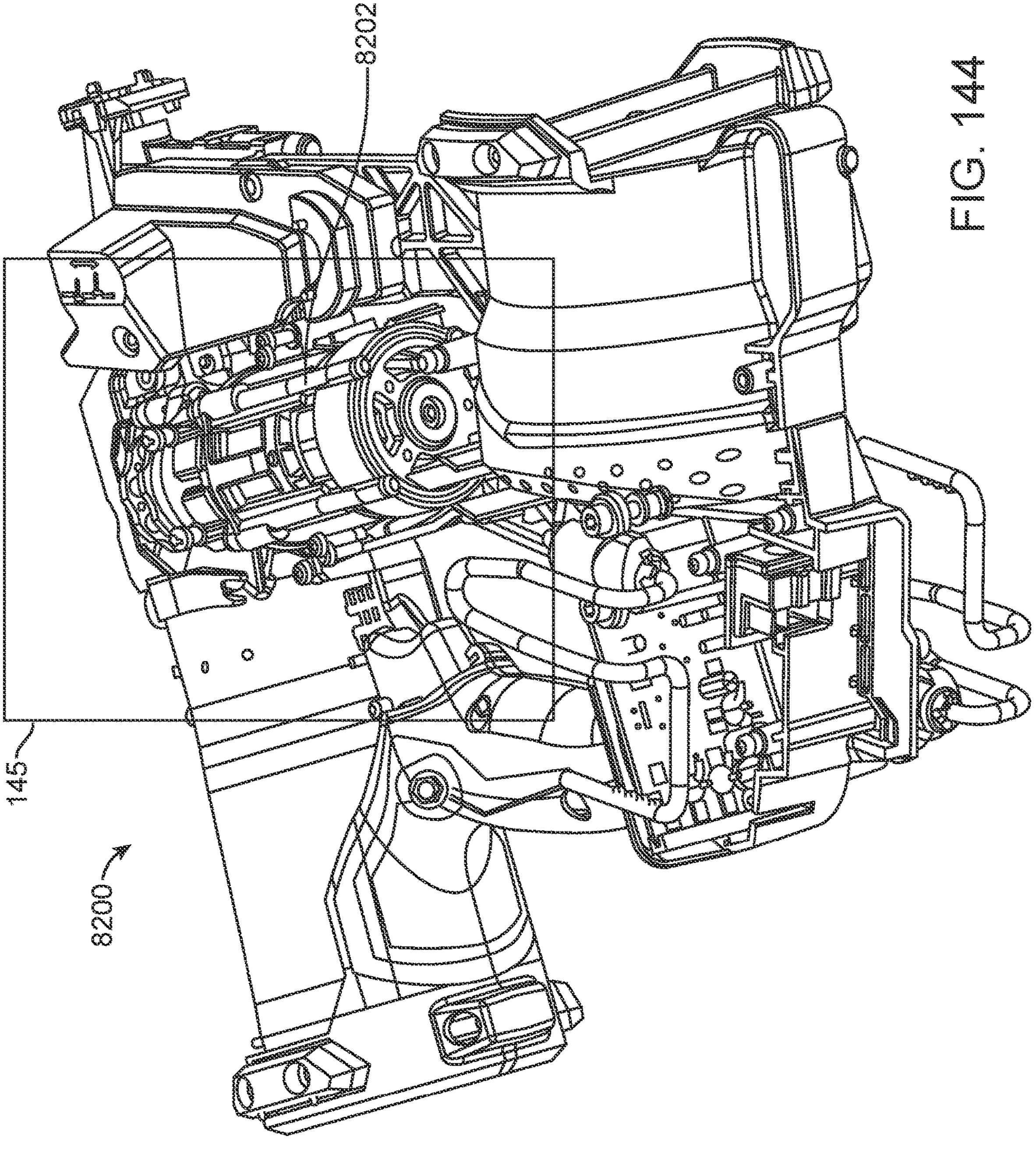

FIG. 144 is a perspective view of another gas-spring fastener driver with a portion of the housing removed.

Figure 145:
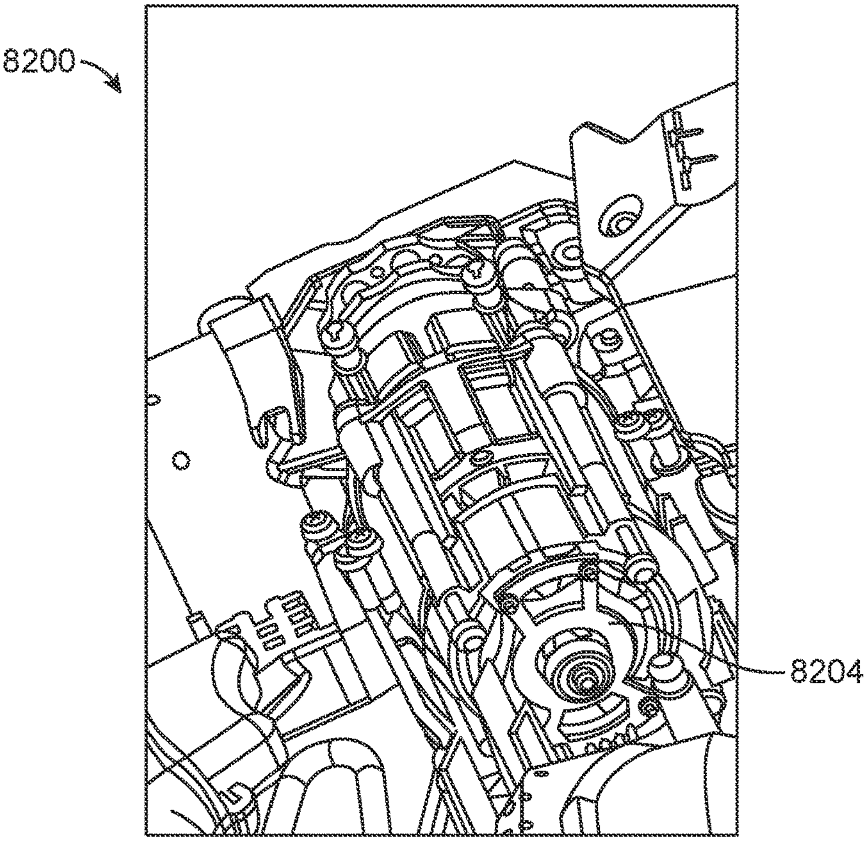

FIG. 145 is a detailed view of the fastener driver of FIG. 144 taken at box 145 in FIG. 144 with a portion of a motor housing removed.

Figure 146:
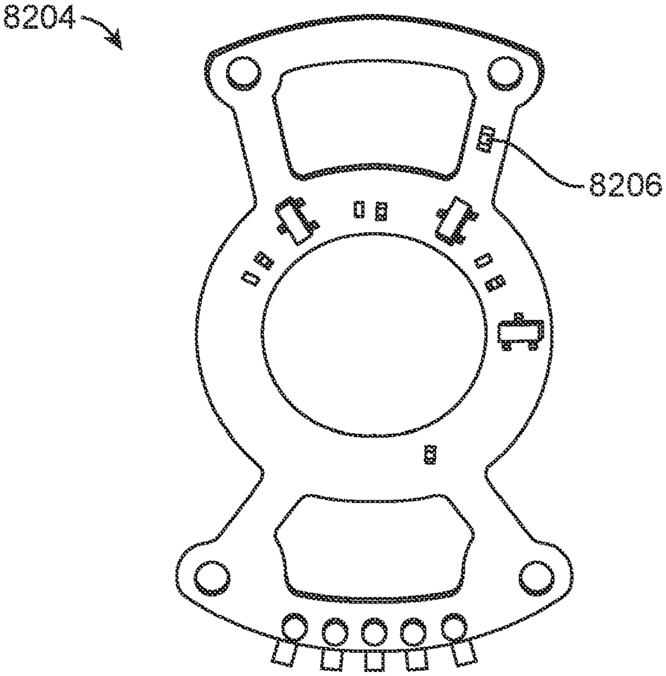

FIG. 146 is a plan view of a printed circuit board of the fastener driver of FIG. 144.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
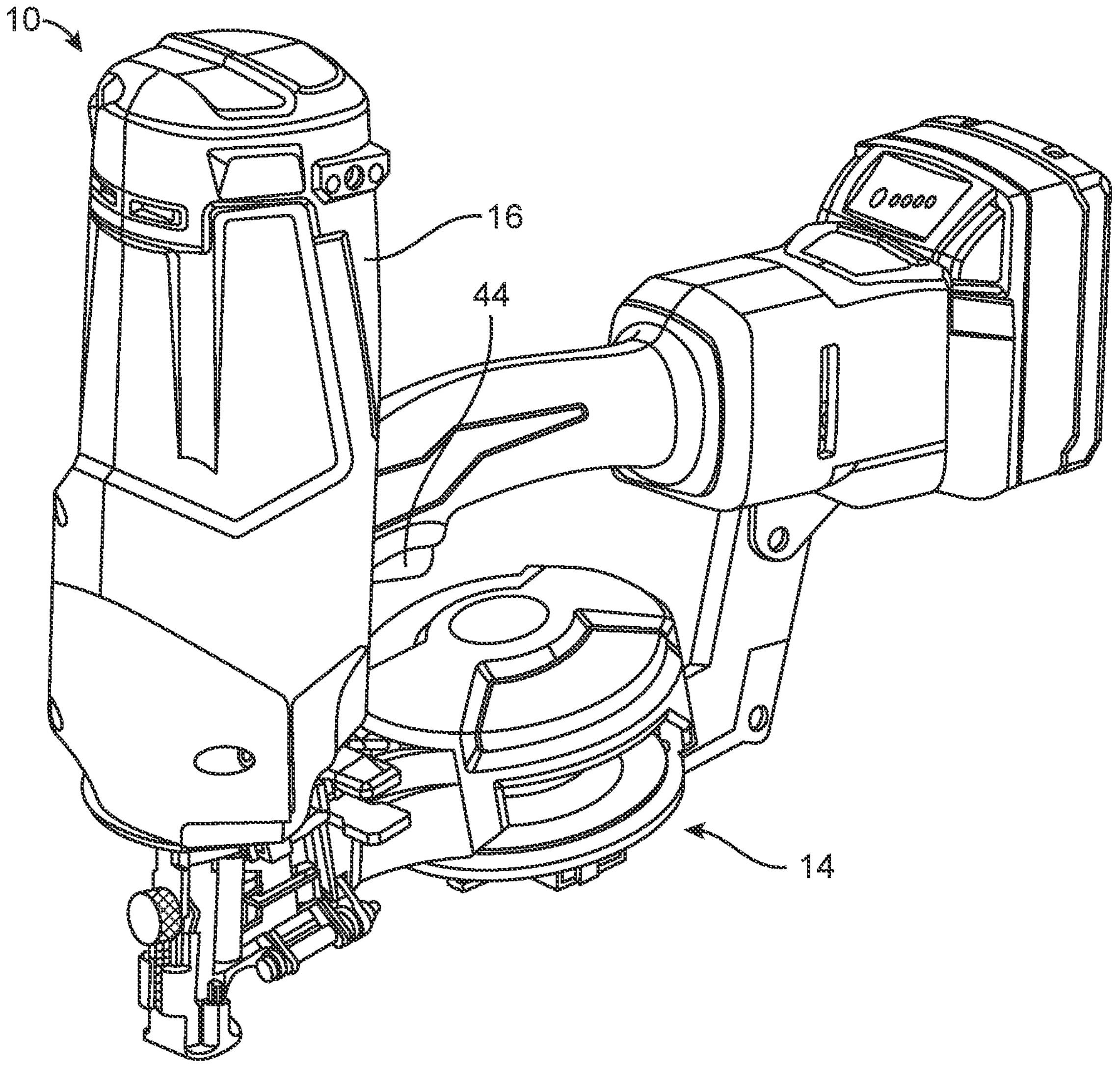
FIG. 1 is a perspective view of a gas spring-powered fastener driver in accordance with an embodiment of the invention.
Figure 2:
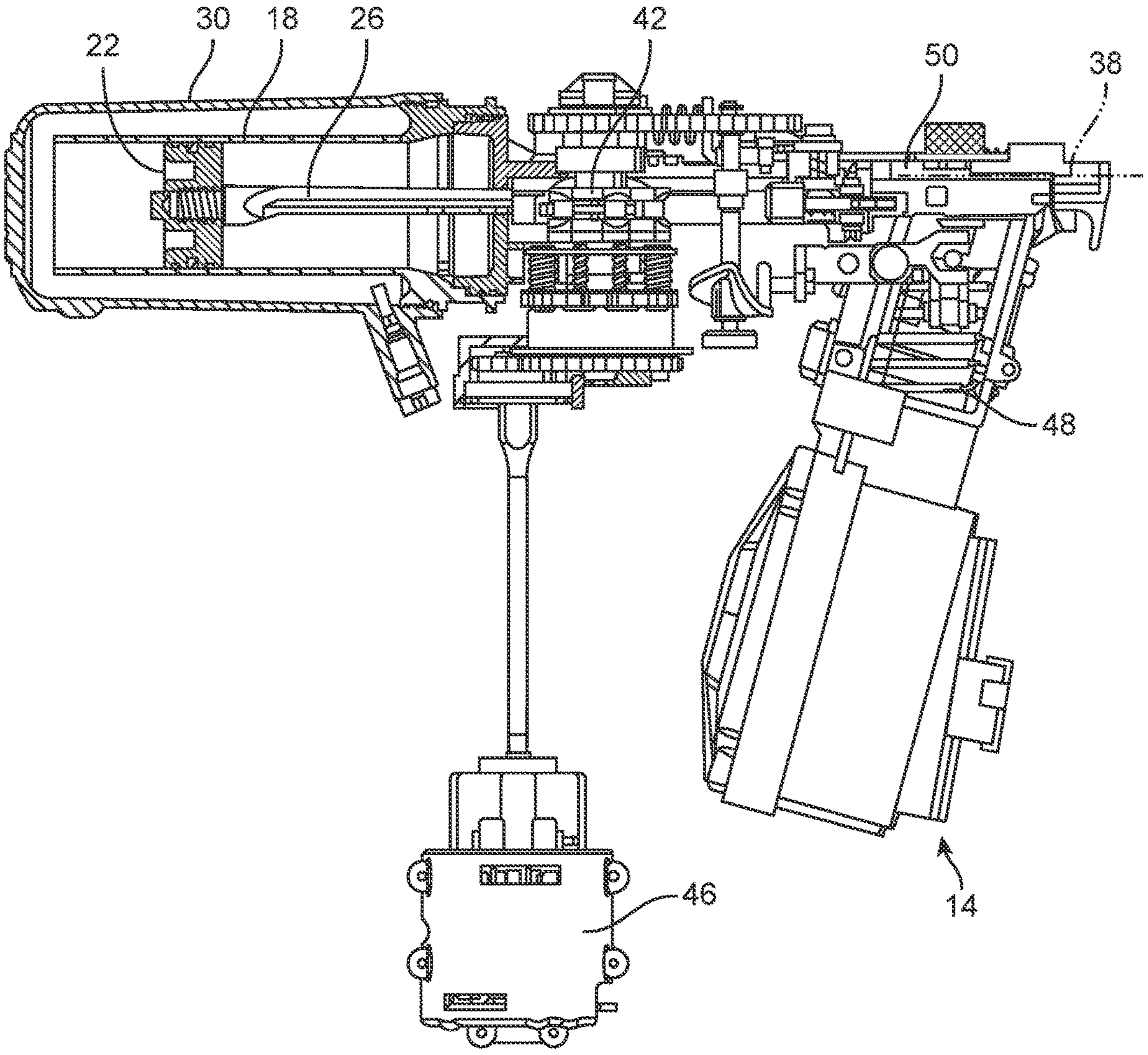
FIG. 2 is a cross section of the fastener driver of FIG. 1, with the housing removed, illustrating a pusher mechanism.
Figure 3:
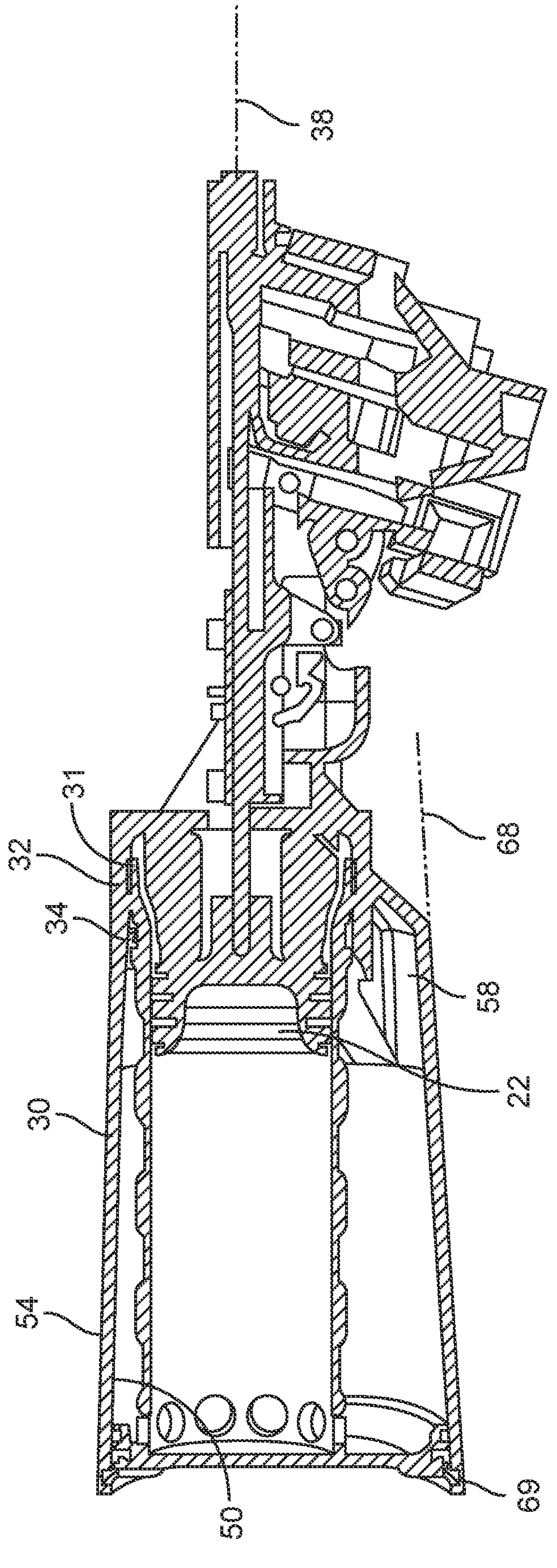
FIG. 3 is a cross-sectional view of the fastener driver of FIG. 1, with portions removed, illustrating a storage chamber cylinder.

With reference to FIGS. 1 and 2, a gas spring-powered fastener driver 10 is operable to drive fasteners (e.g., nails) held within a canister magazine 14 into a workpiece. The fastener driver 10 includes a housing 16, a driver cylinder 18 positioned within the housing 16, and a moveable piston 22 positioned within the cylinder 18. The fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30. With reference to FIG. 3, a first end 31 of the driver cylinder 18 is affixed to a corresponding first end 32 of the storage chamber cylinder 30. A seal 34 is disposed between the first end 31 of the driver cylinder 18 and the first end 32 of the storage chamber cylinder 30. The seal 34 prevents pressurized gas from escaping between the storage chamber cylinder 30 and the driver cylinder 18. It is to be understood that the piston 22, the driver cylinder 18, the storage chamber cylinder 30 collectively operate as a drive mechanism for driving the driver blade 26. In other embodiments, the drive mechanism can include a pneumatic drive mechanism powered by pressurized air from an external source, e.g., an air compressor or tank. Further, the drive mechanism may be powered by a flywheel, another mechanical device, or another source.

With reference to FIG. 2, the cylinder 18 and the driver blade 26 define a driving axis 38, and during a driving cycle the driver blade 26 and piston 22 are moveable between a top dead center ("TDC") (i.e., retracted or ready) position and a bottom dead center ("BDC") (i.e., extended or driven) position. The fastener driver 10 further includes a lifting mechanism 42, which is powered by a motor 46, and which is operable to move the driver blade 26 from the BDC position toward the TDC position.

In operation, the lifting mechanism 42 drives the piston 22 and the driver blade 26 toward the TDC position along the driving axis 38 by energizing the motor 46. As the piston 22 and the driver blade 26 are driven toward the TDC position, the gas above the piston 22 and the gas within the storage chamber cylinder 30 is compressed. Just prior to reaching the TDC position, the motor 46 is deactivated, stopping the piston 22 and the driver blade 26 in a "ready" position where the piston 22 and driver blade 26 are held until released by user activation of a trigger 44. When released, the compressed gas above the piston 22 and within the storage chamber cylinder 30 drives the piston 22 and the driver blade 26 to the BDC position along the driving axis 38, thereby driving a fastener into a workpiece. The illustrated fastener driver 10 therefore operates on a gas spring principle utilizing the lifting mechanism 42 and the piston 22 to compress the gas within the cylinder 18 and the storage chamber cylinder 30 in preparation for a fastener driving cycle.

Figure 4:
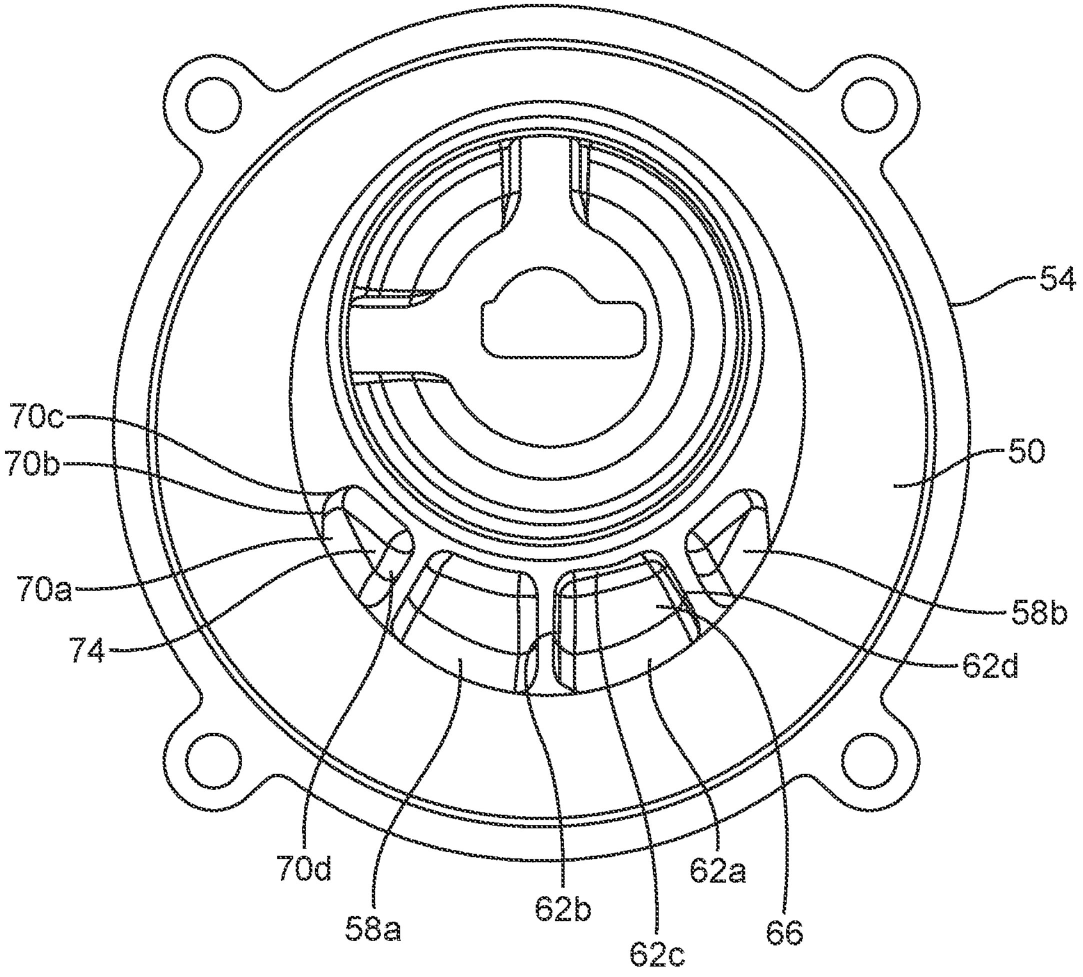
FIG. 4 is a rear view of the storage chamber cylinder of FIG. 3, with portions removed.

With reference to FIGS. 3 and 4, the storage chamber cylinder 30 includes an inner surface 50 and an outer surface 54. The inner surface 50 includes pockets 58 disposed proximate the first end 32 of the storage chamber cylinder 30. The pockets 58 laterally from the inner surface 50 toward the driver cylinder 18. And, as shown in FIG. 3, the pockets 58 extend to a depth below the seal 34. The pockets 58 extend along a circumference of the inner surface 50. The pockets 58 extend along less than half of the circumference of the inner surface 50 such that the pockets 58 partially surround the driver cylinder 18. In other embodiments, the pockets 58 may extend along greater than or equal to half of the circumference of the inner surface 50.

The pockets 58 include two large pockets 58*a* and two small pockets 58*b*. In other embodiments, the pockets 58 may define more than or less than two large pockets 58*a* and more than or less than two small pockets 58*b*. The large pockets 58*a* are disposed next to each other. One of the small pockets 58*b* is disposed next to one large pocket 58*a* and the other small pocket 58*b* is disposed next to the other large pocket 58*a*. Each of the large pockets 58*a* defines a cross-sectional shape that is a parallelogram. In other embodiments, the cross-sectional shape of the large pockets 58*a* may be a circle, rectangle, or the like. Each of the small pockets 58*b* defines a cross-section that is a parallelogram. In other embodiments, the cross-sectional shape of the small pockets 58*b* may be a circle, rectangle, or the like. The cross-sectional shape of the large pockets 58*a* is different than the cross-sectional shape of the small pockets 58*b*. In other embodiments, the cross-sectional shapes of the large pockets 58*a* and the small pockets 58*b* may be the same.

The large pockets 58*a* define four side faces 62 and a back face 66. A first side face 62*a* is contiguous with the inner surface 50 of the storage chamber cylinder 30. The first side face 62*a* defines a plane that is inclined relative to the driving axis 38 by an oblique angle 68. In other words, the inner surface 50 is angled relative to the driving axis 38. Second, third, and fourth side faces 62*b*, 62*c*, 62*d* define planes, respectively, that are parallel with the driving axis 38. The large pockets 58*a* include an open side that is fluidly coupled to the remainder of the storage chamber cylinder 30. The back face 66 is positioned proximate the first end 32 of the storage chamber cylinder 30 while the open side faces a second end 69 of the storage chamber cylinder 30. The second end 69 of the storage chamber 30 is opposite the first end 32 of the storage chamber cylinder 30. The side faces 62 are positioned between the open side and the back face 66. The first side face 62*a*, the third side face 62*c*, the back face 66, and the open side define the parallelogram shape.

The small pockets 58*b* each include four side faces 70 and a back face 74. A first side face 70*a* defines the inner surface 50. A second side face 70*b* is angled greater than 90 degrees relative to the first side face 70*a*. The first side face 70*a* is angled relative to the driving axis 38. The second, third, and fourth side faces 70*b*, 70*c*, 70*d* are axially parallel with the driving axis 38. The small pockets 58*b* include an open side that is fluidly coupled to the remainder of the storage chamber cylinder 30. The back face 74 is positioned proximate the first end 32 of the storage chamber cylinder 30 while the open side faces the second end 69 of the storage chamber cylinder 30. The side faces 70 are positioned between the open side and the back face 74. The pockets 58 allow the storage chamber cylinder 30 to hold an increased volume. The increased volume reduces the risk of seal permeation. Additionally, the overall size of the fastener driver 10 is decreased.

Figure 5:
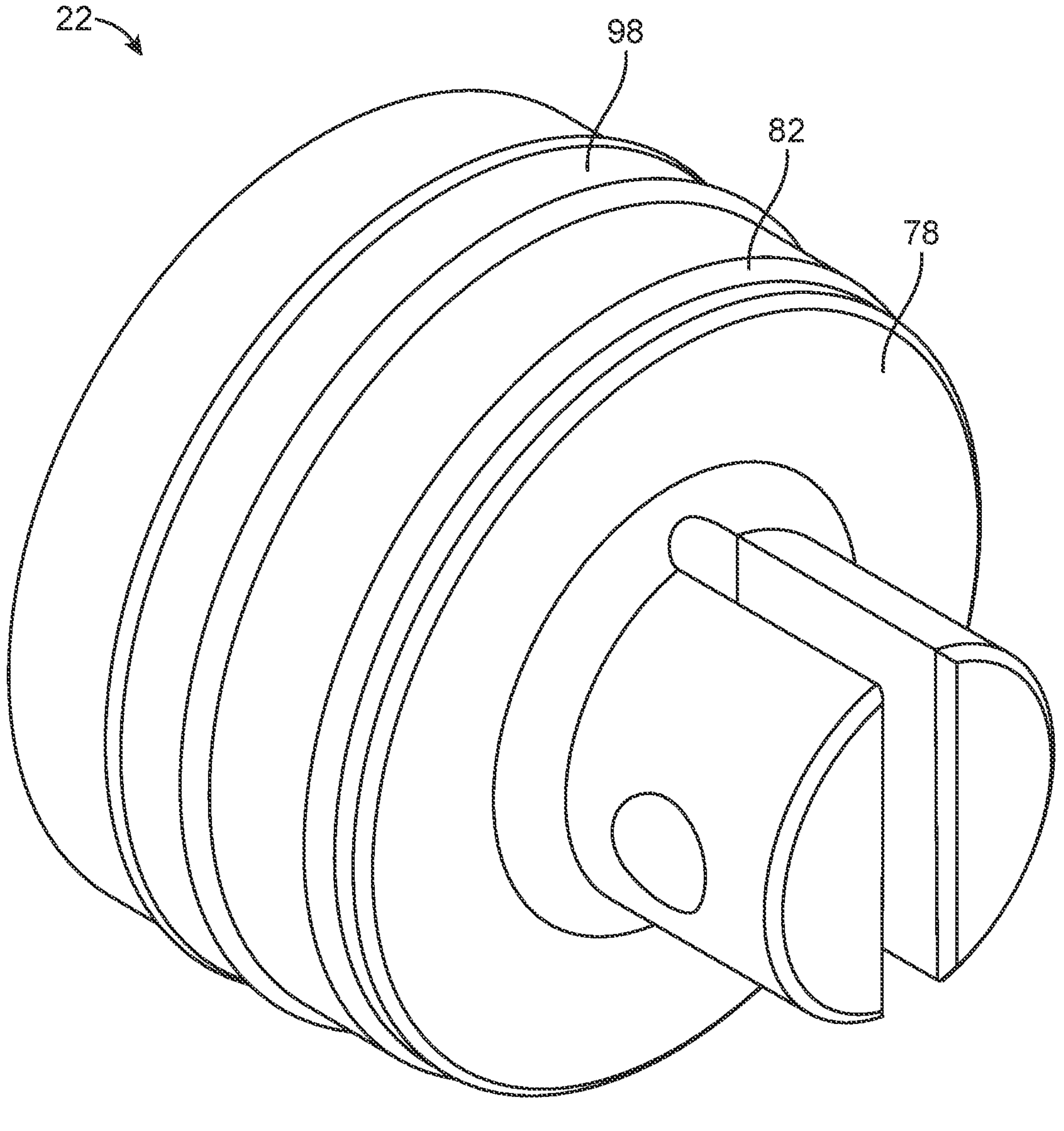
FIG. 5 is a perspective view of a piston of the fastener driver of FIG. 1.
Figure 7:
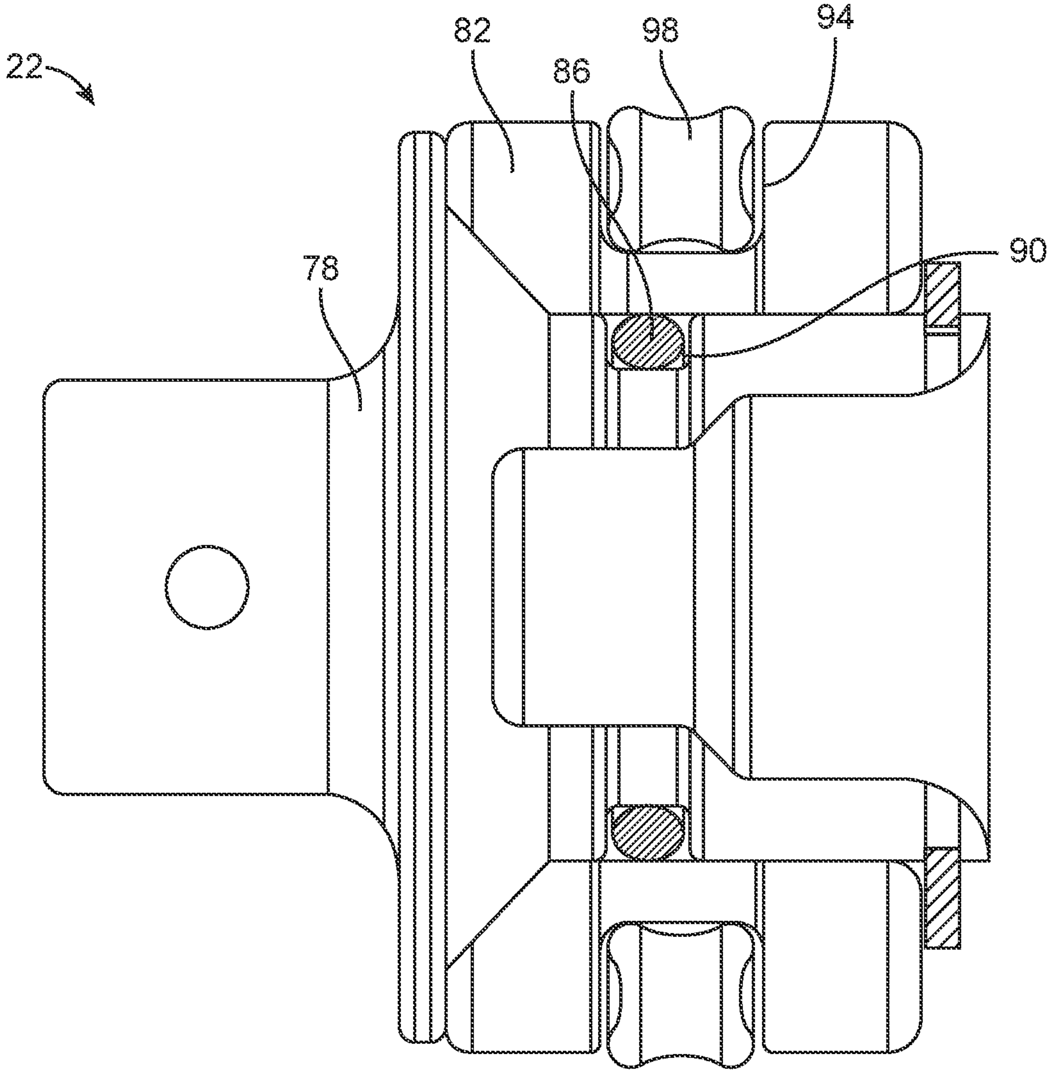
FIG. 7 is a cross-sectional view of the piston of FIG. 5, as shown after a second manufacturing step.

With reference to FIGS. 5 and 7, the piston 22 includes a first, inner portion 78 and an annular, second outer portion 82. The outer portion 82 is disposed circumferentially around the inner portion 78. An O-ring 86 is disposed in a groove 90 of the inner portion 78 between the inner portion 78 and the outer portion 82. The outer portion 82 includes an annular groove 94 that extends along the circumference of the outer portion 82. The groove 94 is disposed on an outer surface of the outer portion 82. A seal 98 is disposed in the groove 94 and is engageable with an inner diameter of the driver cylinder 18 to prevent compressed gas in the storage chamber cylinder 30 and the driver cylinder 18 above the piston 22 from leaking past the piston 22. The outer portion 82 is formed from a soft material, e.g., non-marring polymeric material, such as polytetrafluoroethylene (PTFE) or polyoxymethylene (POM). The inner portion 78 is formed from a material (e.g., a metal, like Aluminum) that is stronger and harder than the material of the outer portion 82. The seal 98 may be formed from a material that is similar to the material of the outer portion 82. The outer portion 82 is non-marring such that the material will not leave marks or damage the driver cylinder 18 during a fastener driving operation. For example, the outer portion 82 is polymeric, that is the outer portion 82 is made from a polymer material.

Figure 6:
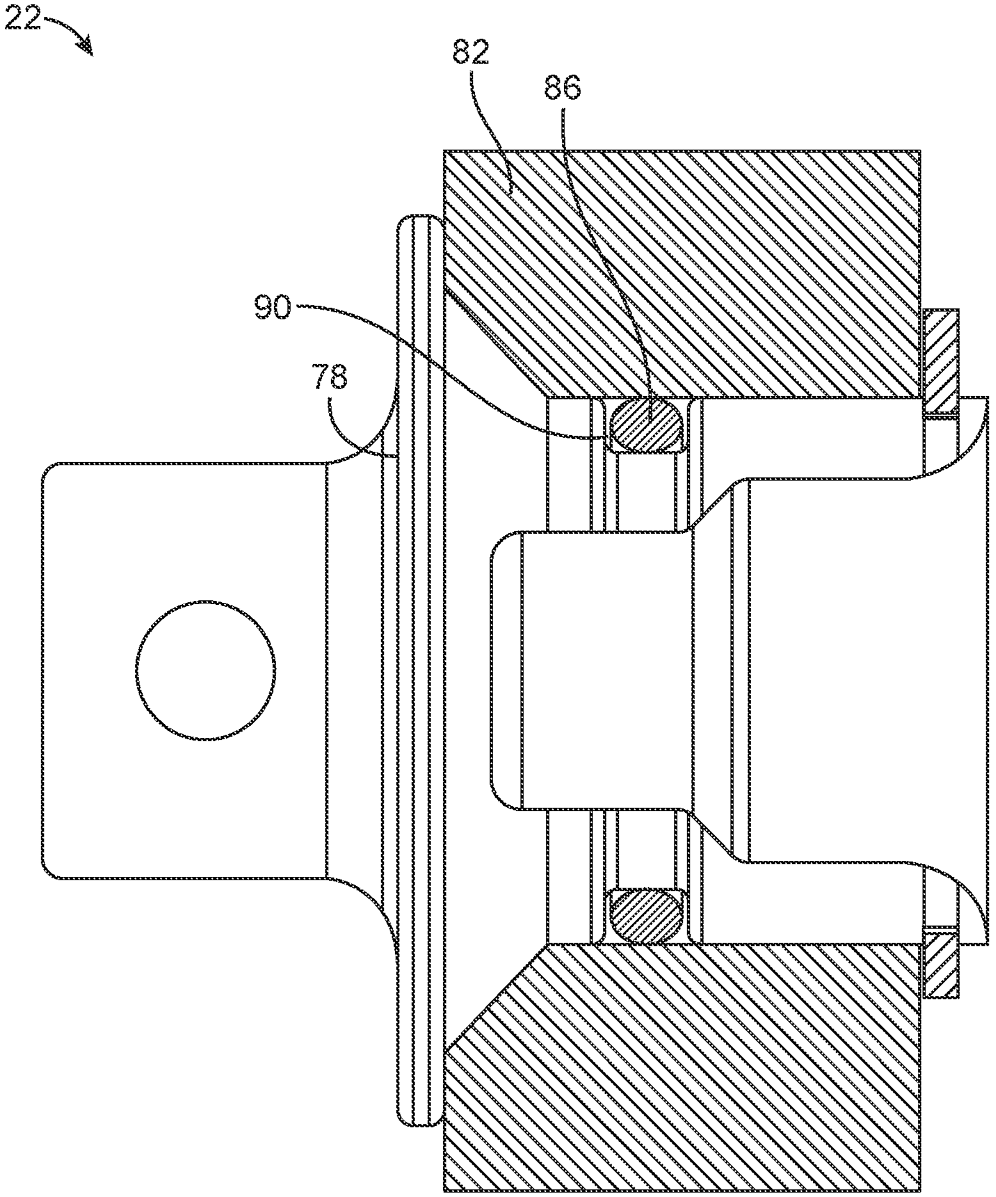
FIG. 6 is a cross-sectional view of the piston of FIG. 5, as shown after a first manufacturing step.

To manufacture the piston 22, the inner portion 78 of the piston 22 is first formed to which the driver blade 26 is attachable. Then, the outer portion 82 of the piston 22 is press-fitted around an exterior periphery of the inner portion 78 of the piston 22 (as shown in FIG. 6). The outer diameter of the outer portion 82 is machined to a value that is nominally less than an inner diameter of the driver cylinder 18 within which the piston 22 is insertable, also forming the groove 94. The seal 98 is then inserted into the groove 94, forming the piston 22 (as shown in FIG. 7). Making the piston 22 from multiple different materials improves the performance and life of the piston 22 at low temperatures.

Figure 8:
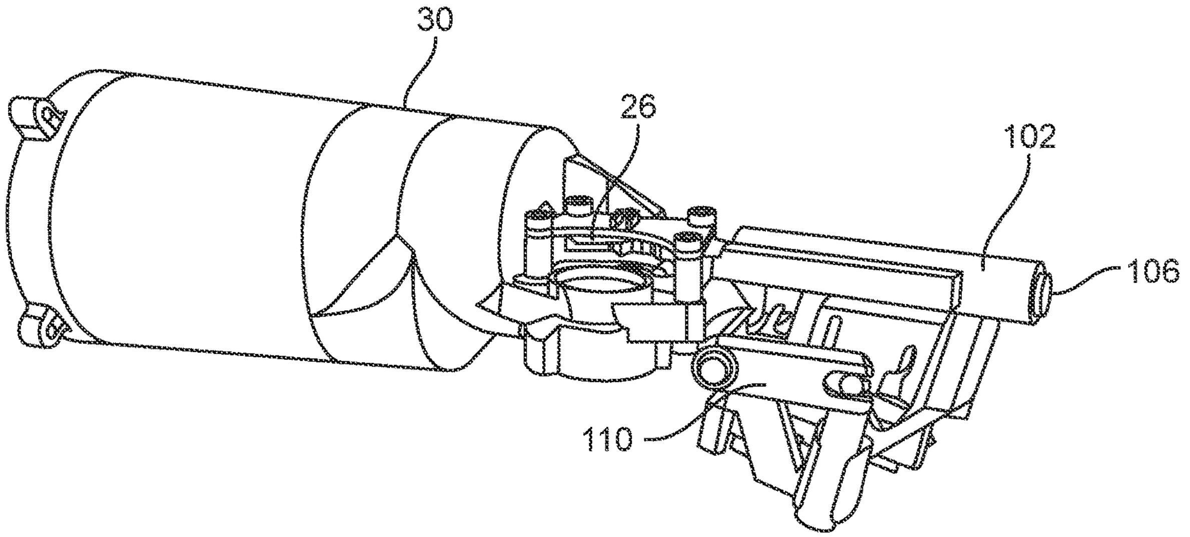
FIG. 8 is a perspective view of the fastener driver of FIG. 1, with the housing removed, illustrating a nosepiece.
Figure 9:
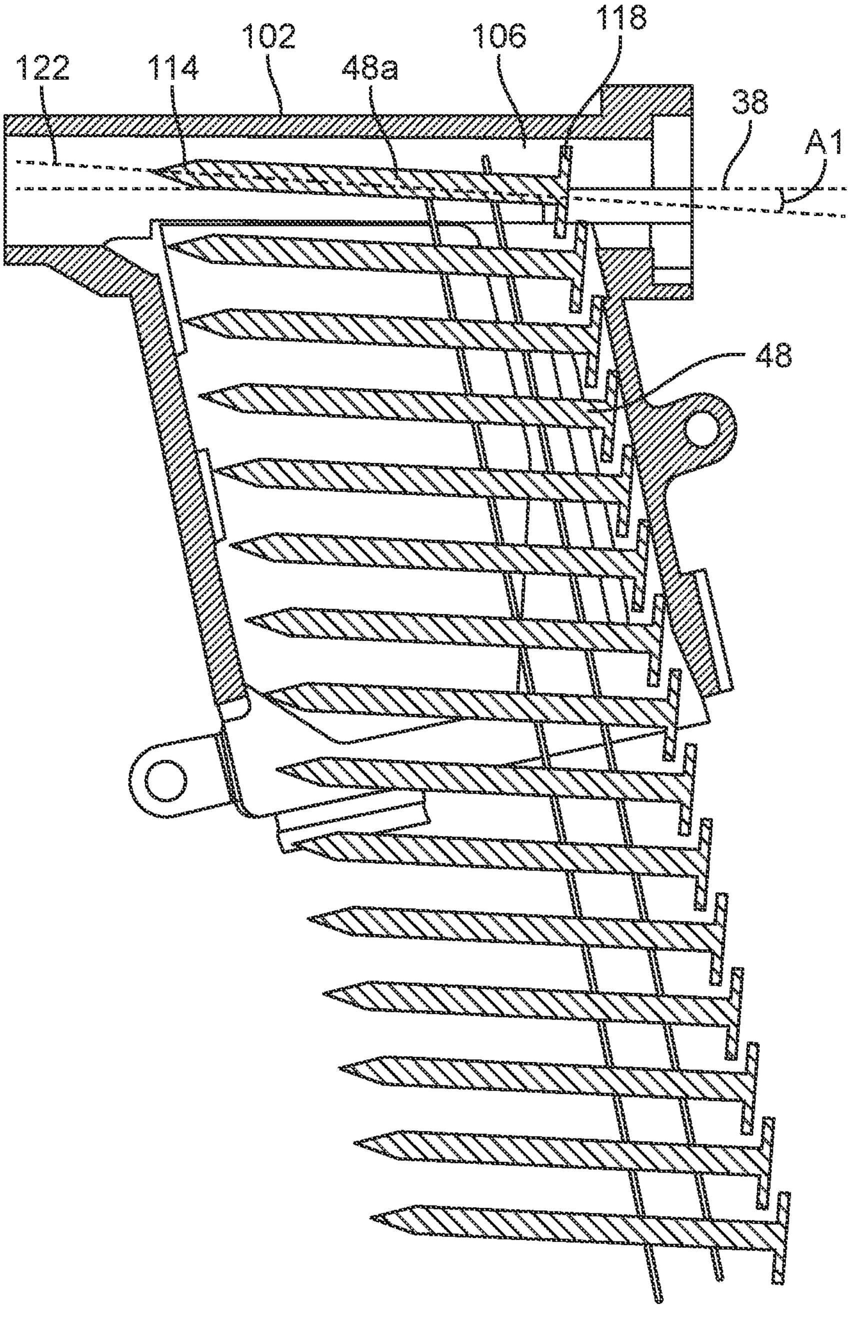
FIG. 9 is a cross-sectional view of the nosepiece of FIG. 8, with portions removed.

With reference to FIGS. 8 and 9, the canister magazine 14 includes collated fasteners 48 arranged in a coil. The magazine 14 is coupled to a nosepiece 102 in which the fasteners 48 are received. The fasteners 48 are sequentially transferred or loaded from the magazine 14 to a driver channel 106 in the nosepiece 102 by a pusher mechanism 110. After a forwardmost fastener 48*a* is inserted into the driver channel 106, the driver blade 26 is movable within the driver channel 106 to discharge the fastener 48 from the driver channel 106 and into a workpiece.

With reference to FIG. 9, the magazine 14 is oriented such that when the fastener 48 is fed into the driver channel 106, the pusher mechanism 110 biases a tip 114 of the fastener 48 above the driving axis 38 while a head 118 of the fastener 48 remains at least partly below the driving axis 38 (from the frame of reference of FIG. 9). In other words, the pusher mechanism 110 feeds the fastener 48 into the driver channel 106 at an oblique, "positive" angle A1 relative to the driving axis 38. In other words, the fastener 48 defines a fastener axis 122 that is at the positive angle A1 relative to the driving axis 38. In some embodiments, the positive angle A1 is approximately 3 degrees relative to the driving axis 38. In other embodiments, the positive angle A1 may be greater than, or less than, 3 degrees relative to the driving axis 38. In some embodiments, the positive angle A1 of the fastener 48 may correlate with the orientation of the magazine 14. For example, if the positive angle A1 of the fastener 48 is 3 degrees relative to the driving axis 38, then the magazine 14 may be tilted an additional 3 degrees relative to an ordinary magazine position in which the fasteners are fed into the driver channel 106 at a "zero" angle in which the fasteners are coaxial with the driving axis 38. The tilted orientation of the magazine 14 provides greater drop resistance relative to the ordinary magazine position.

Figure 10:
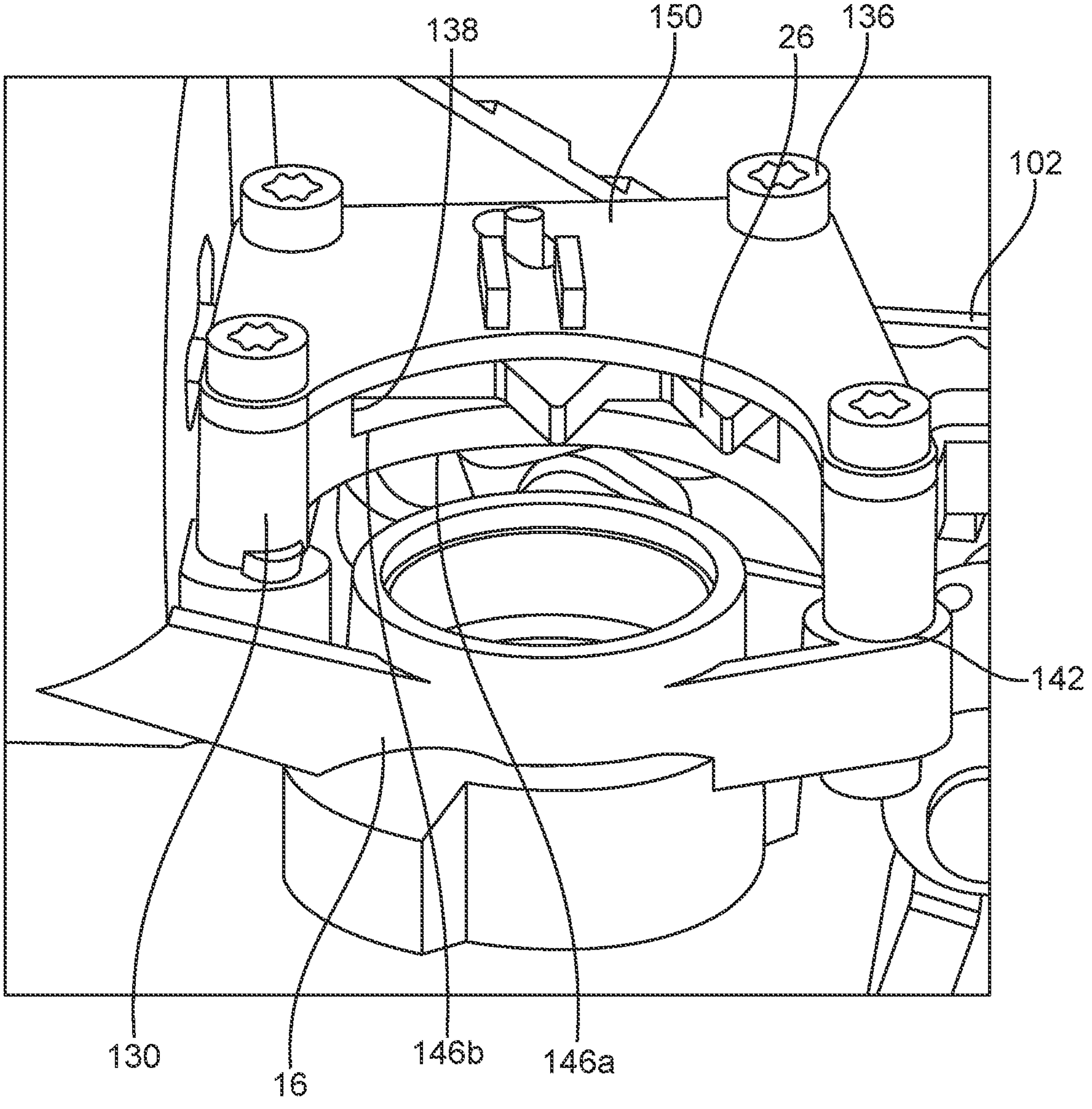
FIG. 10 is an enlarged view of the nosepiece of FIG. 8.
Figure 11:
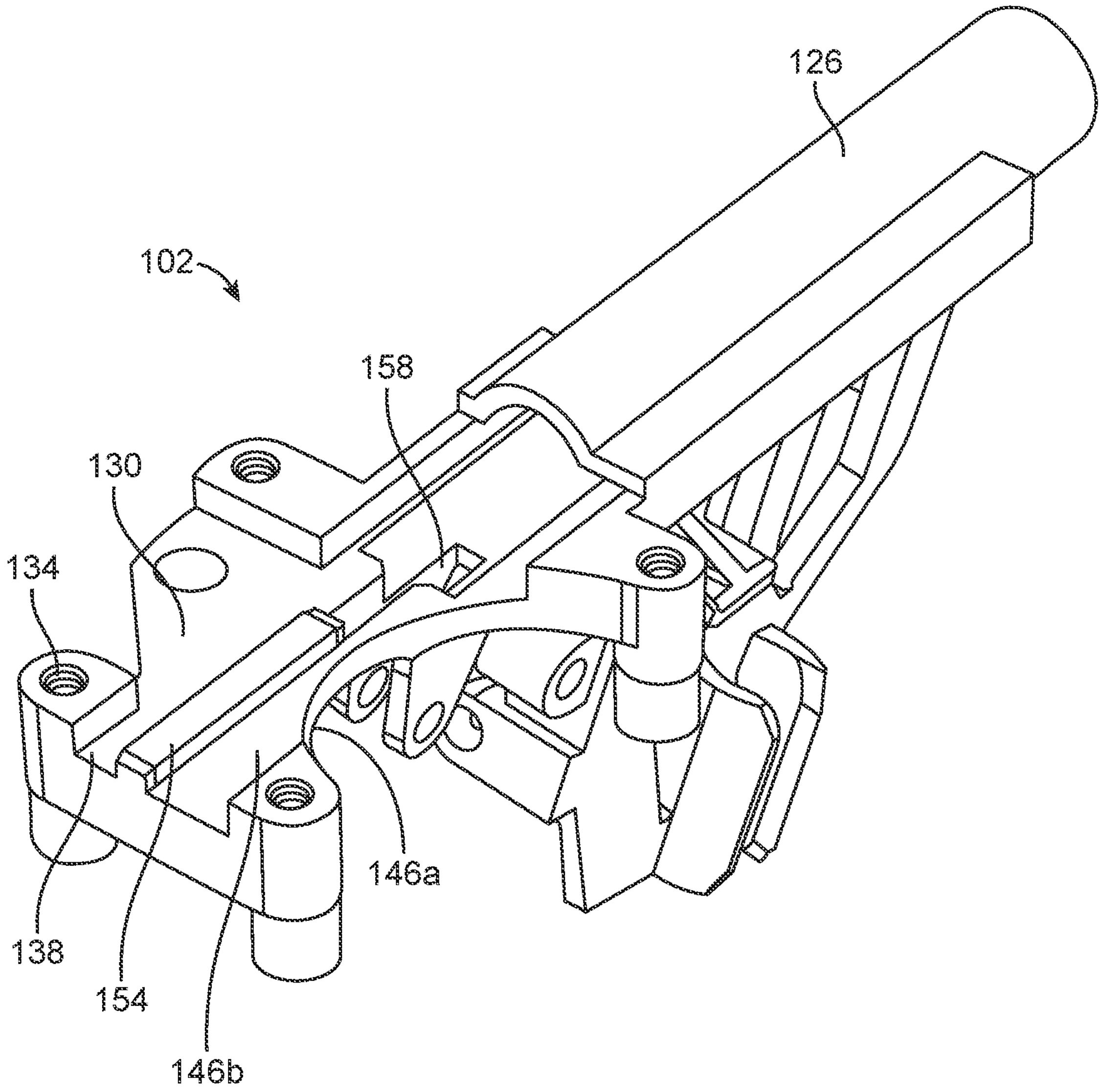
FIG. 11 is a perspective view of the nosepiece of FIG. 8, with portions removed.
Figure 12:
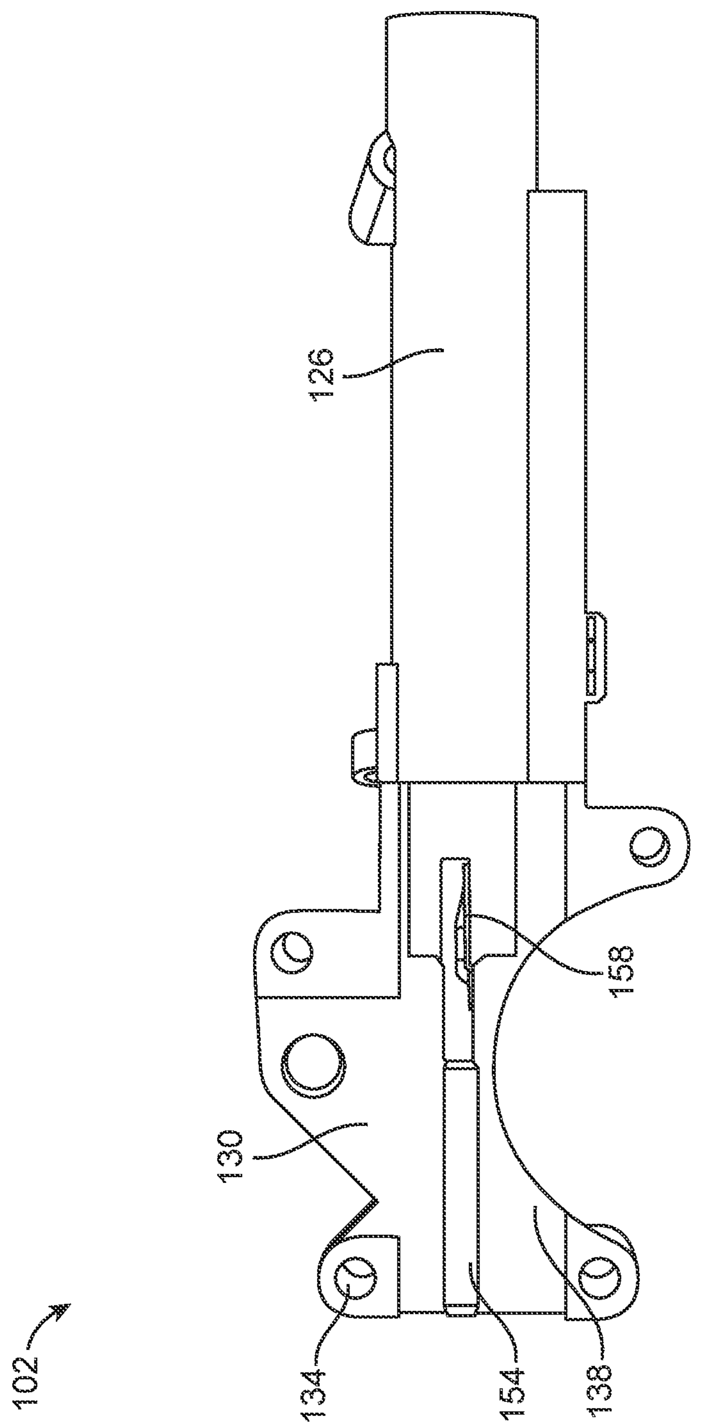
FIG. 12 is a top view of the nosepiece of FIG. 8.

With reference to FIGS. 10-12, the nosepiece 102 includes a tubular portion 126 and an attachment portion 130. The tubular portion 126 and the attachment portion 130 are formed from one piece of material. In other words, the nosepiece 102 is formed from one contiguous piece of material. The attachment portion 130 includes threaded holes 134 and a plate portion 138. The threaded holes 134 align with holes 142 on the storage chamber cylinder 30. In some embodiments, the attachment portion 130 includes four threaded holes 134. In other embodiments, the attachment portion 130 may include more than or less than four threaded holes for receiving fasteners 136. The threaded holes are elevated relative to the plate portion 138 on first and second sides 146*a*, 146*b* of the plate portion 138. A guide plate 150 (FIG. 10) may be coupled to the attachment portion 130 via the fasteners 136 (e.g., screws) received within the threaded holes 134. The elevation of the threaded holes 134 provides space between the second side 146*b* of the plate portion 138 and the guide plate 150. The space allows the driver blade 26 to be disposed on the second side 146*b* of the plate portion 138, between the plate portion 138 and the guide plate 150 (FIG. 10).

The plate portion 138 includes a guide rib 154 disposed on the second side 146*b* (FIG. 11). The guide rib 154 is elevated relative to the remainder of the plate portion 138. In some embodiments, the guide rib 154 is rectangular in shape. In other embodiments, the guide rib 154 may be an alternative shape. The driver blade 26 is disposed on the guide rib 154 such that the guide rib 154 guides the driver blade 26 along the driving axis 38. Due to the elevation of the guide rib 154, the driver blade 26 is clamped between the guide rib 154 and the guide plate 150 such that the driver blade 26 is fully supported at its front and rear surfaces. The plate portion 138 further includes a slot 158, which begins at an end of the guide rib 154. The slot 158 extends through a thickness the plate portion 138, from the first side 146*a* to the second side 146*b*. In some embodiments, the slot 158 is rectangular in shape. In other embodiments, the slot 158 may be an alternative shape. The slot 158 provides added support for the driver blade 26 when the driver blade 26 is proximate the TDC position. Additionally, since the slot 158 extends through the plate portion 138, the slot 158 provides access to a rear of the driver blade 26 to actuate a linkage system of the pusher mechanism 110 (FIG. 8). The linkage system is configured to push fasteners 48 from the magazine 17 into the driver channel 106 in response to movement of the driver blade 26 during a driving operation.

Figure 13:
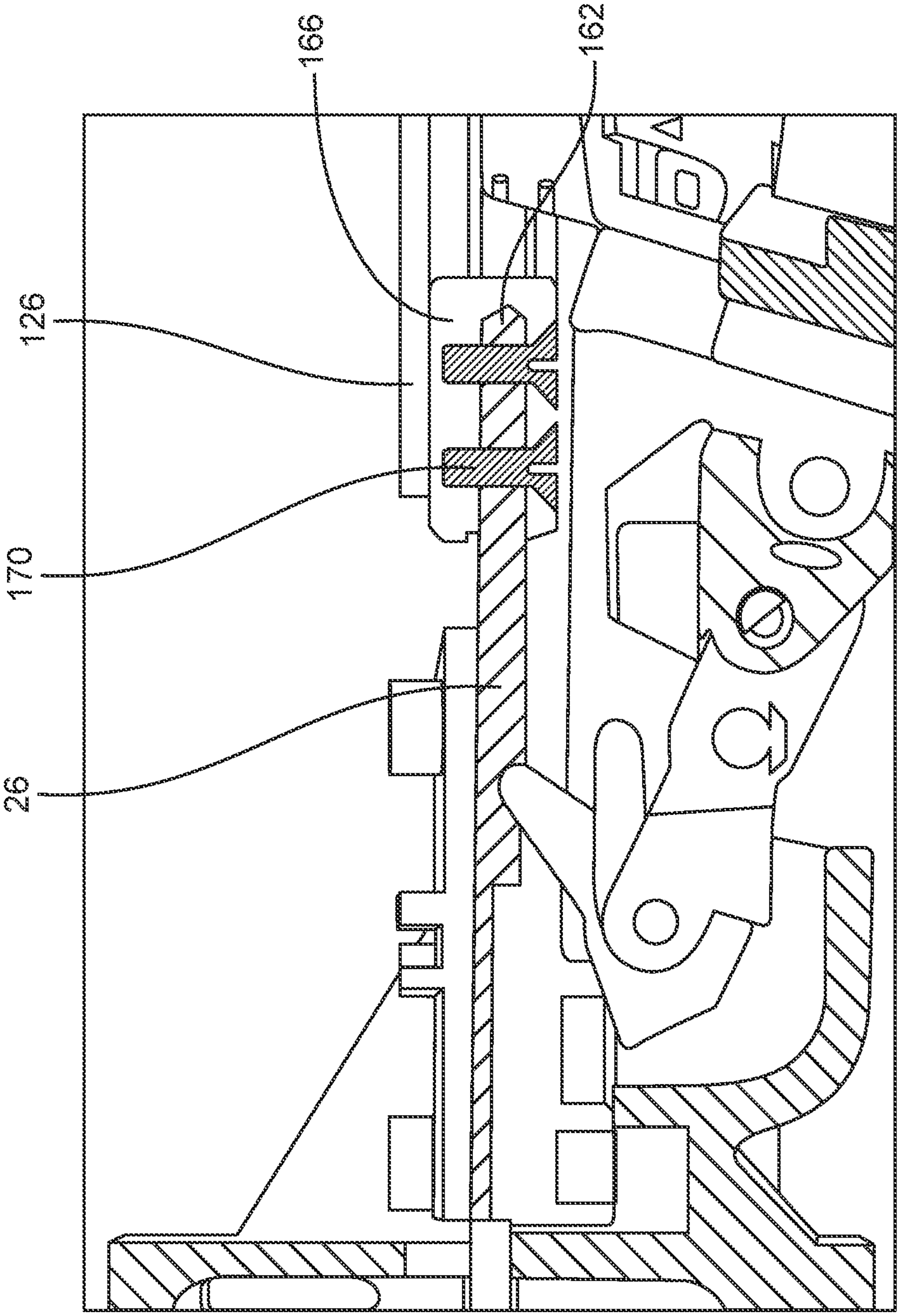
FIG. 13 is a cross-sectional view of the nosepiece of FIG. 8.

With reference to FIG. 13, the driver blade 26 includes an end 162 that is located within the tubular portion 126 of the nosepiece 102. The driver blade 26 may include a tip 166 that is coupled to the end 162 via fasteners 170. The tip 162 increases a surface area of the end 162, which is otherwise the same thickness as the remainder of the driver blade 26. The tip 162 allows the remainder of the driver blade 26 to have a continuous thickness. This is due to the tip 166 increasing the thickness of the driver blade 26 at the end 162. In other embodiments, the enlarged thickness tip 166 may be formed integrally with the remainder of the driver blade 26.

Figure 14:
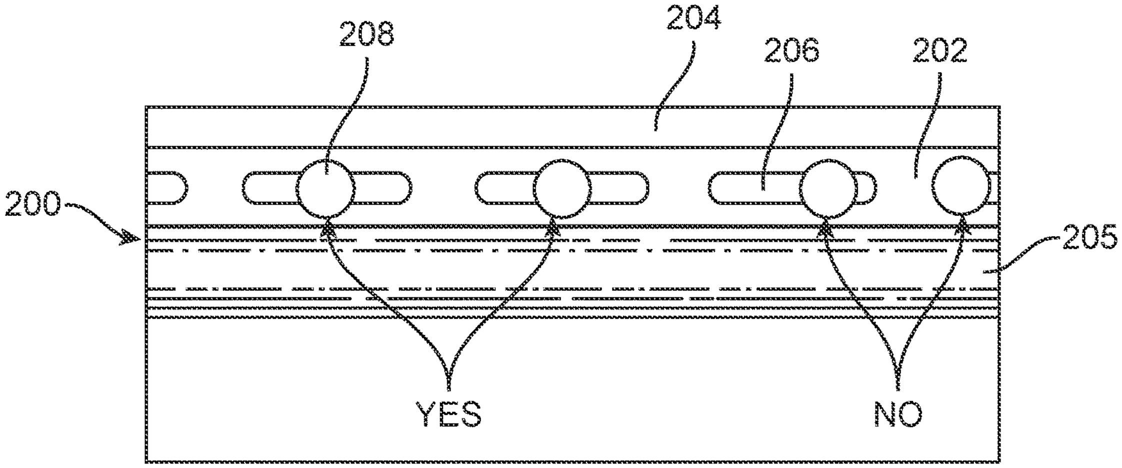
FIG. 14 is a partial view of a fastener strip for an exterior wall covering for a structure.

Referring to FIG. 14, a portion of an exterior wall covering 200 is shown. It is to be understood that the exterior wall covering 200 may be vinyl or metal siding that is used to cover the exterior walls of a structure such as a house or other building. As shown, the exterior wall covering 200 includes a fastener strip 202 along an upper edge 204. A retaining loop 205 extends along the length of the wall covering 200 beneath and adjacent the fastener strip 202. A lower edge of a next course of the exterior wall covering 200 snaps into and engages the retaining loop 205 and the next course of the exterior wall covering 200 covers the fastener strip 202.

Figure 15:
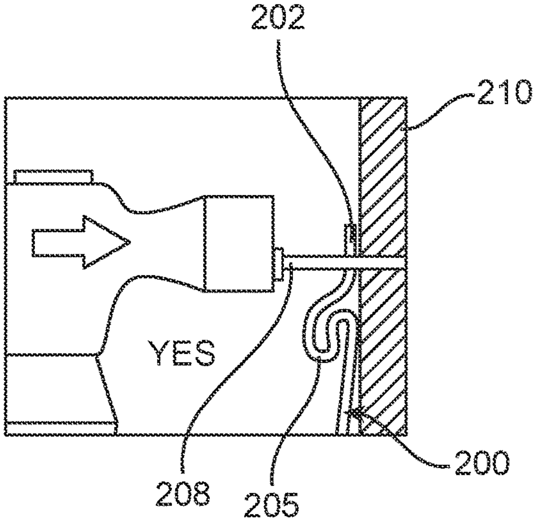
FIG. 15 is a first partial side view of the fastener strip of FIG. 14.
Figure 16:
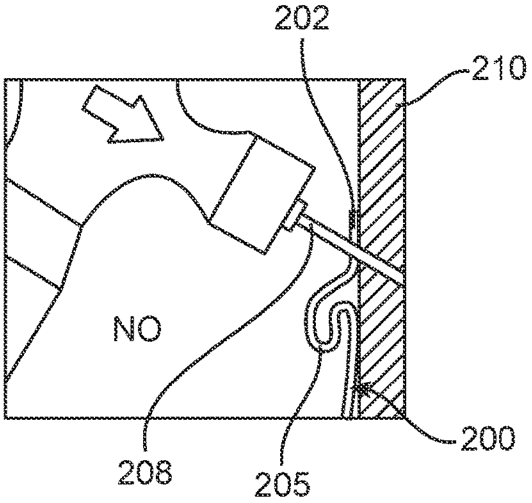
FIG. 16 is a second partial side view of the fastener strip of FIG. 14.

A plurality of elongated nail holes 206, i.e., nail slots, are included in the fastener strip 202 and are designed to receive nails 208 therethrough. For the best installation results, the nails 208 are installed near the center of each elongated nail holes 206 to allow for movement of the exterior wall covering 200 due to thermal expansion and contraction. As indicated in FIG. 15, for a proper installation, the nails 208 are driven straight into a workpiece, e.g., an exterior wall 210, so that the nails 208 are substantially perpendicular to the exterior wall 210 and the nail heads are flat against the surface of the fastener strip 202. FIG. 16 illustrates a less desirable installation in which the nails 208 are driven into the exterior wall 210 at a non-perpendicular angle with respect to the exterior wall 210. In many cases, the nails 208 that are used to install the exterior wall covering 200 are roofing nails and these nails are typically driven by hand, i.e., with a hammer, in order to properly place the nails 208 within the nail holes 206.

Figure 17:
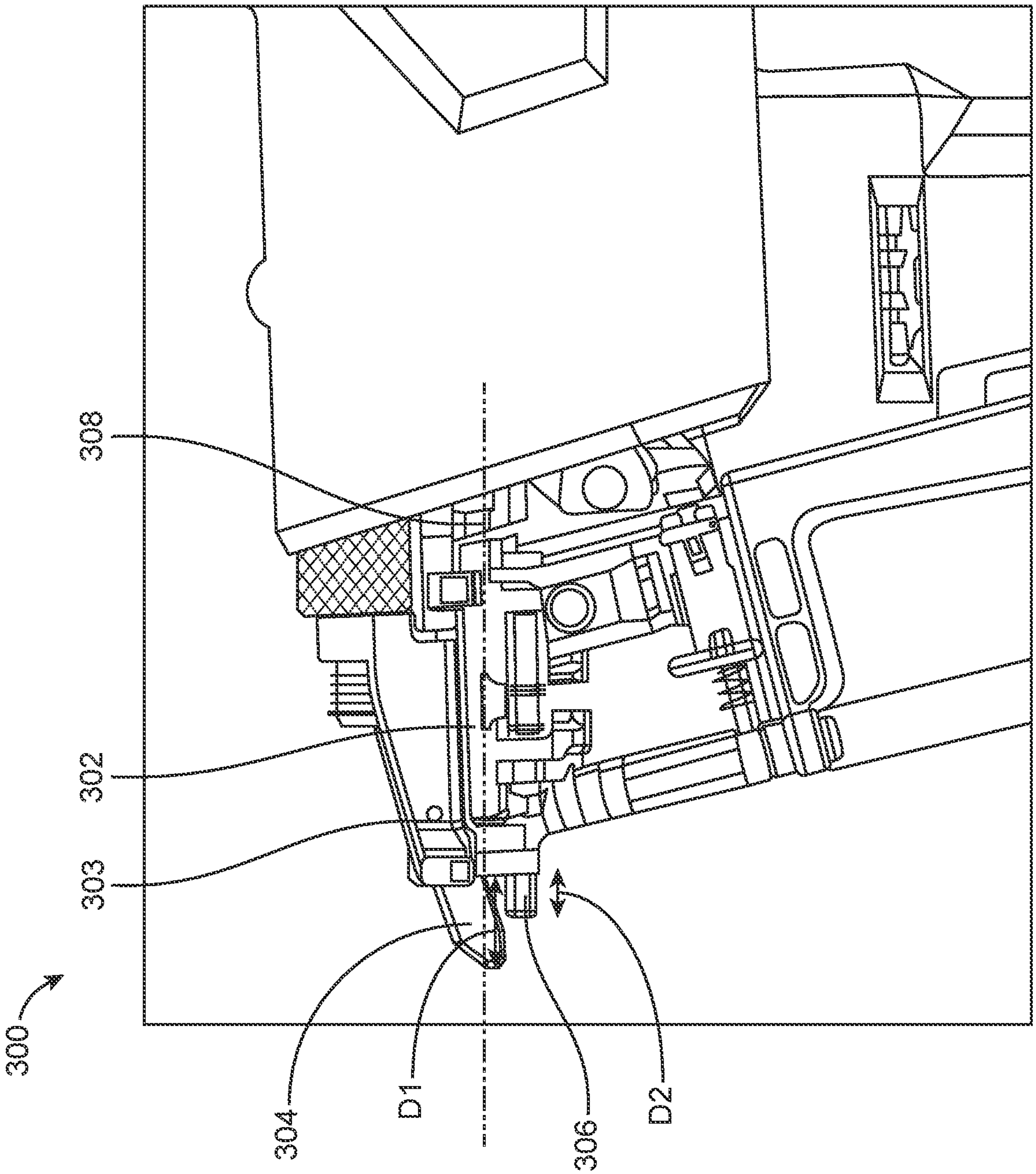
FIG. 17 is a partial side view of a gas spring-powered fastener driver in accordance with an embodiment of the invention.

FIG. 17 illustrates a gas spring-powered fastener driver 300 that is designed to be used to install exterior wall coverings, e.g., the exterior wall covering 200 illustrated in FIG. 14-16. The fastener driver 300 illustrated in FIG. 17 is similar to the gas spring-powered fastener driver 10 illustrated in FIGS. 1-2. The fastener driver 300 depicted in FIG. 17 includes a nosepiece 302 through which a nail is fired into a workpiece and a workpiece contact bracket 303. The fastener driver 300 includes a first guidance dongle 304 adjacent the nosepiece 302 and a second guidance dongle 306 adjacent the nosepiece 302 opposite the first guidance dongle 304. In one aspect, the first guidance dongle 304 extends from the workpiece contact bracket 303 beyond the nosepiece 302. As shown in the orientation of the fastener driver 300 in FIG. 17, the first guidance dongle 304 is above the nosepiece 302 and the second guidance dongle 306 is below the first guidance dongle 304. Further, the first guidance dongle 304 is diametrically opposed to the second guidance dongle 306. In other words, the guidance dongles 304, 306 are spaced apart from each other by 180° around the nosepiece 302.

As indicated in FIG. 17, the end of first guidance dongle 304 is spaced a distance D1 from an end of the nosepiece 302. The end of the second guidance dongle 306 is spaced a distance D2 from the end of the nosepiece 302. In one aspect, D2 is less than or equal to 0.75 D1, such as less than or equal to 0.7 D1, less than or equal to 0.65 D1, less than or equal to 0.6 D1, less than or equal to 0.55 D1, or less than or equal to 0.5 D1. In another aspect, D2 is greater or equal to 0.2 D1, such as greater than or equal to 0.25 D1, greater than or equal to 0.3 D1, greater than or equal to 0.35 D1, or greater than or equal to 0.4 D1. It is to be understood that D2 may be within a range between, or including, any of the maximum or minimum values of D2 described herein.

During operation of the fastener driver 300, the first guidance dongle 304 is used to locate a target, e.g., the elongated nail slot 206 formed in the fastener strip 202 of the exterior wall covering 200, and support the top of a nail that will be ejected by the fastener driver 300 into the elongated nail slot 206. The second guidance dongle 306 provides support for the bottom of the nail that will be ejected by the fastener driver 300. The guidance dongles 304, 306 ensure that the nail exits the fastener driver 300 in alignment with a central axis 308 of the nosepiece 302. Accordingly, when the fastener driver 300 is properly aligned with the exterior wall covering 200 (FIG. 14), the nail is driven from the fastener driver 300, with the help of the guidance dongles 304, 306, through the exterior wall covering 200 perpendicular to the exterior wall 210 (FIG. 15) on which the exterior wall covering 200 is installed.

Figure 18:
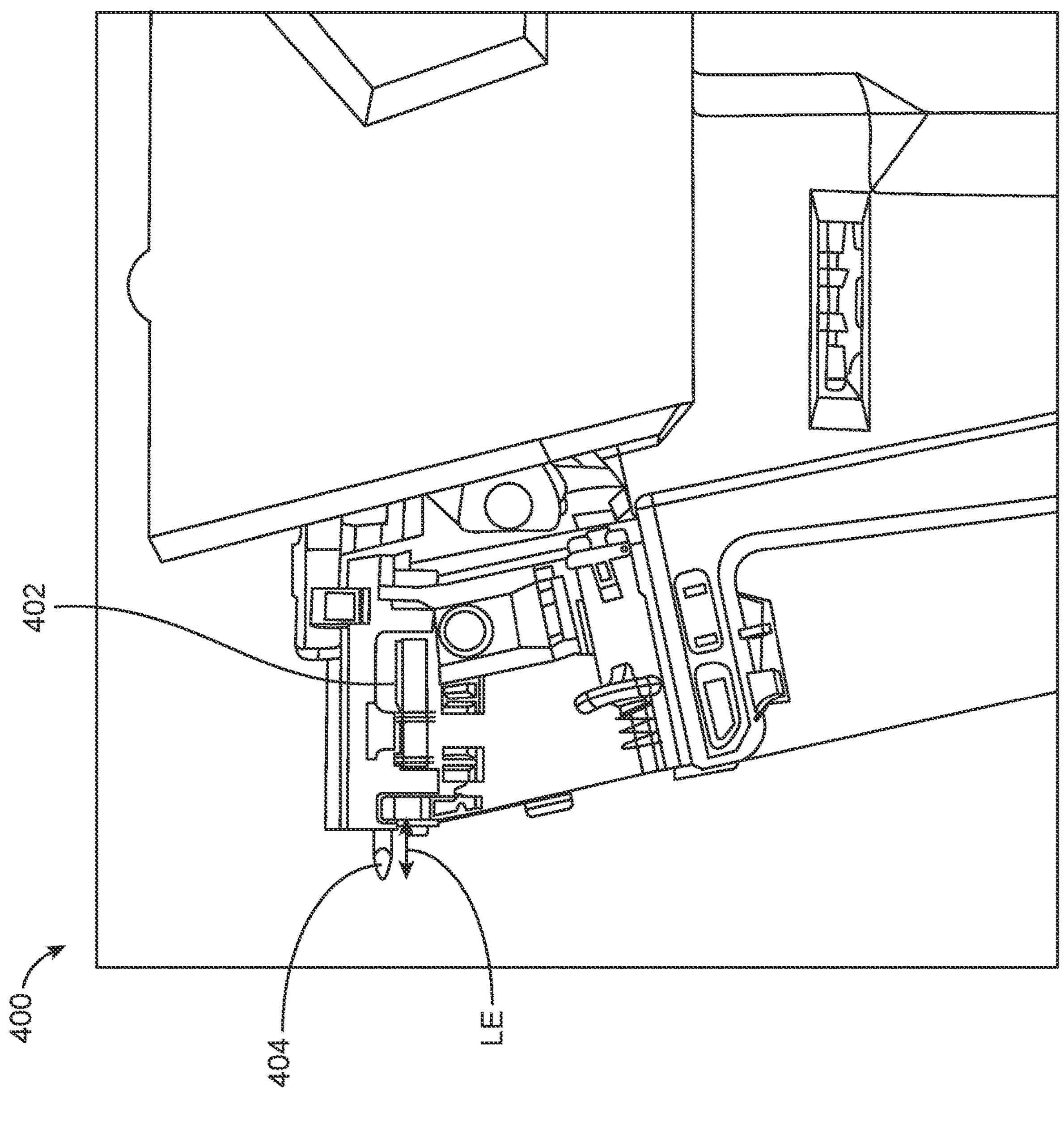
FIG. 18 is a partial side view of a gas spring-powered fastener driver in accordance with another embodiment of the invention.

FIG. 18 illustrates another gas spring-powered fastener driver 400 that is designed to be used to install exterior wall coverings, e.g., the exterior wall covering 200 illustrated in FIG. 14-16. The fastener driver 400 illustrated in FIG. 18 is similar to the gas spring-powered fastener driver 10 illustrated in FIGS. 1-2. The fastener driver 400 depicted in FIG. 18 includes a nosepiece 402 through which a nail 404 is fired into a workpiece. When a nail 404 is loaded into the nosepiece 402 of the fastener driver 400, e.g., into the driver channel of the nosepiece, a portion of the nail 404 extends beyond an end of the nosepiece 402 and is exposed and the exposed portion of the nail 404 defines an exposed length LE. The nail 404, or the driver channel in which the nail is disposed, has a length L. In one aspect, LE is less than or equal to 0.25 L, such as less than or equal to 0.2 L, less than or equal to 0.15 L, or less than or equal to 0.1 L. In another aspect, LE is greater or equal to 0.01 L, such as greater than or equal to 0.02 L, greater than or equal to 0.03 L, greater than or equal to 0.04 L, or greater than or equal to 0.05 L. It is to be understood that LE may be within a range between, or including, any of the maximum or minimum values of LE described herein. During operation of the fastener driver 400, the exposed tip of the nail 404 is used to locate a target, e.g., the center of the elongated nail slot 206 formed in the fastener strip 202 of the exterior wall covering 200.

Figure 19:
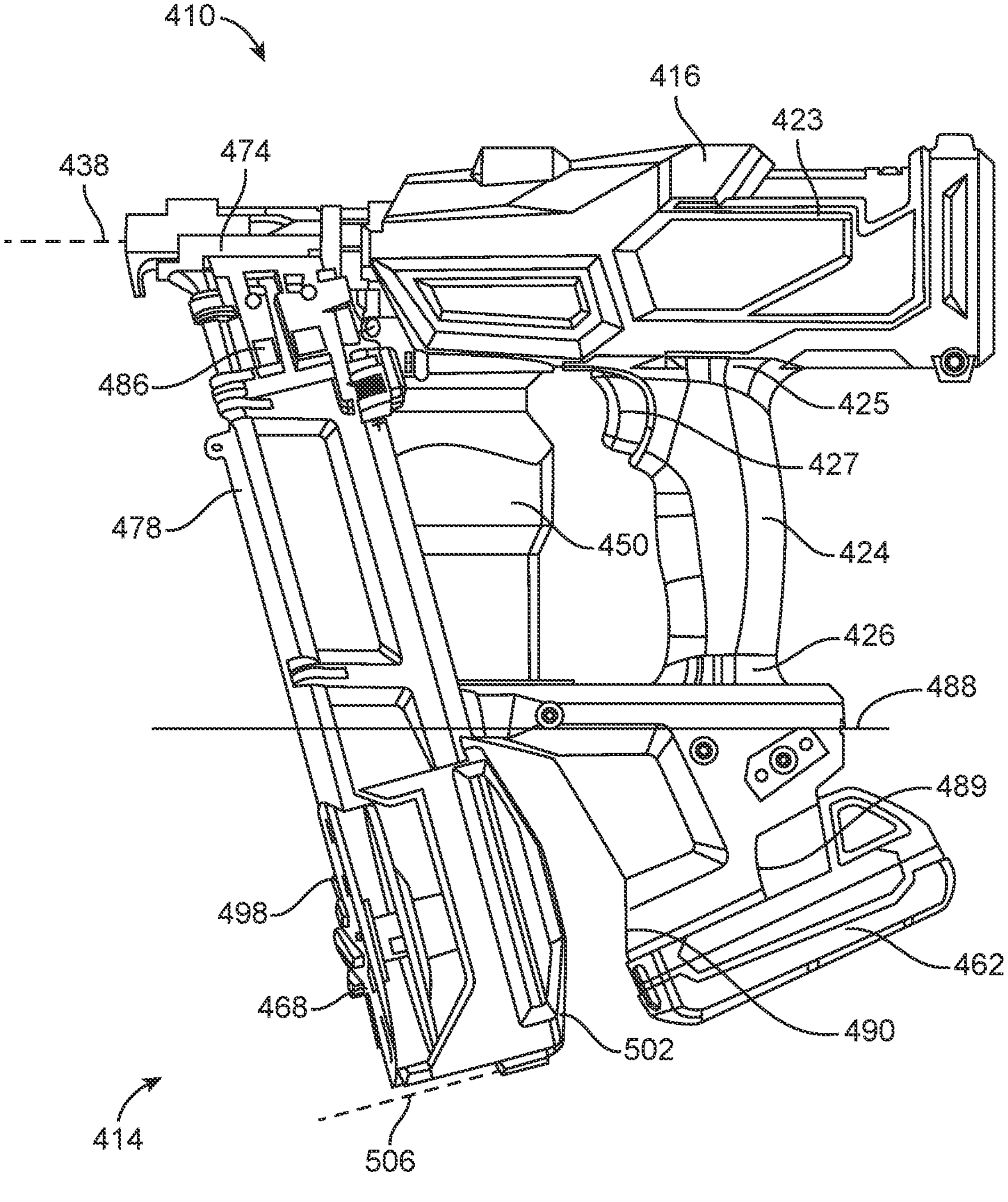
FIG. 19 is a side view of a gas spring-powered fastener driver in accordance with still another embodiment of the invention.
Figure 20:
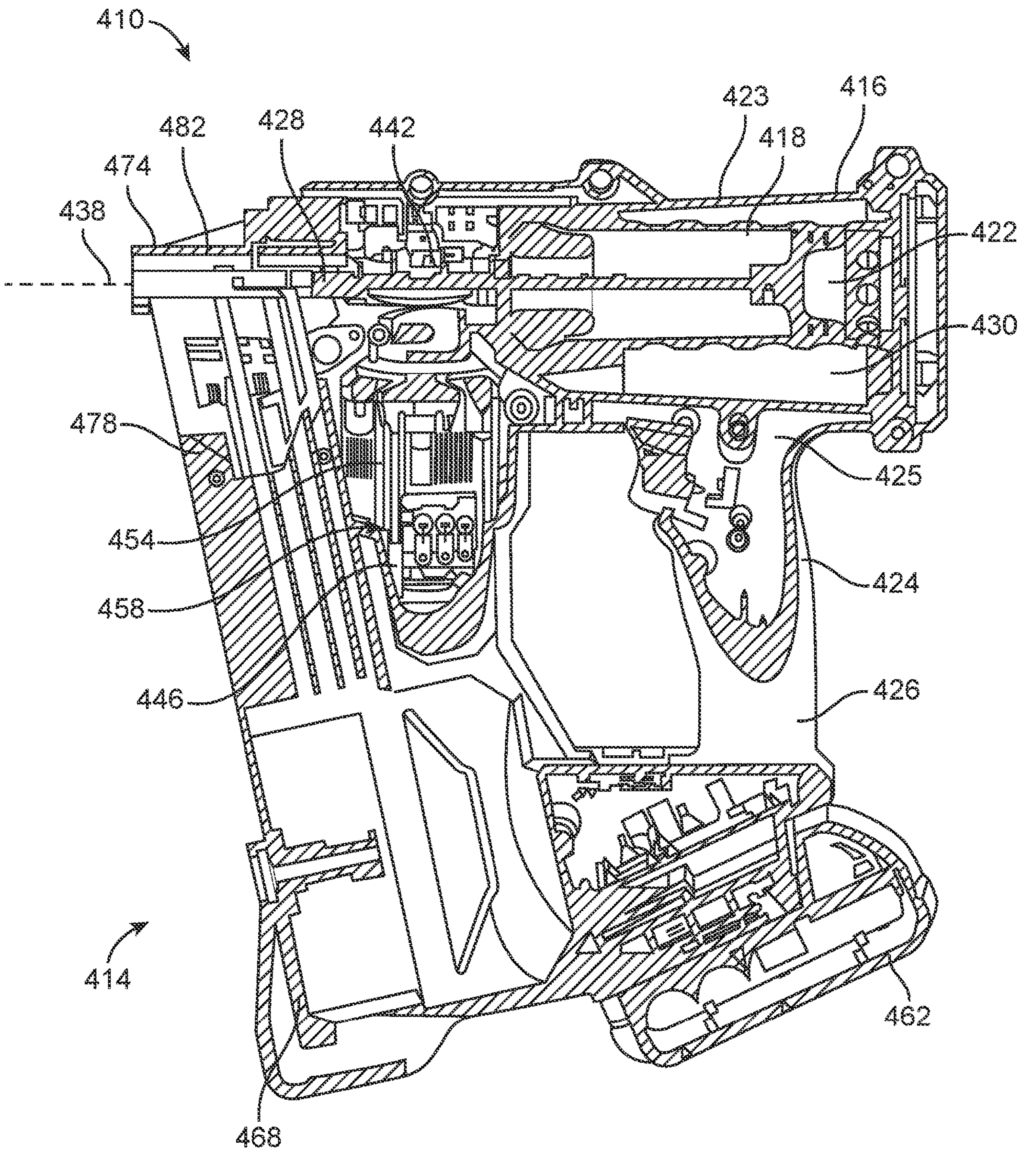
FIG. 20 is a cross-sectional view of the fastener driver of FIG. 19.

With reference to FIGS. 19 and 20, a gas spring-powered fastener driver 410 is operable to drive fasteners (e.g., nails) held within a canister magazine 414 into a workpiece. The fastener driver 410 includes a housing 416, a driver cylinder 418 positioned within the housing 416, and a moveable piston 422 positioned within the cylinder 418. The housing 416 includes a head portion 423 and a handle portion 424 extending therefrom. The handle portion 424 includes a first end 425 coupled with the head portion 423 and an opposite, second end 426. A trigger 427 is disposed on the handle portion 424 for activating the fastener driver 410 through actuation of the trigger 427. The driver cylinder 418 is positioned within the head portion 423 of the housing 416. The fastener driver 410 further includes a driver blade 428 that is attached to the piston 422 and moveable therewith. The fastener driver 410 does not require an external source of air pressure, but rather includes a storage chamber cylinder 430 of pressurized gas in fluid communication with the cylinder 418. In the illustrated embodiment, the cylinder 418 and moveable piston 422 are positioned within the storage chamber cylinder 430.

Figure 21:
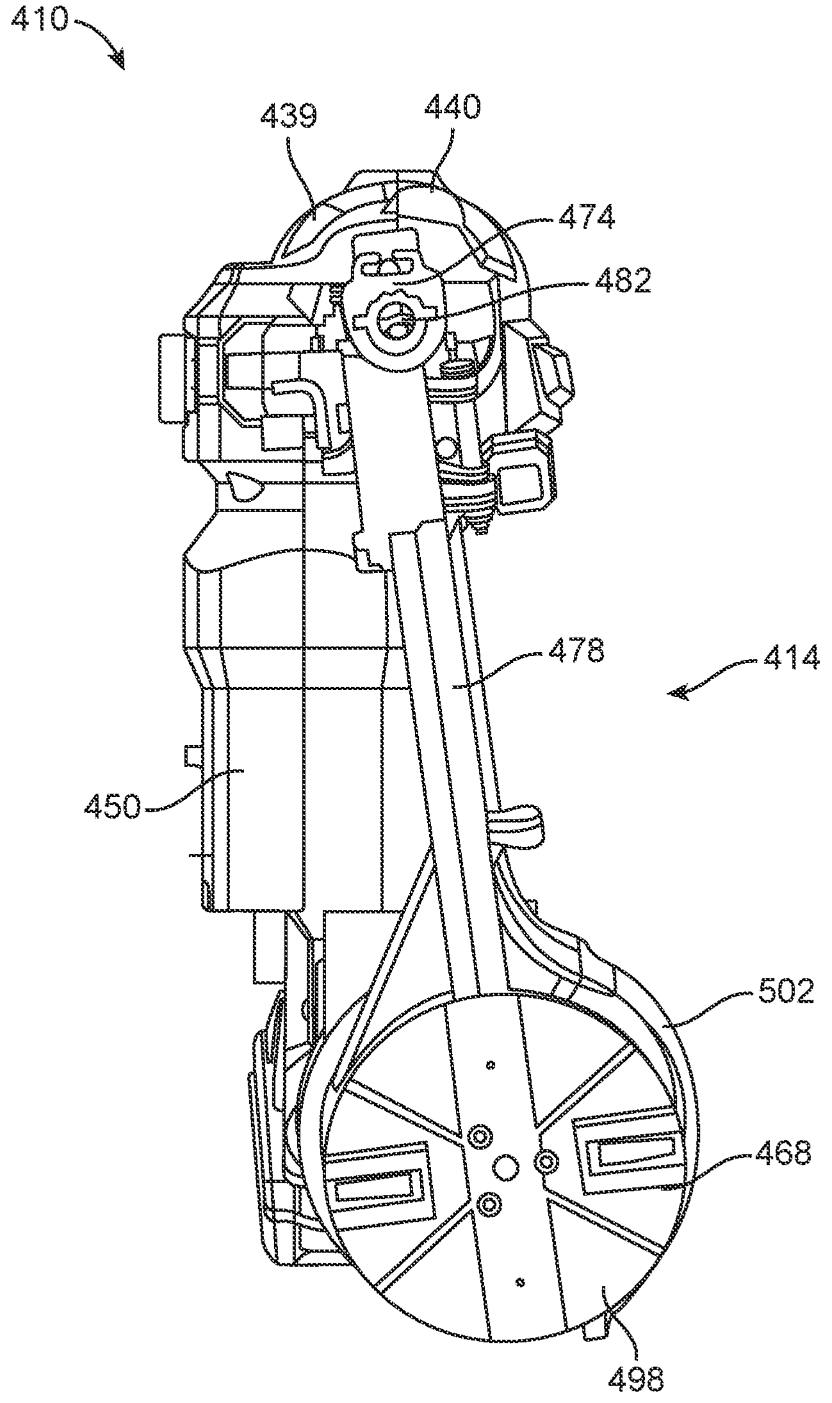
FIG. 21 is a front view of the fastener driver of FIG. 19.

With reference to FIG. 20, the cylinder 418 and the driver blade 428 define a driving axis 438, and during a driving cycle the driver blade 428 and piston 422 are moveable between a top dead center ("TDC") (i.e., retracted or ready) position and a bottom dead center ("BDC") (i.e., extended or driven) position. The housing includes first and second clamshell portions 439, 440 mated along a plane in which the driving axis 438 is contained or is parallel thereto (as shown in FIG. 21). The fastener driver 410 further includes a lifting mechanism 442 (FIG. 20), which is powered by a motor 446, and which is operable to move the driver blade 428 from the BDC position toward the TDC position. The motor 446 is positioned in line with the lifting mechanism 442 in a drive unit housing portion 450 of the housing 416. A transmission 454 is positioned between the motor 446 and the lifting mechanism 442 in the drive unit housing portion 450 of the housing 416. The motor 446 and the transmission 454 together form a drive unit 458 for moving the driver blade 428 along the driving axis 438 from the BDC position toward the TDC position. The fastener driver 410 also includes a battery pack 462 coupled to the second end 426 of the handle portion 424 that supplies electrical current to the motor 446 in response to actuation of the trigger 427, which in turn rotates the lifting mechanism 442.

In operation, after a fastener is driven into a workpiece, the lifting mechanism 442 drives the piston 422 and the driver blade 428 toward the TDC position along the driving axis 438 with continued activation of the motor 446. As the piston 422 and the driver blade 428 are driven toward the TDC position, the gas above the piston 422 and the gas within the storage chamber cylinder 430 is compressed. Just prior to reaching the TDC position, the motor 446 is deactivated, stopping the piston 422 and the driver blade 428 in a "ready" position where the piston 422 and the driver blade 428 are held until initiation of the next fastener driving operation, which is commenced by user activation of the trigger 427. When the driver blade 428 is released by the lifting mechanism 442, the compressed gas above the piston 422 and within the storage chamber cylinder 430 drives the piston 422 and the driver blade 428 to the BDC position along the driving axis 438, thereby driving a fastener into a workpiece. The illustrated fastener driver 410 therefore operates on a gas spring principle utilizing the lifting mechanism 442 and the piston 422 to compress the gas within the cylinder 418 and the storage chamber cylinder 430 in preparation for a fastener driving cycle.

Figure 23:
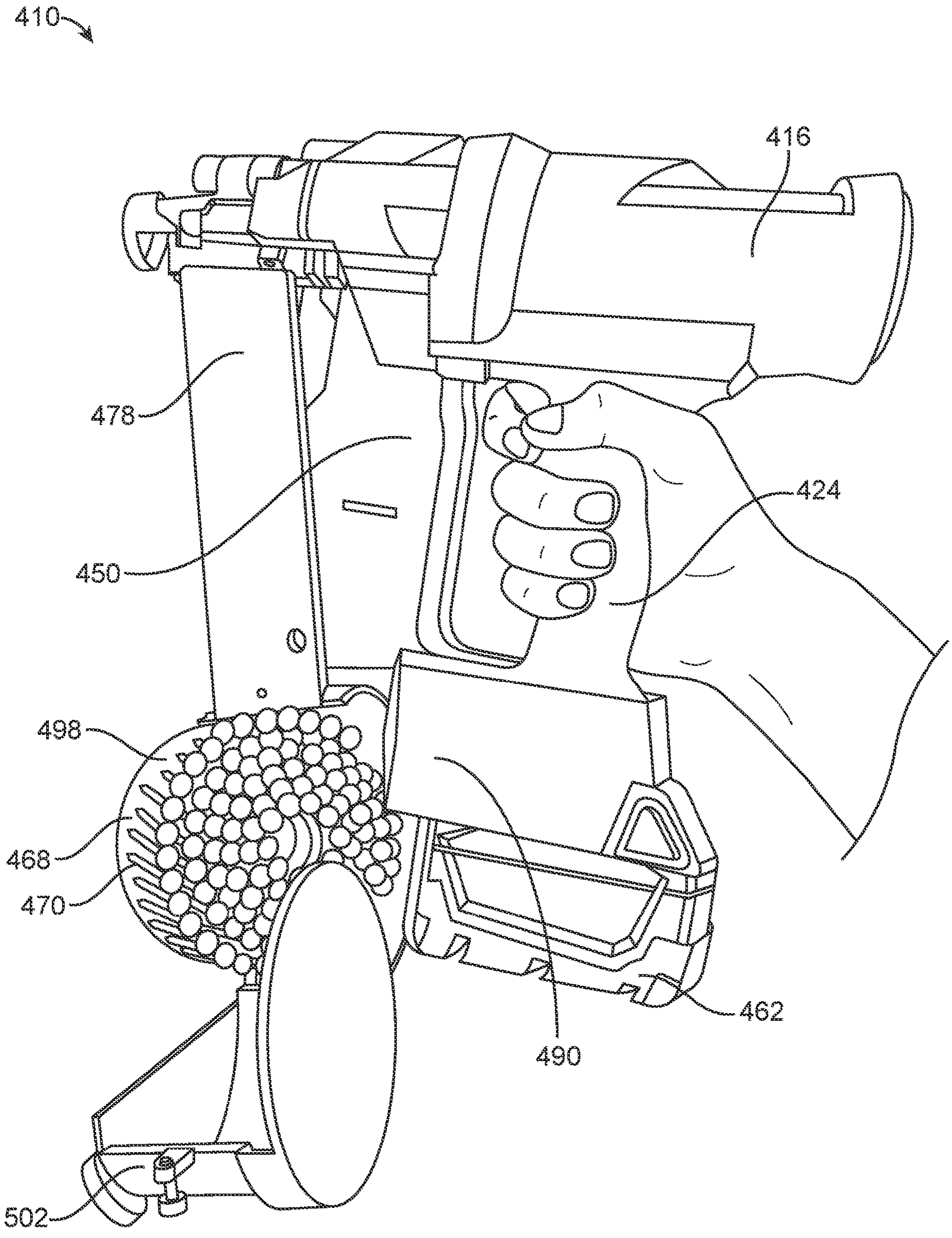
FIG. 23 is a side perspective view of the fastener driver of FIG. 19 with the magazine in an open position.

With reference to FIG. 23, the magazine 414 includes a cannister portion 468 in which collated fasteners 470 are arranged in a coil. The magazine 414 also includes a straight or linear portion 478 that is coupled to a nosepiece 474 of the fastener driver 410. The fasteners 470 are sequentially transferred from the cannister portion 468, through the linear portion 478, and into a driver channel 482 within the nosepiece 474 by a pusher mechanism 486 (FIG. 19). After a forwardmost fastener 470 is inserted into the driver channel 482, the driver blade 428 is movable within the driver channel 482 to discharge the fastener 470 from the driver channel 482 and into a workpiece.

Figure 24:
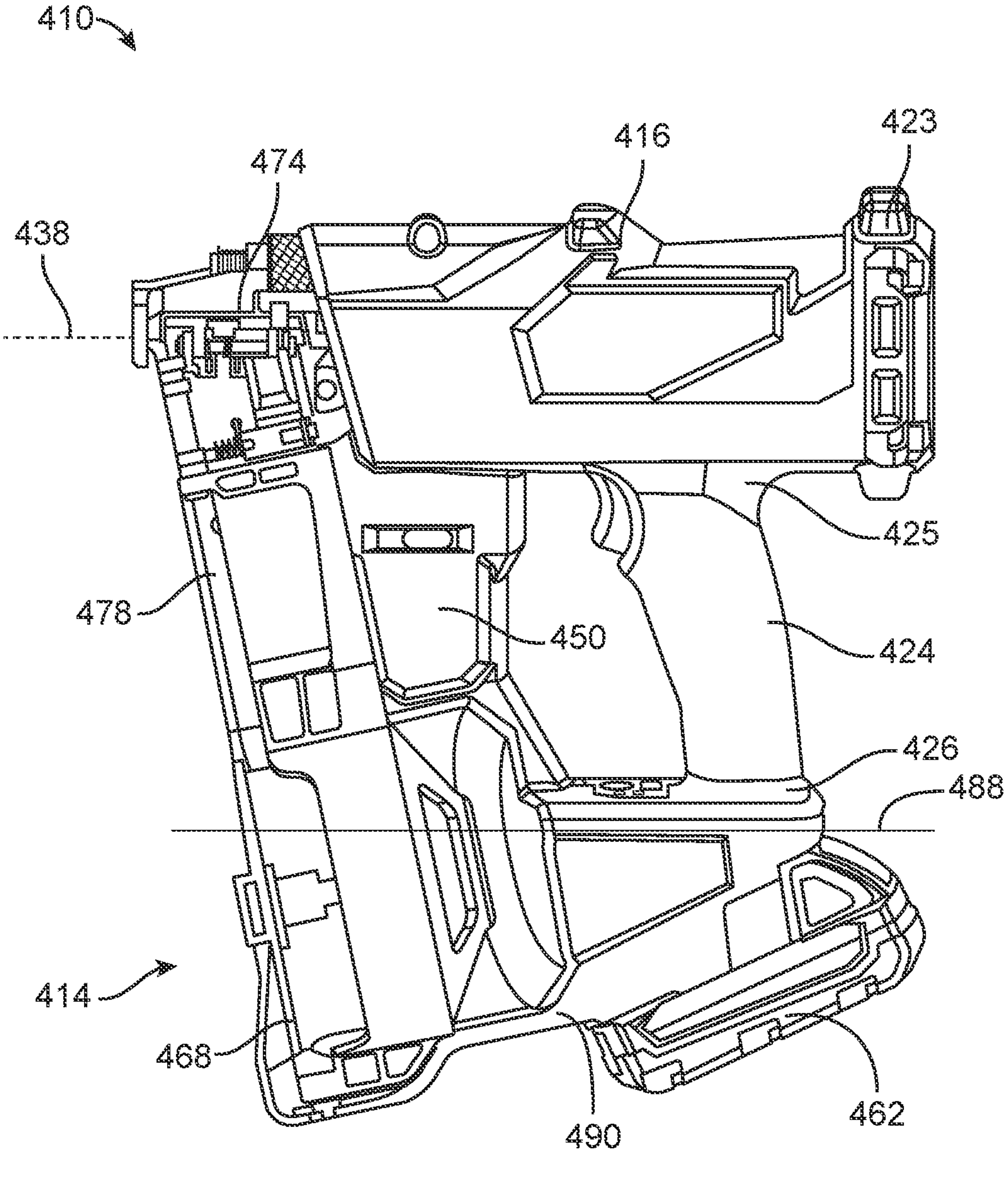
FIG. 24 is a side view of a gas-spring powered fastener driver in accordance with another embodiment of the invention.

With continued reference to FIG. 19, the cannister portion 468 is positioned on an opposite side of an imaginary plane 488 as the second end 426 of the handle portion 424. The imaginary plane 488 is positioned between the magazine 414 and the second end 426 of the handle portion 424 and is parallel with the driving axis 438. In other embodiments, the imaginary plane 488 may bisect both the cannister portion 468 and a battery receptacle portion 489 of the housing 416 which, in turn, is integrally formed as a single piece with the handle portion 424 (as shown in FIG. 24). In the embodiment shown in FIG. 19, the housing 416 includes a recess 490 positioned behind the motor 446 and below the battery pack 462 such that the canister portion is at least partially disposed within the recess 490. The recess 490 is sized to nest the cannister portion 468 therein. When nested in the recess 490, the cannister portion 468 is positioned behind the motor 446 and below the battery pack 462. Therefore, the cannister portion 468 is cantilevered from a rear end of the linear portion 478 of the magazine 414. By locating the cannister portion 468 of the magazine 414 in this manner, the weight of the coiled fasteners 470 is shifted further rearward, such that a center of mass of the fastener driver 410 with a fully loaded magazine 414 is near the handle portion 424. Having the center of mass near the handle portion 424 makes the fastener driver 410 easier for the user to hold and maneuver.

Figure 22:
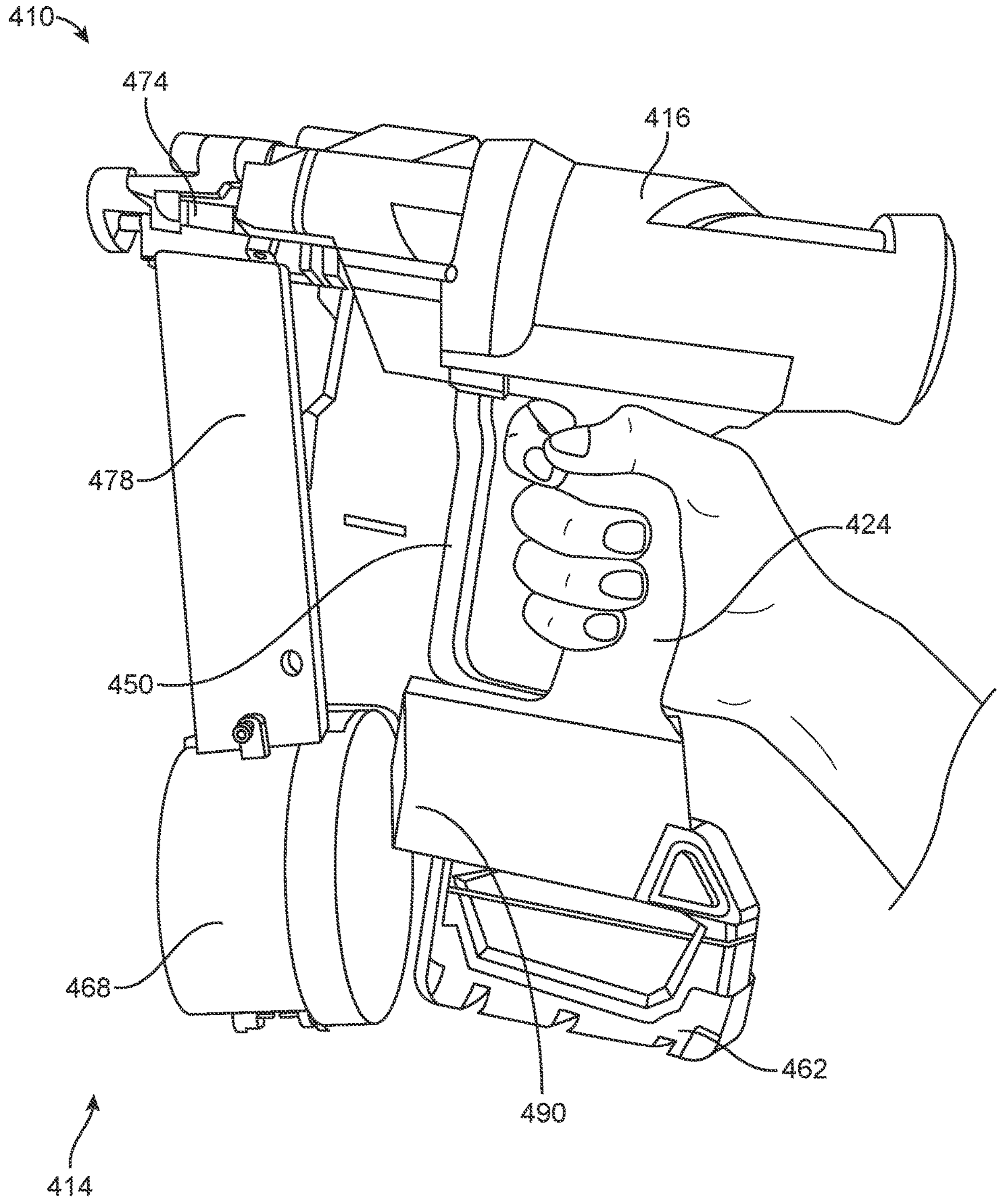
FIG. 22 is a side perspective view of the fastener driver of FIG. 19 with a magazine in a closed position.

With reference to FIGS. 19 and 21, the magazine 414 includes a base 498 and an attached cover 502. The base 498 is sized to receive the coiled fasteners 470 and, in some embodiments, is integrally formed as a single piece with the first clamshell portion 439 of the housing 416. In addition to the base 498 defining part of the cannister portion 468 of the magazine 414, the base 498 also defines part of the linear portion 478 of the magazine 414. In other words, the first clamshell portion 439 of the housing 416 defines parts of the handle portion 424, the drive unit housing portion 450, and the base 498, and is formed from one continuous piece of material. In other embodiments, the base 498 of the magazine 414 is formed separately from the housing 416 and is attached to the nosepiece 474 by fasteners, as shown in FIGS. 22 and 23.

With reference to FIG. 19, the cover 502 is pivotable relative to the base 498 to provide access to an interior of the magazine 414, and therefore, the fasteners 470. In the illustrated embodiment, the cover 502 pivots relative to the base 498 about an axis 506 that is parallel to the linear portion 478 of the magazine between a closed position (shown in FIG. 19) and an open position. In the closed position, the cover 502 is latched to the base 498 such that the fasteners 470 are secured within the magazine 414. In the open position, the cover 502 is pivoted away from the base 498 such that the user may remove the fasteners 470 from the magazine 414 or reload fasteners 470 into the magazine 414.

With reference to FIGS. 19 and 21, the linear portion 478 of the magazine 414 is positioned adjacent (i.e., side by side with) the drive unit housing portion 450 of the housing 416. The linear portion 478 is also oriented at an oblique included angle relative to the driving axis 438.

Figure 25:
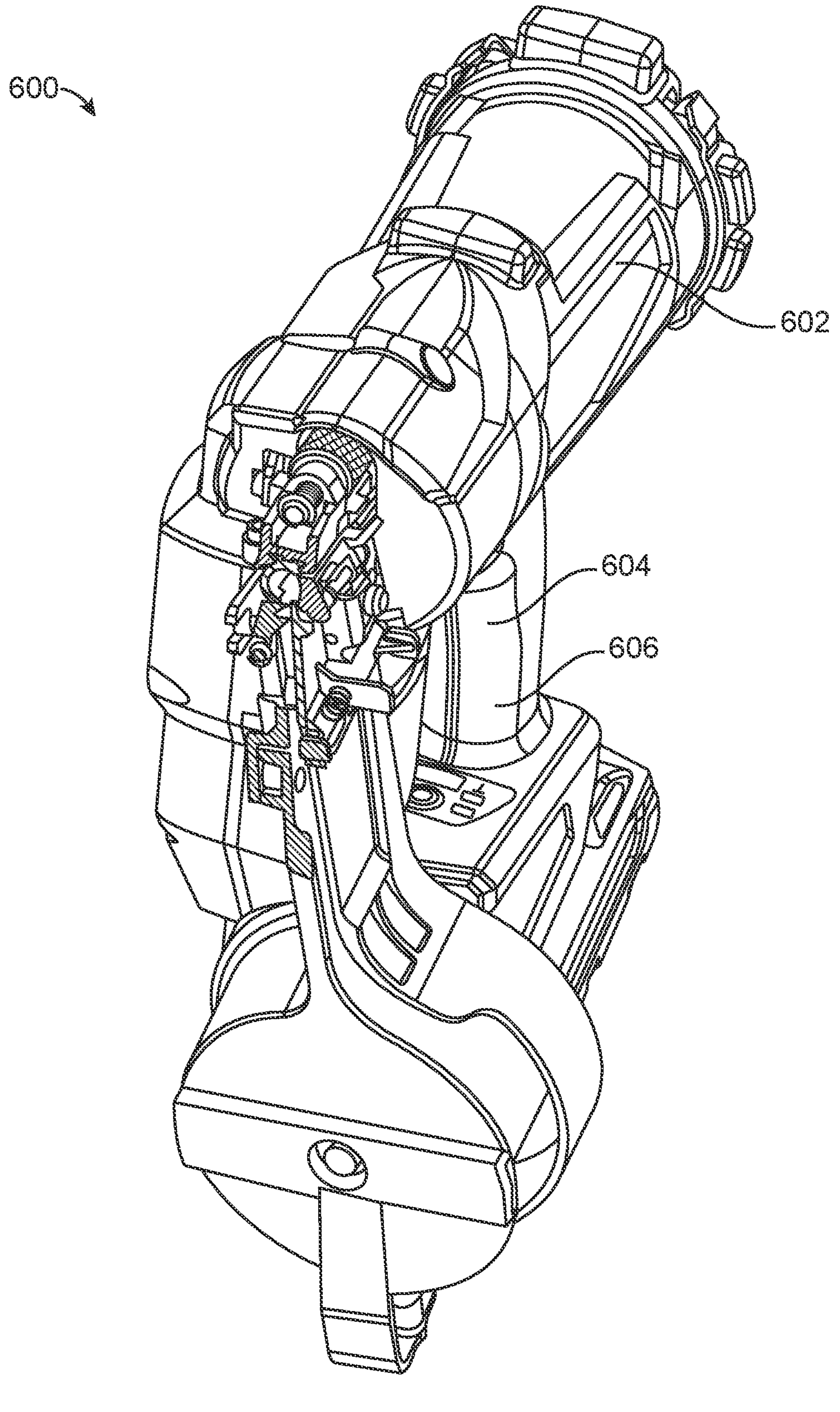
FIG. 25 is a perspective view of a gas-spring powered fastener driver in accordance with yet another embodiment of the invention.

FIG. 25 depicts another gas spring-powered fastener driver 600 that is designed to be used to install exterior wall coverings, e.g., the exterior wall covering 200 illustrated in FIG. 14-16. The fastener driver 600 illustrated in FIG. 25 is similar to the gas spring-powered fastener driver 10 illustrated in FIGS. 1-2. A shown, the fastener driver 600 includes a housing 602 that includes a heat reducing exterior coating 604 that is disposed overall, or a portion, of the housing 602. In a particular aspect, the heat reducing exterior coating 604 is disposed only on the handle 606 of the fastener driver 600. In another aspect, the heat reducing exterior coating 604 is a reflective coating. In a further aspect, the reflective coating is a chrome coating on the plastic housing 602. For example, the chrome coating is applied using a plastic chrome plating process. Alternatively, the chrome coating is applied using a vacuum metalizing process. Further, the chrome coating is applied using silver colored spray paint. In another aspect, the chrome coating is a chrome film that is either stretchable or non-stretchable. Finally, in another aspect, the chrome coating is applied using an actual spray chrome for plastic.

Figure 26:
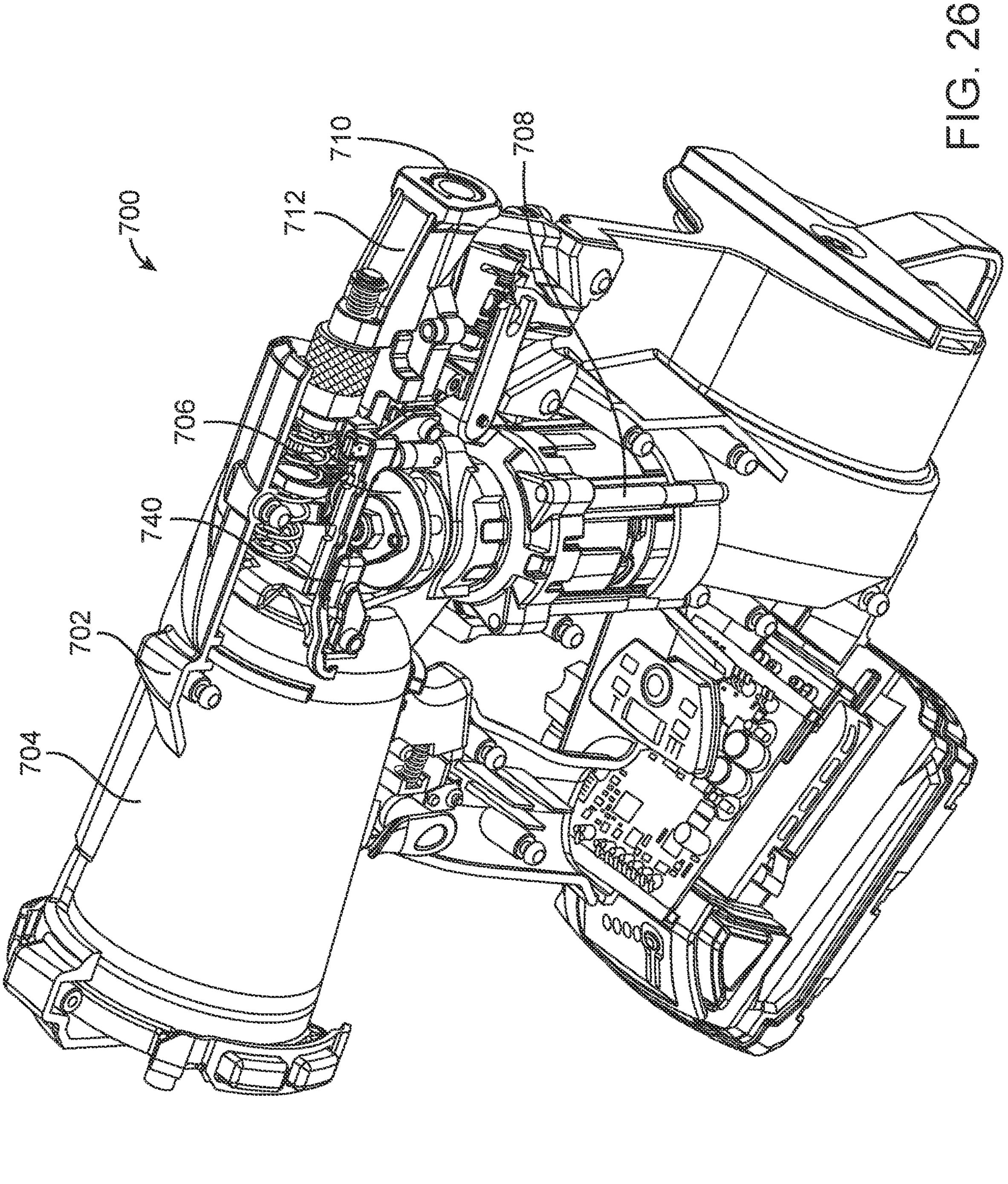
FIG. 26 is a perspective view of a fastener driver in accordance with another embodiment of the invention.
Figure 27:
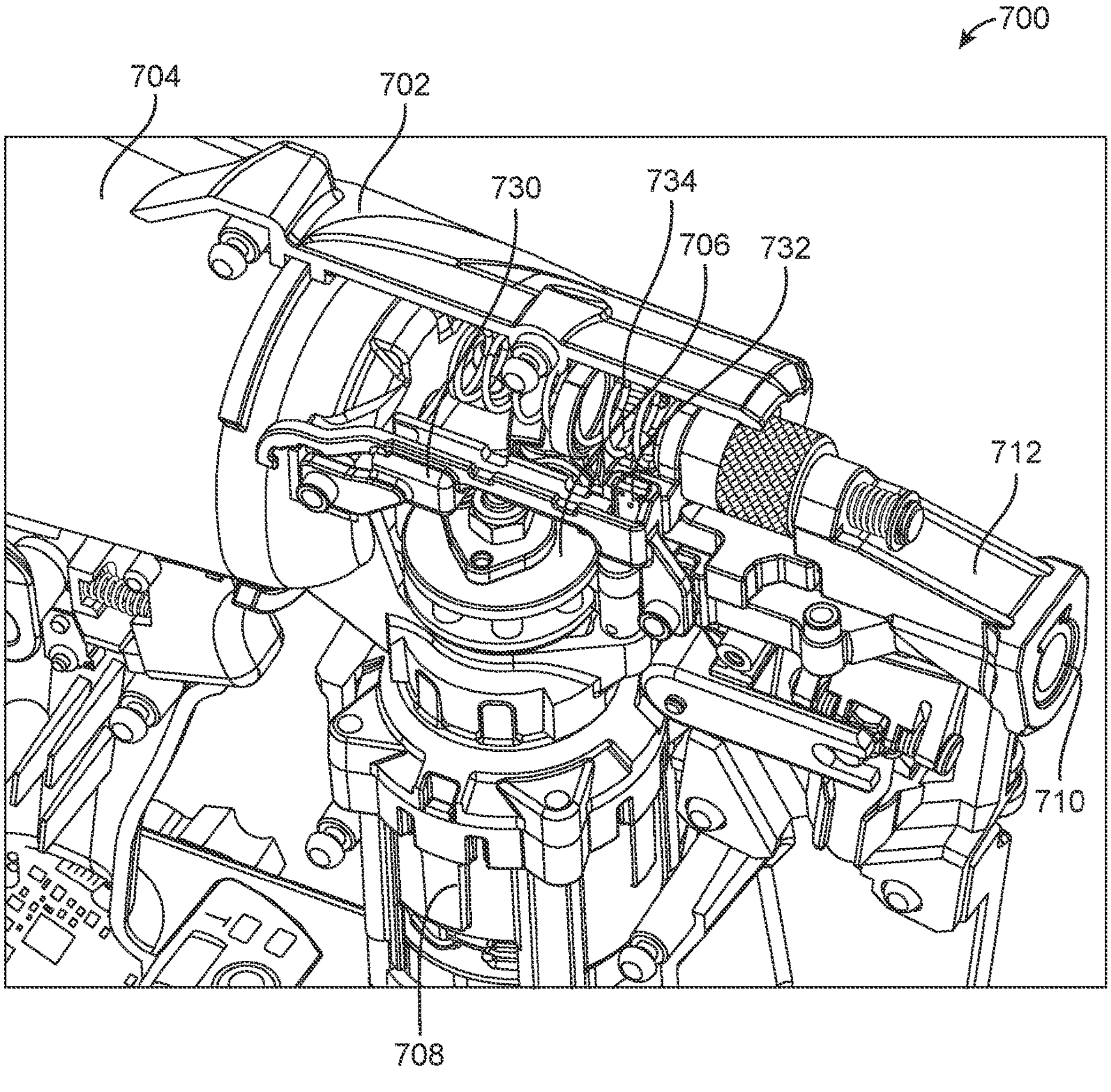
FIG. 27 is a detailed view of the fastener driver of FIG. 26.
Figure 28:
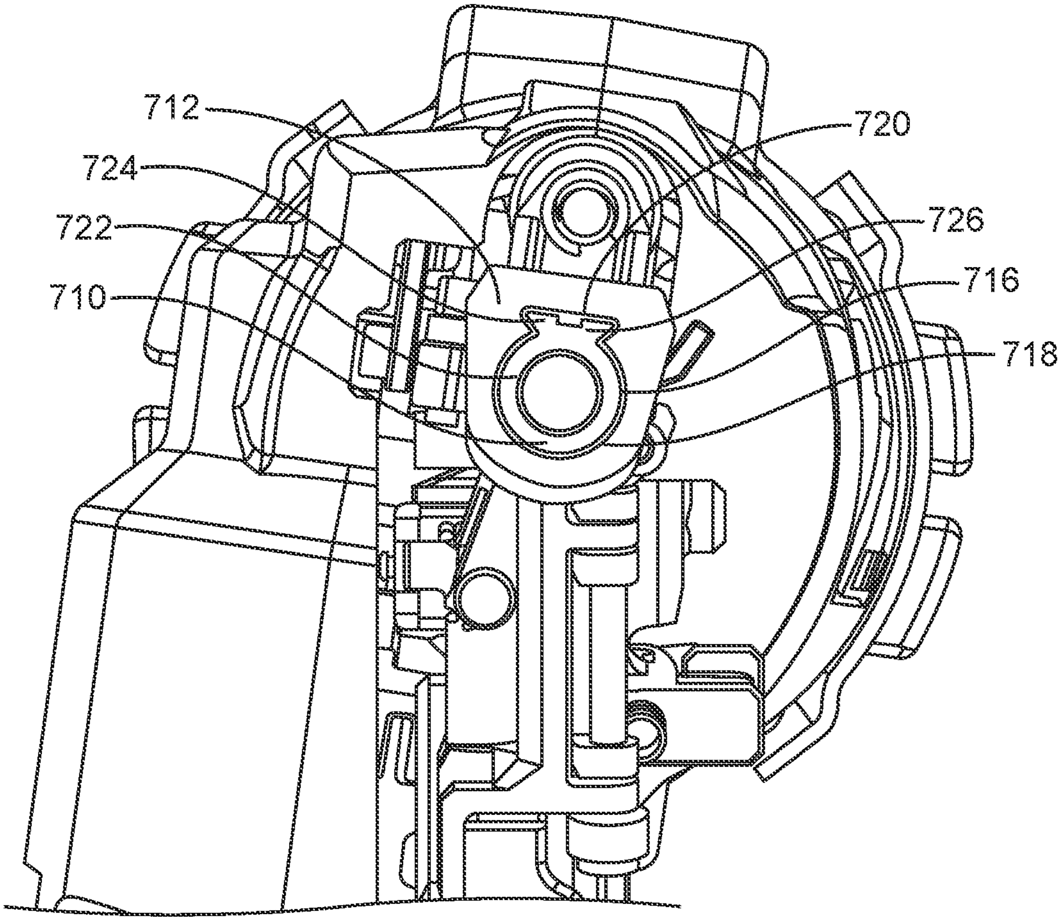
FIG. 28 is detailed view of the fastener driver of FIG. 26.

FIGS. 26-28 illustrate another gas spring-powered fastener driver 700 that is designed to be used to install exterior wall coverings, e.g., the exterior wall covering 200 illustrated in FIG. 14-16. The fastener driver 700 illustrated in FIGS. 26-28 is similar to the gas spring-powered fastener driver 10 illustrated in FIGS. 1-2. As illustrated, the fastener driver 700 includes a housing 702. A storage chamber cylinder 704 is disposed within the housing 702. Further, a lifting mechanism 706 is disposed within the housing 702 and is powered by a motor 708. As stated above, the lifting mechanism 706 is operable to move a driver blade from the BDC position toward the TDC position. During operation, the lifting mechanism 706 drives the piston and the driver blade toward the TDC position along the driving axis by energizing the motor 708. As the piston and the driver blade are driven toward the TDC position, the gas above the piston and the gas within the storage chamber cylinder 704 is compressed. Just prior to reaching the TDC position, the motor 708 is deactivated, stopping the piston and the driver blade in a "ready" position where the piston and driver blade are held until released by user activation of a trigger.

As shown in FIGS. 26-28, the fastener driver 700 also includes a nosepiece 710 and a workpiece contact bracket 712 fitted around the nosepiece 714. The workpiece contact bracket 712 is formed with an internal bore 716 at least partially along the length of the workpiece contact bracket 712. Looking at the end of the workpiece contact bracket 712, as shown in FIG. 28, the internal bore 716 of the workpiece contact bracket 712 includes a circular portion 718 and a trapezoidal portion 270 extending therefrom to form a tail socket. The nosepiece 710 includes a generally cylindrical outer wall 722 having a first ear 724 and a second ear 726 extending outwardly from the outer wall 722 along the length of the nosepiece 710. The ears 724, 726 form a generally trapezoidal tail that fits into the tail socket formed in the internal bore 716 of the workpiece contact bracket 712. Accordingly, a slip fit, elongated, continuous dovetail joint is formed between the nosepiece 710 and the workpiece contact bracket 712 partially along the length of both pieces. The dovetail joint allows the workpiece contact bracket 712 to slide along the nosepiece 710 and not rotate relative to the nosepiece 710. As such, the sliding dovetail joint constrains the workpiece contact bracket 712 and the nosepiece 710 to only allow linear motion therebetween to provide a precise feel for users of the fastener driver 700. Further, the dovetail joint between the workpiece contact bracket 712 and the nosepiece 710 fully supports the workpiece contact bracket 712 on the nosepiece 710 and substantially minimizes, or prevents, failures if the fastener driver 700 is dropped during use. The sliding dovetail joint between the workpiece contact bracket 712 and the nosepiece 710 is also relatively cost effective and mechanically robust.

As shown in FIG. 27, the fastener driver 700 includes a first Hall effect sensor 730 to sense the rotational position of the lifting mechanism 706 and a second Hall effect sensor 732 to sense the linear position of the workpiece contact bracket 712 on the nosepiece 710. During operation, the lifting mechanism 706 drives the piston and the driver blade toward the TDC position along the driving axis by energizing the motor 708. As the piston and the driver blade are driven toward the TDC position, the gas above the piston and the gas within the storage chamber cylinder 704 is compressed. Just prior to reaching the TDC position, the motor is deactivated by sensing the rotational position of the lifting mechanism 706 using the first Hall effect sensor 730 and a first target magnet on the lifting mechanism 706. When the motor 708 is deactivated, the piston and the driver blade are stopped in a "ready" position where the piston and driver blade are held until released by user activation of a trigger. When released, the compressed gas above the piston and within the storage chamber 704 drives the piston and the driver blade to the BDC position along the driving axis, thereby driving a fastener into a workpiece. The illustrated fastener driver 700 therefore operates on a gas spring principle utilizing the lifting mechanism 706 and the piston to compress the gas within the cylinder and the storage chamber cylinder 704 in preparation for a fastener driving cycle.

Also, during operation, the second Hall effect sensor 732 senses the linear position of the workpiece contact bracket 712 relative to the nosepiece 710. When the workpiece contact bracket 712 is pushed into, or toward, the housing 702 of the fastener driver 700 along the nosepiece 710, as shown in FIGS. 26 and 27, to compress a spring 734, the second Hall sensor 732 detects a second target magnet on the workpiece contact bracket 712 and provides an input signal to the main control unit of the fastener driver 700 to arm the fastener driver 700 to be ready to drive the next fastener that is loaded into the nosepiece 710. When the spring 734 biases the workpiece contact bracket 712 away from the housing 702 along the nosepiece 710, the second target magnet on the workpiece contact bracket 712 is not sensed by the second Hall effect sensor 732 and the fastener driver 700 is not allowed to operate when the trigger is pulled.

Figure 29:
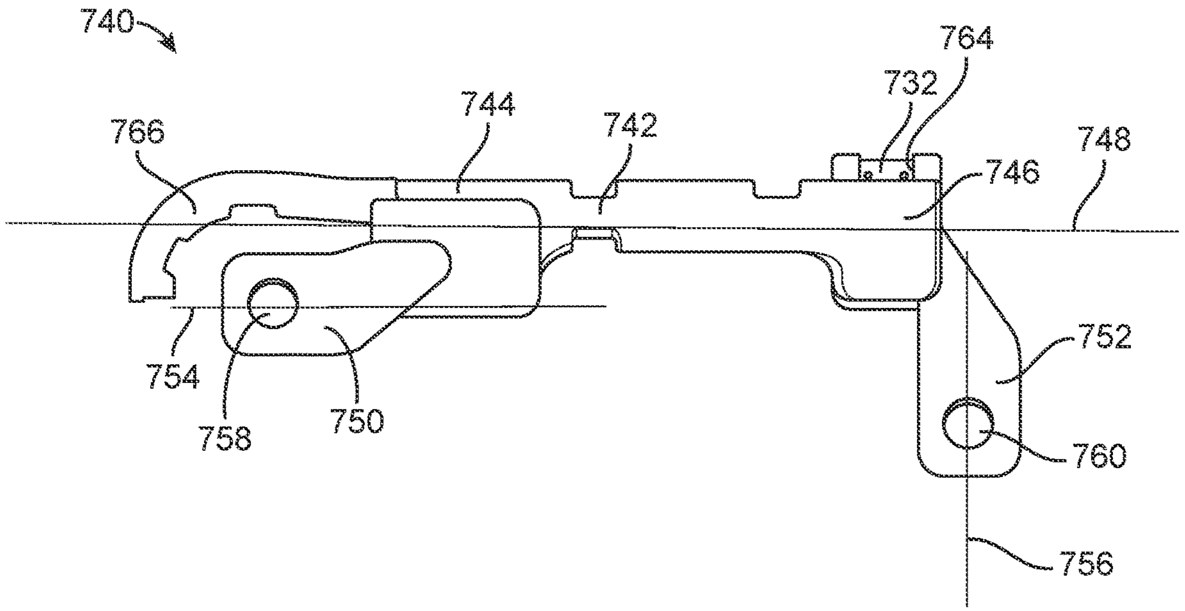
FIG. 29 is a side plan view of a sensor bracket for the fastener driver of FIG. 26.
Figure 30:
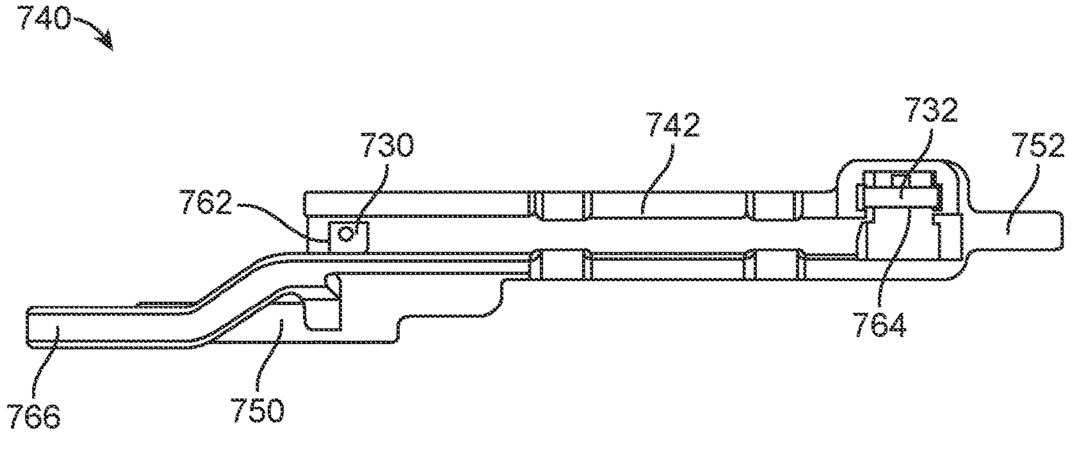
FIG. 30 is a top plan view of the sensor bracket of FIG. 29.
Figure 31:
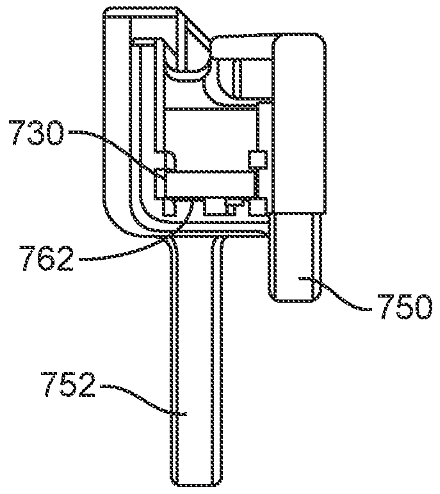
FIG. 31 is an end plan view of the sensor bracket of FIG. 29.

As illustrated in FIG. 26, the fastener driver 700 includes a sensor bracket 740 that is configured to hold the first Hall effect sensor 730 and the second Hall effect sensor 732. Details of the sensor bracket 740 are illustrated in FIGS. 29-31. As depicted in FIGS. 29-31, the sensor bracket 740 includes an elongated body 742 having a first end 744 and a second end 746. The elongated body 742 of the sensor bracket 740 includes a longitudinal axis 748. A first mounting tab 750 extends from the elongated body 742 near the first end 744. A second mounting tab 752 extends from the elongated body 742 near the second end 746. The first mounting tab 750 defines a longitudinal axis 754 that is parallel to the longitudinal axis 748 of the elongated body 742 of the sensor bracket 740. The second mounting tab 752 defines a longitudinal axis 756 that is perpendicular to the longitudinal axis 748 of the elongated body 742. As shown, the mounting tabs 750, 752 are formed with holes 758, 760 to allow fasteners to extend therethrough to mount the sensor bracket 740 within the housing 702 of the fastener driver 700.

FIGS. 29-31 further show that the sensor bracket 740 includes a first sensor pocket 762 formed near the first end 744 of the elongated body 742 and a second sensor pocket 764 near the second end 746 of the elongated body 742. The first sensor pocket 762 is configured to receive the first Hall sensor 730 therein. Further, the first sensor pocket 762 is oriented so that a long axis of the first sensor pocket 762 is parallel to the longitudinal axis 748 of the elongated body 742 and in the orientation shown in FIG. 30, the first sensor pocket 762 and the first Hall sensor 730 disposed therein are horizontal. The second sensor pocket 764 is configured to receive the second Hall sensor 732 therein. Further, the second sensor pocket 764 is oriented so that a long axis of the second sensor pocket 764 is perpendicular to the longitudinal axis 748 of the elongated body 742 and in the orientation shown in FIG. 30, the second sensor pocket 764 and the second Hall sensor 732 disposed therein are vertical. As shown, the long axis of the first sensor pocket 762 and the first Hall sensor 730 disposed therein is perpendicular to the long axis of the second sensor pocket 764 and the second Hall sensor 732 disposed therein. The sensor bracket 740 also includes a curved extension 766 that extends from the first end 744 of the elongated body 742. The curved extension 766 extends partially along the longitudinal axis 748 of the elongated body 742 and curves downward, relative to FIG. 29, partially around the first mounting tab 750.

Figure 32:
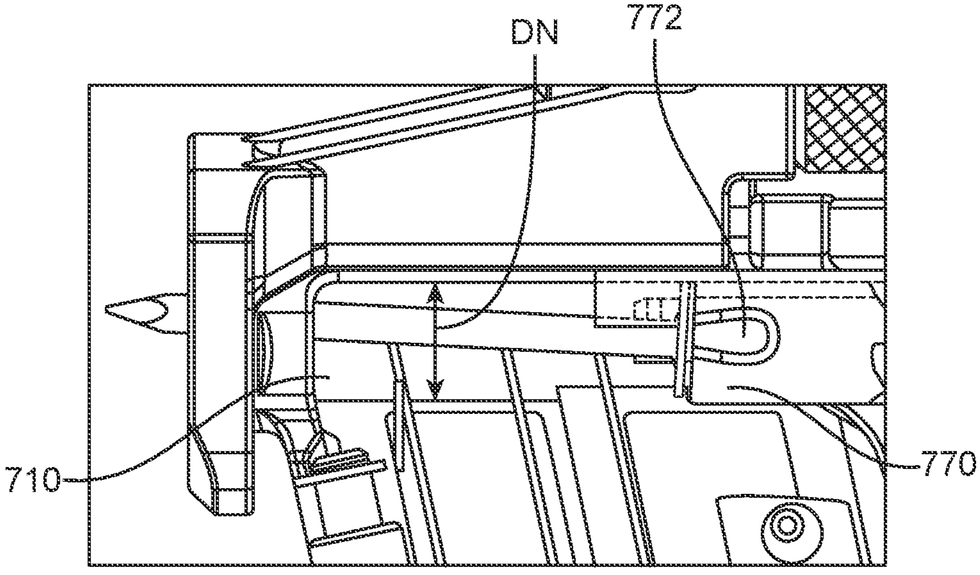
FIG. 32 is another detailed view of the fastener driver of FIG. 26.

FIG. 32 illustrates that the nosepiece 710 includes an inner bore extending at least partially along the length of the nosepiece 710 and the inner bore has a diameter DN greater than or equal to 7.5 millimeters (mm), such as greater than or equal to 7.6 mm, greater than or equal to 7.7 mm, greater than or equal to 7.8 mm, or greater than or equal to 7.9 mm. In another aspect, diameter DN is less than or equal to 12 mm, such as less than or equal to 11.5, less than or equal to 11.0, less than or equal to 10.5, or less than or equal to 10.0. Further, the fastener driver 700 includes a striker tip 770 that extends into the nosepiece 710. The striker tip 770 is magnetic or includes a magnet 772 near, or at, the striker tip 770. The magnetic striker tip 770 holds the head of the roofing nail during firing to reduce the issues associated with guiding roofing nails during installation via a fastener driver 700. The magnetic striker tip 770 substantially reduces jams and improves seating performance.

Figure 33:
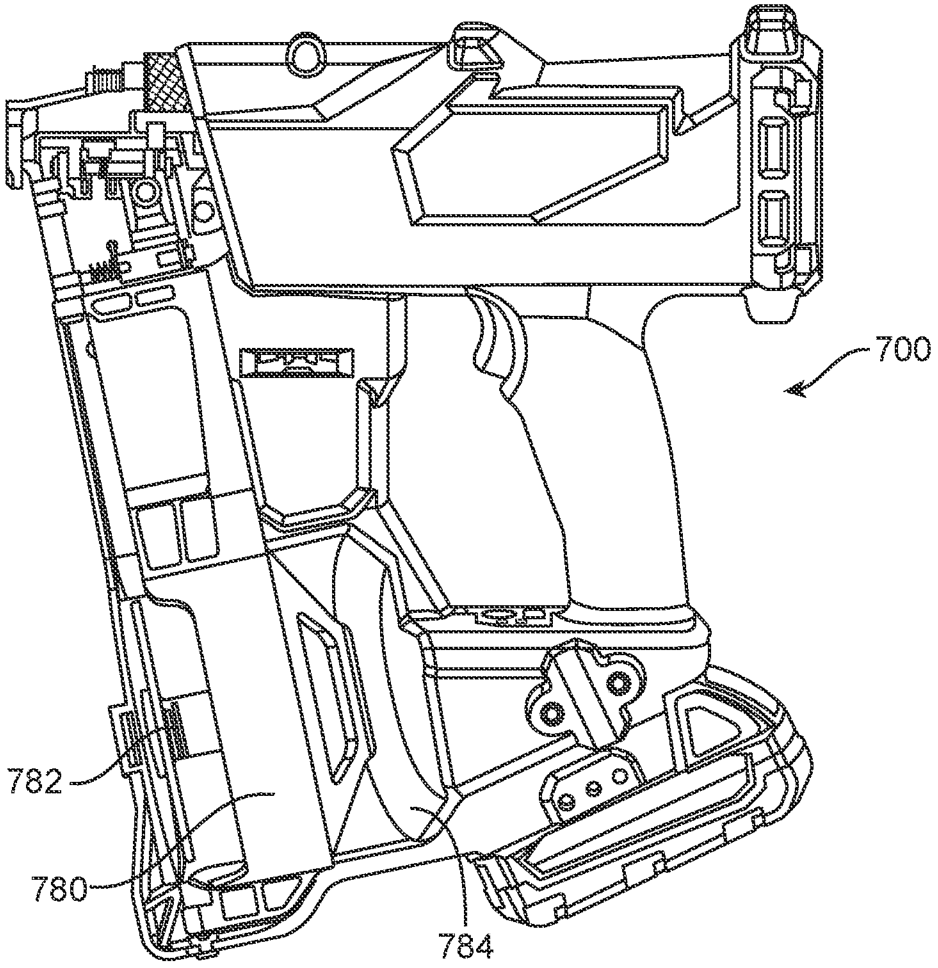
FIG. 33 is a side plan view of the fastener driver of FIG. 26.

Referring now to FIG. 33, the fastener driver 700 includes a magazine cover 780 that provides access to a magazine 782 within a magazine receptacle 784 formed in the housing 702 of the fastener driver 700. The magazine 782 is a canister magazine which contains a coiled strip of collated nails. Individual fasteners are sequentially loaded from the magazine 782 to the nosepiece 710 during operation of the fastener driver 700.

Figure 34:
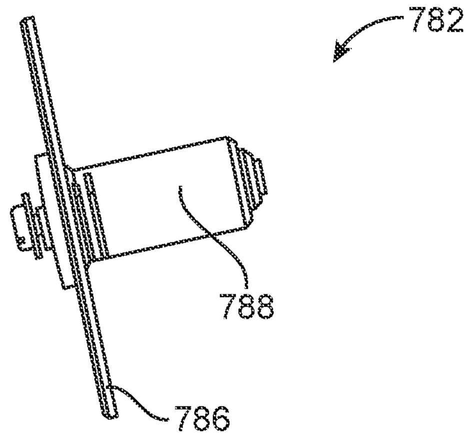
FIG. 34 is a side plan view of a magazine for the fastener driver of FIG. 26.

As shown in FIG. 34, the magazine 782 includes a nail plate 786 and a support post 788 for supporting the coiled strip of collated nails. The support post 788 includes a hollow center. An adjustment post 790 is slidably and rotatably disposed within the hollow center of the support post 788. The adjustment post 790 includes an end plate 792 and a removable end cap 794 that prevents the adjustment post 790 from sliding completely out of the magazine. A fastener 796 extends along the length of a bore within the adjustment post 790 and engages a threaded portion 798 of the end cap 794 to hold the end cap 794 in place and maintain the magazine 782 on the adjustment post 790.

Figure 35A:
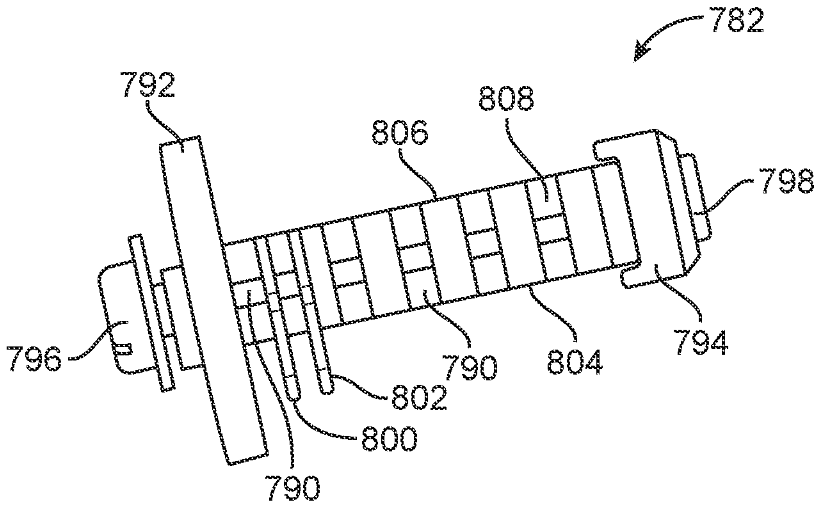
FIG. 35*a* is side plan view of the magazine of FIG. 34.
Figure 35B:
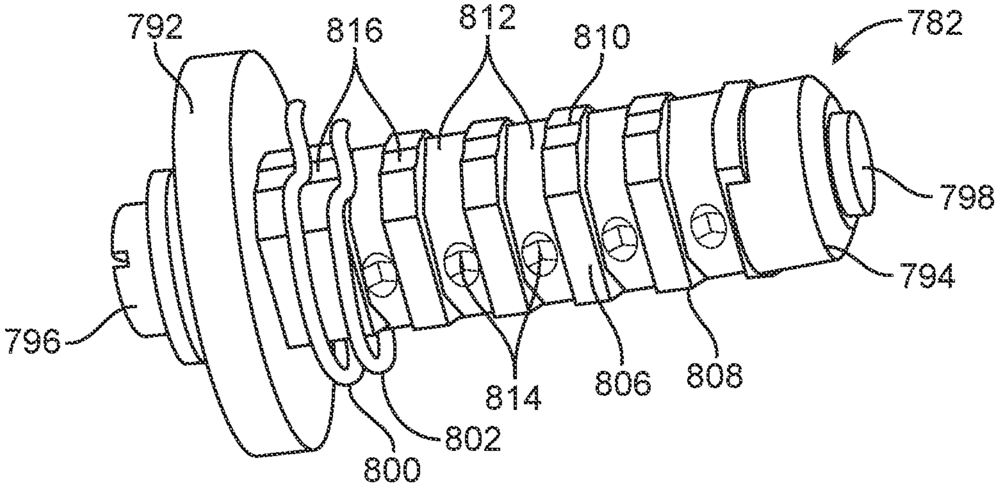
FIG. 35*b* is a perspective view of the magazine for the fastener driver of FIG. 26.

As illustrated, the magazine 782 is slidably coupled to the adjustment post 790. Specifically, the nail plate 786 and the support post 788 are slidable relative to the adjustment post 790. A radial detent spring clip 800 and an axial detent spring clip 802 couple the support post 788 to the adjustment post 790. As shown in FIG. 35*a*, the adjustment post 790 includes a first and second flat surface 804, 806 that extend along the length of the adjustment post 790 from the end plate 792 to the end cap 794. The flat surfaces 804, 806 are diametrically opposed to each other. FIG. 35*b* shows that the adjustment post 790 also includes a first and second rounded surface 808, 810 that extend along the length of the adjustment post 790 from the end plate 792 to the end cap 794. The rounded surfaces 808, 810 are diametrically opposed to each other and each rounded surface 808, 810 is between adjacent flat surfaces 804, 806. A plurality of adjustment grooves 812 are formed in the rounded surfaces 808, 810 as opposing pairs. A plurality of axial detents 814 are formed in the flat surfaces 804, 806 as opposing pairs. Each pair of axial detents 814 is radially aligned with a pair of adjustment grooves 812. Further, a plurality of radial detents 816 are formed in the rounded surfaces 808, 810 as opposing pairs. Each pair of radial detents 816 is located adjacent a pair of opposing adjustment grooves 812.

As depicted in FIGS. 35*a* and 35*b*, the axial detent spring clip 802 is disposed in two opposing adjustment grooves 812 of the adjustment post 790 and the radial detent spring clip 800 is disposed in a pair of opposing radial detents 816. To move the support post 788 and the nail plate 786 relative to the adjustment post 790, the support post 788 is rotated. Rotation of the support post 788 causes the axial detent spring clip 802 to move out of the opposing adjustment grooves 812 and causes the radial detent spring clip 800 to move out of the opposing radial detents 816. The user can rotate the support post 788 until the axial detent spring 802 snaps into a pair of opposing axial detents 814. Once rotated, the support post 788 is slid axially relative to the adjustment post 790 from one pair of opposing axial detents 814 to another pair of opposing axial detents 814 along the length of the adjustment post 790. Once the support post 788 slides a predetermined amount to where the user wants the support post 788 to land along the adjustment post 790, the support post 788 is again rotated.

It is to be understood that rotation of the support post 788 causes the axial detent spring clip 802 to move into a new pair of opposing adjustment grooves 812 at a different location along the adjustment post 790 and causes the radial detent spring clip 800 to move into a new pair of opposing radial detents 816 along the length of the adjustment post 790. The radial detents 816 provide tactile feedback to the user to know when to stop rotating the support post 788 relative to the adjustment post 790 while the axial detents 814 provide tactile feedback to the user to know when to stop the support post 788 along the adjustment post 790 so that the spring clips 800, 802 are properly aligned for alignment back into position in which the axial detent spring clip 802 linearly locks the support post 788 in place along the adjustment post 790 to prevent further linear movement along the adjustment post 790. Accordingly, the magazine 782 is adjustable to accommodate roofing nails of varying lengths within the magazine 782.

Figure 36:
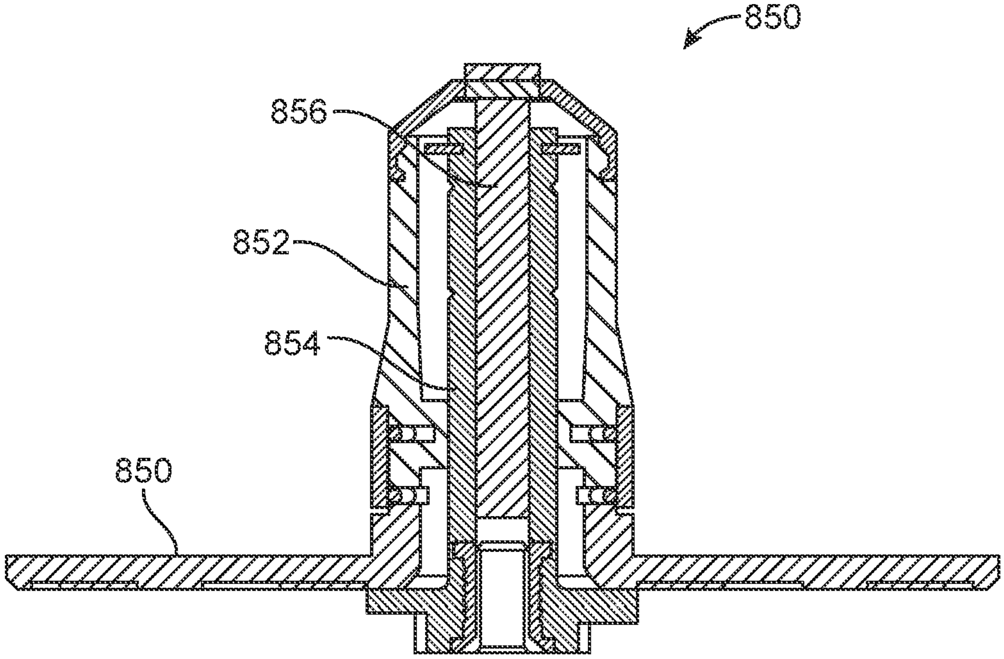
FIG. 36 is a cross-section view of another embodiment of a magazine.

FIG. 36 illustrates another the magazine 850 that includes a nail plate 852 and a support post 854 for supporting the coiled strip of collated nails. The support post 854 is hollow and includes an adjustment post 856 slidably and rotatably disposed within the hollow center of the support post 854. A guidepost 856 is disposed within the support post 854 to provide lateral stability to the magazine 850.

Figure 37:
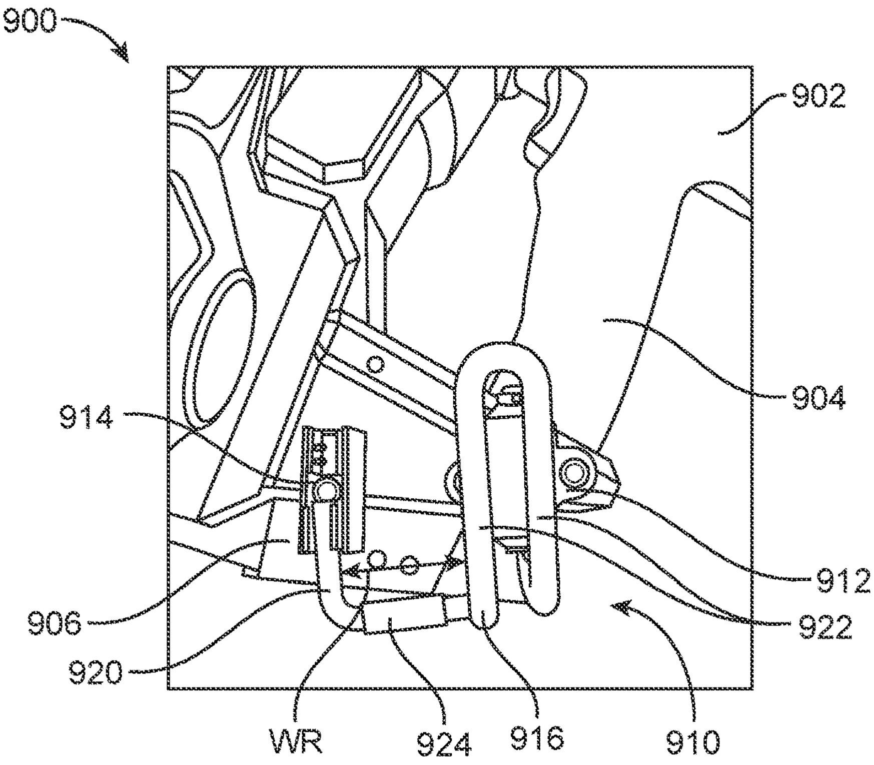
FIG. 37 is a partial view of a gas-spring powered fastener driver in accordance with another embodiment of the invention.
Figure 38:
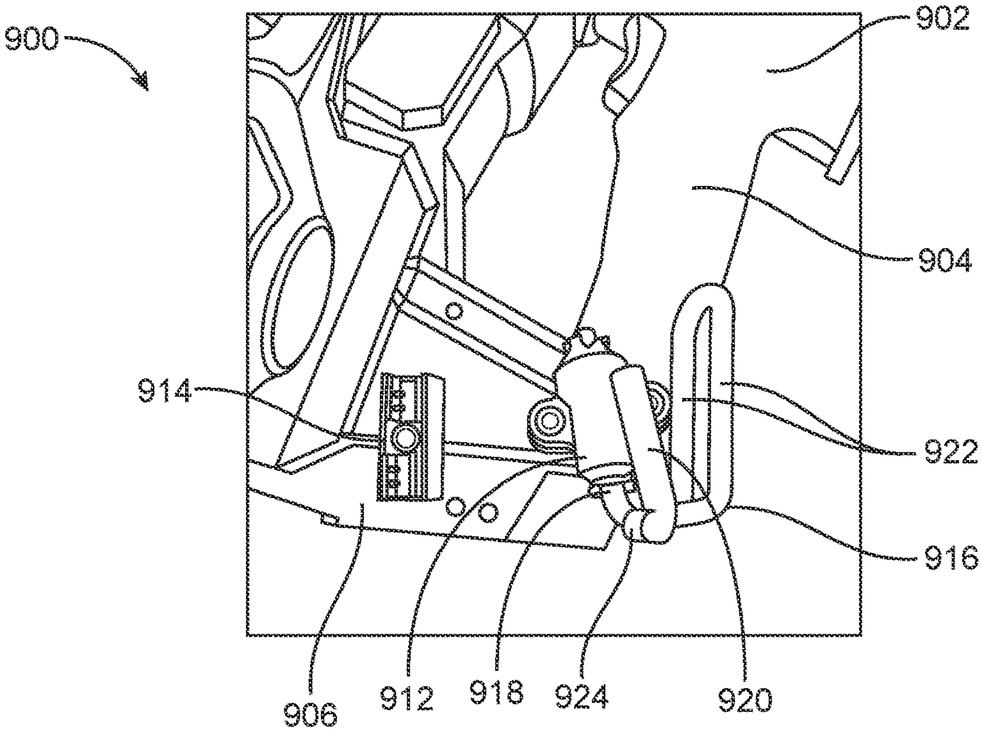
FIG. 38 is another partial view of the fastener driver of FIG. 37.
Figure 39:
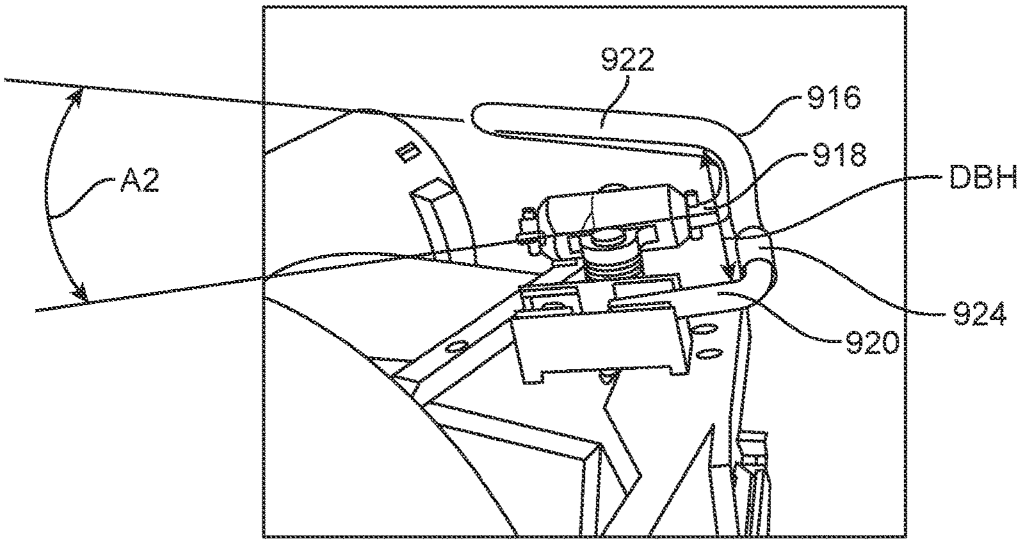
FIG. 39 is yet another partial view of the fastener driver of FIG. 37.

FIGS. 37-39 depict still another gas spring-powered fastener driver 900 that is designed to be used to install exterior wall coverings, e.g., the exterior wall covering 200 illustrated in FIG. 14-16. The fastener driver 900 illustrated in FIGS. 37-39 may be similar to any of the gas spring-powered fastener drivers 10, 300, 400, 410, 600, 700 illustrated in the previous figures.

As illustrated, the fastener driver 700 includes a housing 902 having a handle 904 and a battery receptacle 906. A dual-purpose hook assembly 910 is affixed, or otherwise attached, to the housing 902 adjacent the handle 904 near the battery receptacle 906. The dual-purpose hook assembly 910 includes a hinge bracket 912 and a clasp 914. Further, the dual-purpose hook assembly 910 includes a hook 916. As shown, the hook 916 includes a hinge post 918 that is rotatably disposed within the hinge bracket 912 and a clasp post 920 that is removably engaged with the clasp 914. In a particular aspect, the clasp post 920 is parallel to the hinge post 918.

FIGS. 37-39 further show that the hook 916 further includes a belt hook portion 922 between the hinge post 918 and the clasp post 920. The belt hook portion 922 is configured to fit over a user's belt to hold the fastener driver 900 during use. The belt hook portion 922 is formed at an angle A2 with respect to the hinge post 918 and the clasp post 920. Angle A2 is greater than or equal to 5°, such as greater than or equal to 7.5°, greater than or equal to 10°, or greater than or equal to 12.5°. In another aspect, angle A2 is less than or equal to 25°, such as less than or equal to 22.5°, less than or equal to 20°, less than or equal to 17.5°, or less than or equal to 15.0°. It is to be understood that the angle A2 may be within a range between, and including, the minimum and maximum vales of A2 described herein.

As depicted in FIG. 39, the belt hook portion 922 is offset, or spaced, from the hinge post 918 and the clasp post 920. For example, the belt hook portion 922 includes a minimum offset distance DB measured at the base of the belt hook portion 922. In a particular aspect, the distance DB is greater than or equal to 0.5 inches, such as greater than or equal to 0.625 inches, greater than or equal to 0.75 inches, or greater than or equal to 1.0 inches. Moreover, distance DB is less than or equal to 1.5 inches, such as less than or equal to 1.375 inches, less than 1.25 inches, or less than or equal to 1.125 inches. It is to be understood that distance DB may be within a range between, and including, any of the minimum and maximum values of distance DB described herein.

FIGS. 37-39 further show that the hook 916 includes a rafter hook portion 924 between the belt hook portion 922 and the clasp post 20. The rafter hook portion 924 is perpendicular to the belt hook portion 922. Moreover, the rafter hook portion 924 is configured to fit over a rafter, or other static structure, to hold the fastener driver 900 during use. As shown, the rafter hook portion 924 includes a width WR. In one aspect, width WR is greater than or equal to 1.25 inches, such as greater than or equal to 1.375 inches, greater than or equal to 1.5 inches, greater than or equal to 1.625 inches, or greater than or equal to 1.75 inches. In another aspect, the width WR is less than or equal to 2.5 inches, such as less than or equal to 2.375 inches, less than or equal to 2.25 inches, less than or equal to 2.125 inches, less than or equal to 2.0 inches, or less than or equal to 1.875 inches. It is to be understood that the width WR may be within a range between, and including, any of the minimum and maximum values of width WR described herein.

In another aspect, width WR is greater than distance DB. For example, width WR is greater than or equal to 1.4×DB, such as greater than or equal to 1.5×DB, greater than or equal to 1.75×DB, greater than or equal to 2.0×DB, or greater than or equal to 2.33×DB. In yet another aspect, width WR is less than or equal to 5.0×DB, such as less than or equal to 4.0×DB, less than or equal to 3.33×DB, or less than or equal to 2.5×DB. It is to be understood that width WR may be within a range between, an including, any of the minimum and maximum values of width WR relative to distance DB as described herein.

During use, the hook 916 is rotatable between a first position and a second position within the hinge bracket 912. In the first position, the clasp post 920 of the hook 916 is engaged with clasp 914 and the belt hook portion 922 is parallel with a face of the housing 902 of the fastener driver 900. In the first position, the hook 916 is configured to allow the fastener driver 900 to be hung from user's belt via the belt hook portion 922. In the second position, the clasp post 920 of the hook 916 is disengaged from the clasp 914 and the hook 916 is rotated away from the housing 902 of the fastener driver 900 in the hinge bracket 912 until the rafter hook portion 924 is perpendicular, or near perpendicular, to the face of the housing 902 of the fastener driver 900. In the second position, the hook 916 is configured to allow the fastener driver 900 to be hung on a portion of a static structure, such as a rafter, a joist, or other similar structure.

Referring to FIGS. 40-46, yet still another gas spring-powered fastener driver 1000 is illustrated. The fastener driver 1000 is designed to be used to install exterior wall coverings, e.g., the exterior wall covering 200 illustrated in FIG. 14-16. The fastener driver 1000 illustrated in FIGS. 40-46 may be similar to any of the gas spring-powered fastener drivers 10, 300, 400, 410, 600, 700, 900 illustrated in the previous figures.

Figure 40:
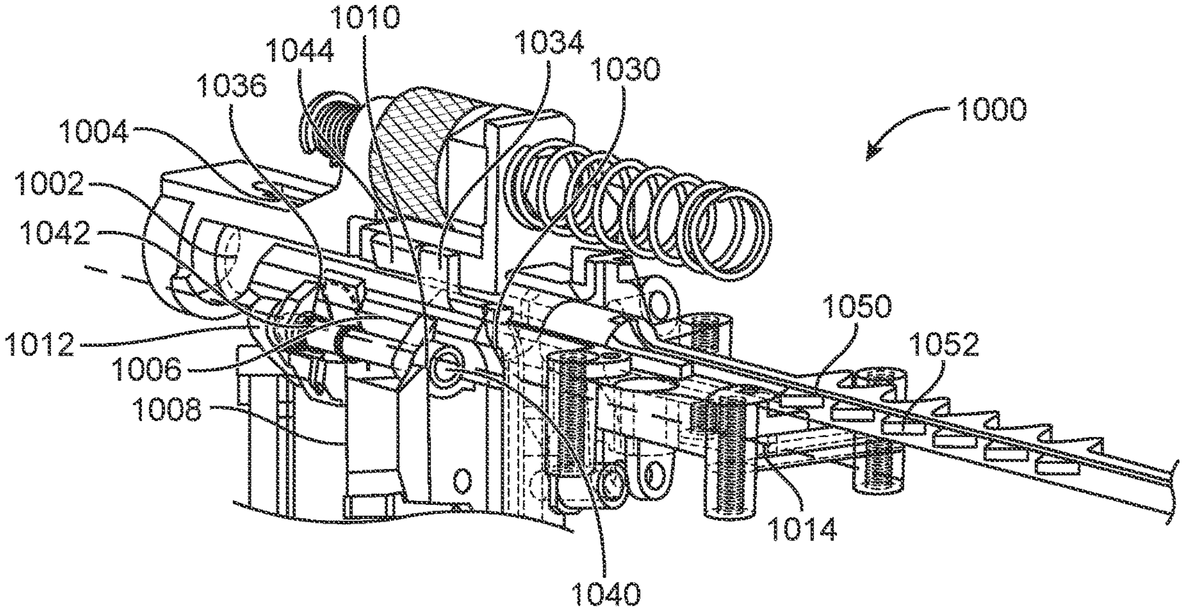
FIG. 40 is a partial view of a gas-spring powered fastener driver in accordance with another embodiment of the invention.

As shown in FIGS. 40-46, the fastener driver 1000 includes a nosepiece 1002 and a workpiece contact bracket 1004 engaged therewith. The fastener driver 1000 further includes a dry-fire lockout mechanism 1006 adjacent the nosepiece 1002. Specifically, as illustrated in FIG. 40, the fastener driver 1000 includes a dry-fire lockout mounting bracket 1008 adjacent the nosepiece 1002 and the dry-fire lockout 1006 is rotatably disposed thereon. The dry-fire lockout mounting bracket 1008 includes a first hinge barrel 1010 and a second hinge barrel 1012 distanced therefrom. The hinge barrels 1010, 1012 on the dry-fire lockout mounting bracket 1008 are aligned along a hinge axis 1014.

Figure 41:
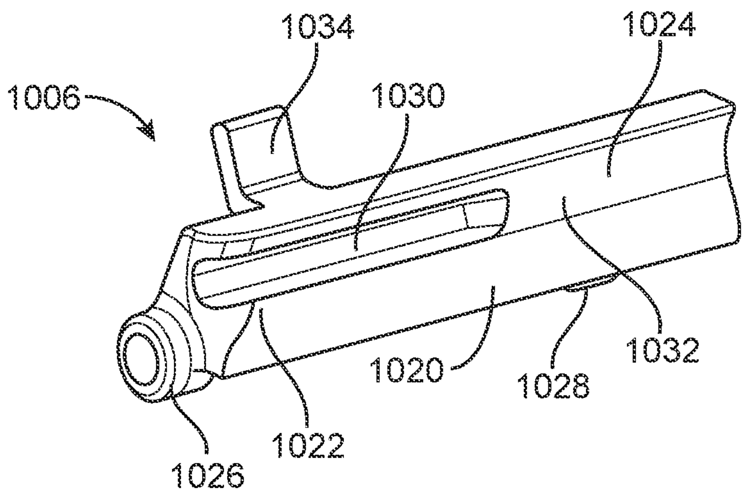
FIG. 41 is a first perspective view of a dry-fire lockout mechanism for the fastener driver of FIG. 40.
Figure 42:
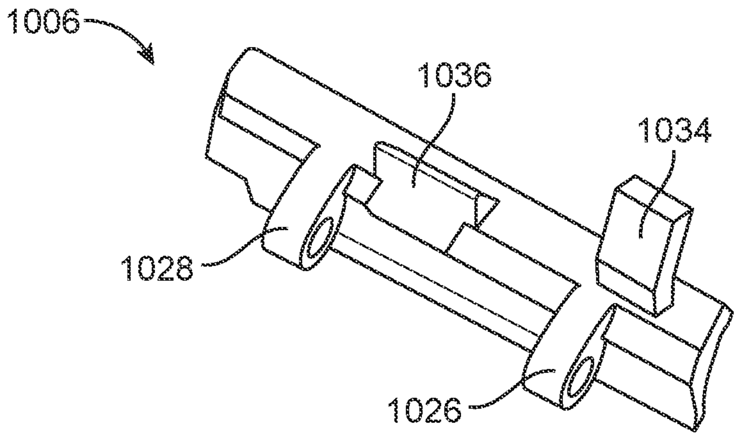
FIG. 42 is a second perspective view of a dry-fire lockout mechanism for the fastener driver of FIG. 40.
Figure 43:
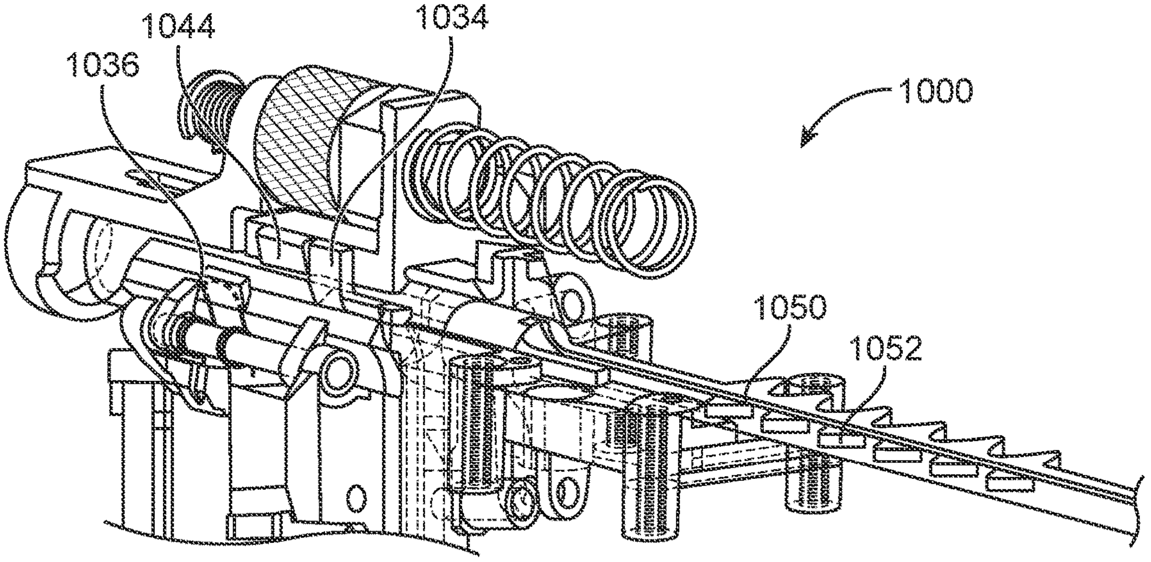
FIG. 43 is a partial view of the fastener driver of FIG. 40.

As shown, the dry-fire lockout 1006 includes a body 1020 having a first end 1022 and a second end 1024. The dry-fire lockout 1006 also includes a first hinge barrel 1026 near the first end 1022 of the body 1020 and a second hinge barrel 1028 near the second end 1024 of the body 1020. The first hinge barrel 1026 is aligned with the second hinge barrel 1028 along the hinge axis 1014. FIG. 41 further illustrates that the dry-fire lockout 1006 includes a longitudinal groove 1030 formed in an inner surface 1032 of the dry-fire lockout 1006, i.e., the surface 1032 closest to, and facing, the nosepiece 1002. FIGS. 41 and 42 show that the dry-fire lockout 1006 includes a locking tab 1034 that extends generally outward from the body 1020 of the dry-fire lockout 1006 near the first hinge barrel 1026. Moreover, the dry-fire lockout 1006 includes an angular movement limiter 1036. In a particular aspect, the angular movement limiter 1036 limits a range of motion of the dry-fire lockout 1006.

The dry-fire lockout 1006 is installed on the dry-fire lockout bracket 1008 so that the hinge barrels 1026, 1028 of the dry-fire lockout 1006 are disposed between the hinge barrels 1010, 1012 of the dry-fire lockout bracket 1008. A hinge pin 1040 extends through the hinge barrels 1010, 1012 of the dry-fire lockout bracket 1008 and the hinge barrels 1026, 1028 of the dry-fire lockout 1006. The dry-fire lockout 1006 rotates about the hinge pin 1040. As shown, the fastener driver 1000 includes a spring 1042 that biases the dry-fire lockout 1006 so that it rotates toward the nosepiece 1002.

Figure 44:
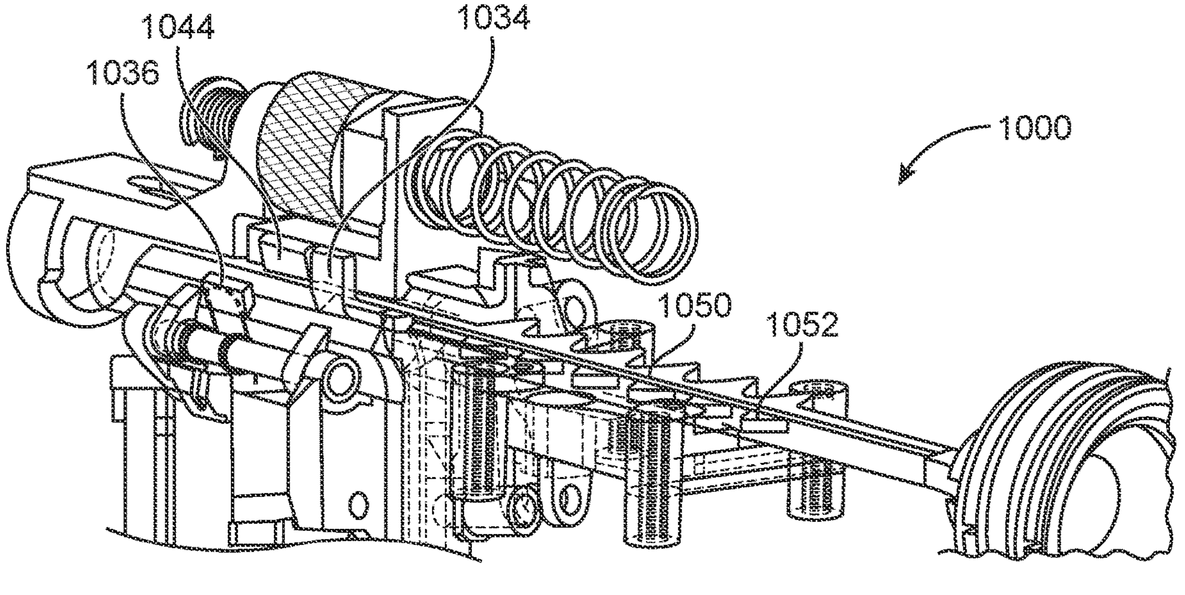
FIG. 44 is a partial view of the fastener driver of FIG. 40.
Figure 45:
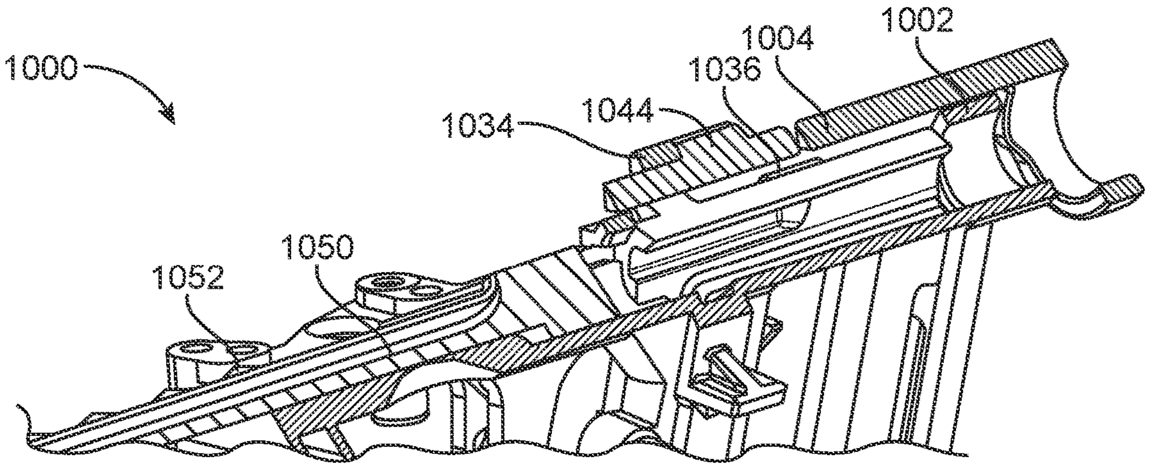
FIG. 45 is a partial view of the fastener driver of FIG. 40.
Figure 46:
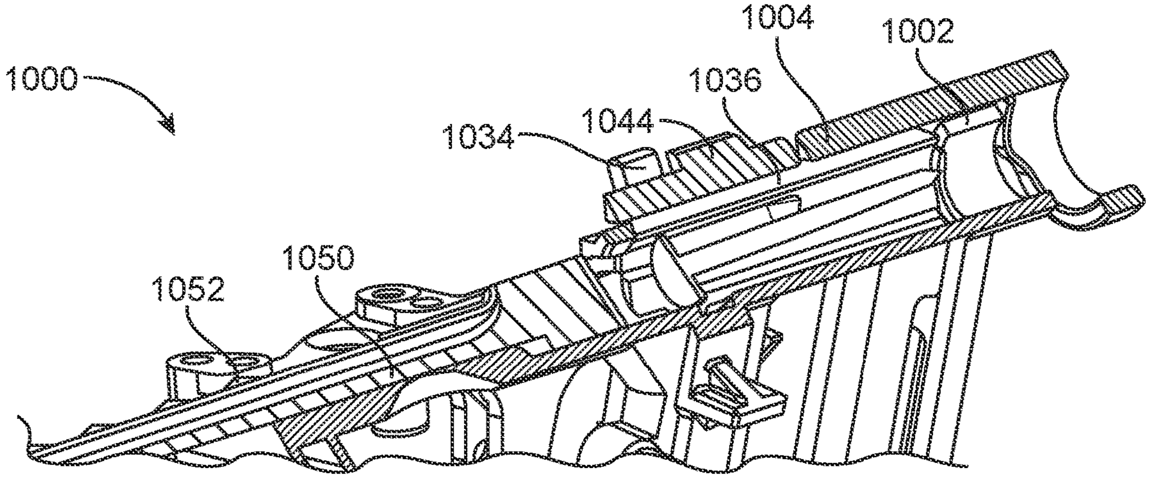
FIG. 46 is a partial view of the fastener driver of FIG. 40.
Figure 47:
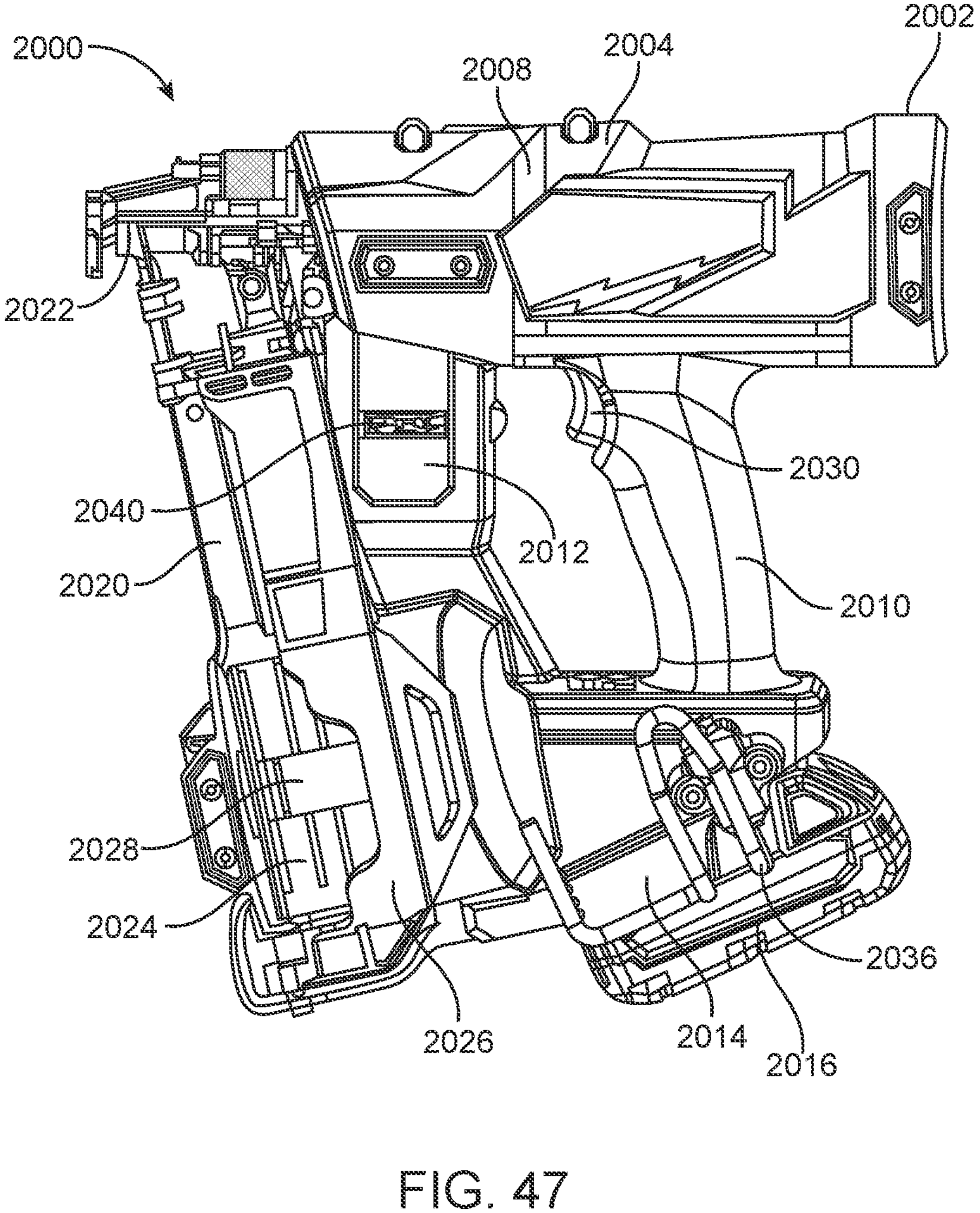
FIG. 47 is a left side plan view of a gas-spring powered fastener driver in accordance with another embodiment of the invention.

During operation, when the nosepiece 1002 is empty, the spring 1042 biases the dry-fire lockout 1006 toward the nosepiece 1002 so that the locking tab 1034 of the dry-fire lockout 1006 blocks a corresponding locking tab 1044 on the workpiece contact bracket 1004 and prevents the workpiece contact bracket 1004 from moving relative to the nosepiece 1002. This locks the workpiece contact bracket 1004 and prevents the fastener driver 1000 from being dry-fired (i.e., without a nail in the nosepiece 1002). When a nail is loaded into the nosepiece 1002, it rotates the dry-fire lockout 1006 away from the nosepiece 1002 and moves the locking tab 1034 of the dry-fire lockout 1006 away from the locking tab 1044 on the workpiece contact bracket 1004 so that the locking tab 1034 of the dry-fire lockout 1006 bypasses the locking tab 1044 on the workpiece contact bracket 1004. This allows the workpiece contact bracket 1004 to move relative to the nosepiece 1002 into a position in which the fastener driver 1000 is able to be actuated to drive a fastener. When actuated, the driver blade 1050 is able to extend into the nosepiece 1002, as illustrated in FIG. 44, and drive the fastener into a workpiece.

Accordingly, the dry-fire lockout 1006 is movable between a first position in which the locking tab 1034 of the dry-fire lockout 1006 blocks the locking tab 1044 on the workpiece contact bracket 1004 to prevent movement of the workpiece contact bracket 1004 and prevent dry firing of the fastener driver 1000 and a second position in which the locking tab 1034 of the dry-fire lockout 1006 bypasses the locking tab 1044 on the workpiece contact bracket 1004 to allow movement of the workpiece contact bracket 1004 and allow the fastener driver 1000 to actuate. The groove 1030 formed in the dry-fire lockout 1006 provides clearance for the pawls 1052 formed in the driver blade 1050 and allows the driver blade 1050 to extend into the nosepiece 1002 without interfering with the dry-fire lockout 1006. In the first position, the nosepiece 1002 is empty and the spring 1042 biases the dry-fire lockout 1006 toward the nosepiece 1002 into the first position. In the second position, the nosepiece 1002 is loaded with a fastener and the fastener biases the dry-fire lockout 1006 away from the nosepiece 1002 into the second position.

In a particular aspect, the angular movement limiter 1036 of the dry-fire lockout 1006 prevents over rotation of the dry-fire lockout 1006 and substantially minimizes, or prevents, fasteners getting jammed as they are fed into the nosepiece 1002. The angular movement limiter 1036 allows the dry-fire lockout 1006 to rotate over a movement range R that is greater than or equal to 10°, such as greater than or equal to 12.5°, greater than or equal to 15°, greater than or equal to 17.5°, or greater than or equal to 20°. In another aspect, the movement range R is less than or equal to 45°, such as less than or equal to 40°, less than or equal to 35°, less than or equal to 30°, or less than or equal to 25°. It is to be understood that the movement range R may be within a range between, and including, any of the values of R described herein.

Referring now to FIGS. 47-53, another embodiment of a gas spring-powered fastener driver 2000 is illustrated. The fastener driver 2000 illustrated in FIGS. 47-52 may be similar to any of the previously described gas spring-powered fastener drivers 10, 300, 400, 410, 600, 700, 900, 1000. The fastener driver 2000 includes a housing 2002 having a first housing shell 2004 joined to a second housing shell 2006. The housing 2002 includes a head portion 2008 having a handle portion 2010 and a drive unit housing portion 2012 extending therefrom. The housing 2002 also includes a battery receptacle portion 2014 that extends from the handle portion 2010 and is sized and shaped to receive a removable battery pack 2016 there. Further, the housing 2002 includes a fastener delivery portion 2020 that extends along the drive unit housing portion 2012 from a nosepiece 2022 to a magazine receptacle portion 2024 adjacent the battery receptacle portion 2014. The magazine receptacle portion 2024 is generally cylindrical and is sized and shaped to receive coiled fasteners therein. A magazine cover 2026 is rotatably disposed on the housing 2002 and provides access to a magazine 2028 that may be removably disposed within the magazine receptacle portion 2024. The magazine 2028 is a canister magazine which contains a coiled strip of collated nails. Individual fasteners are sequentially loaded from the magazine 2028 to the nosepiece 2022 via the fastener delivery portion 2020 during operation of the fastener driver 2000.

As shown, the fastener driver 2000 further includes a trigger 2030 that extends outwardly from the handle portion 2010 of the housing 2002. The housing 2002 further includes an opening 2032 adjacent the trigger 2030 that provides access to the interior of the housing 2002. The significance of the opening 2032 is described in detail below. As shown, a cover 2034 is removably disposed within the opening 2032 and when removed, provides access to the interior of the housing 2002. The fastener driver 2000 also includes a first dual-purpose hook assembly 2036 disposed on one side of the housing 2002 and a second dual-purpose hook assembly 2038 disposed on the other side of the housing 2002 opposite the first dual-purpose hook assembly 2036. The dual-purpose hook assemblies 2036, 2038 may be used to hang the fastener driver 2000 on a user's belt or on a static structure, such as a rafter, a joist, or other similar structure.

Figure 48:
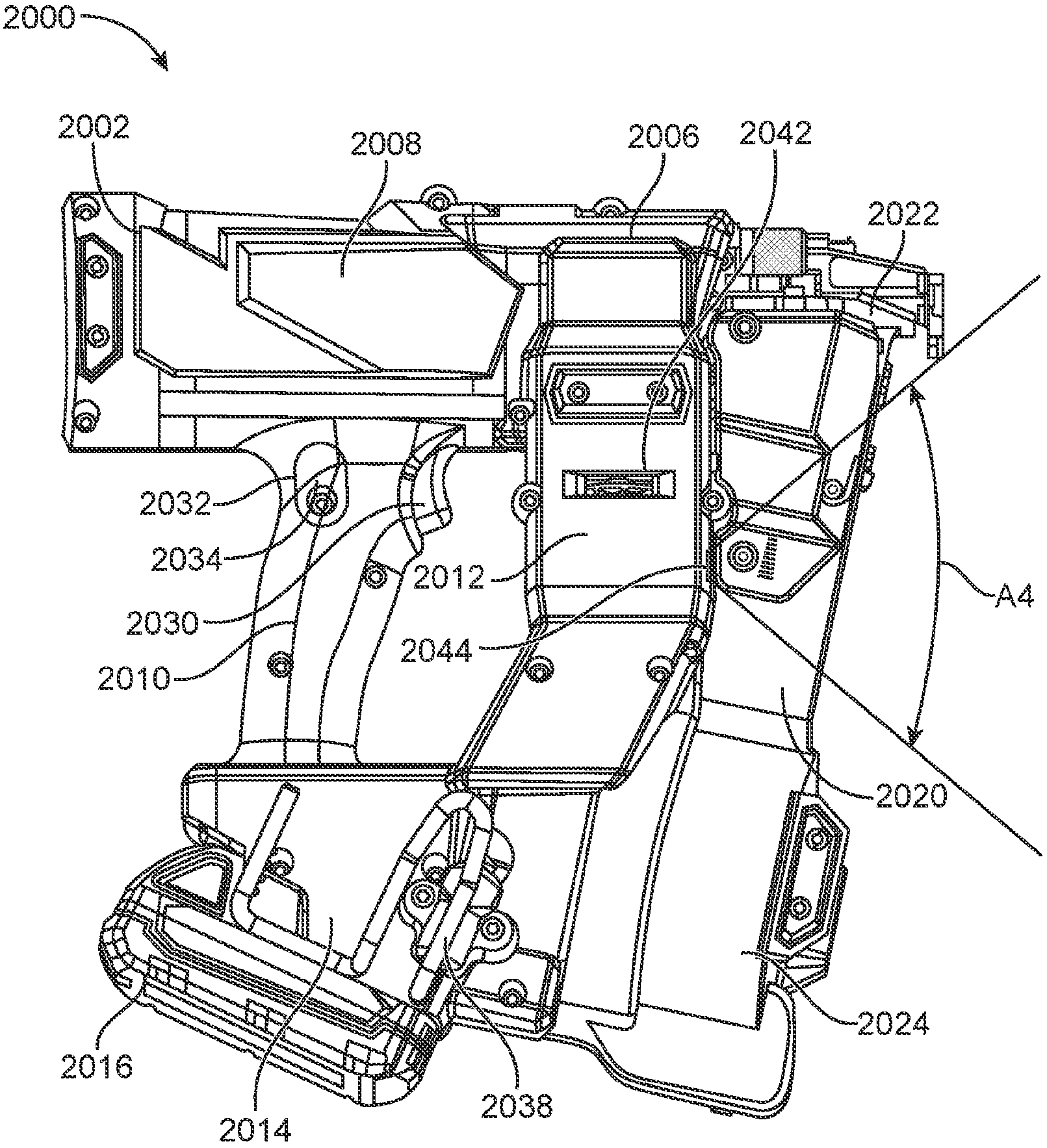
FIG. 48 is a right side plan view of the fastener driver of FIG. 47.
Figure 49:
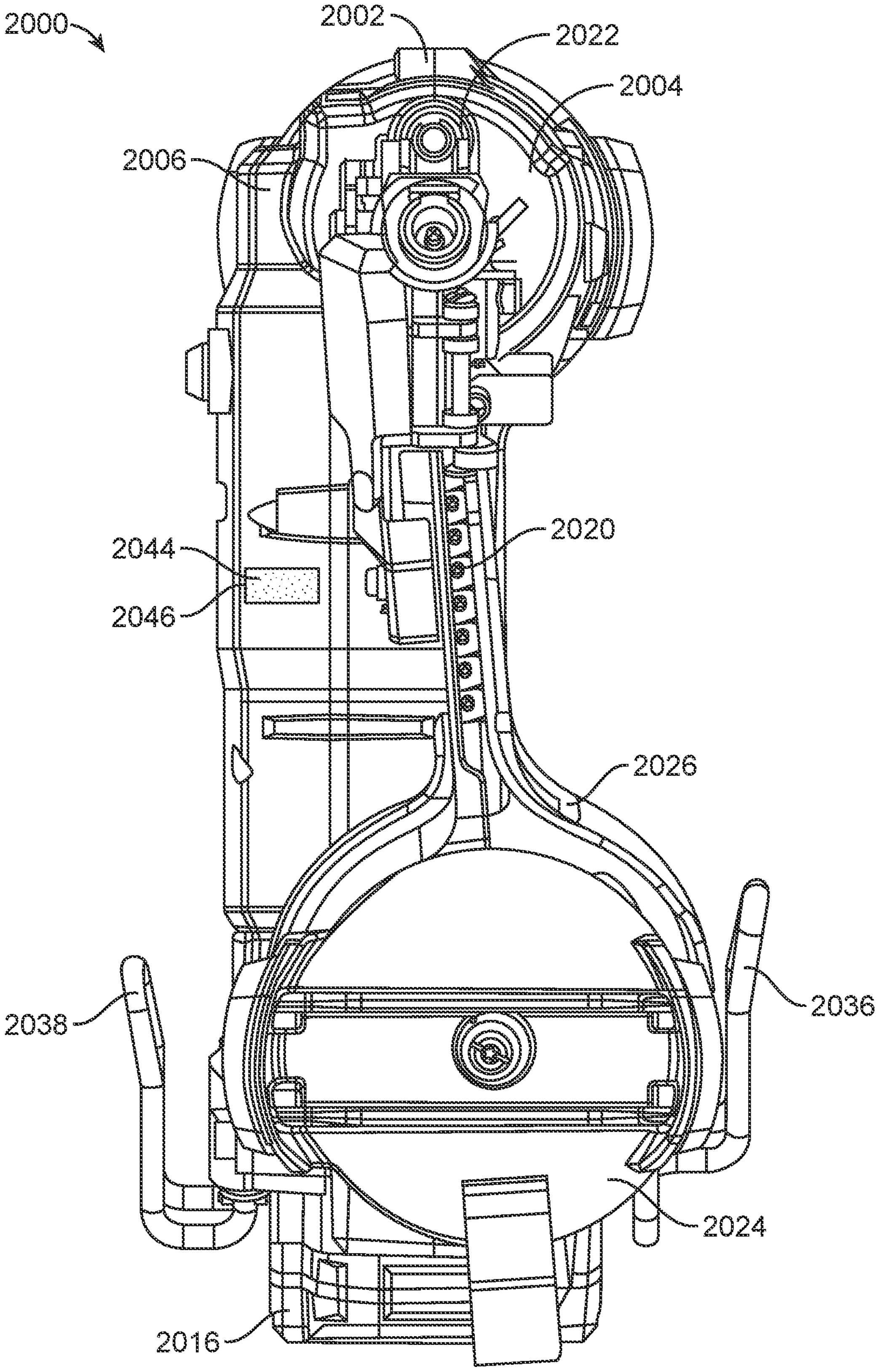
FIG. 49 is a front plan view of the fastener driver of FIG. 47.
Figure 50:
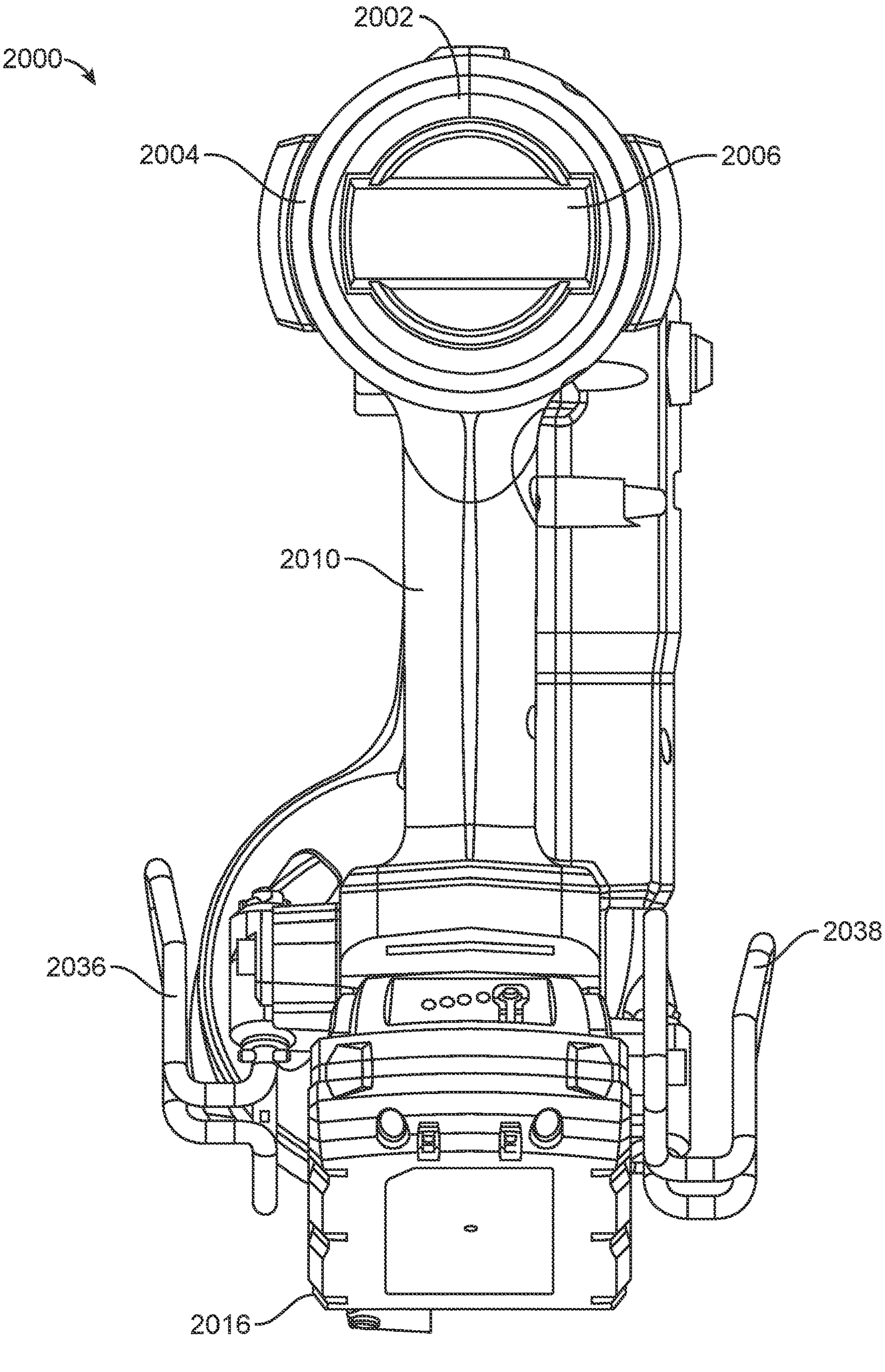
FIG. 50 is a rear plan view of the fastener driver of FIG. 47.

FIGS. 48 and 49 show that the housing 2002 of the fastener driver 2000 includes a first vent hole 2040 formed in the first housing shell 2004 and a second vent hole 2042 formed in the second housing shell 2006, opposite the first vent hole 2040. The vent holes 2040, 2042 provide air flow to and from the interior of the housing 2002 to help cool components housed therein. FIGS. 48 and 49 also indicate that the fastener driver 2000 further includes a light source 2044 that extends through an opening 2046 in the housing 2002 and is directed in the same direction as the nosepiece 2022. As shown, the light source 2044 is disposed in the second housing shell 2006 in a face of the second housing shell 2006 facing in the same direction as the nosepiece 2022. In a particular embodiment, the light source 2044 may be a light emitting diode (LED) or a series of LEDs that are electrically connected to the battery pack 2016 when the battery pack 2016 is engaged with the fastener driver 2000. Accordingly, during operation of the fastener driver 2000 the light source 2044 may be illuminated to provide light on a workpiece to be nailed. In a particular aspect, the light source 2044 has a beam angle A4 that is greater than or equal to 60°, such as greater than or equal 65°, greater than or equal 70°, greater than or equal 75°, or greater than or equal 80°. In another aspect, the beam angle A4 is less than or equal to 120°, such as less than or equal to 115°, less than or equal to 110°, less than or equal to 105°, less than or equal to 100°, less than or equal to 95°, less than or equal to 90°, or less than or equal to 85°. It is to be understood that the beam angle A4 may be within a range between, and including, any of the values of A4 described herein.

Figure 51:
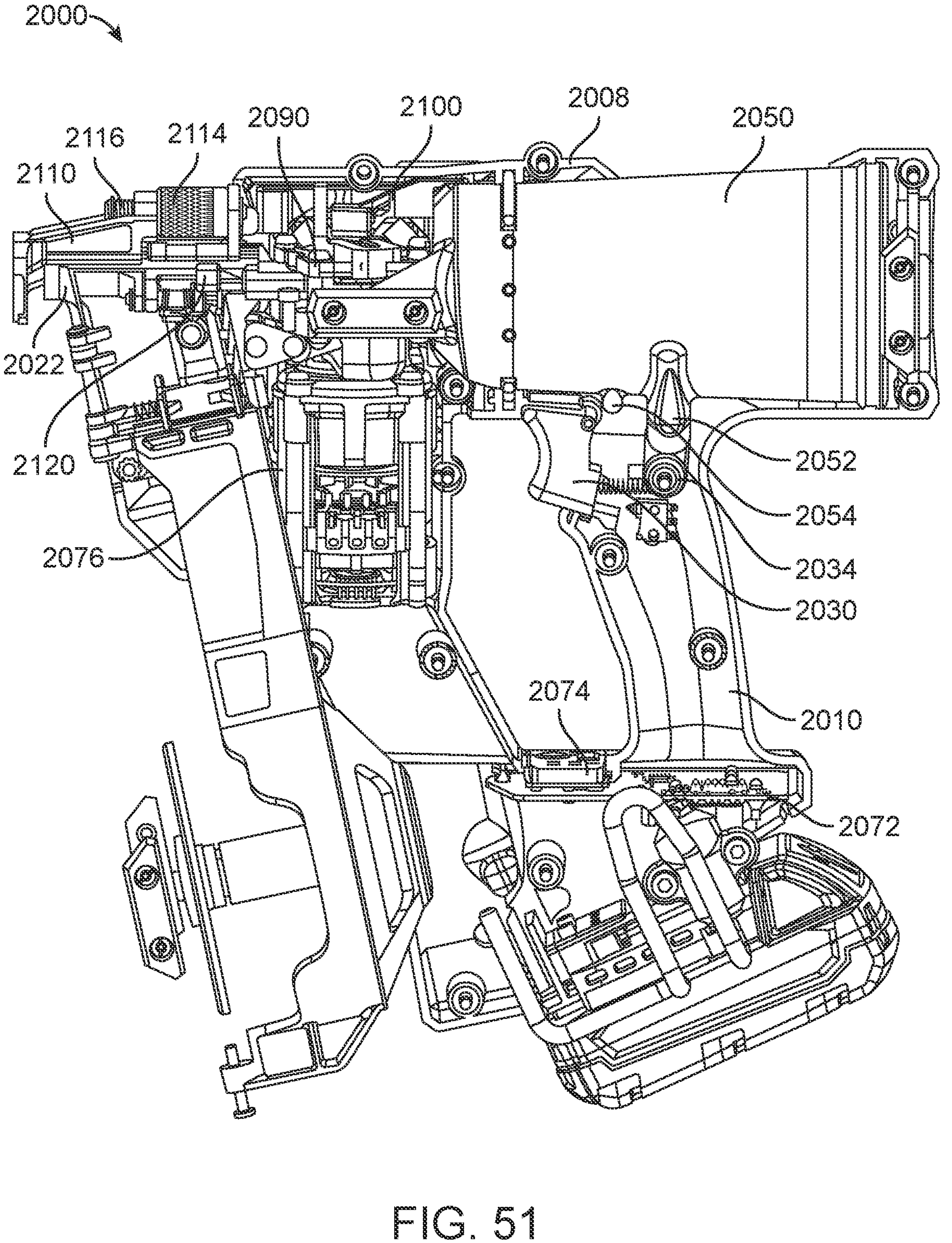
FIG. 51 is a right side plan view of the fastener driver of FIG. 47 with a portion of the housing removed.
Figure 52:
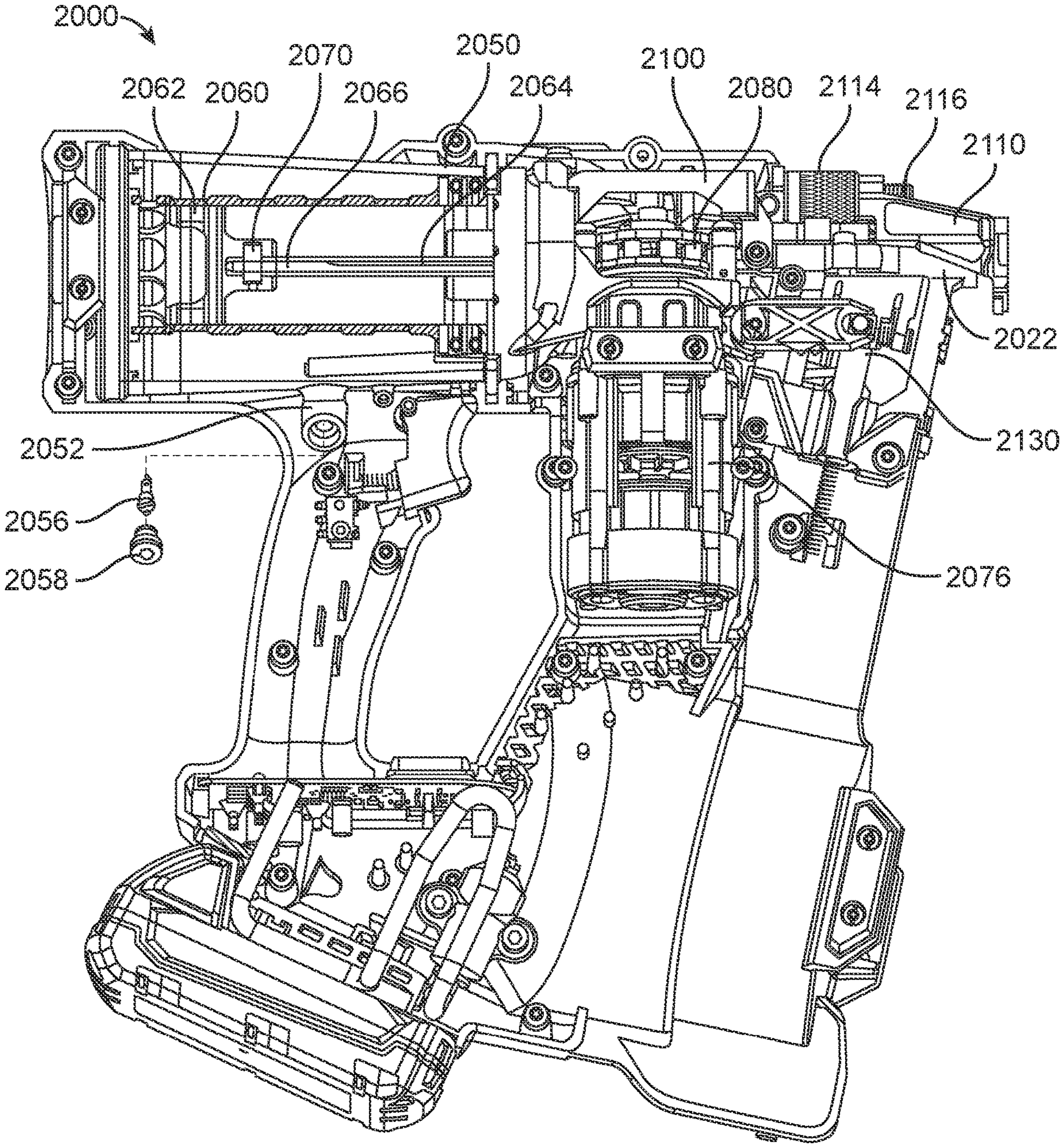
FIG. 52 is a left side plan view of the fastener driver of FIG. 47 with a portion of the housing removed and with a partial cross-section through a storage chamber cylinder.
Figure 53:
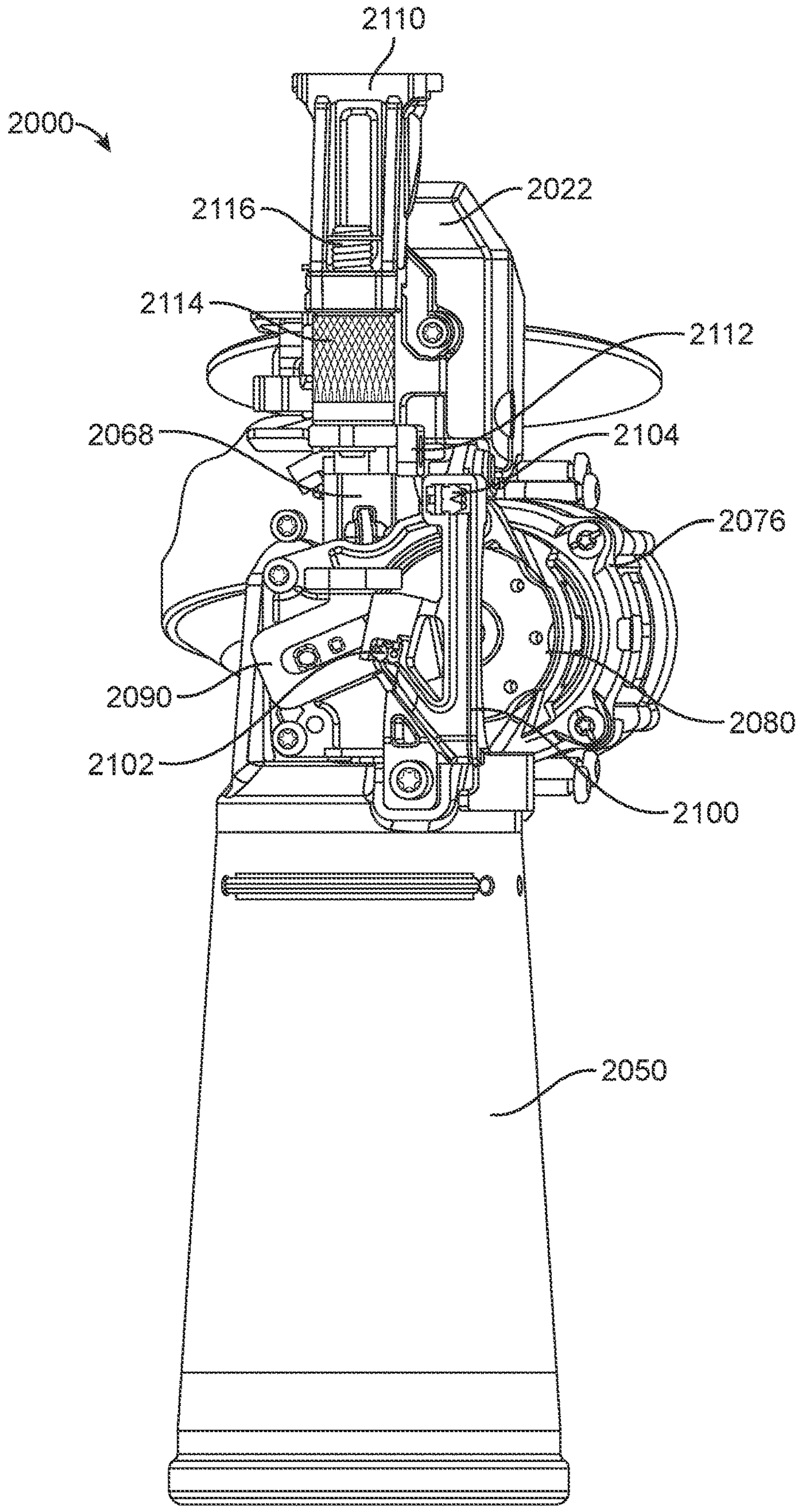
FIG. 53 is a top plan view of the fastener driver of FIG. 47 with the housing and other parts removed.

FIGS. 51-53 illustrate the internal components of the fastener driver 2000. As shown, the fastener driver 2000 includes a storage chamber cylinder 2050 disposed within the head portion 2008 of the housing 2002. The storage chamber cylinder 2050 includes a valve port 2052 and a sensor port 2054. For example, the sensor port 2054 is a thermistor port having a thermistor disposed therein. In one embodiment, the thermistor is a negative temperature coefficient (NTC) thermistor in which the electrical resistance decreases as the temperature increases. In another embodiment, the thermistor is a positive temperature coefficient (PTC) thermistor in which the electrical resistance increase as the temperature increases.

As illustrated in FIG. 52, a fill valve 2056 is disposed in the valve port 2052 and is in fluid communication with the interior of the storage chamber cylinder 2050. For example, the fill valve 2056 may be configured as a Schrader valve, a Presta valve, a Dunlop valve, or some other similar valve. When connected with a source of compressed gas, the fill valve 2056 enables the storage chamber cylinder 2050 to be filled with compressed gas or refilled with compressed gas if any leakage occurs. As shown, the valve port 2052 is configured as a protrusion that is integral with the storage chamber cylinder 2050. The fill valve 2056 is positioned within the valve port 2052 and a downstream end of the fill valve 2056 is in fluid communication with the storage chamber cylinder 2050. The valve port 2052 is formed with internal threads and a plug 2058 having external threads is at least partially threaded into the valve port 2052 upstream of the fill valve 2056 to preventing access to the fill valve 2056.

The storage chamber cylinder 2050 includes a driver cylinder 2060 disposed therein. Further, a moveable piston 2062 is slidably disposed within the driver cylinder 2060. A driver blade 2064 is connected to the moveable piston 2062. As shown, the driver blade 2064 includes a proximal end 2066 and a distal end 2068. The proximal end 2066 of the driver blade 2064 is connected to the moveable piston 2062 via a pin 2070. The distal end 2068 of the driver blade 2064 is located adjacent the nosepiece 2022 when the piston 2062 is moved to a top dead center (TDC) (i.e., retracted or ready) position within the driver cylinder 2060 and the fastener driver 2000 is ready to be fired. Upon firing, the distal end 2068 of the driver blade 2064 is moved into the nosepiece 2022 to drive a fastener from within the nosepiece 2022 and into a workpiece until the piston 2062 reaches a bottom dead center (BDC) (i.e., extended or driven) position within the driver cylinder 2060. Further details of the driver blade 2064 are discussed below in conjunction with FIGS. 54-57.

FIGS. 51-53 further indicate that the fastener driver 2000 includes a circuit board 2072 that controls the operation of the fastener driver 2000. A user interface 2074 is disposed on the circuit board 2072 and extends through the housing 2002 into an area near the handle portion 2010. The user interface 2074 provides the user controls for the fastener driver 2000 and includes, for example, an on/off switch, a mode selector button, a remaining charge indicator, a charging indicator, and other additional buttons and indicators, as necessary. The circuit board 2072 is electrically connected to the battery receptacle portion 2014 and the battery pack 2016 when engaged therewith and provides DC power to a motor 2076 (e.g., a brushless direct current (BLDC) motor) that is operably coupled to a lifting mechanism 2080. As described in greater detail below, the lifting mechanism 2080 selectively engages the driver blade 2064 and the lifting mechanism 2080 is driven by the motor 2076 to move the driver blade 2064 from a fired position to a ready position and in the process move the piston 2062 from the BDC position to the TDC position. Moreover, as described in greater detail below, a latch actuator assembly 2090 cooperates with the lifting mechanism 2080 to selectively engage the driver blade 2064 and hold the driver blade 2064 in a ready position before the latch actuator assembly 2090 is actuated by the lifting mechanism 2080 to release the driver blade 2064 into the nosepiece 2022 to drive a fastener from the fastener driver 2000 and into a workpiece.

As depicted in FIGS. 51-53, the fastener driver 2000 further includes a sensor bracket 2100 disposed at least partially above the lifting mechanism 2080. The sensor bracket 2100 includes a first sensor 2102 configured to sense an angular (or rotational) position of the lifting mechanism 2080 and a second sensor 2104 to sense a linear position of a workpiece contact bracket 2110 that is slidably disposed on the nosepiece 2022. For example, the sensors 2102, 2104 are Hall effect sensors that are configured to sense magnets or the presence of magnetic fields. The workpiece contact bracket 2110 includes a magnet 2112 that is sensed by the second sensor 2104 when the workpiece contact bracket 2110 is engaged with a workpiece and slides on the nosepiece 2022. When the magnet 2112 is sensed, the fastener driver 2000 is allowed to fire.

As shown, the fastener driver 2000 includes a depth adjuster 2114 having a threaded shaft 2116 that is threadably engaged with the workpiece contact bracket 2110. The depth adjuster 2114 is rotatable to change a linear position of the workpiece contact bracket 2110 relative to the nosepiece 2022. This changes the depth to which a fastener expelled from the fastener driver 2000 is driven into a workpiece. FIG. 51 shows that the fastener driver 2000 further includes a dry-fire lockout 2120 that is operates similar to the dry-fire lockout described above. FIG. 52 shows that the fastener driver 2000 also includes a fastener delivery mechanism 2130 that is described in detail below.

Figure 55:
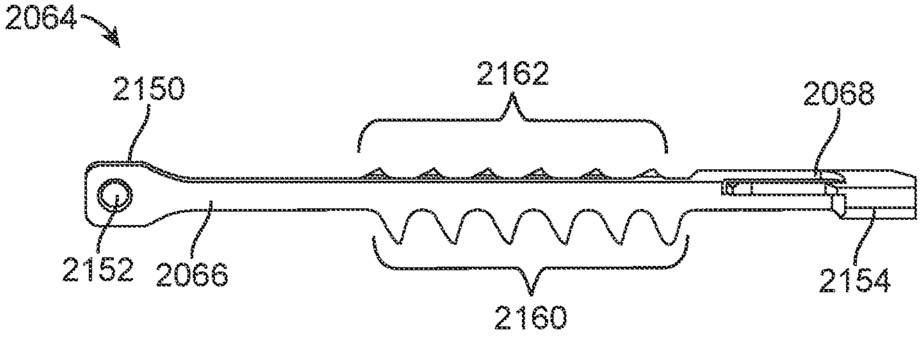
FIG. 55 is a bottom plan view of the driver blade of FIG. 54.
Figure 56:
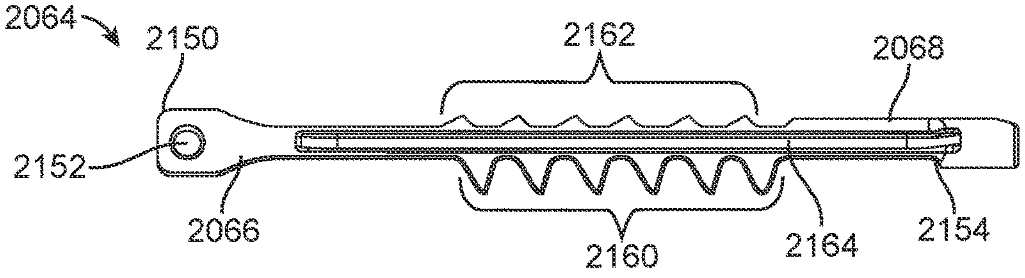
FIG. 56 is a top plan view of the driver blade of FIG. 54.
Figure 57:
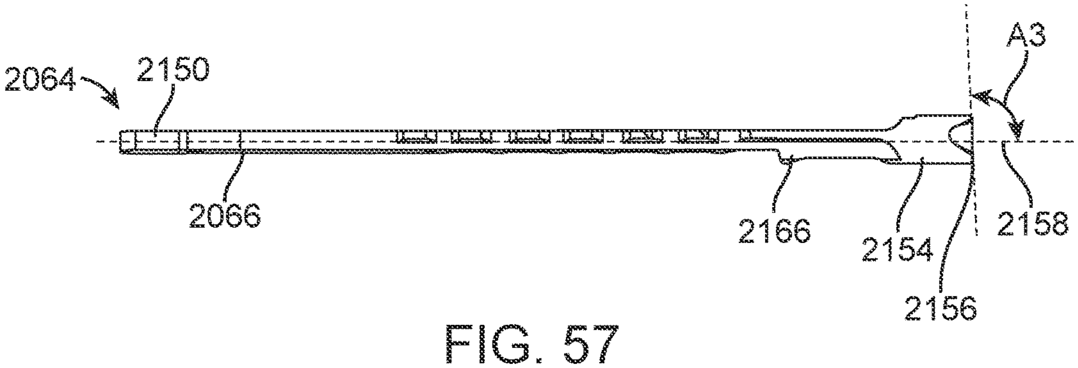
FIG. 57 is a side plan view of the driver blade of FIG. 54.

Referring to FIGS. 54-57, the details of the driver blade 2064 are shown. In addition to a proximal end 2066 and in a distal end 2068, the driver blade 2064 includes a connector portion 2150 formed at the proximal end 2066. The connector portion 2150 is formed with a lateral bore 2152 that is sized and shaped to receive the pin 2070 therethrough to attach the driver blade 2064 to the piston 2062. The driver blade 2064 further includes a driver tip 2154 at the distal end 2068 of the driver blade 2064. As illustrated in FIG. 57, the driver tip 2154 includes a driver face 2156 that is configured to strike and drive a fastener from within the nosepiece 2022 of the fastener driver 2000 when the trigger 2030 is pressed.

When viewed from the side, as shown in FIG. 57, the driver face 2156 is tilted rearward toward the proximal end 2066 of the driver blade 2064 to formed at an angle A3 with respect to the longitudinal axis 2158 of the driver blade 2064. The angle A3 is greater than or equal to 91.50°, such as greater than or equal to 91.75°, greater than or equal to 92.00°, greater than or equal to 92.25°, or greater than or equal to 92.50°. Moreover, the angle A3 is less than or equal to 94.00, such as less than or equal to 93.75, less than or equal to 93.50, less than or equal to 93.25, less than or equal to 93.00, or less than or equal to 92.75. It is to be understood that the angle A3 may be with a range between, and including, any of the minimum and maximum values of the angle A3 disclosed herein.

Figure 54:
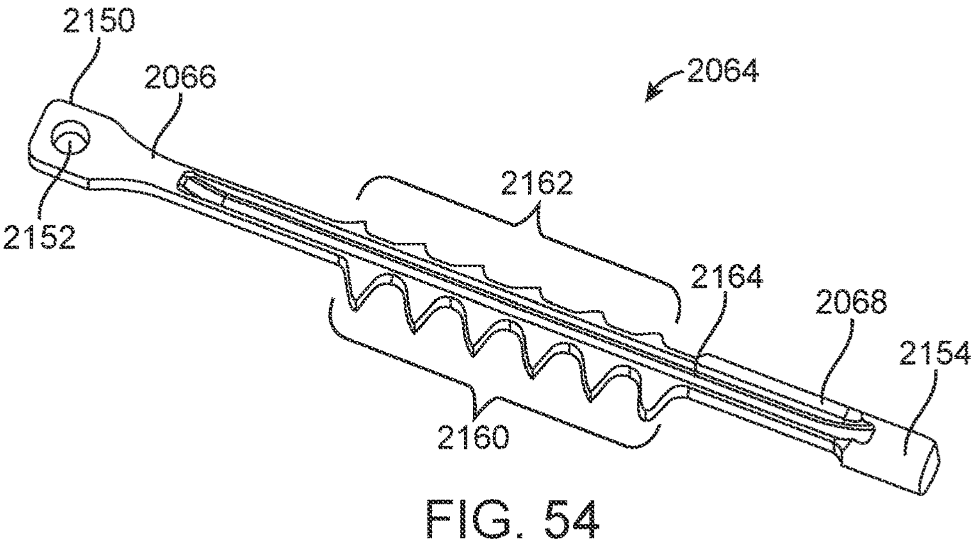
FIG. 54 is a perspective view of a driver blade for the fastener driver of FIG. 47.

FIGS. 54-56 further show that the driver blade 2064 includes a plurality of axially spaced drive teeth 2160 on a first side of the driver blade 2064 between the proximal end 2066 and the distal end 2068 of the driver blade 2064. As described in greater detail below, the drive teeth 2160 are configured to engage the lifting mechanism 2080 to move the driver blade 2064 to the TDC (i.e., retracted or ready) position. The driver blade 2064 also includes a plurality of axially spaced locking protrusions 2162 on a second side of the driver blade 2064, opposite the first side of the driver blade 2064 and opposite the teeth 2160, between the proximal end 2066 and the distal end 2068 of the driver blade 2064. As described in greater detail below, the locking protrusions 2162 are configured to engage the latch actuator assembly 2090 to hold the driver blade 2064 in the TDC (i.e., retracted or ready) position prior to being released to the BDC (i.e., extended or driven) position. FIG. 56 shows that the driver blade 2064 includes a guide groove 2164 formed along the length of the driver blade 2064 from the proximal end 2066 to the distal end 2068. FIG. 57 further shows that the driver blade 2064 includes an actuator tooth 2166 extending from the driver blade 2064 in a direction perpendicular to the drive teeth 2160. The actuator tooth 2166 actuates a fastener delivery mechanism and loads a fastener into the nosepiece 2022 as the driver blade 2064 is returned to the TDC (i.e., retracted or ready) position after the fastener driver 2000 is fired, as described in detail below.

Figure 58:
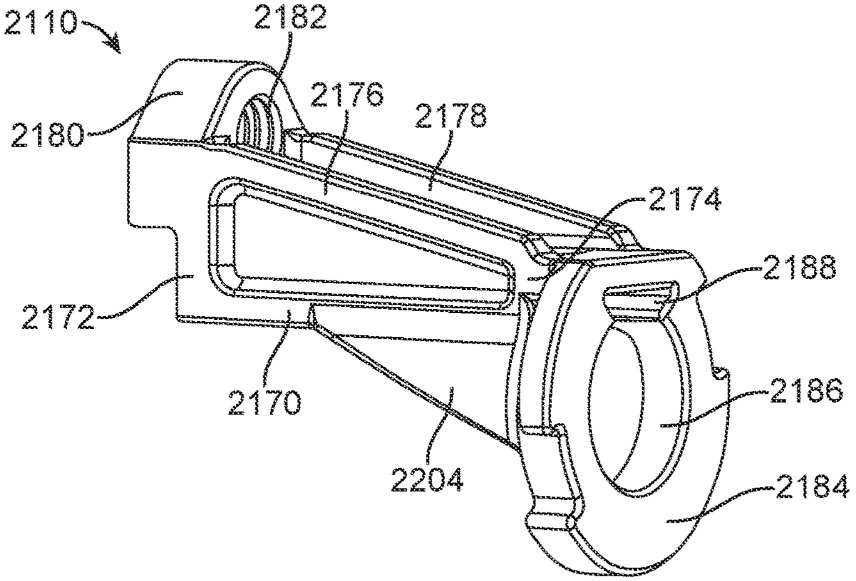
FIG. 58 is a perspective view of a workpiece contact bracket for the fastener driver of FIG. 47.
Figure 59:
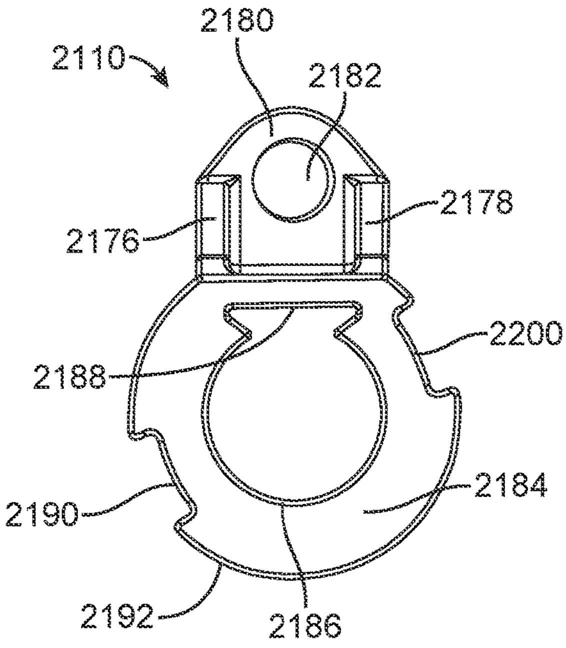
FIG. 59 is a front plan view of the workpiece contact bracket of FIG. 58.
Figure 60:
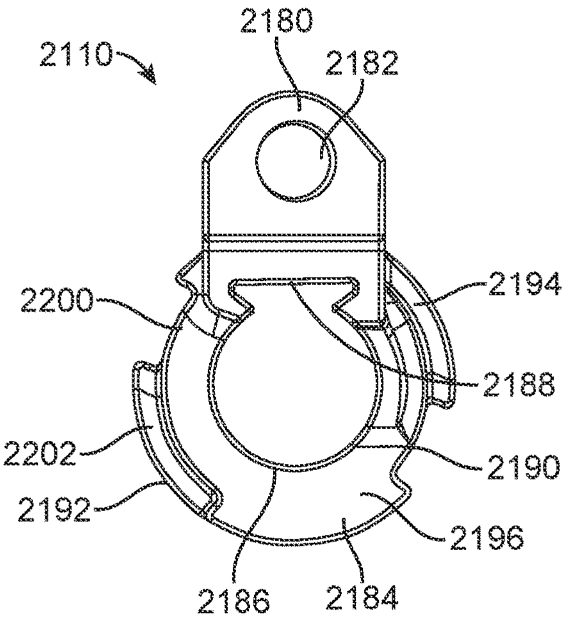
FIG. 60 is a rear plan view of the workpiece contact bracket of FIG. 58.

FIGS. 58-60 show the details of the workpiece contact bracket 2110. As shown, the workpiece contact bracket 2110 includes a baseplate 2170 having a proximal end 2172 and a distal end 2174. A first sidewall 2176 and a second sidewall 2178 extend in a generally upward direction from the baseplate 2170. The sidewalls 2176, 2178 are generally triangular and extend from the proximal end 2172 to the distal end 2174 of the baseplate 2170 with the widest portion of the sidewalls 2176, 2178 adjacent the proximal end 2172. The workpiece contact bracket 2110 includes an adjuster collar 2180 that extends perpendicularly from the proximal end 2172 of baseplate 2170 between the sidewalls 2176, 2178. The adjuster collar 2180 includes a bore 2182 formed with threads and is configured to threadably receive the threaded shaft 2116 of the depth adjuster 2114 (FIGS. 51-53) therein.

As further illustrated in FIG. 58-60, the workpiece contact bracket 2110 includes a workpiece contact plate 2184 that extends perpendicularly from the distal end 2174 of the baseplate 2170 in a direction opposite the adjuster collar 2180. The workpiece contact plate 2184 is generally ring shaped and includes a central bore 2186 that is sized and shaped to fit over an end of the nosepiece 2022. The workpiece contact bracket 2110 further includes a tail socket 2188 formed along the length of the baseplate 2170 that is configured to fit over a corresponding feature, or features, on the nosepiece 2022. The tail socket 2188 allows the workpiece contact bracket 2110 to slide along the nosepiece 2022, but not rotate relative to the nosepiece 2022.

FIGS. 58-60 show that the workpiece contact plate 2184 further includes a first notch 2190 formed in the outer periphery 2192 of the workpiece contact plate 2184. A first radial slot 2194 is formed in the rear face 2196 of the workpiece contact plate 2184 adjacent the first notch 2190. A second notch 2200 is formed in the outer periphery 2192 of the workpiece contact plate 2184 opposite the first notch 2190. A second radial slot 2202 is formed in the rear face 2196 of the workpiece contact plate 2184 adjacent the second notch 2200 and opposite the first radial slot 2194. Accordingly, an accessory having features that correspond to the notches 2190, 2200 formed in the workpiece contact plate 2184 may be placed over the workpiece contact plate 2184 and rotated to secure the accessory to the workpiece contact bracket 2110. As show, the workpiece contact bracket 2110 includes a gusset 2204 extending from the baseplate 2170 in a generally downward direction, opposite the sidewalls, to provide support for the workpiece contact plate 2184. Each side of the baseplate 2170 includes a similar gusset 2204. Further, each gusset 2204 is curved to match the curvature of the outer periphery 2192 of the workpiece contact plate 2184.

Figure 61:
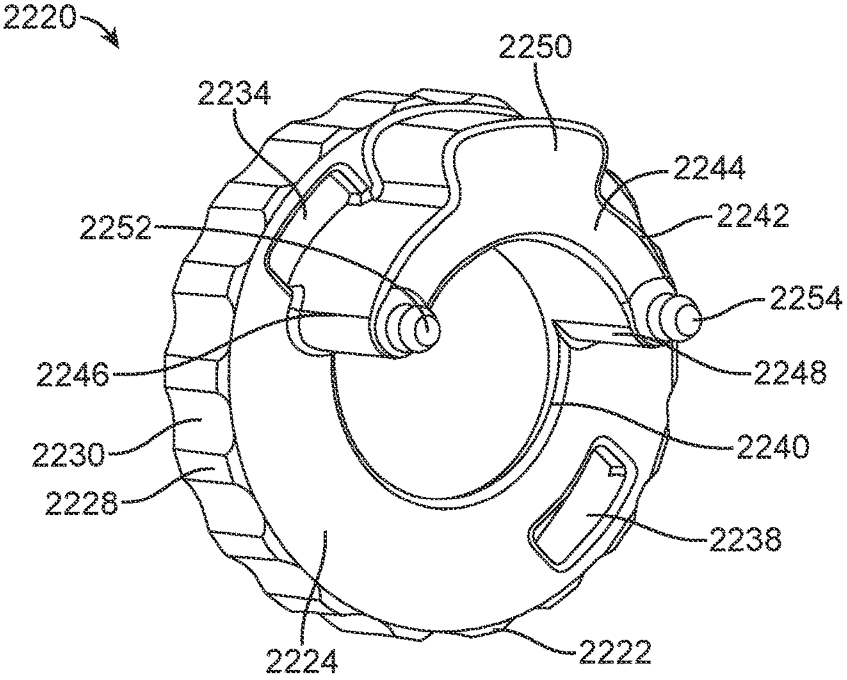
FIG. 61 is a perspective view of a siding tip for the fastener driver of FIG. 47.
Figure 62:
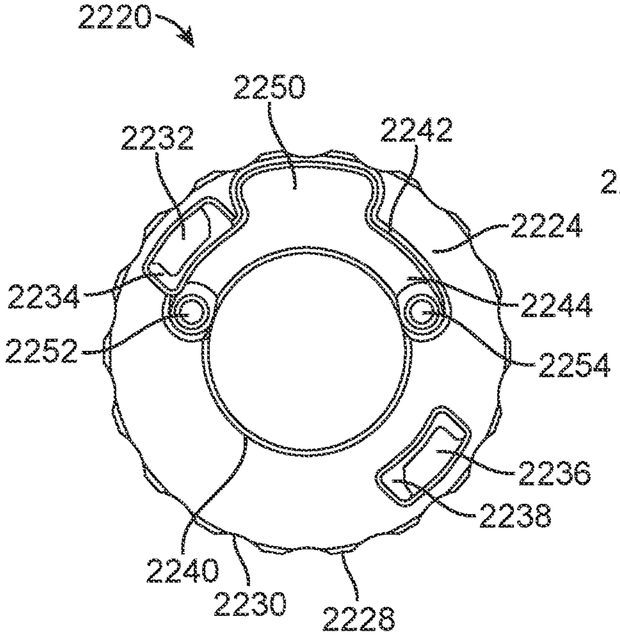
FIG. 62 is a front plan view of the siding tip of FIG. 61.
Figure 63:
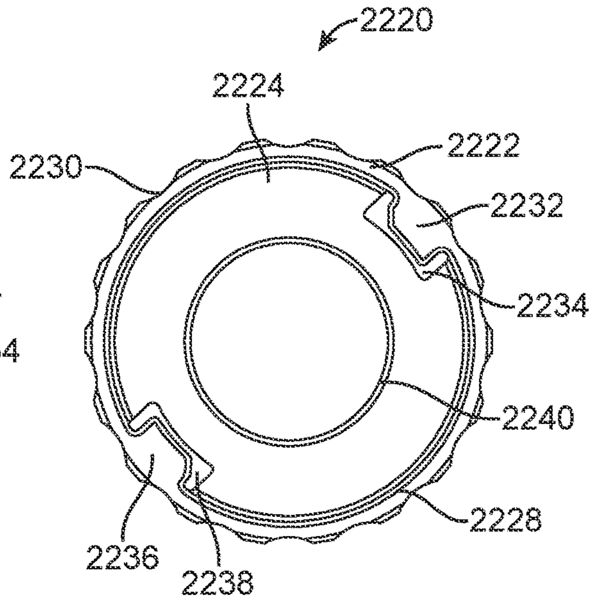
FIG. 63 is a rear plan view of the siding tip of FIG. 61.

FIGS. 61-63 illustrate such an accessory. As shown, the accessory includes a siding tip 2220 that may be used with the fastener driver 2000 to facilitate the installation of siding on a workpiece such as an exterior wall. As shown, the siding tip 2220 includes a shallow, hollow generally cylindrical body 2222 having a disk-shaped base 2224 and a cylindrical peripheral sidewall 2228 extending therefrom. The cylindrical sidewall 2228 is formed with a plurality of radially spaced scallops 2230 around the outer periphery to facilitate gripping the siding tip 2220 when installing the siding tip 2220 on, or removing the siding tip 2220 from, a fastener driver, e.g., the fastener driver 2000 disclosed herein.

As shown in FIGS. 62 and 63, the siding tip 2220 includes a first tab 2232 that extends radially inward from the cylindrical sidewall 2228 and spaced axially apart from the disk-shaped base 2224 of the siding tip 2220. A first opening 2234 is formed in the disk-shaped base 2224 of the siding tip 2220 at a location aligned with the first tab 2232. The siding tip 2220 also includes a second tab 2236 that extends radially inward from the cylindrical sidewall 2228 and spaced axially apart from the disk-shaped base 2224 of the siding tip 2220. The second tab 2236 is diametrically opposed with the first tab 2232. A second opening 2238 is formed in the disk-shaped base 2224 of the siding tip 2220 at a location aligned with the second tab 2236. As shown, the siding tip 2220 includes a central bore 2240 in the base 2224 to allow a fastener to be ejected from the fastener driver 2000 through the siding tip 2220.

FIGS. 61 and 62 show that the siding tip 2220 further includes an overhang portion 2242 that extends from the base 2224 in an axial direction opposite the cylindrical sidewall 2228. The overhang portion 2242 includes a generally semi-cylindrical sidewall 2244 that wraps partially around the central bore 2240. The sidewall 2244 of the overhang portion 2242 includes a first end 2246 and a second end 2248 radially spaced therefrom on opposite sides of the central bore 2240. The overhang portion 2242 also includes a central ridge 2250 along the sidewall 2244 between the first end 2246 and the second end 2248 and extending radially outward from the sidewall 2244. The central ridge 2250 increases the surface area of the overhang portion 2242 and thus, the contact area with workpiece during use. The overhang portion 2242 also includes a first guide tip 2252 extending in an axial direction from the first end 2246 of the sidewall 2244 and a second guide tip 2254 extending in an axial direction from the second end 2248 of the sidewall 2244. The first guide tip 2252 and the second guide tip 2254 extend in the same direction and are generally perpendicular to the base 2224.

With reference to FIGS. 61-63 and FIG. 14, the guide tips 2252, 2254 are configured to fit into the elongated nail hole 206 formed in the fastener strip 202 of the exterior wall covering 200. The guide tips 2252, 2254 align, guide, and center the nosepiece 2022 of the fastener driver 2000 within the elongated nail hole 206 to allow the fastener driver 2000 to properly deliver a fastener through the elongated nail hole 206 and into the exterior wall 210 on which the exterior wall covering 200 is installed. The overhang portion 2242 allows the fastener driver 2000 to be placed against the exterior wall covering 200 at the elongated nail hole 206 without crushing or engaging the retaining loop 205 on the exterior wall covering 200.

Figure 64:
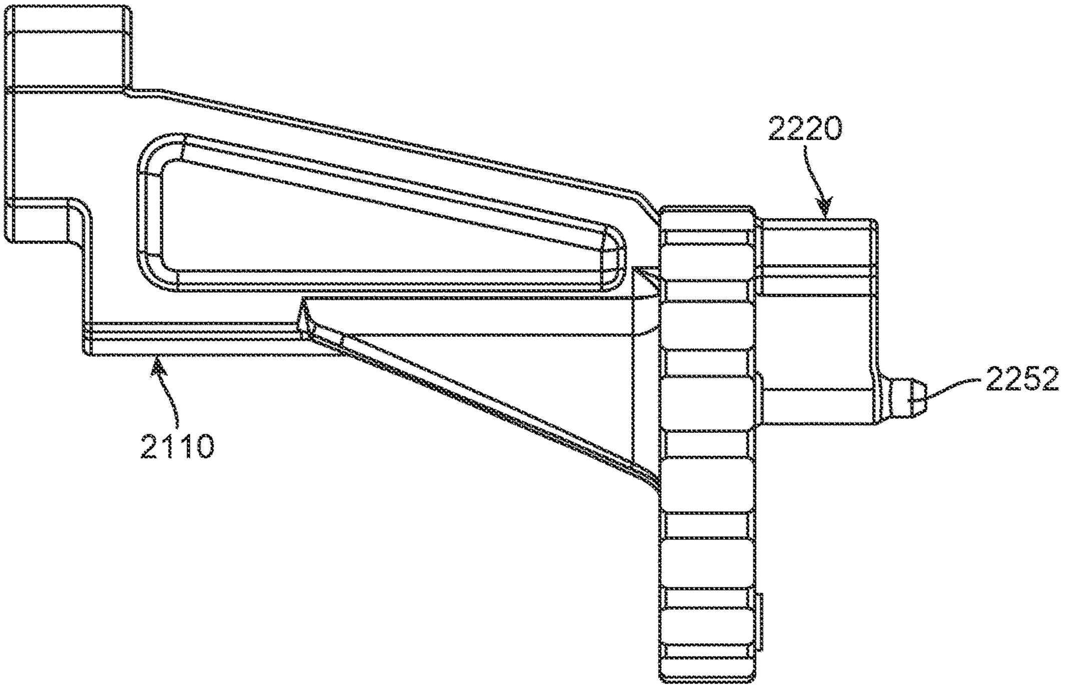
FIG. 64 is a side plan view of the siding tip of FIG. 61 installed on the workpiece contact bracket of FIG. 58.

FIG. 64 shows the siding tip 2220 installed on workpiece contact bracket 2110, for example, the workpiece contact bracket 2110 shown in detail in FIGS. 58-60. To install the siding tip 2220 on the workpiece contact bracket 2110, the siding tip 2220 is placed adjacent the workpiece contact plate 2184 with the cylindrical sidewall 2228 facing the workpiece contact plate 2184. The siding tip 2220 is rotate so that the first tab 2232 on the siding tip 2220 is aligned with the first notch 2190 formed in the workpiece contact plate 218 and the second tab 2236 is aligned with the second notch 2200 formed in the workpiece contact plate 2184. Then, the siding tip 2220 is moved linearly over the workpiece contact plate 2184 and rotated clockwise (looking at the workpiece contact bracket 2110 from the end) until the tabs 2232, 2236 reach the closed end of each slot 2194, 2202 and the central ridge 2250 on the siding tip 2220 is located above the central bore 2240 of the siding tip 2220. Further, the guide tips 2252, 2254 are oriented along a horizontal axis, as illustrated in FIG. 64. The openings 2234, 2238 formed in the base 2224 of the siding tip 2220 provide a visual indicator that the siding tip 2220 is properly installed on the workpiece contact bracket 2110.

Figure 65:
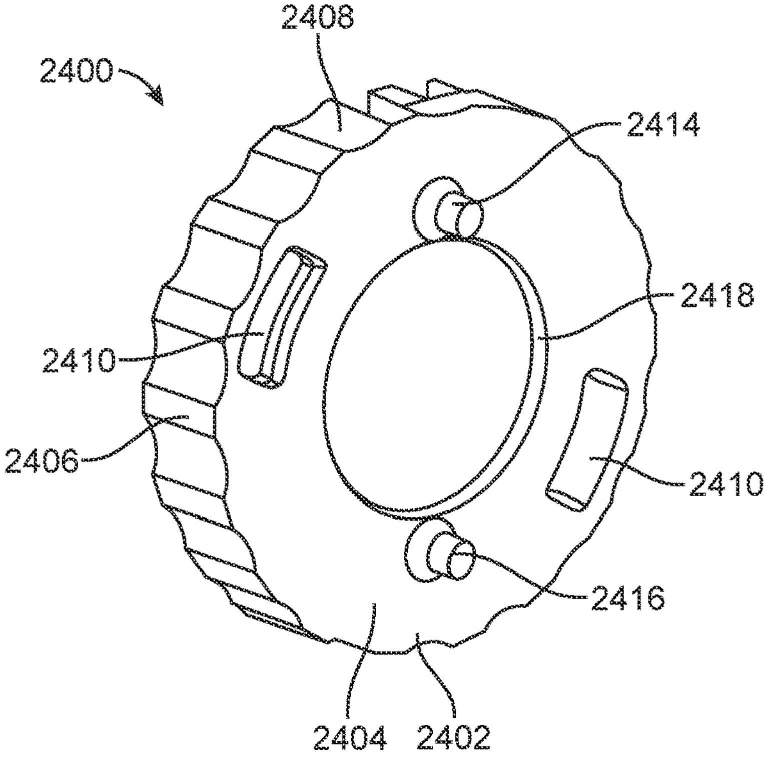
FIG. 65 is a perspective view of another siding tip for the fastener driver of FIG. 47.
Figure 66:
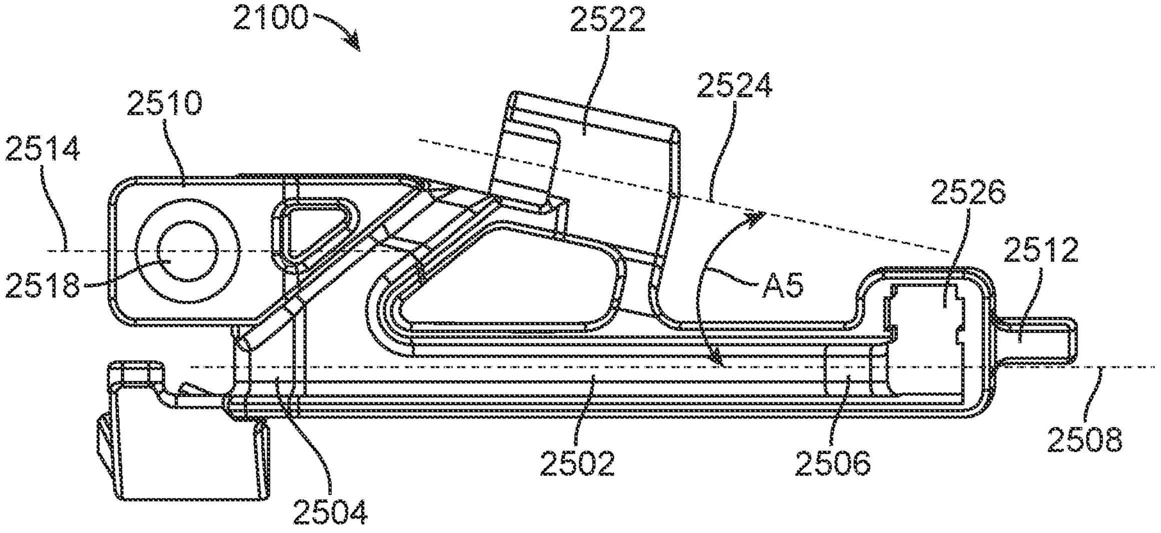
FIG. 66 is a top plan view of a sensor bracket for the fastener driver of FIG. 47.
Figure 67:
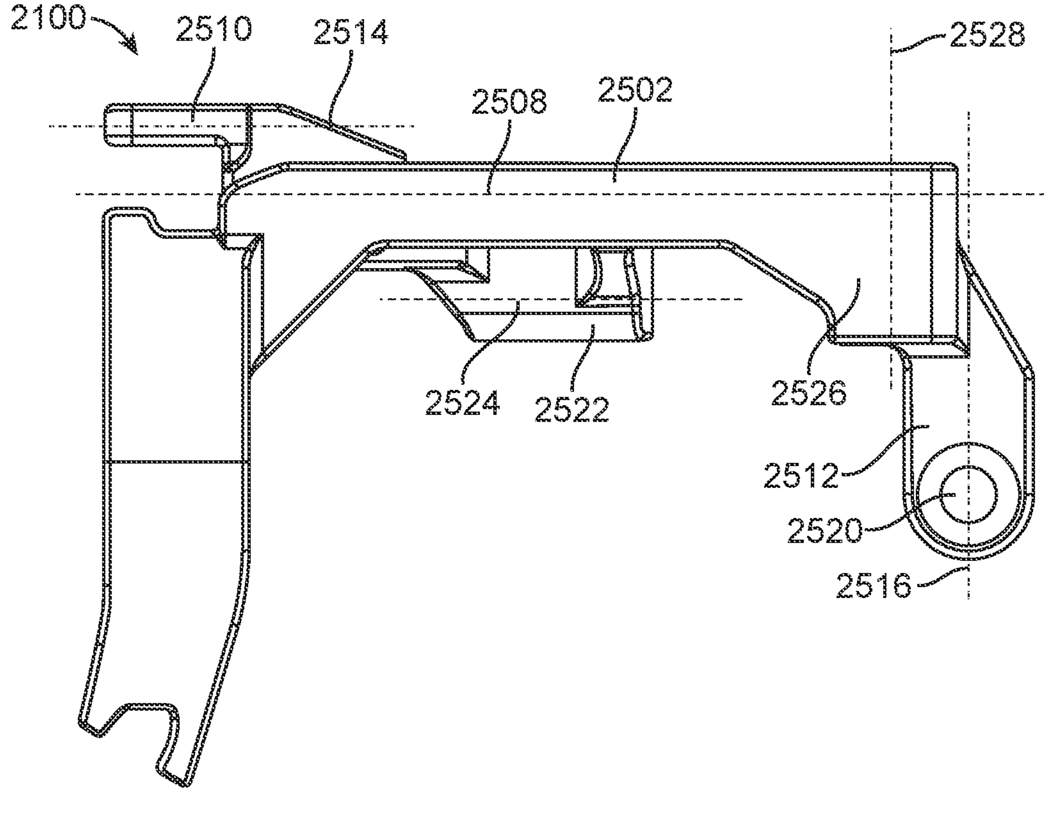
FIG. 67 is a left side plan view of the sensor bracket of FIG. 66.
Figure 68:
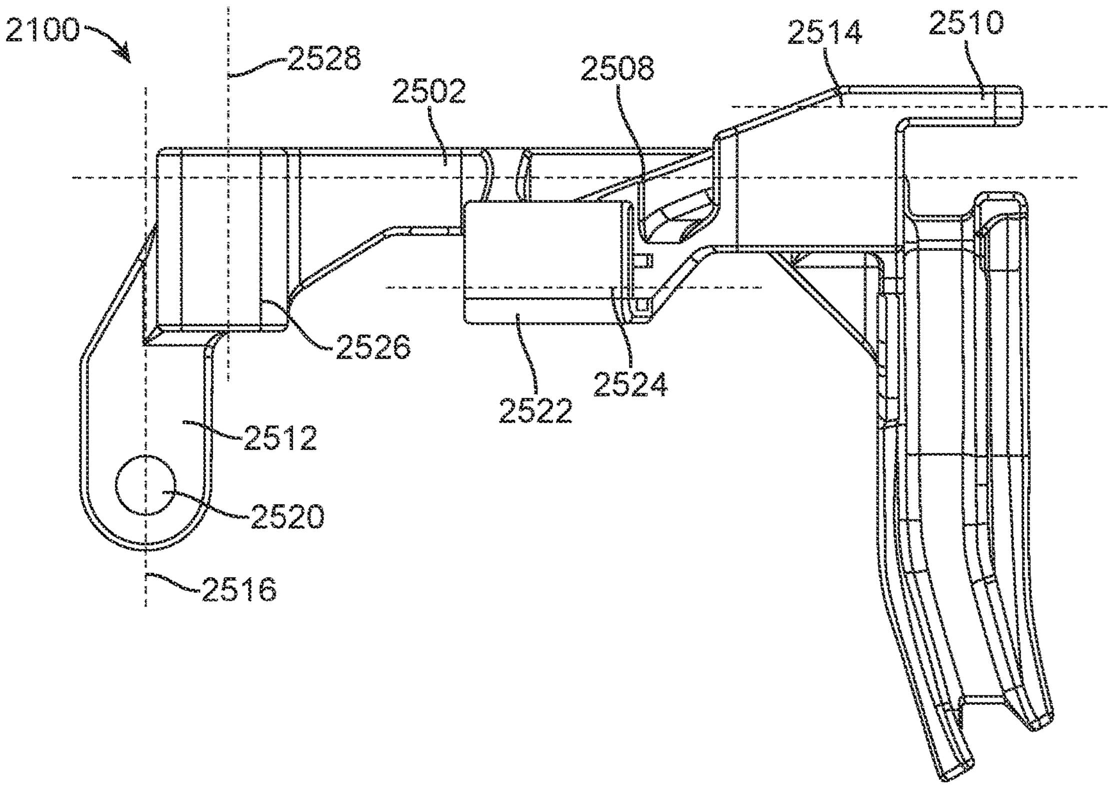
FIG. 68 is a right side plan view of the sensor bracket of FIG. 66.
Figure 69:
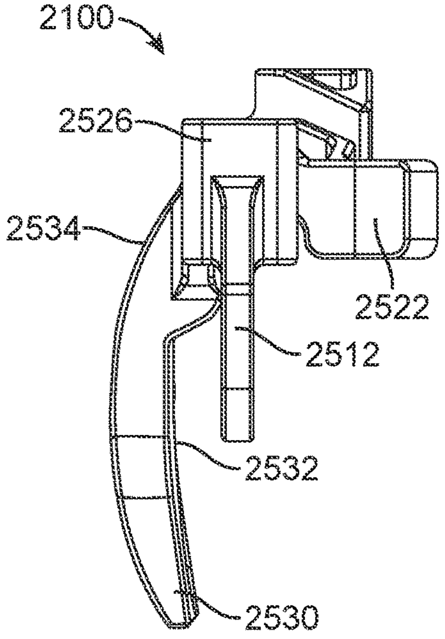
FIG. 69 is a front plan view of the sensor bracket of FIG. 66.
Figure 70:
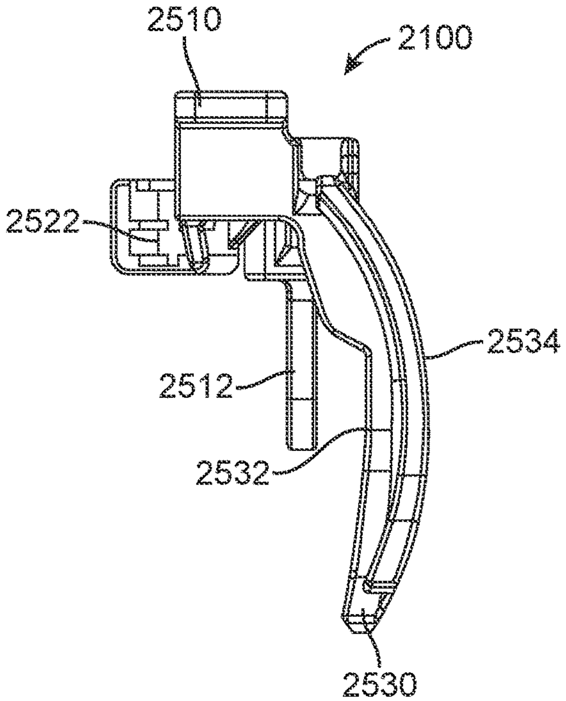
FIG. 70 is a rear plan view of the sensor bracket of FIG. 66.

FIG. 65 illustrates another siding tip 2400 that may be used with the fastener driver 2000 to facilitate the installation of exterior wall covering, i.e., siding, on a workpiece such as an exterior wall. The siding tip 2400 is similar to the siding tip 2220 described above and includes a body 2402 that has a base 2404, a sidewall 2406 with exterior scallops 2408, tabs (not shown), and openings 2410, 2412. Unlike the siding tip 2220, the siding tip 2400 does not include an overhang portion. Moreover, the siding tip 2400 includes guide tips 2414, 2416 that extend directly from a face of the base 2404 on opposite sides of a bore 2418 formed in the siding tip 2400. As shown in FIG. 65, the guide tips 2414, 2416 are oriented along a vertical axis. The siding tip 2400 may be engaged with the workpiece contact bracket 2110 of the fastener driver 2000 and may facilitate the installation of fasteners in vertically oriented nail slots.

Referring to FIGS. 66-70, the details of the sensor bracket 2100 are shown. As previously indicated, the sensor bracket 2100 is configured to hold the first sensor 2102 and the second sensor 2104 as shown in FIG. 53. As illustrated in FIGS. 66-70, the sensor bracket 2100 includes an elongated body 2502 having a first end 2504 and a second end 2506. The elongated body 2502 of the sensor bracket 2100 defines a longitudinal axis 2508. A first mounting tab 2510 extends from the elongated body 2502 near the first end 2504. A second mounting tab 2512 extends from the elongated body 2502 near the second end 2506. The first mounting tab 2510 defines a longitudinal axis 2514 that is parallel to the longitudinal axis 2508 of the elongated body 2502 of the sensor bracket 2100. The second mounting tab 2512 defines a longitudinal axis 2516 that is perpendicular to the longitudinal axis 2508 of the elongated body 2502. As shown, the mounting tabs 2510, 2512 are formed with holes 2518, 2520 to allow fasteners to extend therethrough to mount the sensor bracket 2100 within the housing 2002 of the fastener driver 2000.

FIGS. 66-70 further show that the sensor bracket 2100 includes a first sensor pocket 2522 formed near a midpoint of the elongated body 2502 and a second sensor pocket 2526 near the second end 2506 of the elongated body 2502. The first sensor pocket 2522 is configured to receive the first sensor 2102 therein. Further, the first sensor pocket 2522 is oriented so that a long axis 2524 of the first sensor pocket 2522 is at an angle A5 with respect to the longitudinal axis 2508 of the elongated body 2502. Also, the first sensor pocket 2522 and the first sensor 2102 disposed therein are parallel to the first mounting tab 2510. In a particular aspect, the angle A5 is greater than or equal to 5.0°, such as greater than or equal to 6.0°, greater than or equal to 7.0°, greater than or equal to 8.0°, greater than or equal to 9.0°, greater than or equal to 10.0°, greater than or equal to 11.0°, or greater than or equal to 12.0°. Further, the angle A5 is less than or equal to 20.0°, such as less than or equal to 19.0°, less than or equal to 18.0°, less than or equal to 17.0°, less than or equal to 16.0°, less than or equal to 15.0°, less than or equal to 14.0°, or less than or equal to 13.0°. It is to be understood that the angle A5 may be within a range between, and including, any of the maximum and minimum values of A5 disclosed herein.

Figure 71:
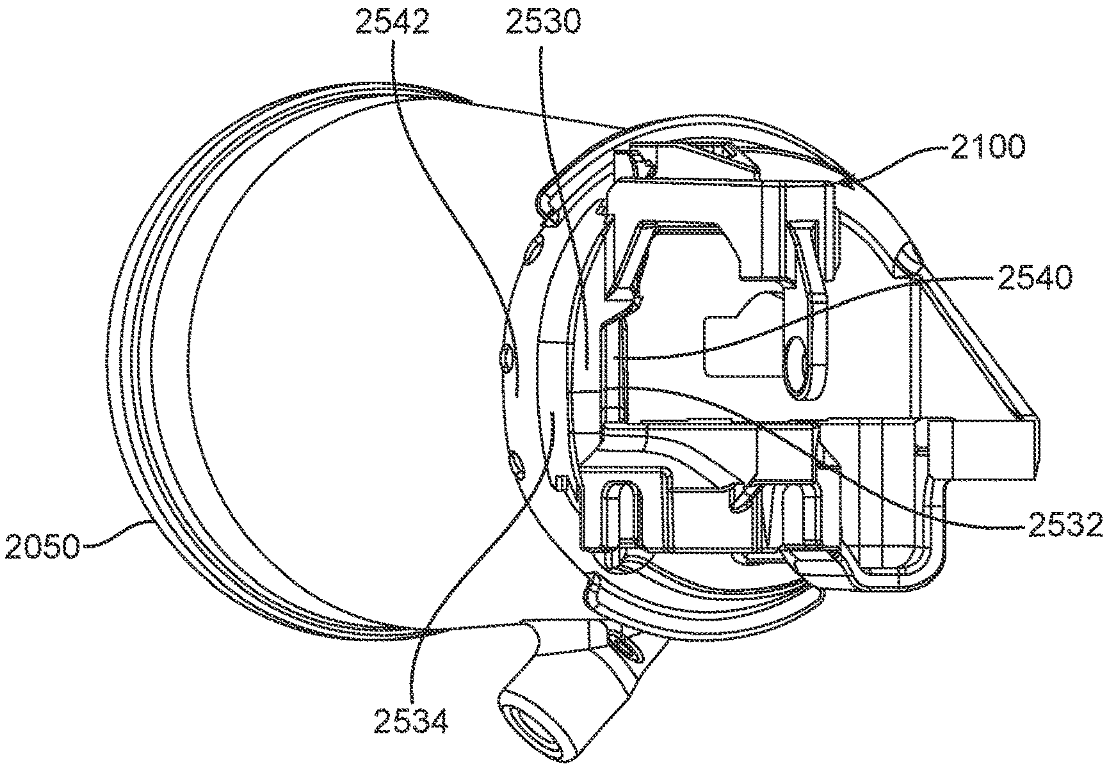
FIG. 71 is a perspective of the sensor bracket of FIG. 66 installed on a storage chamber cylinder of the fastener driver of FIG. 47.

As shown, the second sensor pocket 2526 is configured to receive the second sensor 2104 therein. Further, the second sensor pocket 2526 is oriented so that a long axis 2528 of the second sensor pocket 2526 is perpendicular to the longitudinal axis 2508 of the elongated body 2502. In addition, the second sensor pocket 2526 and the second sensor 2104 disposed therein are parallel to the second mounting tab 2512. The sensor bracket 2100 also includes a curved extension 2530 that extends from the first end 2504 of the elongated body 2502. The curved extension 2530 extends in a downward direction, relative to FIGS. 69 and 70, and is generally perpendicular to the longitudinal axis 2508 of the elongated body 2502. The curved extension 2530 includes an inner surface 2532 and an outer surface 2534. As shown in FIG. 71, the inner surface 2532 is shaped to fit around a gusset 2540 on an end of the storage chamber cylinder 2050. The outer surface 2534 is curved to match the curvature of an outer surface 2542 of the storage chamber cylinder 2050 adjacent the sensor bracket 2100.

FIGS. 72-77 depict the details of the lifting mechanism 2080. As shown, the lifting mechanism 2080 includes a lifter 2600 having a central hub 2602 with an upper disk 2604 and a lower disk 2606 extending radially outward from the central hub 2602 and spaced axially apart from each other. The upper disk 2604 includes a plurality of upper bores 2608 that extend partially into the lower surface 2610 of the upper disk 2604. The lower disk 2606 includes a plurality of lower bores 2610 extending through the lower disk 2606. Each lower bore 2610 is aligned with an upper bore 2608. The lifting mechanism 2080 includes a plurality of drive pins 2612 installed within the lifter 2600. Each drive pin 2612 extends through a lower bore 2610 and into an upper bore 2608. A support disk 2614 is installed below the lower disk 2606 to hold the drive pins 2612 in place. A retaining ring 2616 maintains the support disk 2614 in place on the lifting mechanism 2080.

As further illustrated in FIGS. 72-75, the lifter 2600 further includes a cam 2620 extending in an upward direction from the upper disk 2604. As described in detail below, the cam 2620 is configured to actuate the latch actuator assembly 2090. In particular the cam 2620 is configured to engage and actuate the latch actuator assembly 2090 over an angle A6. In a particular aspect, the angle A6 is greater than or equal to 25.0°, such as greater than or equal to 27.5°, greater than or equal to 30.0°, greater than or equal to 31.0°, greater than or equal to 32.0°, greater than or equal to 33.0°, greater than or equal to 34.0°, or greater than or equal to 35.0°. Further, the angle A6 is less than or equal to 50.0°, such as less than or equal to 47.5°, less than or equal to 45.0°, less than or equal to 42.5°, less than or equal to 40.0°, less than or equal to 39.0°, less than or equal to 38.0°, less than or equal to 37.0°, or less than or equal to 36.0°. It is to be understood that the angle A6 may be within a range between, and including, any of the maximum and minimum values of A6 disclosed herein.

Figure 75:
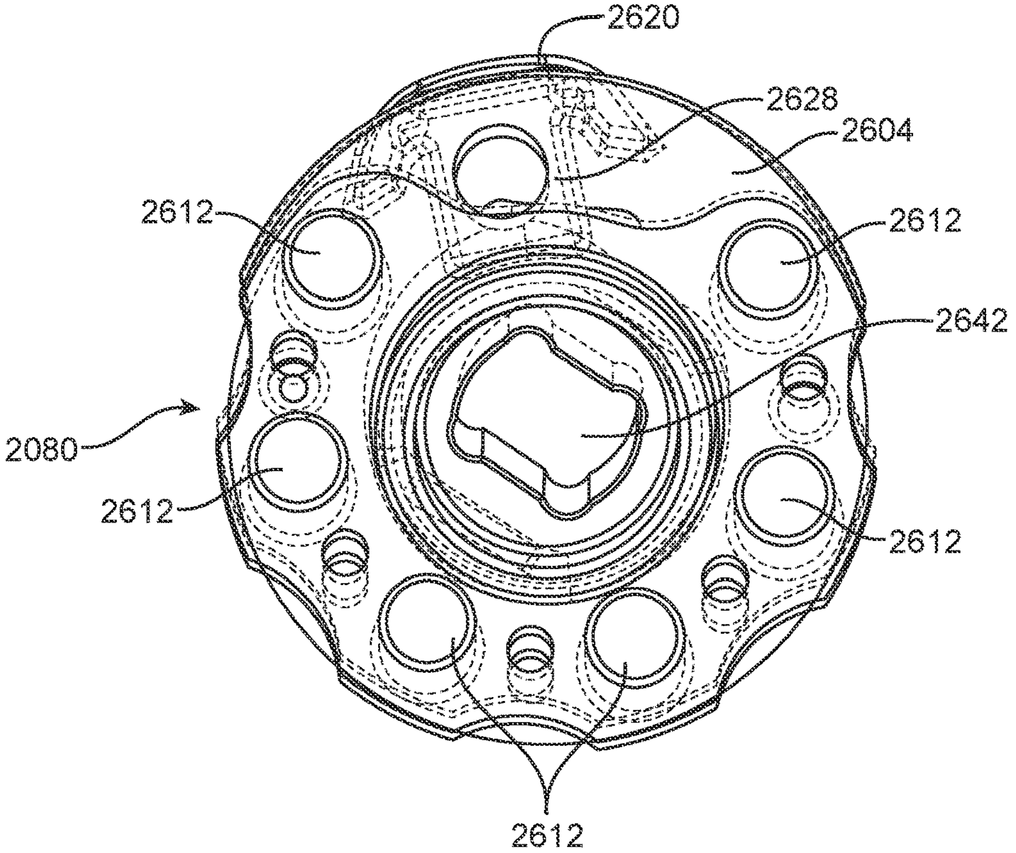
FIG. 75 is another top view of the lifting mechanism of FIG. 72.

A magnet retainer 2622 is disposed adjacent the upper disk 2604 and a bolt 2624 extends through the magnet retainer 2622 secures the lifting mechanism 2080 to a drive shaft of the motor 2076 (FIGS. 51-53). Further, a magnet 2626 is disposed within the magnet retainer 2622 and the magnet 2626 is detected by the first sensor 2102 (FIG. 53) that disposed within the sensor bracket 2100 (FIG. 53) to control the operation of the motor 2076 (FIGS. 51-53) and the lifting mechanism 2080 operably coupled thereto. As shown in FIG. 75, the lifter 2600 also includes an alignment feature 2628 that extends upwardly from the upper disk 2604 adjacent the cam 2620 and extending radially inward from the cam 2620.

Figure 76:
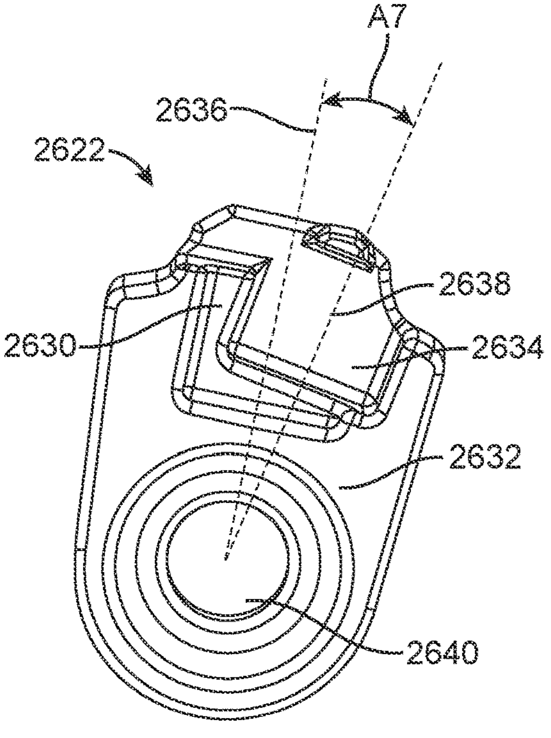
FIG. 76 is a bottom plan view of a magnet holder for the lifting mechanism of FIG. 72.
Figure 77:
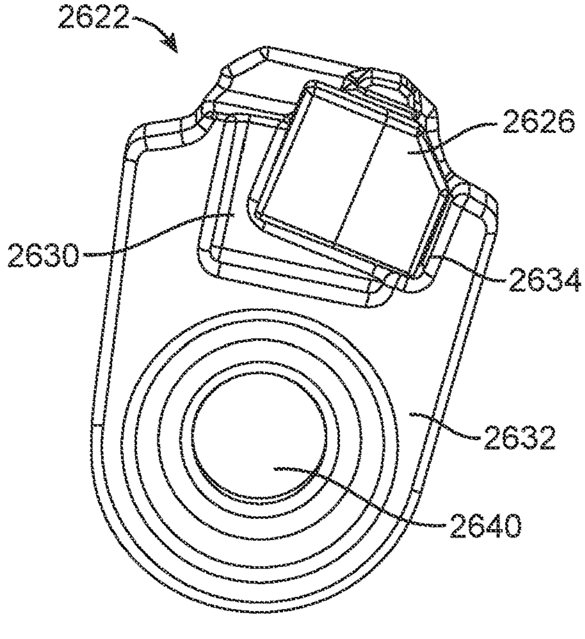
FIG. 77 is a bottom plan view of the magnet holder of FIG. 76 with a magnet disposed therein.

FIGS. 76 and 77 show the details of the magnet retainer 2622. The magnet retainer 2622 includes a first pocket 2630 formed in a lower surface 2632 of the magnet retainer 2622. A second pocket 2634 extends further into the magnet retainer 2622 from the first pocket 2630. As shown, the second pocket 2634 is radially offset from the first pocket 2630. In particular, an axis 2636 that extends through the center of the first pocket 2630 is radially spaced from an axis 2638 that extends through the center of the second pocket 2634 by an offset angle A7. In a particular aspect, the angle A7 is greater than or equal to 5.0°, such as greater than or equal to 6.0°, greater than or equal to 7.0°, greater than or equal to 8.0°, greater than or equal to 9.0°, greater than or equal to 10.0°, or greater than or equal to 11.0°. Further, the angle A7 is less than or equal to 20.0°, such as less than or equal to 19.0°, less than or equal to 18.0°, less than or equal to 17.0°, less than or equal to 16.0°, less than or equal to 15.0°, less than or equal to 14.0°, less than or equal to 13.0°, or less than or equal to 12.0°. It is to be understood that the angle A7 may be within a range between, and including, any of the maximum and minimum values of A7 disclosed herein.

Figure 72:
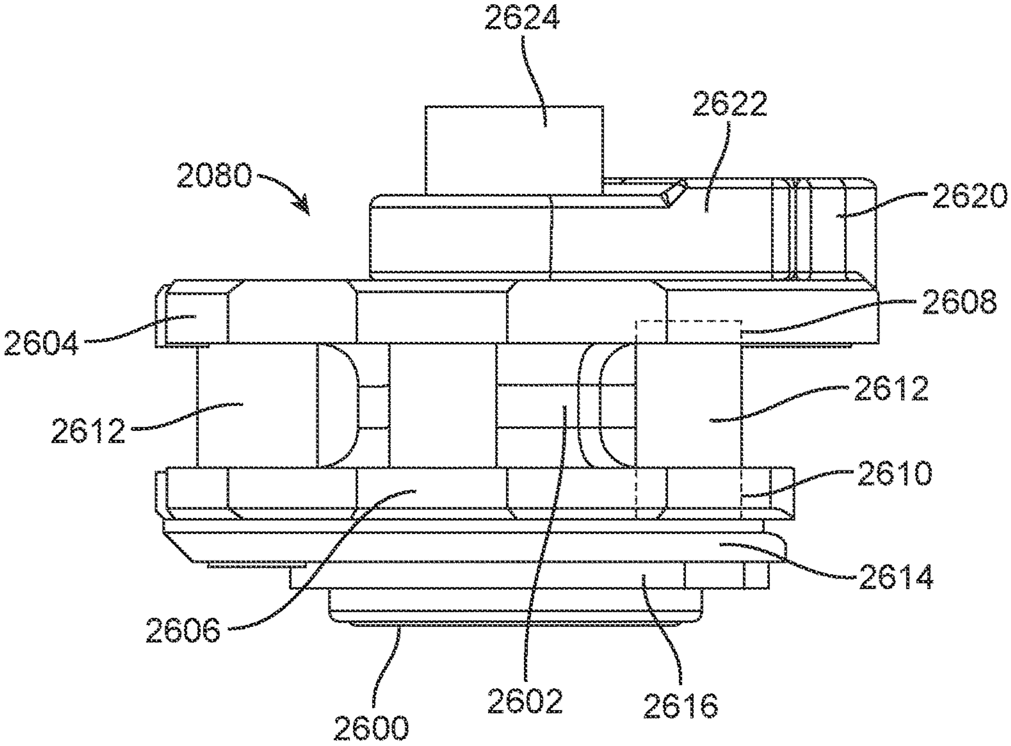
FIG. 72 is a side plan view of a lifting mechanism for the fastener driver of FIG. 47.
Figure 73:
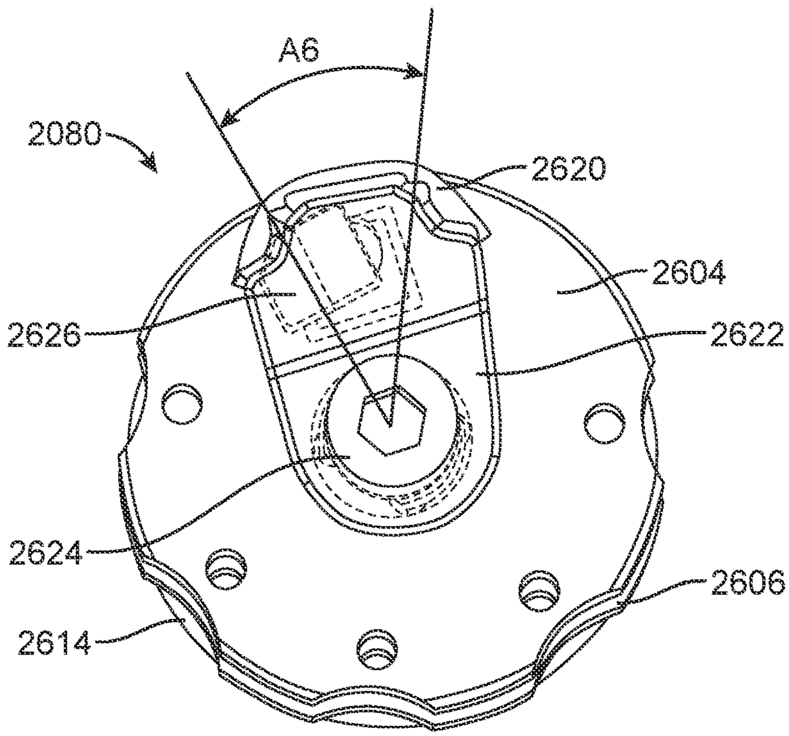
FIG. 73 is a top view of the lifting mechanism of FIG. 72.
Figure 74:
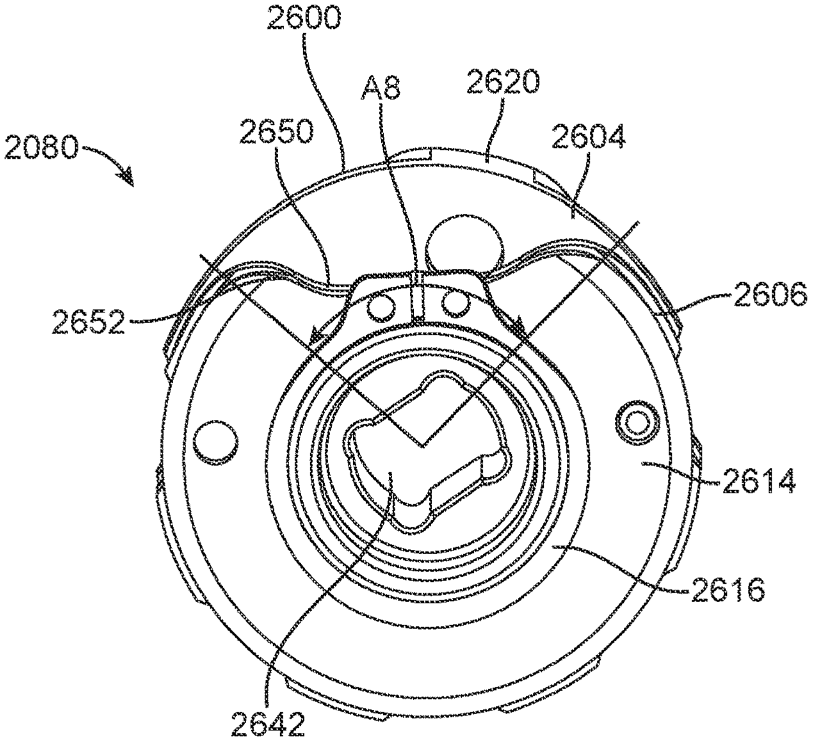
FIG. 74 is a bottom view of the lifting mechanism of FIG. 72.

As shown in FIG. 77, the magnet 2626 is disposed within the second pocket 2634 and the first pocket 2630 fits over the alignment feature 2628 on the upper disk 2604 of the lifter 2600. Accordingly, when the magnet retainer 2622 is installed on the lifter 2600 as shown in FIGS. 72 and 73, the magnet 2626 is nested within the cam 2620. This arrangement provides greater spatial efficiency and better performance from the first sensor 2102 arranged to detect the magnet 2626. The bolt 2624 extends through a bore 2640 in the magnet retainer 2622 and a bore 2642 in the lifter 2600 and is threadably engaged with a motor shaft that is keyed to the bore 2642 in the lifter 2600 to prevent the lifter 2600 from rotating with respect to the motor shaft.

Referring back to FIG. 74, the lower disk 2606 of the lifter 2600 is formed with a peripheral notch 2650 below the radial location of the cam 2620 on the upper disk 2604 of the lifter 2600 such that the peripheral notch 2650 overlaps the cam 2620 in an axial direction. The support disk 2614 includes a matching peripheral notch 2652 aligned with the peripheral notch 2650 on the lower disk 2606. The peripheral notch 2652 in the support disk 2614 also overlaps the cam 2620 in an axial direction. As described in detail below, the peripheral notches 2650, 2652 provide clearance for the driver blade 2064 (FIGS. 54-57) when the fastener driver 2000 is fired and the driver blade 2064 is moved to the BDC (i.e., extended or driven) position into the nosepiece 2022 to forcibly eject a fastener therefrom and into a workpiece. The peripheral notches 2650, 2652 extend over an angle A8. In a particular aspect, the angle A8 is greater than or equal to 60.0°, such as greater than or equal to 65.0°, greater than or equal to 70.0°, greater than or equal to 75.0°, greater than or equal to 80.0°, greater than or equal to 85.0°, or greater than or equal to 90.0°. Further, the angle A8 is less than or equal to 120.0°, such as less than or equal to 115.0°, less than or equal to 110.0°, less than or equal to 105.0°, less than or equal to 100.0°, or less than or equal to 95.0°. It is to be understood that the angle A8 may be within a range between, and including, any of the maximum and minimum values of A8 disclosed herein.

FIGS. 78-82 show the details of the latch actuator assembly 2090. As illustrated, the latch actuator assembly 2090 includes base plate 2700 that is formed with a semi-cylindrical notch 2702 that is sized and shaped to fit around the lifting mechanism 2080, e.g., around the lifter 2600 (as shown in FIG. 53). A spring retainer 2704 extends from an upper surface 2706 of the base plate 2700 of the latch actuator assembly 2090. The spring retainer 2704 is configured to receive an end of a spring (not shown) that is installed in compression between the spring retainer 2704 of the latch actuator assembly 2090 and the workpiece contact bracket 2110 (FIG. 53) to bias the workpiece contact bracket 2110 away from the spring retainer 2704 along the nosepiece 2022 (FIG. 53).

Figure 78:
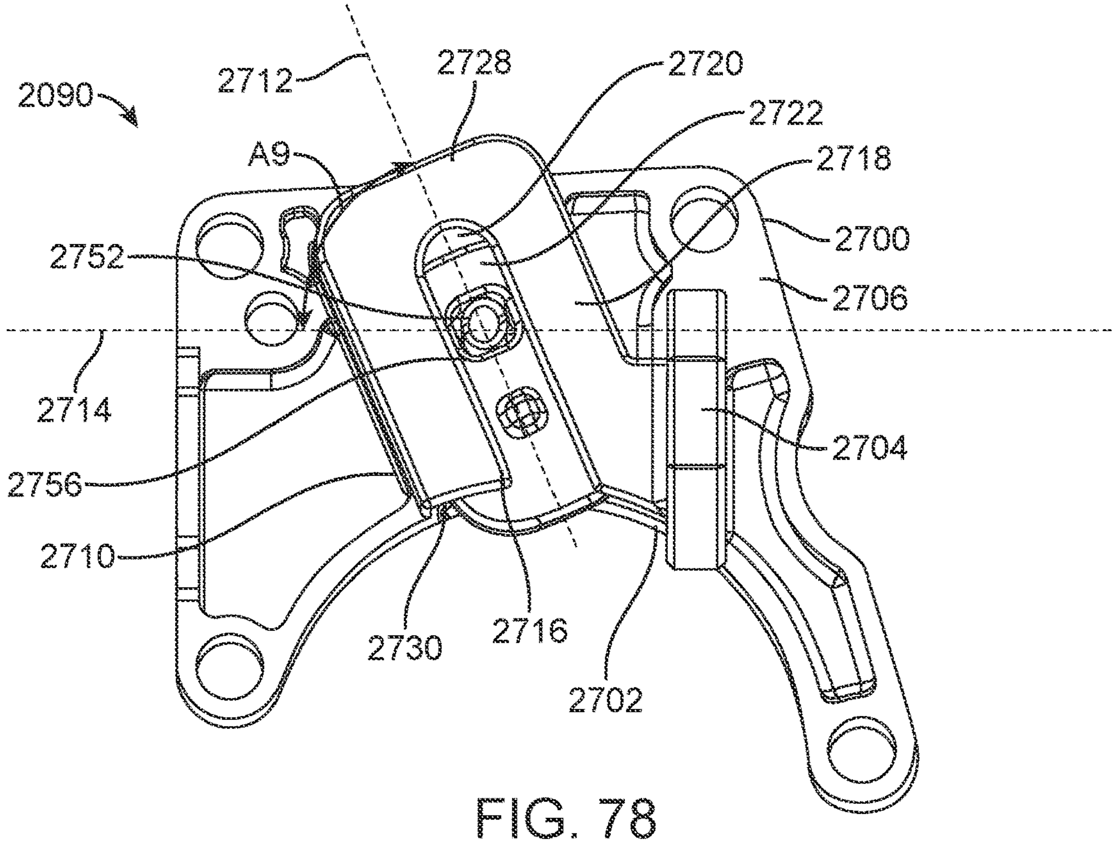
FIG. 78 is a first top view of a latch assembly for the fastener driver of FIG. 47.
Figure 79:
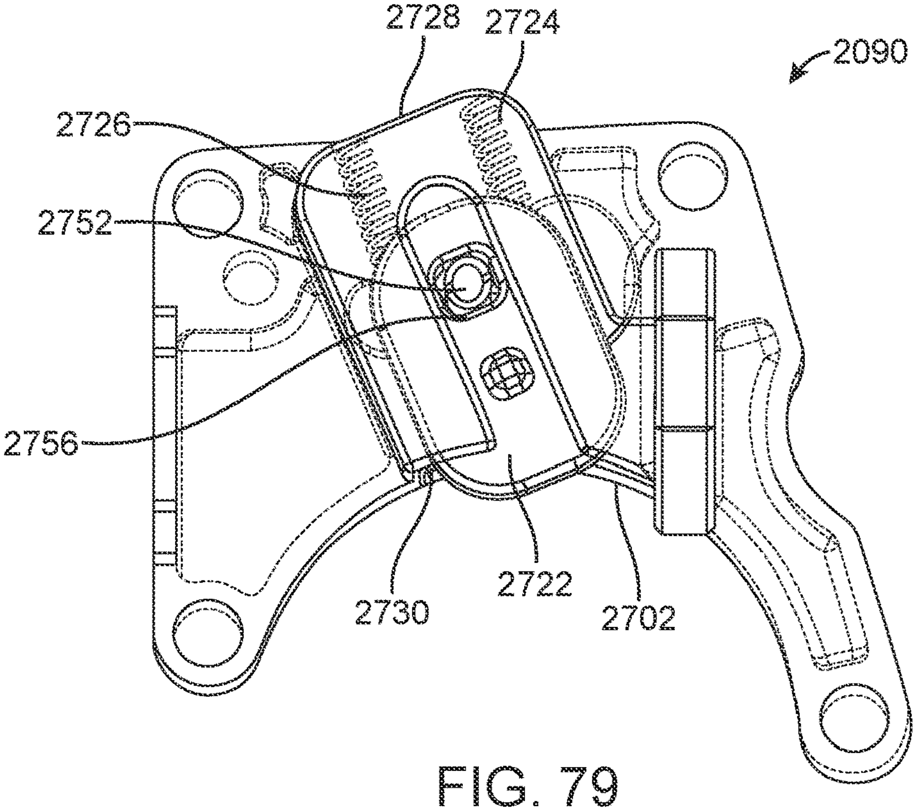
FIG. 79 is a second top view of the latch assembly of FIG. 78.

FIGS. 78 and 79 show that the latch actuator assembly 2090 includes a generally rectangular shuttle housing 2710 that is disposed on the upper surface 2706 of the base plate 2700. It is to be understood that the shuttle housing 2710 may be integrally formed with the base plate 2700. As shown, the shuttle housing 2710 includes a longitudinal axis 2712 that is formed at an angle A9 with respect to a longitudinal axis 2714 of the base plate 2700. In a particular aspect, the angle A9 is greater than or equal to 60.0°, such as greater than or equal to 61.0°, greater than or equal to 62.0°, greater than or equal to 63.0°, greater than or equal to 64.0°, greater than or equal to 65.0°, greater than or equal to 66.0°, or greater than or equal to 67.0. Further, the angle A9 is less than or equal to 75.0°, such as less than or equal to 74.0°, less than or equal to 73.0°, less than or equal to 72.0°, less than or equal to 71.0°, less than or equal to 70.0°, less than or equal to 69.0°, or less than or equal to 68.0°. It is to be understood that the angle A9 may be within a range between, and including, any of the maximum and minimum values of A9 disclosed herein.

The shuttle housing 2710 includes a slot 2716 formed in an upper surface 2718 of the shuttle housing 2710 at least partially along the length of the upper surface 2718 and along the longitudinal axis 2712. The shuttle housing 2710 also includes a pocket 2720 that is sized and shaped to receive a shuttle 2722 slidably, or otherwise movably, therein. A first shuttle spring 2724 and a second shuttle spring 2726 are disposed parallel to each other and parallel to the longitudinal axis 2712 of the shuttle housing 2710 in compression within the pocket 2720 between a closed end 2728 of the shuttle housing 2710 (and the pocket 2720) and the shuttle 2722 to bias the shuttle 2722 outward from the pocket 2720 and an open end 2730 of the shuttle housing 2710 (and the pocket 2720) so that a portion of the shuttle 2722 extends into the semi-cylindrical notch 2702.

Figure 80:
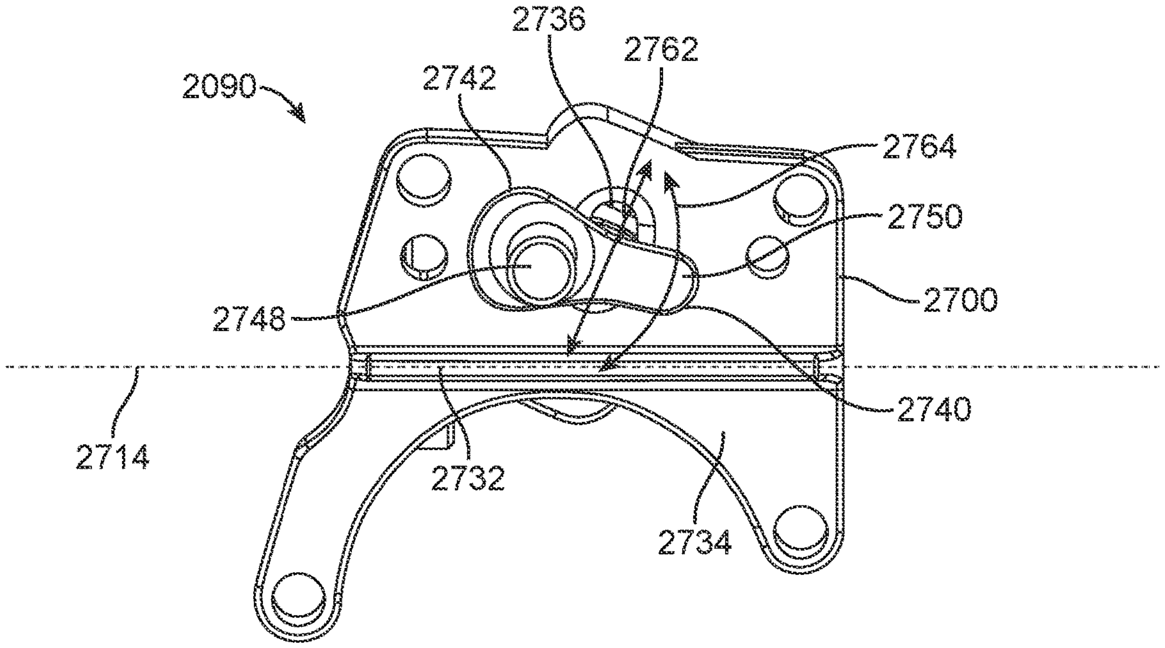
FIG. 80 is a first bottom view of the latch assembly of FIG. 78.
Figure 81:
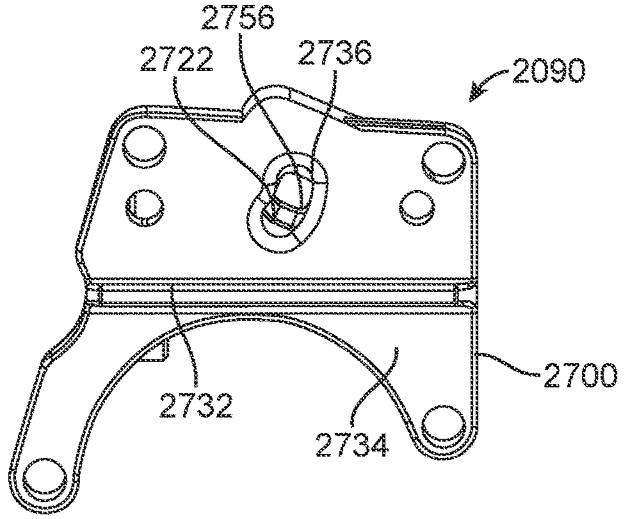
FIG. 81 is a second bottom view of the latch assembly of FIG. 78.

As shown in FIGS. 80 and 81, the latch actuator assembly 2090 further includes a guide rib 2732 that extends perpendicularly from a lower surface 2734 of the base plate 2700. The guide rib 2732 extends along the entire length of the base plate 2700 and is parallel to the longitudinal axis 2714. The guide rib 2732 is sized and shaped to fit into the guide groove 2164 (FIG. 56) of the driver blade 2064 and acts as a guide for the driver blade 2064 as it moves between the TDC (i.e., retracted or ready) position and the BDC (i.e., extended or driven) position.

Figure 82:
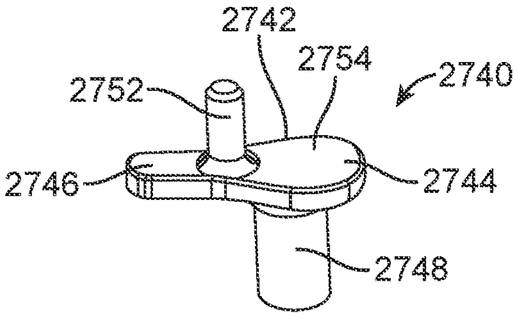
FIG. 82 is a side view of an actuator post for the latch assembly of FIG. 78.

FIGS. 80 and 81 further show that the base plate 2700 is formed with a curved slot 2736 that extends through the base plate 2700, i.e., from the upper surface 2706 to the lower surface 2734. A portion of a latch assembly 2740 fits into the curved slot 2736 and rotates therein as the shuttle 2722 moves linearly within the shuttle housing 2710. As shown in FIG. 82, the latch assembly 2740 includes a latch 2742 that includes a proximal end 2744 and a distal end 2746. A support post 2748 extends perpendicularly from a lower surface 2750 of the latch 2742 in a first direction. An actuator post 2752 extends perpendicularly from an upper surface 2754 in a second direction opposite the first direction and opposite the support post 2748.

Figure 84:
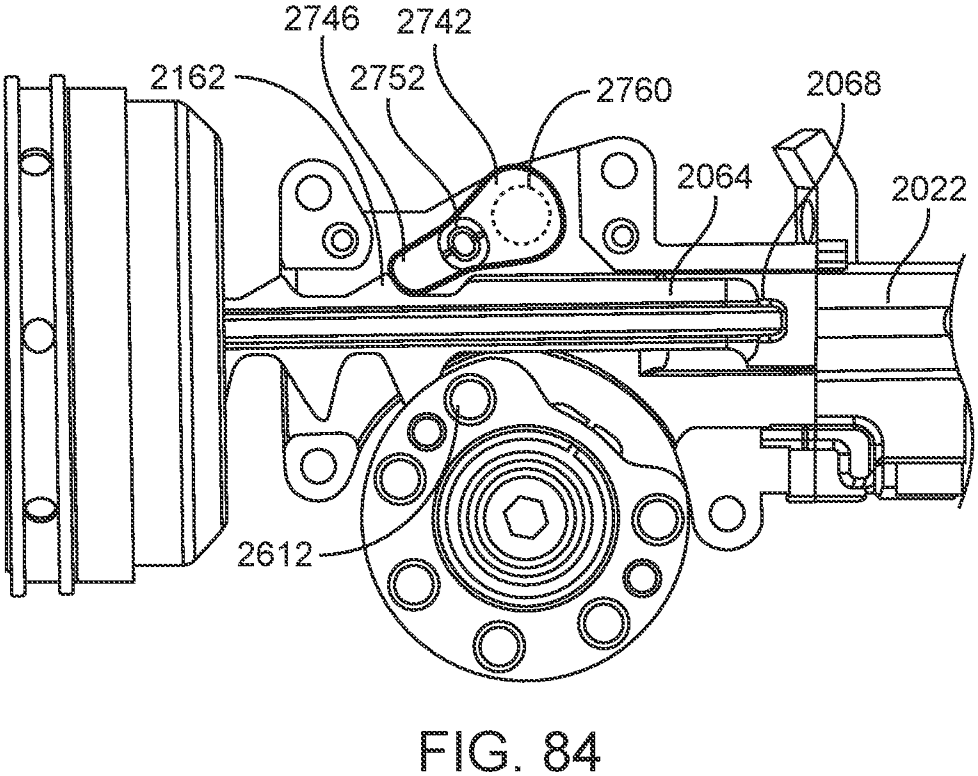
FIG. 84 is a second top view of the firing mechanism of FIG. 83 in the ready position.

When the latch actuator assembly 2090 is assembled as shown in FIGS. 78-80, the actuator post 2752 extends through the curved slot 2736 and into a bore 2756 formed in the shuttle 2722. The support post 2748 is configured to fit into and rotate within a bore 2760 formed in the nosepiece (FIG. 84). Accordingly, as the shuttle 2722 moves linearly back-and-forth, as indicated by arrow 2762 within the shuttle housing 2710, the latch assembly 2740 rotates about the support post 2748 and the distal end 2746 of the latch 2742 moves back-and-forth along a circular arc, as indicated by arrow 2764. As described in greater detail below, the lifting mechanism 2080 rotates to actuate the latch actuator assembly 2090.

Figure 83:
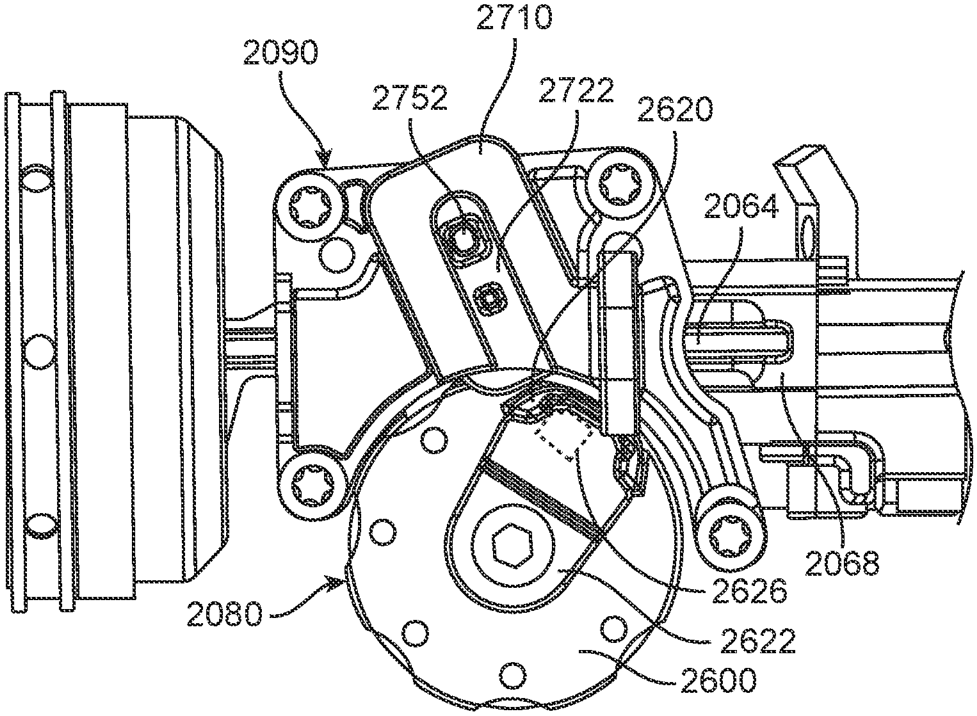
FIG. 83 is a first top view of a firing mechanism of the fastener driver of FIG. 47 in a ready position.

With reference to FIGS. 83-90, the operation of the lifting mechanism 2080 and the latch actuator assembly 2090 to fire and reset the driver blade 2064 is depicted. FIGS. 83 and 84 show the driver blade 2064 in the TDC (i.e., retracted or ready) position and the lifting mechanism 2080 in a ready position. In the ready position, the motor 2076 is de-energized and stationary. The cam 2620 on the lifter 2600 is adjacent and in contact with the end of shuttle 2722 that is extending from the open end 2730 of the shuttle housing 2710. As shown, in the ready position, the magnet 2626 within the magnet retainer 2622 on the lifter 2600 is in a position to be sensed by the first sensor 2102 within the sensor bracket 2100. Also, in the ready position as shown in FIG. 84, the distal end 2746 of the latch 2742 is engaged with one of the locking protrusions 2162 on the driver blade 2064, e.g., the locking protrusion 2162 nearest the distal end 2068 of the driver blade 2064. Accordingly, the latch 2742 holds the driver blade 2064 locked in the TDC (i.e., retracted or ready) position against the force of the gas spring (i.e., the compressed gas within the storage chamber cylinder 2050.)

Figure 85:
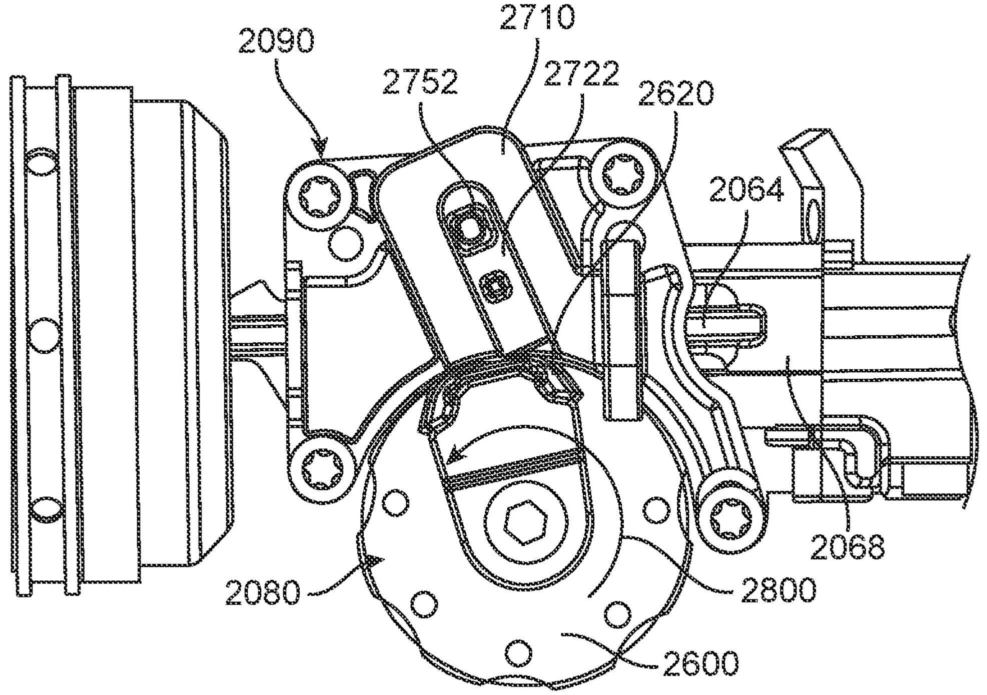
FIG. 85 is a first top view of the firing mechanism of FIG. 83 in a firing position.
Figure 86:
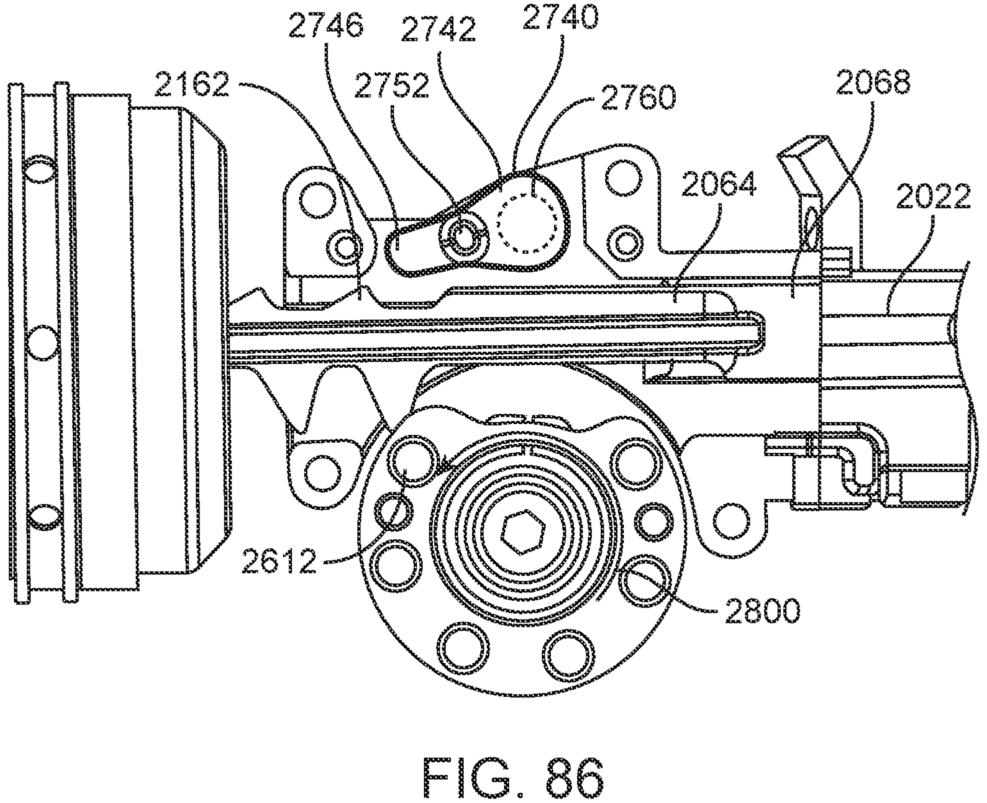
FIG. 86 is a second top view of the firing mechanism of FIG. 83 in the firing position.

As shown in FIG. 85, when a user actuates the trigger 2030 of the fastener driver 2000, the motor 2076 is energized and rotates counterclockwise as indicated by arrow 2800 and also rotates the lifter 2600 of the lifting mechanism 2080 counterclockwise. As the lifter 2600 rotates, the cam 2620 on the lifter 2600 pushes the shuttle 2722 into the shuttle housing 2710 against the force of the springs 2724, 2726 (FIG. 79). As the shuttle 2722 moves into the shuttle housing 2710 it pushes the actuator post 2752 along the curved slot 2736 formed in the base plate 2700 of the latch actuator assembly 2090 and the latch assembly 2740 rotates on the support post 2748 within the bore 2760 of the nosepiece 2022. The distal end 2746 of the latch 2742 rotates away from the driver blade 2064 into a position in which the latch 2742 disengages the locking protrusion 2162 and remains clear of the locking protrusions 2162.

Figure 87:
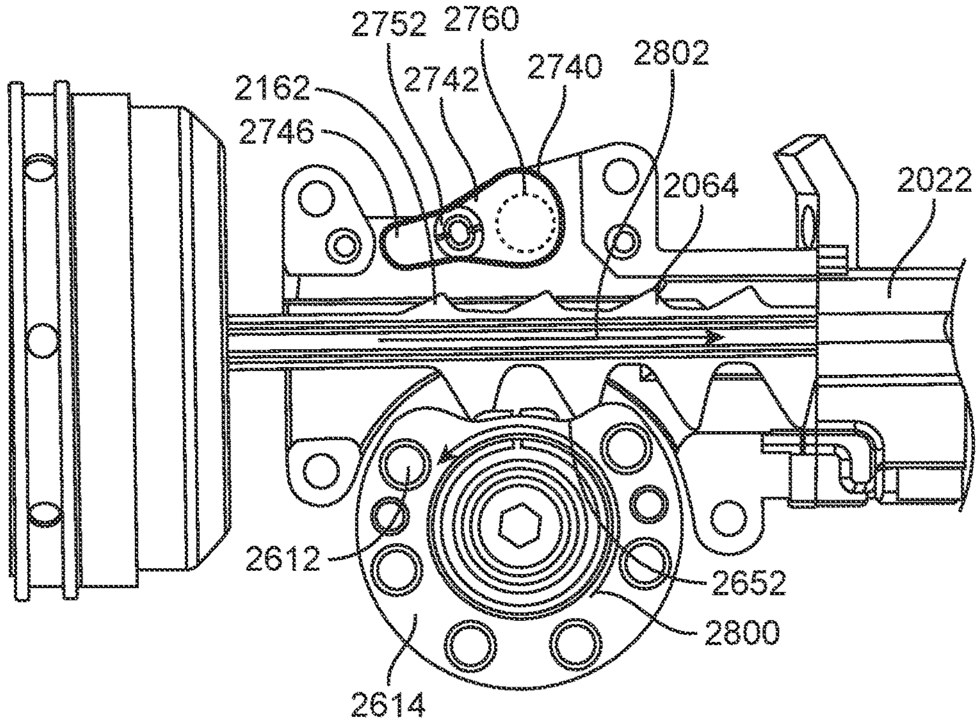
FIG. 87 is a top view of the firing mechanism of FIG. 83 in a fired position.

As disclosed herein, as the lifter 2600 rotates, the cam 2620 remains in contact with the shuttle 2722 over the angle A5 which is within a range between and including 25° to 50°. The shape of the cam 2620 keeps the shuttle 2722 toggle into the shuttle housing 2710 which, in turn, keeps the distal end 2746 of the latch 2742 rotated into a position away from the driver blade 2064 and clear of the locking protrusions 2162. As shown in FIG. 87, as the lifter 2600 continues to rotate, as indicated by arrow 2800, into a firing position, the latch 2742 remains clear of the locking protrusions 2162 while the peripheral notch 2650 on the lower disk 2606 of the lifter 2600 and the peripheral notch 2652 on the support disk 2614 moves into position adjacent the driver blade 2064. In the firing position, the drive pins 2612 on the lifter 2600 are clear of the drive teeth 2160 on the driver blade 2064. Accordingly, the driver blade 2064 is released and the force of the compressed gas behind the piston 2062 and within the storage chamber cylinder 2050 drives the piston 2062 and the driver blade 2064 toward the BDC (i.e., extended or driven position), as indicated by arrow 2802, into the nosepiece 2022 to expel a fastener from the fastener driver 2000 and drive the faster into a workpiece.

Figure 88:
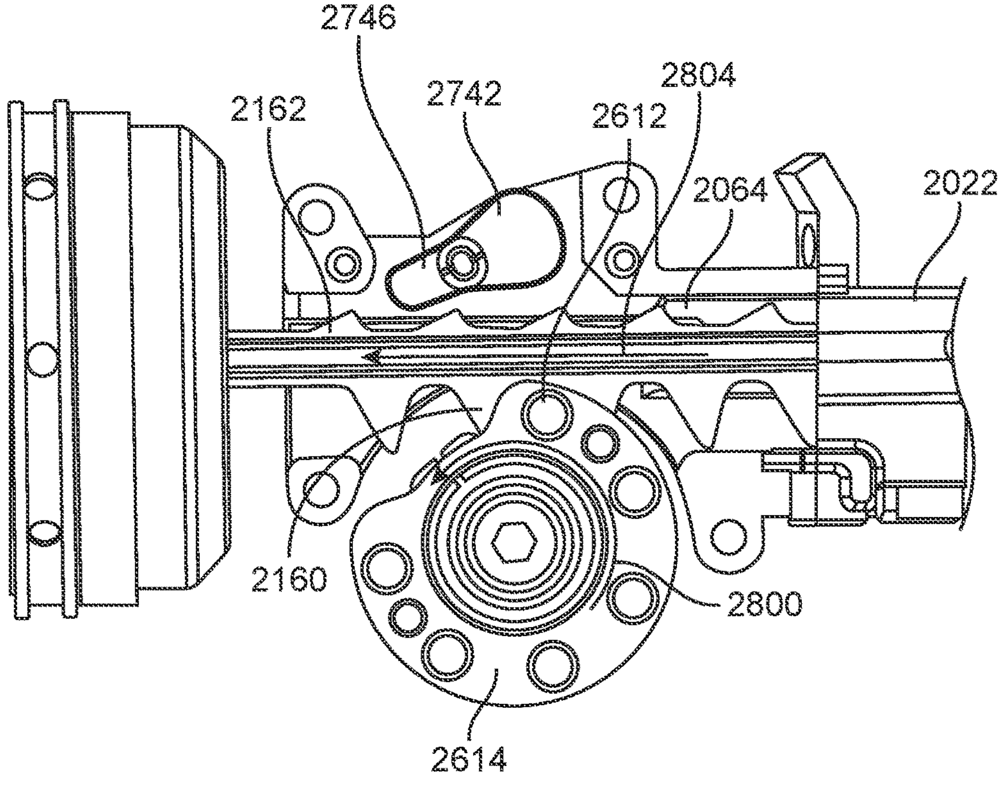
FIG. 88 is a first top view of the firing mechanism of FIG. 83 in a recharging position.
Figure 89:
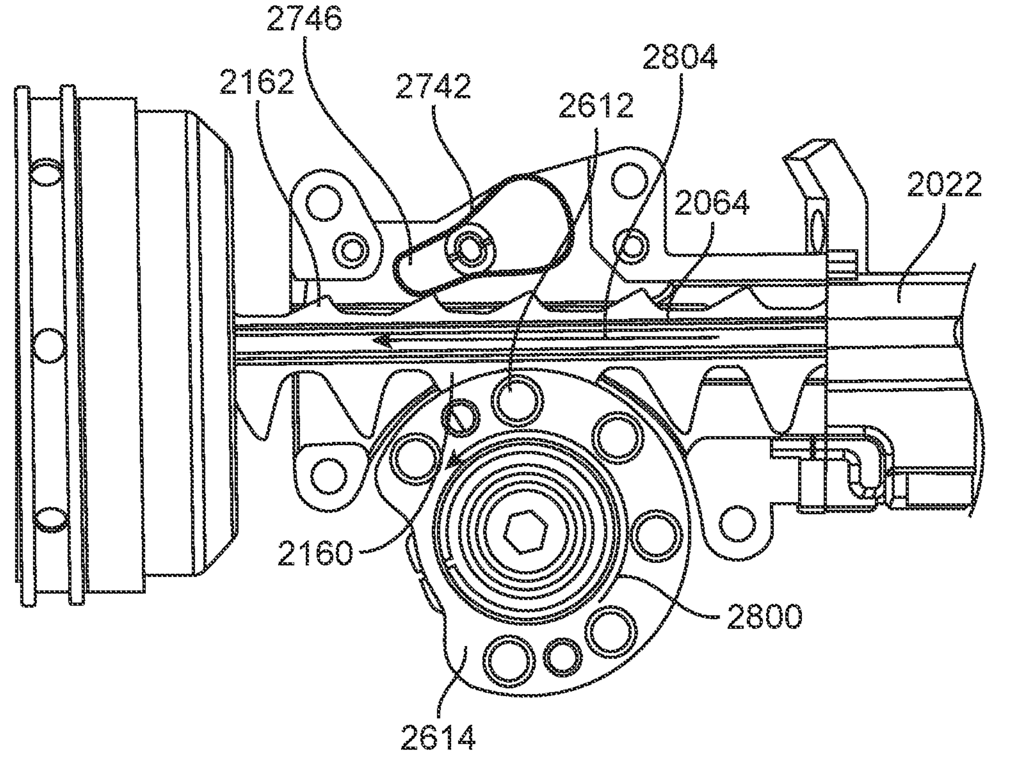
FIG. 89 is a second top view of the firing mechanism of FIG. 83 in a recharging position.
Figure 90:
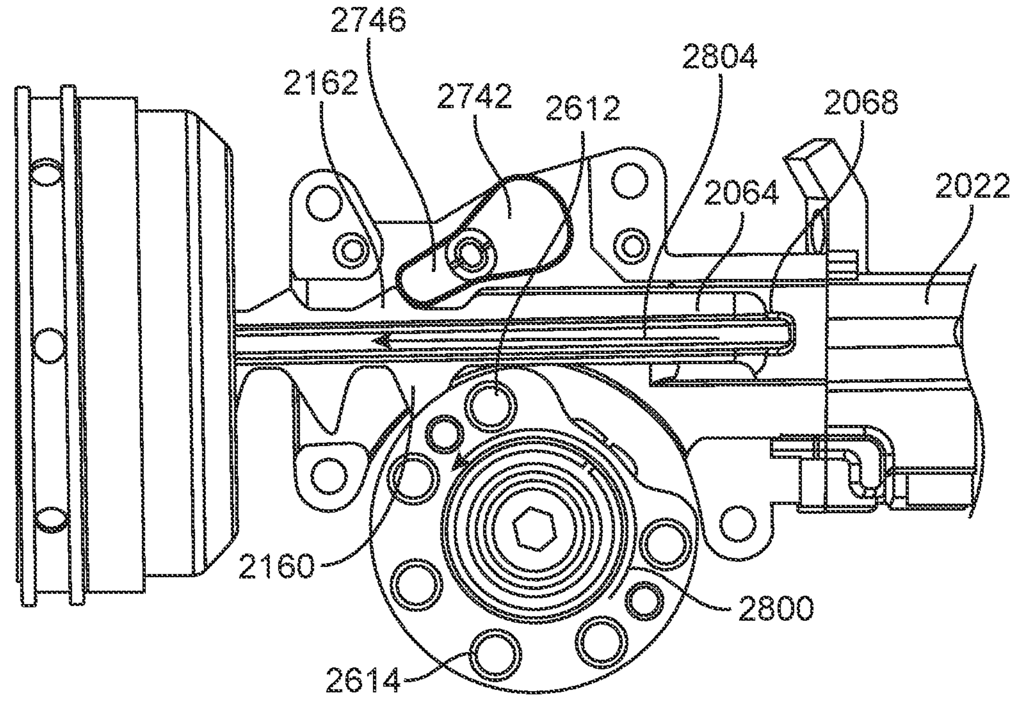
FIG. 90 is a top view of the firing mechanism of FIG. 83 in a recharged/ready position.
Figure 91:
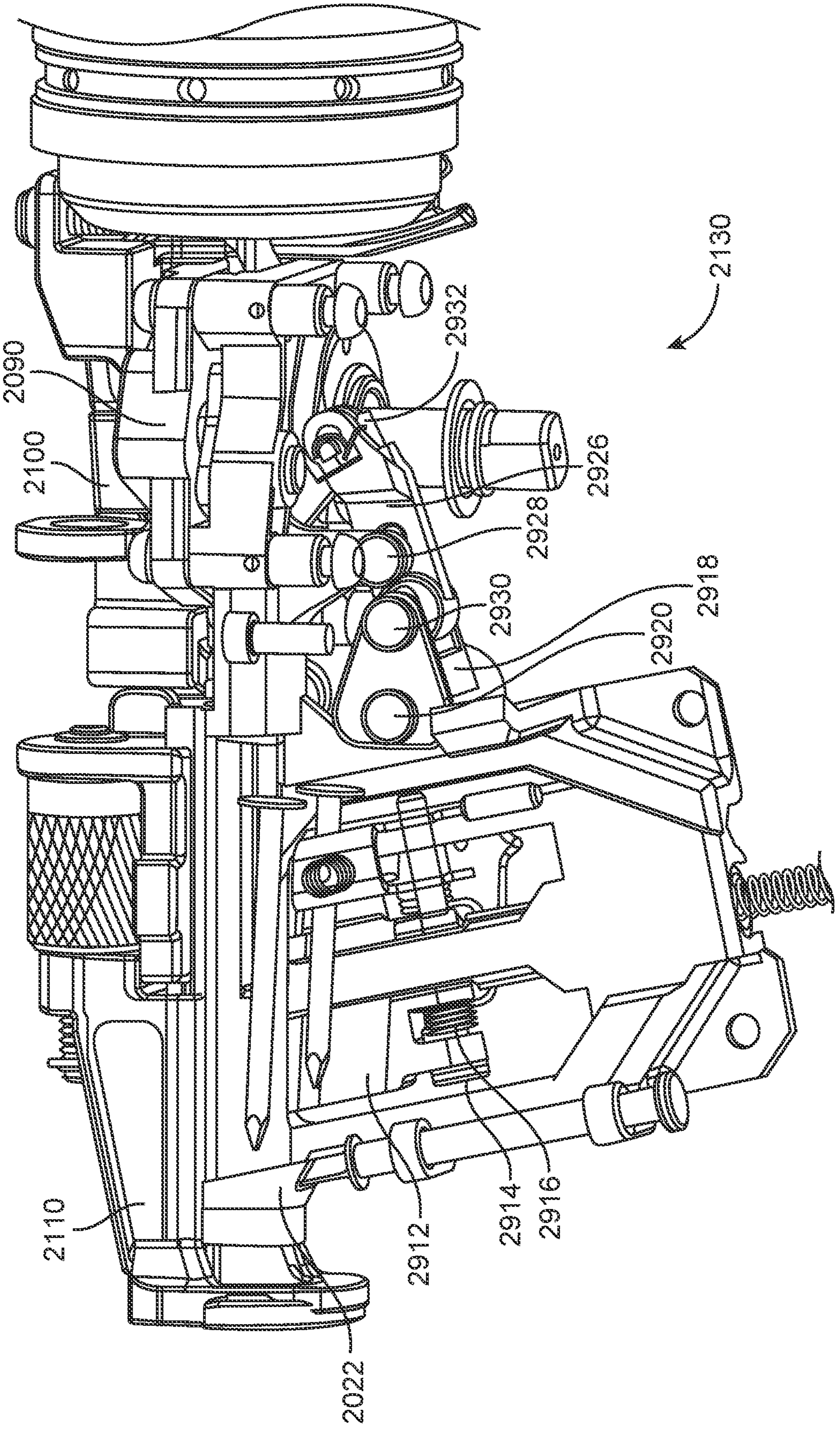
FIG. 91 is a left side view of a fastener delivery mechanism of the fastener driver of FIG. 47.
Figure 92:
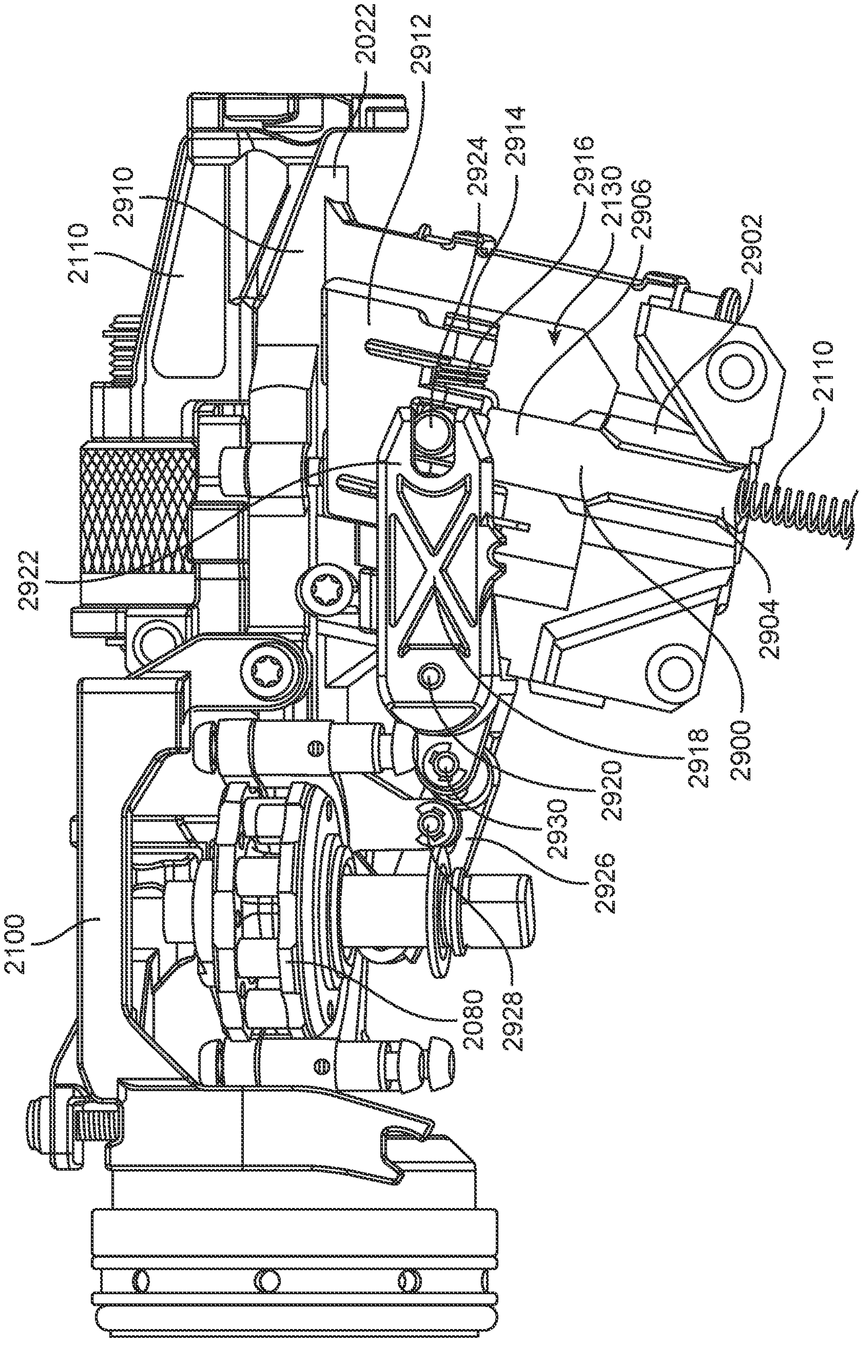
FIG. 92 is a right side view of the fastener delivery mechanism of FIG. 91.

After the driver blade 2064 is released and fired by the compressed gas in the storage chamber cylinder 2050, the motor 2076 continues to rotate the lifting mechanism 2080 counterclockwise as shown in FIGS. 88-90 and indicated by arrow 2800. When the cam 2620 rotates past the latch actuator assembly 2090, the shuttle 2722 is released and the springs 2724, 2726 bias the shuttle 2722 toward the lifter 2600 and the distal end 2746 of the latch 2742 moves toward the driver blade into a position in which the latch 2742 is able to engage one of the locking protrusions 2162 if the motor 2076 fails. As the lifter 2600 rotates the drive pins 2612 engage the drive teeth 2160 on the driver blade 2064 in sequence to move the driver blade 2064 in a direction away from the nosepiece 2022, as indicated by arrow 2804, and return the driver blade 2064 to the TDC (i.e., retracted or ready) position. As the lifter 2600 returns the driver blade 2064 to the TDC (i.e., retracted or ready) position, the piston 2062 compresses the gas within the storage chamber cylinder 2050. Moreover, as the driver blade 2064 returns to the TDC (i.e., retracted or ready) position, the locking protrusions 2162 will rotate the latch 2742 away from the driver blade 2064 against the springs 2724, 2726 which return the latch 2742 toward the driver blade 2064 as each locking protrusion 2162 passes. The motor 2076 continues to rotate the lifting mechanism 2080 counterclockwise, as indicated by arrow 2800 until the driver blade 2064 is returned to the TDC (i.e., retracted or ready) position and the magnet 2626 on the lifter 2600 is detected by the first sensor 2102 in the sensor bracket 2100 to signal the controller to de-energize the motor 2076. The distal end 2746 of the latch 2742 engages the locking protrusion 2162 nearest the distal end 2068 of the driver blade 2064 to hold the driver blade 2064 in the ready position until the trigger 2030 is, once again, pressed by a user. It is to be understood that the illustrated fastener driver 2000 operates on a gas spring principle utilizing the lifting mechanism 2080 and the piston 2062 to further compress the gas within the driver cylinder 2060 and the storage chamber cylinder 2050.

FIGS. 91-94 illustrate the details of the fastener delivery mechanism 2130. As shown, the fastener delivery mechanism 2130 includes a support post 2900 that is slidably disposed within a bracket 2902 on the nosepiece 2022. The support post 2900 includes a proximal end 2904 and a distal end 2906. A spring 2908 is installed in compression adjacent the proximal end 2904 of the support post 2900 to bias the support post 2900 toward a barrel 2910 of the nosepiece 2022. An advancer 2912 is mounted on the distal end 2906 of the support post 2900 via a hinge pin 2914. A torsional spring 2916 is disposed on the hinge pin 2914 to bias the advancer 2912 around the hinge pin 2914 toward the nosepiece 2022.

The fastener delivery mechanism 2130 further includes a first rocker arm 2918 rotatably mounted on the nosepiece 2022 via a first post 2920 (e.g., a threaded fastener). The first rocker arm 2918 includes a forked end 2922 that fits around a lateral post 2924 on the distal end of the support post 2900. As shown, the fastener delivery mechanism 2130 also includes a second rocker arm 2926 rotatably mounted on the nosepiece 2022 via a second post 2928 and mounted to the first rocker arm 2918 via a third post 2930. A spring loaded actuator 2932 is installed on a free end of the second rocker arm 2926. The spring loaded actuator 2932 may only rotate in a single direction toward the delivery end of the fastener driver 2000 against the force of a spring which returns it to an upright position.

Figure 93:
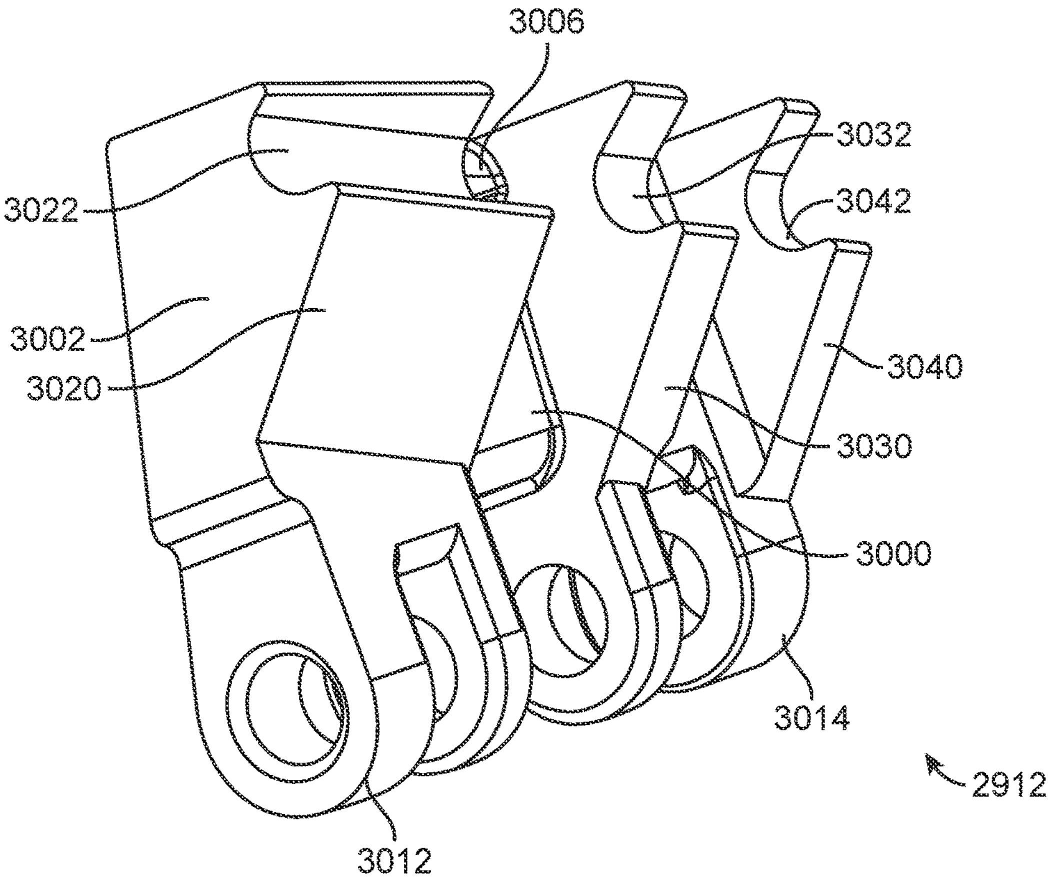
FIG. 93 is a perspective view of an advancer for the fastener delivery mechanism of FIG. 91.
Figure 94:
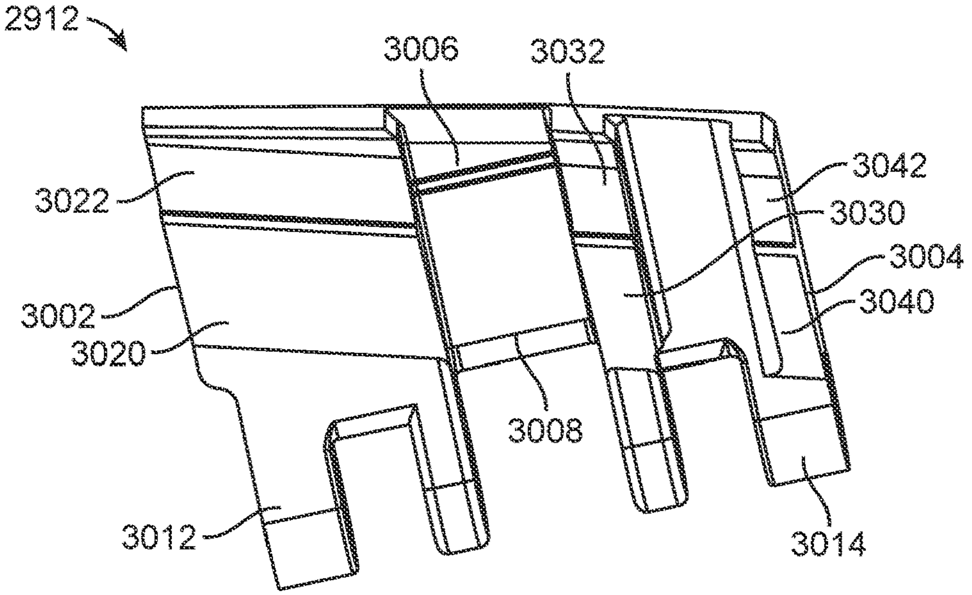
FIG. 94 is a side plan view of the advancer of FIG. 93.
Figure 95:
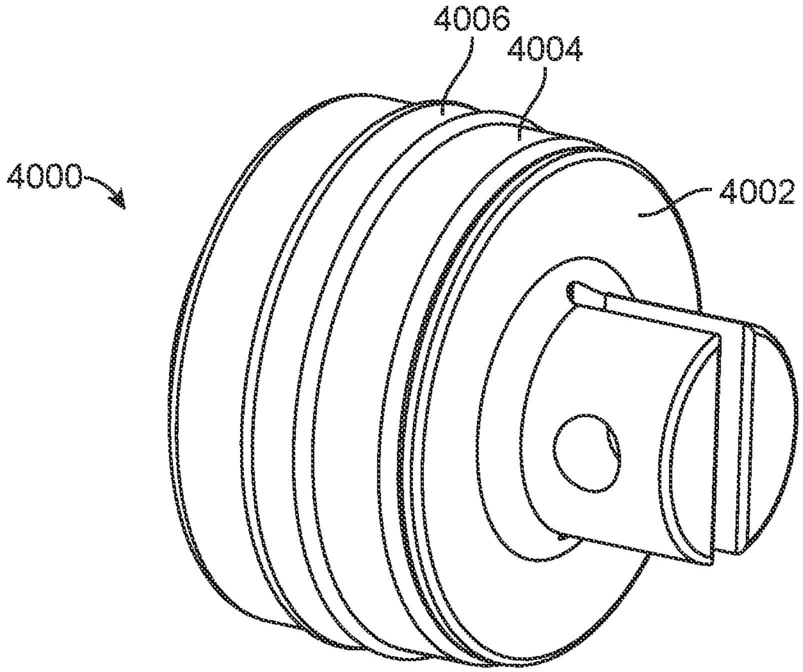
FIG. 95 is a side perspective view of a piston of the fastener driver of FIG. 47.
Figure 96:
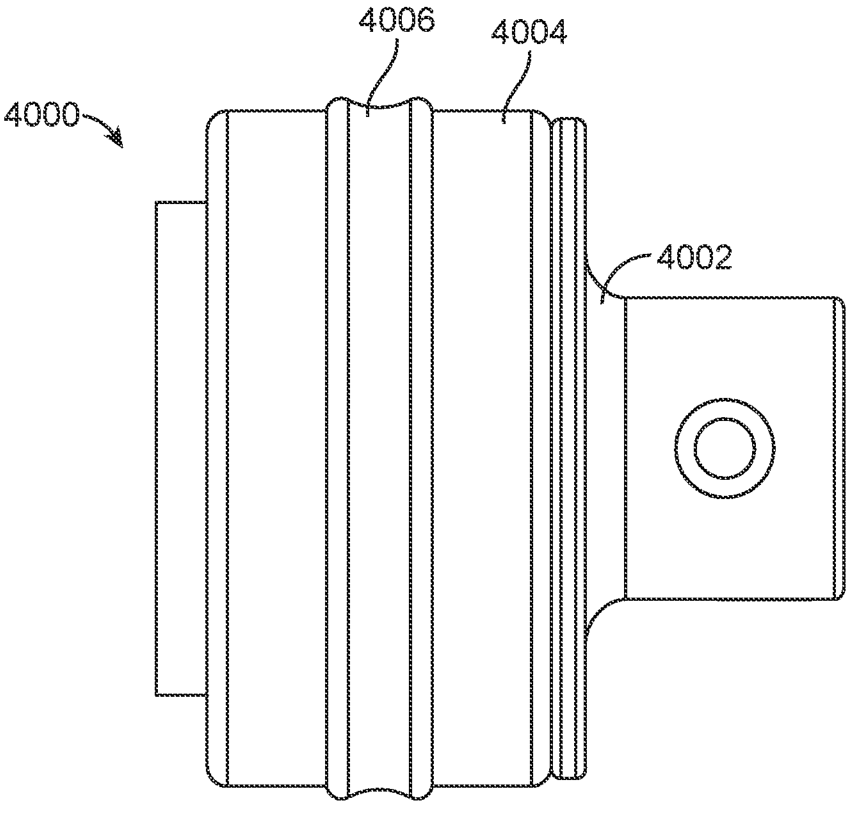
FIG. 96 is a side plan view of the piston of FIG. 95.
Figure 97:
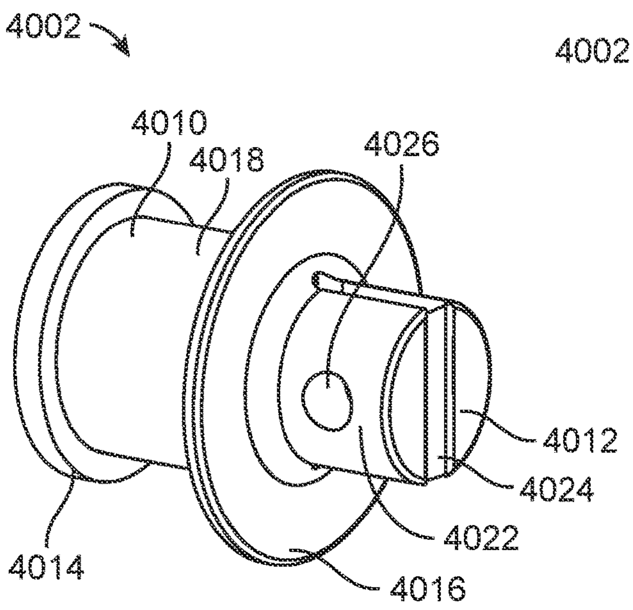
FIG. 97 is a side perspective view of a core of the piston of FIG. 95.
Figure 98:
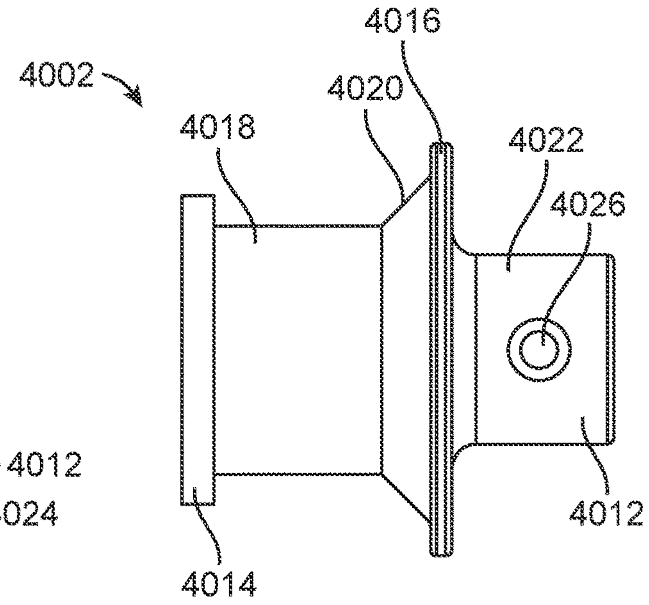
FIG. 98 is a side plan view of the core of FIG. 97.

Referring to FIGS. 93 and 94, the advancer 2912 is illustrated in greater detail. The advancer 2912 includes a body 3000 that includes a first end 3002, a second end 3004, a top 3006, and a bottom 3008. A first pair of hinge barrels 3012 extend in a generally downward direction from the bottom 3008 of the body 3000 near the first end 3002. A second pair of hinge barrels 3014 extend in a generally downward direction from the bottom 3008 of the body 3000 near the second end 3004. The pairs of hinge barrels 3012, 3014 are spaced apart from each other to form an opening that fits over the distal end 2906 of the support post 2900. The hinge pin 2914 fits through both pairs of hinge barrels 3012, 3014 and a bore formed in the distal end 2906 of the support post 2900.

As shown, the advancer 2912 includes a first ramped structure 3020 that extends from the bottom 3008 of the body 3000 toward the top 3006. The first ramped structure 3020 is narrowest at the bottom 3008 and widest at the top 3006. The first ramped structure 3020 terminates at a first groove 3022 near the top 3006 that is sized and shaped to receive a portion of a fastener therein. The advancer 2912 includes a second ramped structure 3030 that extends from the bottom 3008 of the body 3000 toward the top 3006. The second ramped structure 3030 is narrowest at the bottom 3008 and widest at the top 3006. The second ramped structure 3030 terminates at a second groove 3032 near the top 3006 that is sized and shaped to receive a portion of a fastener therein. The advancer 2912 further includes a third ramped structure 3040 that extends from the bottom 3008 of the body 3000 toward the top 3006. The third ramped structure 3040 is narrowest at the bottom 3008 and widest at the top 3006. The third ramped structure 3040 terminates at a third groove 3042 near the top 3006 that is sized and shaped to receive a portion of a fastener therein.

When the driver blade 2064 is fired, or moved to the BDC (i.e., extended or driven) position, the actuator tooth 2166 on the driver blade 2064 moves past the spring loaded actuator 2932, which rotates downward briefly before the spring force returns it to the upright position. As the driver blade 2064 is returned to the TDC (i.e., retracted or ready) position by the lifting mechanism 2080, as described herein, the actuator tooth 2166 on the driver blade 2064 engages the spring loaded actuator 2932 to rotate the second rocker arm 2926 counterclockwise in FIG. 92. This causes the first rocker arm 2918 to rotate clockwise in FIG. 92 and move the support post 2900 away from the barrel 2910 the nosepiece 2022. As the support post 2900 moves away from the barrel 2910, the ramped structures 3020, 3030, 3040 on the advancer 2912 move against a fastener to be loaded and rotate the advancer 2912 outward from the fastener against the spring force provided by the torsional spring 2916 until the grooves 3022, 3032, 3042 are aligned with the fastener to be loaded. When the grooves 3022, 3032, 3042 are aligned with the fastener, the torsional spring 2916 biases the advancer 2912 toward the nosepiece 2022 so that the grooves 3022, 3032, 3042 fit around the fastener. Then, the spring 2908 biases the support post 2900 in an upward direction toward the barrel 2910 of the nosepiece 2022 and loads the fastener that is held within the grooves 3022, 3032, 3042 of the advancer 2912 into the barrel 2910 in a ready position to be expelled from the fastener driver 2000 and driven into a workpiece when the trigger 2030 is actuated.

Finally, FIGS. 95-100 depict the details of a piston 4000 that may be installed within the fastener driver 2000 in lieu of the piston 2062 illustrated in FIG. 52. As shown, the piston 4000 includes a generally cylindrical core 4002 having a guide 4004 disposed therearound. In a particular aspect, the guide 4004 is co-molded around the core 4002. Further, a seal 4006 is disposed around the guide 4004. The core 4002 includes a proximal end 4010 and a distal end 4012. A first flange 4014 is formed at the proximal end 4010 of the core 4002 and a second flange 4016 is formed near a midpoint of the core 4002. The core 4002 includes a first cylindrical portion 4018 that extends from the first flange 4014 to a ramped surface 4020 that is adjacent the second flange 4016. A second cylindrical portion 4022 extends from the second flange 4016 to the distal end 4012. The core 4002 further includes a longitudinal slot 4024 that extends into the second cylindrical portion 4022 from the distal end 4012 to the second flange 4016. A lateral bore 4026 extends through the second cylindrical portion 4022 and is perpendicular to the longitudinal slot 4024. The slot 4024 is configured to receive a connector portion on an end of a driver blade, e.g., the connector portion 2150 formed on the proximal end 2066 of the driver blade 2064 shown in FIGS. 54-57. A pin may extend through the lateral bore 4026 of the core 4002 and through the lateral bore 2152 of the driver blade 2064.

Figure 99:
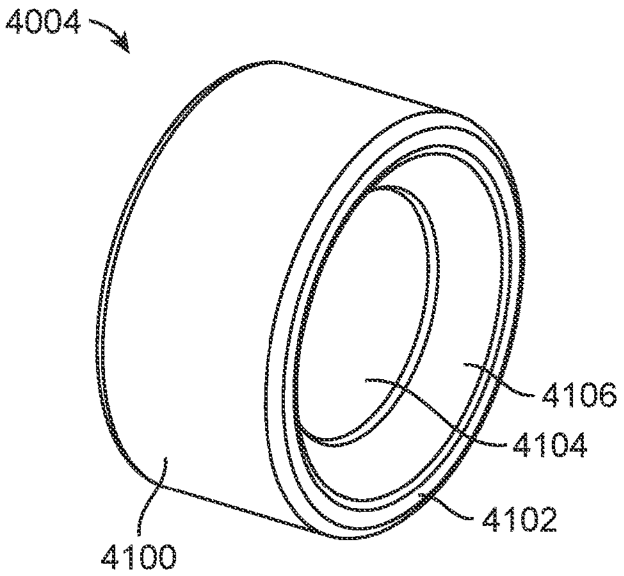
FIG. 99 is a side perspective view of a plastic guide of the piston of FIG. 95.
Figure 100:
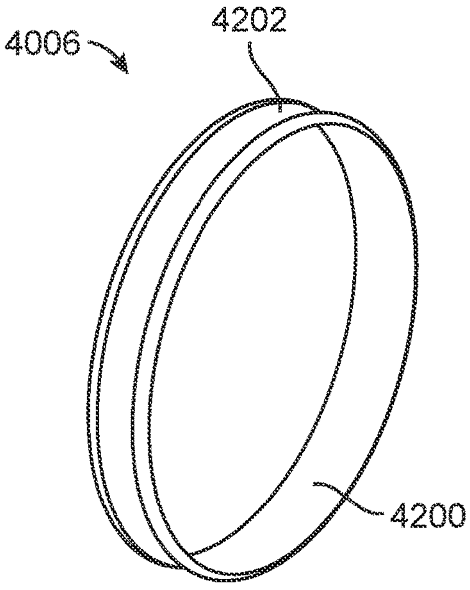
FIG. 100 is a side perspective view of a seal of the piston of FIG. 95.

As shown in FIG. 99, the guide 4004 includes a proximal end 4100 and a distal end 4102. A central bore 4104 extends along the length of the guide 4004 between the proximal end 4100 and the distal end 4102. The central bore 4104 includes a ramped surface 4106 adjacent the distal end 4102 of the guide 4004. The ramped surface 4106 of the central bore 4104 of the guide 4004 is configured to match the ramped surface 4020 on the core 4002. As shown in FIG. 100, the seal 4006 is generally shaped with a generally flat inner surface 4200 and a generally concave outer surface 4204. In a particular aspect, the core 4002 is made from a metal material, the guide 4004 is made from a plastic material, and the seal 4006 is made from rubber.

Figure 101:
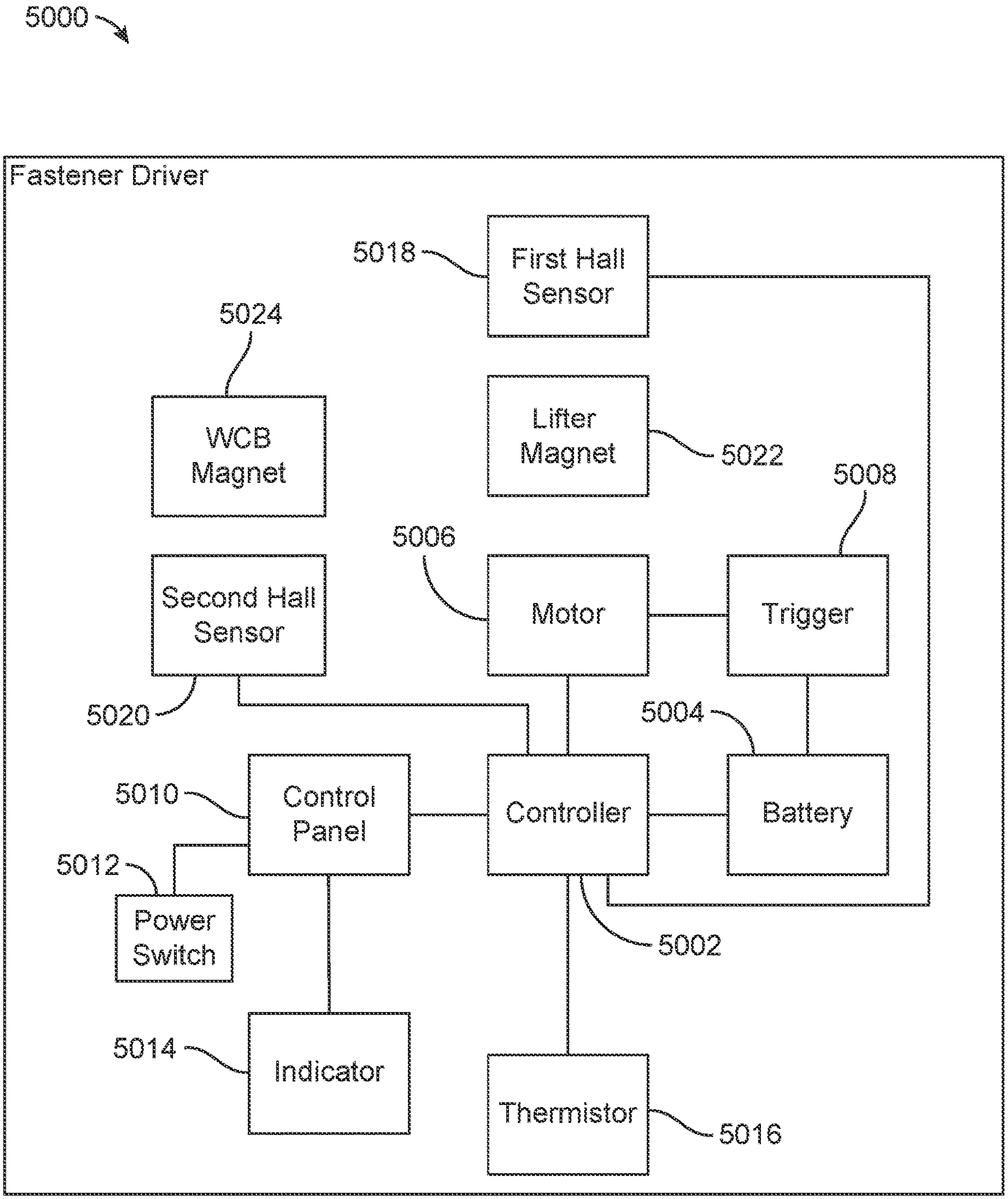
FIG. 101 is a block diagram of a gas-spring powered fastener driver according to an embodiment.

Referring now to FIG. 101, a block diagram of a gas spring-powered fastener driver 5000 is illustrated. The fastener driver 5000 illustrated in FIG. 101 may be similar to any of the previously described gas spring-powered fastener drivers 10, 300, 400, 410, 600, 700, 900, 1000, 2000. The fastener driver 5000 includes a controller 5002 having a battery 5004 and a motor 5006 connected thereto. A trigger 5008 is connected between the battery 5004 and the motor 5006 and is operable to energize the motor 5006 to expel a fastener from the fastener driver 5000. FIG. 101 further shows that a control panel 5010 is operably coupled to the controller 5002. The control panel 5010 includes a power switch 5012 and at least one indicator 5014. The indicator may be an audible indicator, a visual indicator, or a combination of both. The fastener driver 5000 also includes a plurality of sensors operably coupled to the controller 5002. For example, the fastener driver 5000 includes a thermistor 5016, a first Hall sensor 5018, and a second Hall sensor 5020. The thermistor 5016 is installed within a port of a storage chamber cylinder to detect the temperature of the gas stored therein. The first Hall sensor 5018 is installed in a sensor bracket above the motor 5006 to detect the presence of a lifter magnet 5022 on a lifter that rotates with the motor 5006. When the first Hall sensor 5018 detects the presence of the lifter magnet 5022, the controller de-energizes the motor 5006. The second Hall sensor 5020 detects the presence of a workpiece contact bracket (WCB) magnet 5024. When the WCB magnet 5024 is detected, the fastener driver 5000 is allowed to fire. On the other hand, when the WCB magnet 5024 is not detected, the fastener driver 5000 unable to fire.

Figure 102:
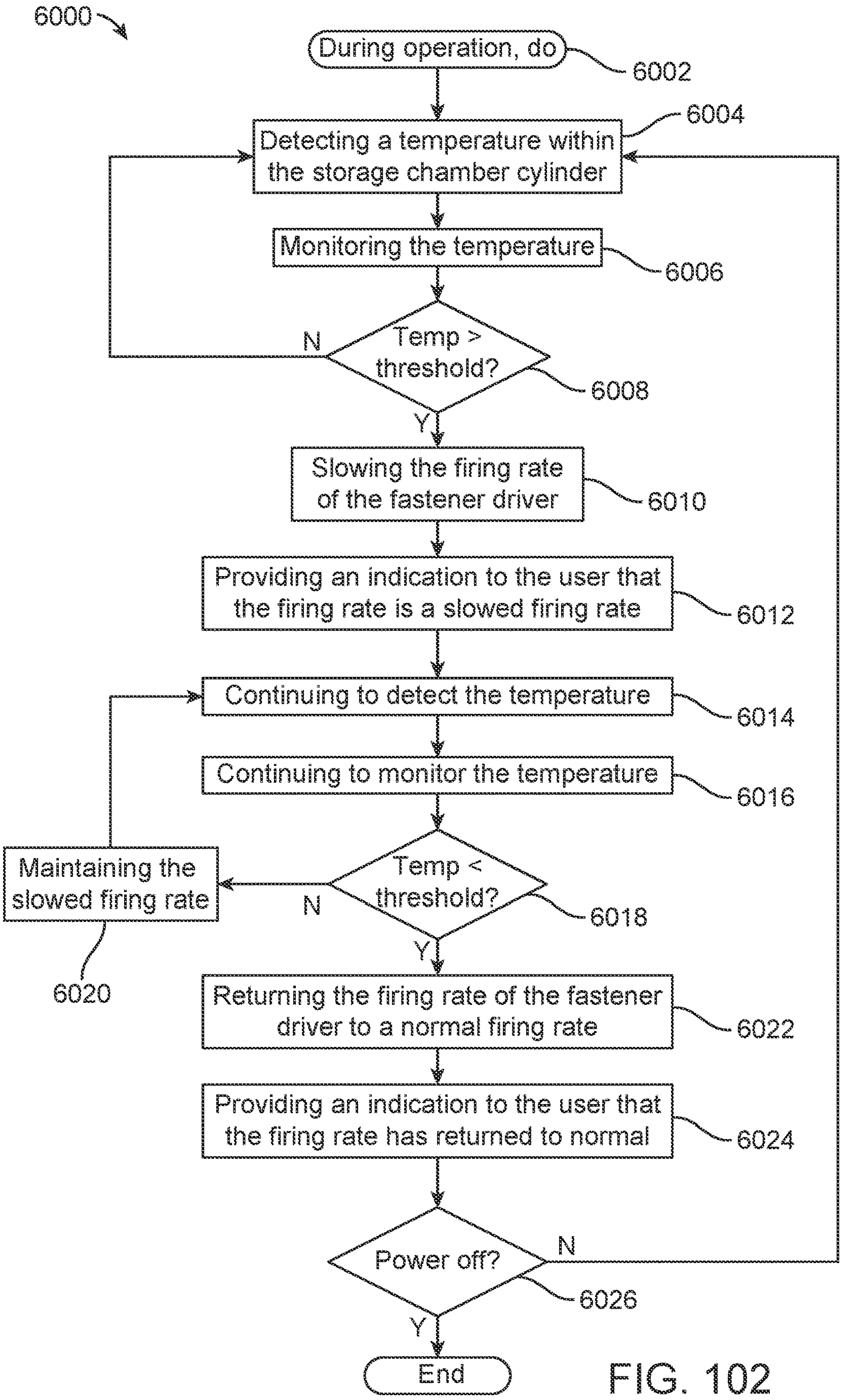
FIG. 102 is a flow chart representing a method of operating a gas-spring powered fastener driver according to an embodiment.
Figure 103:
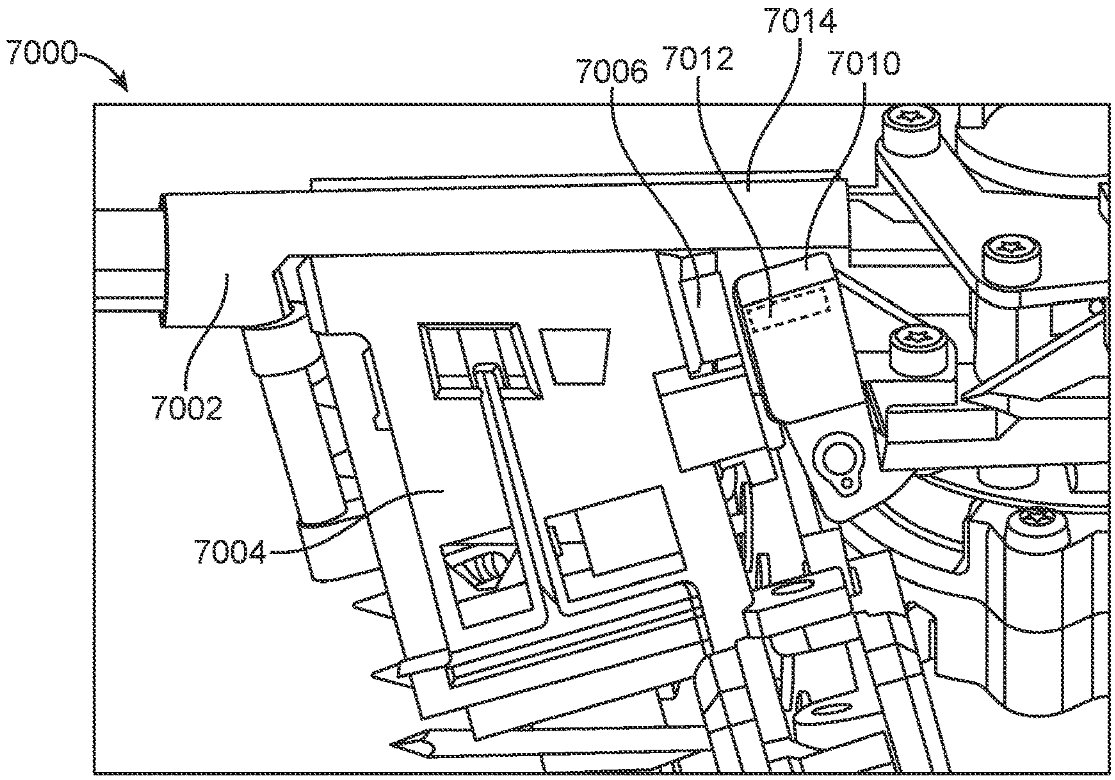
FIG. 103 is a partial view of a gas-spring powered fastener driver in accordance with another embodiment of the invention.
Figure 104:
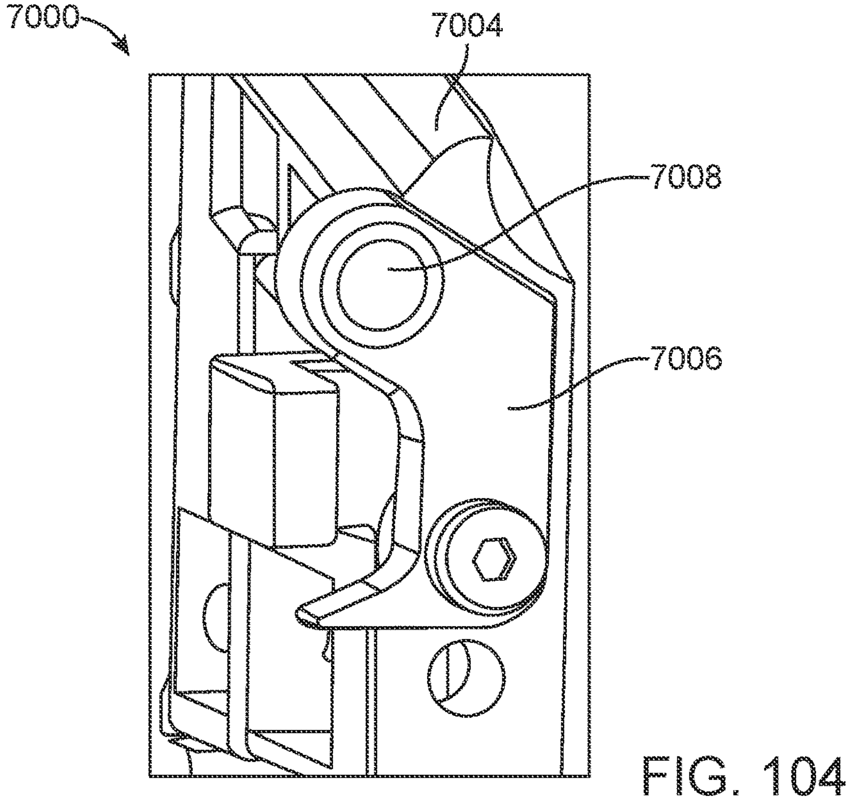
FIG. 104 is a partial end view of the fastener driver of FIG. 103.

Referring to FIG. 102, a method of operation for a gas spring-powered fastener driver is illustrated and is generally designated 6000. The method 6000 commences at step 6002 with a do loop in which during operation, the following steps are performed. At block 6004, the method 6000 includes detecting a temperature within the storage chamber cylinder. Thereafter, at block 6006, the method 6000 includes monitoring the temperature within the storage chamber cylinder during the operation of the fastener driver. The temperature may be monitored via a thermistor that is in fluid communication with the interior of the storage chamber cylinder and the gas stored therein. Depending on the type of thermistor, the resistance will increase or decrease based on the temperature change. A controller operably coupled to the thermistor is able to detect this change in resistance.

Moving to decision 6008, the method 6000 includes determining whether the monitored temperature is greater than a threshold. If the temperature is less than the threshold, the method 6000 returns to block 6004 and continues as described herein. On the other hand, if the temperature is greater than the threshold, the method 6000 moves to block 6010 and includes slowing a firing rate of the fastener driver. The firing rate of the fastener driver may be slowed by slowing the motor coupled with the lifter. Thereafter, at block 6012, the method 6000 includes providing an indication to the user that the firing rate has slowed due to the temperature increase detected within the storage chamber cylinder. For example, an interface or control panel on the fastener driver may provide an audible indicator (e.g., a beep or series of beeps), a visual indicator (e.g., blinking a light), or a combination thereof.

Proceeding to block 6014, the method 6000 includes continuing to detect the temperature. Then, at block 6016, the method 6000 includes continuing to monitor the temperature. At decision 6018, the method 6000 includes determining whether the temperature has fallen below the threshold. If the temperature remains above the threshold, the method 6000 proceeds to block 6020 and the method 6000 includes maintaining the slowed firing rate. Thereafter, the method 6000 returns to block 6014 and continues as described herein. Conversely, if the temperature falls below the threshold, the method 6000 moves to block 6022 and the method 6000 includes returning the firing rate of the fastener driver to the normal firing rate, e.g., the firing rate before the rate was slowed due to the temperature increase. Next, at block 6024, the method 6000 includes providing an indication to the user that the firing rate has returned to normal. At decision 6026, the method 6000 includes determining when the fastener driver is powered off. If the fastener driver remains powered on, the method 6000 returns to block 6004 and continues as described herein. However, if the fastener driver is powered off, the method 6000 ends.

With reference to FIGS. 103-106, another gas spring-powered fastener driver 7000 is illustrated. The fastener driver 7000 illustrated in FIGS. 103-106 may be similar to any of the previously described gas spring-powered fastener drivers 10, 300, 400, 410, 600, 700, 900, 1000, 2000, 5000. The fastener driver 7000 includes a nosepiece 7002 on which a fastener delivery mechanism 7004 is mounted. The fastener driver 7000 also includes a spring-loaded dry-fire lockout lever 7006 rotatably mounted on or adjacent the fastener delivery mechanism 7004. The dry-fire lockout lever 7006 includes a magnet 7008 disposed therein. The fastener driver 7000 includes a sensor bracket 7010 mounted near the fastener delivery mechanism 7004. The sensor bracket 7010 includes a sensor 7012, e.g., a Hall sensor, that is configured to detect the presence of the magnet 7008. As shown, the nosepiece 7002 includes a barrel 7014 in which a fastener is disposed prior to being driven into a workpiece when the fastener driver 7000 is fired.

Figure 105:
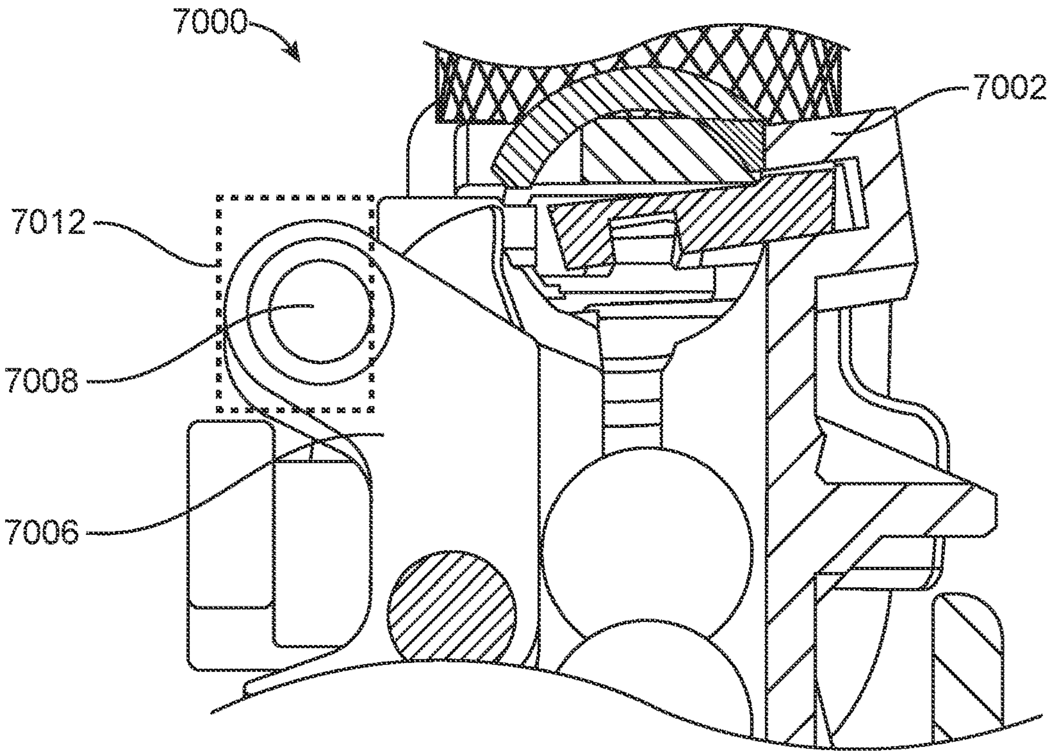
FIG. 105 is a partial end view of the fastener driver of FIG. 103.
Figure 106:
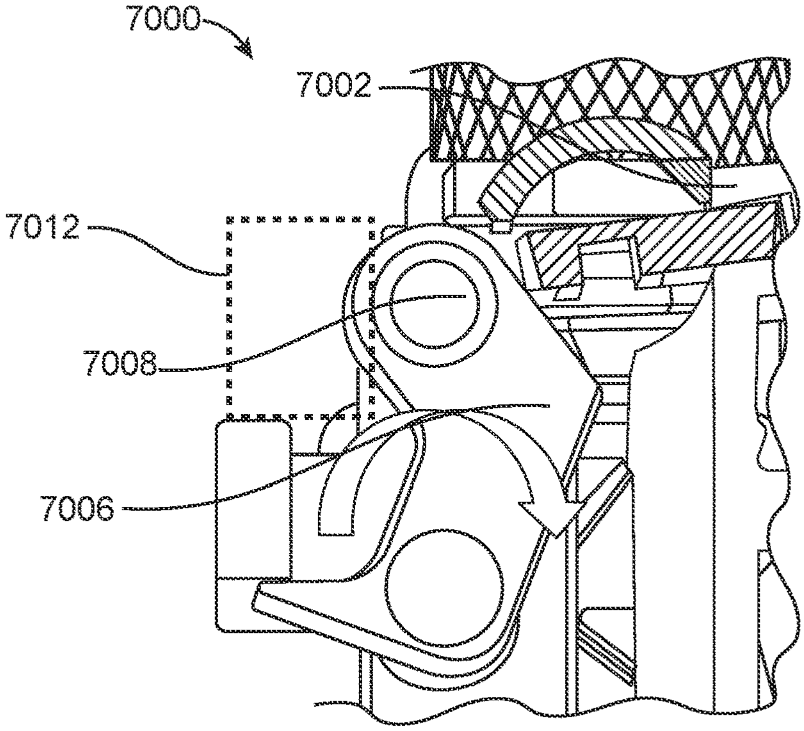
FIG. 106 is a partial end view of the fastener driver of FIG. 103.
Figure 107:
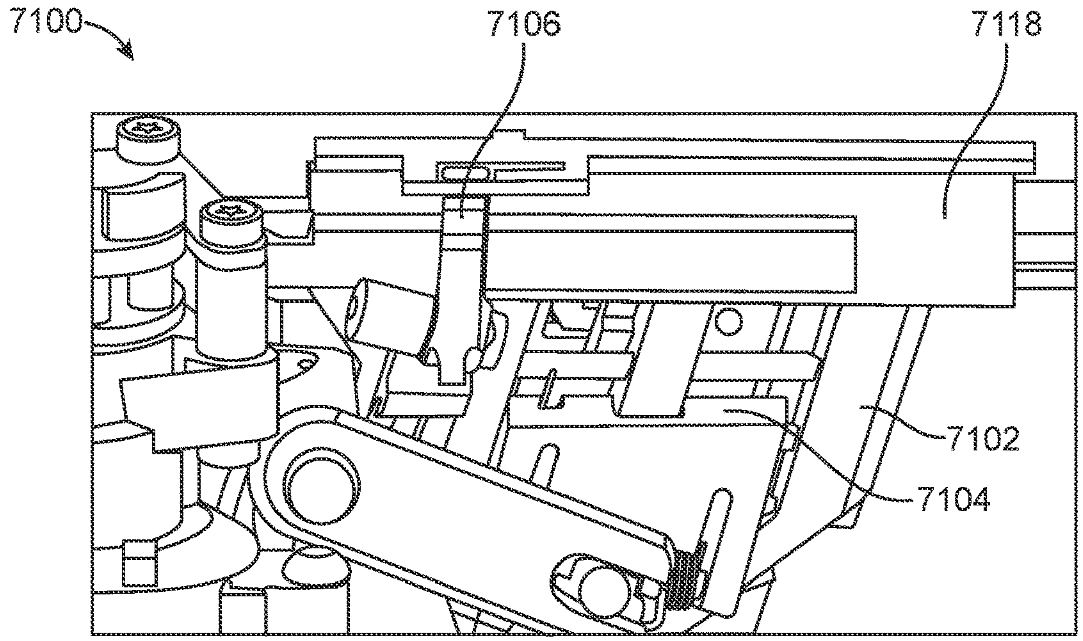
FIG. 107 is a partial view of a gas-spring powered fastener driver in accordance with another embodiment of the invention.
Figure 108:
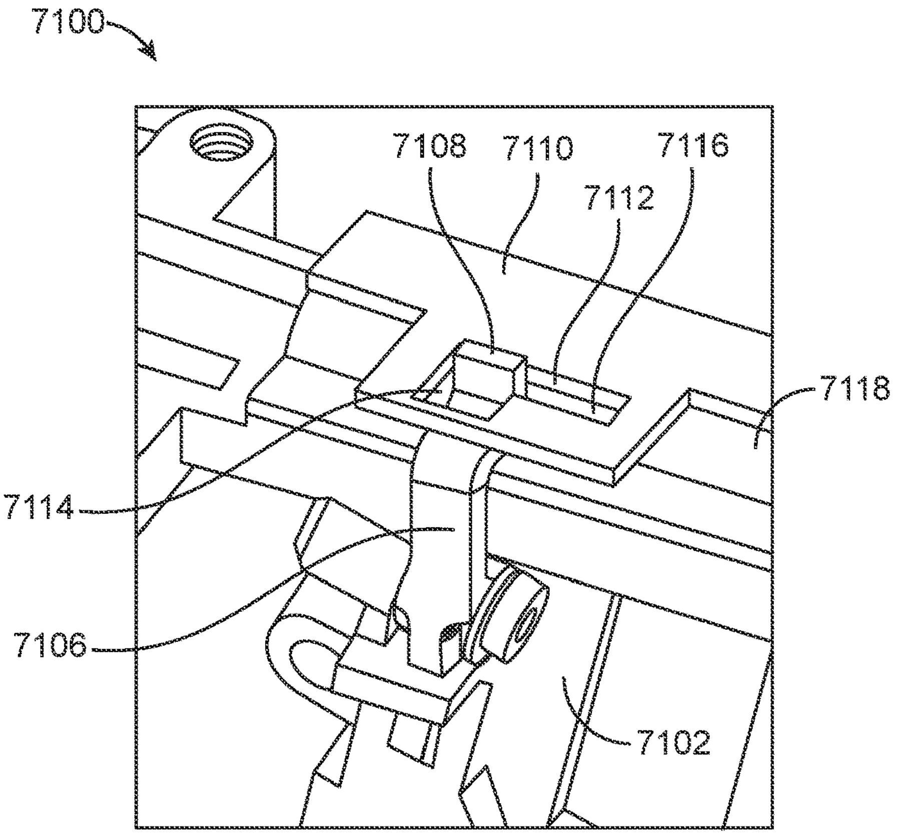
FIG. 108 is a partial view of the fastener driver of FIG. 107.

When a fastener 7016 moves along the fastener delivery mechanism 7004 to the barrel 7014 of the nosepiece, as shown in FIG. 105, the fastener 7016 rotates the dry-fire lockout lever 7006 so that the magnet 7008 moves into position to be detected by the sensor 7012. When the sensor 7012 detects the magnet 7008, a controller operably coupled to the sensor 7012 allows the fastener driver 7000 to be fired. Conversely, when a fastener is not present in the fastener delivery mechanism 7004, as illustrated in FIG. 106, the spring-loaded dry-fire lockout lever 7006 is rotated toward the nosepiece 7002 and the magnet 7008 moves away from sensor 7012 to a position in which the magnet 7008 is not detected by the sensor 7012. If the sensor 7012 does not detect the magnet 7008, the controller does not allow the fastener driver 7000 to be fired.

FIGS. 107-112 depicts another powered fastener driver 7100. The fastener driver 7100 illustrated in FIGS. 107-1112 may be similar to any of the previously described gas spring-powered fastener drivers 10, 300, 400, 410, 600, 700, 900, 1000, 2000, 5000, 7000. The fastener driver 7100 includes a nosepiece 7102 on which a fastener delivery mechanism 7104 is mounted. The fastener driver 7100 also includes a spring-loaded dry-fire lockout lever 7106 rotatably mounted adjacent the fastener delivery mechanism 7104. The dry-fire lockout lever 7106 includes a locking tab

7108 extending therefrom. The fastener driver 7100 includes a workpiece contact bracket 7110 slidably disposed on the nosepiece 7102. The workpiece contact bracket 7110 includes a slot 7112 having a locking portion 7114 and a clearance portion 7116. As shown, the nosepiece 7102 includes a barrel 7118 in which a fastener is disposed prior to being driven into a workpiece when the fastener driver 7100 is fired.

Figure 109:
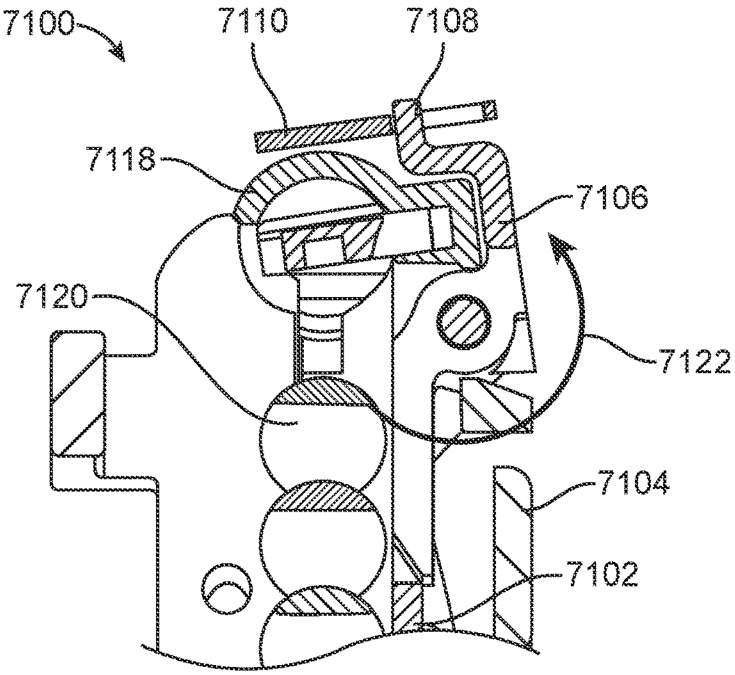
FIG. 109 is a partial end view of the fastener driver of FIG. 107.
Figure 110:
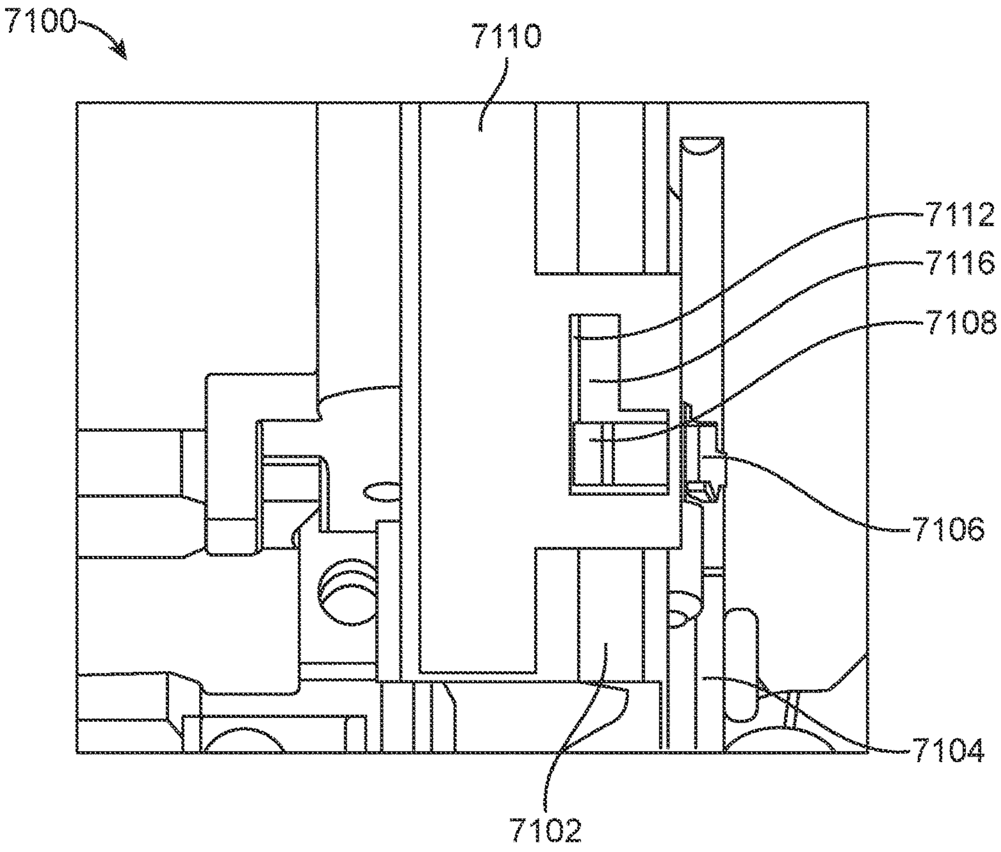
FIG. 110 is a partial top view of the fastener driver of FIG. 107.

When a fastener 7120 moves along the fastener delivery mechanism 7104 to the barrel 7118 of the nosepiece, as shown in FIG. 109, the fastener 7120 rotates the dry-fire lockout lever 7106 counterclockwise, as indicated by arrow 7122, so that the locking tab 7108 moves into the clearance portion 7116 of the slot 7112 on the workpiece contact bracket 7110, as shown in FIG. 110. Thus, the workpiece contact bracket 7110 is able to slide on the nosepiece and a magnet on the workpiece contact bracket 7110 is moveable to a position in which the magnet is detectable by a sensor. When the sensor detects the magnet, a controller operably coupled to the sensor allows the fastener driver 7100 to be fired.

Figure 111:
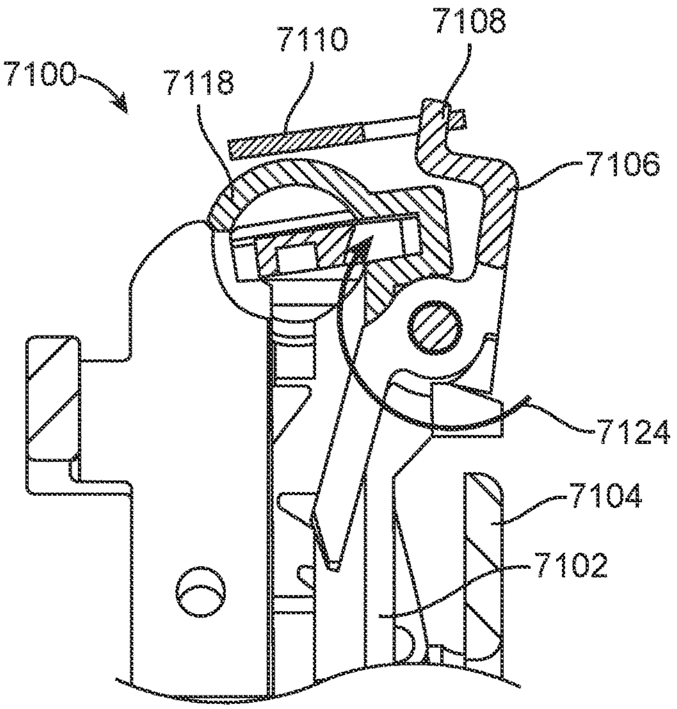
FIG. 111 is a partial end view of the fastener driver of FIG. 107.
Figure 112:
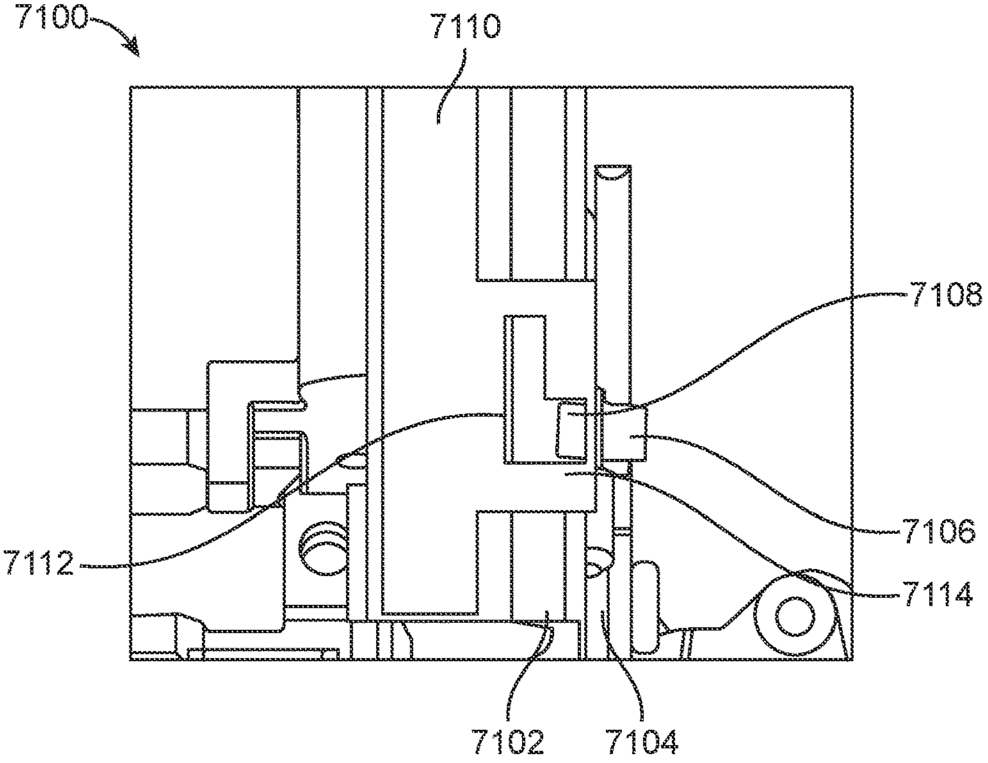
FIG. 112 is a partial top view of the fastener driver of FIG. 107.
Figure 113:
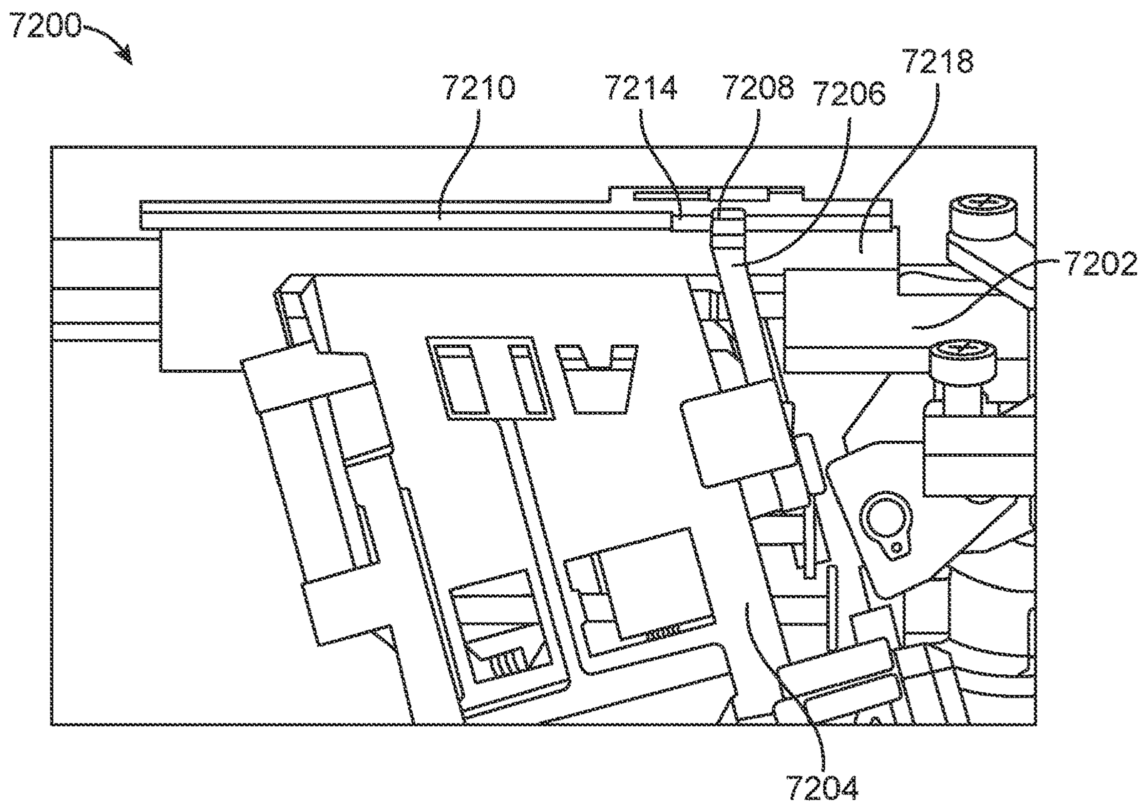
FIG. 113 is a partial view of a gas-spring powered fastener driver in accordance with another embodiment of the invention.
Figure 114:
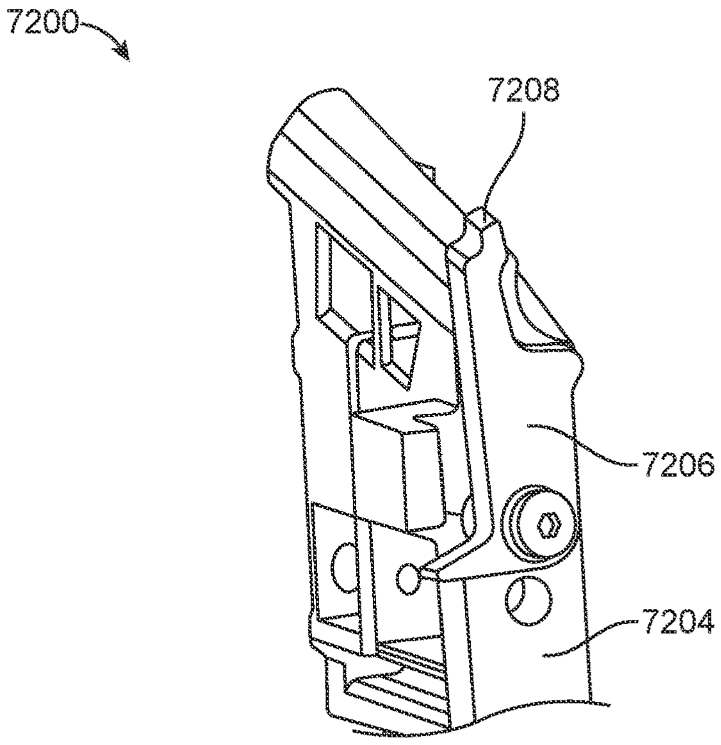
FIG. 114 is a partial end view of the fastener driver of FIG. 113.

Conversely, when a fastener is not present in the fastener delivery mechanism 7104, as illustrated in FIG. 111, the spring-loaded dry-fire lockout lever 7106 is rotated clockwise, as indicated by arrow 7124, so that the locking tab 7108 moves into the locking portion 7114 of the slot 7112 on the workpiece contact bracket 7110, as shown in FIG. 112. Thus, the workpiece contact bracket 7110 is unable to slide on the nosepiece and a magnet on the workpiece contact bracket 7110 is unable to be detected by a sensor. As such, the fastener driver 7100 is not able to be fired.

FIGS. 113-118 depicts another powered fastener driver 7200. The fastener driver 7200 illustrated in FIGS. 113-118 may be similar to any of the previously described gas spring-powered fastener drivers 10, 300, 400, 410, 600, 700, 900, 1000, 2000, 5000, 7000, 7100. The fastener driver 7200 includes a nosepiece 7202 on which a fastener delivery mechanism 7204 is mounted. The fastener driver 7200 also includes a spring-loaded dry-fire lockout lever 7206 rotatably mounted on the fastener delivery mechanism 7204. The dry-fire lockout lever 7206 includes a locking tab 7208 extending therefrom. The fastener driver 7200 includes a workpiece contact bracket 7210 slidably disposed on the nosepiece 7202. The workpiece contact bracket 7210 includes a locking tab 7214 thereon. As shown, the nosepiece 7202 includes a barrel 7218 in which a fastener is disposed prior to being driven into a workpiece when the fastener driver 7200 is fired.

Figure 115:
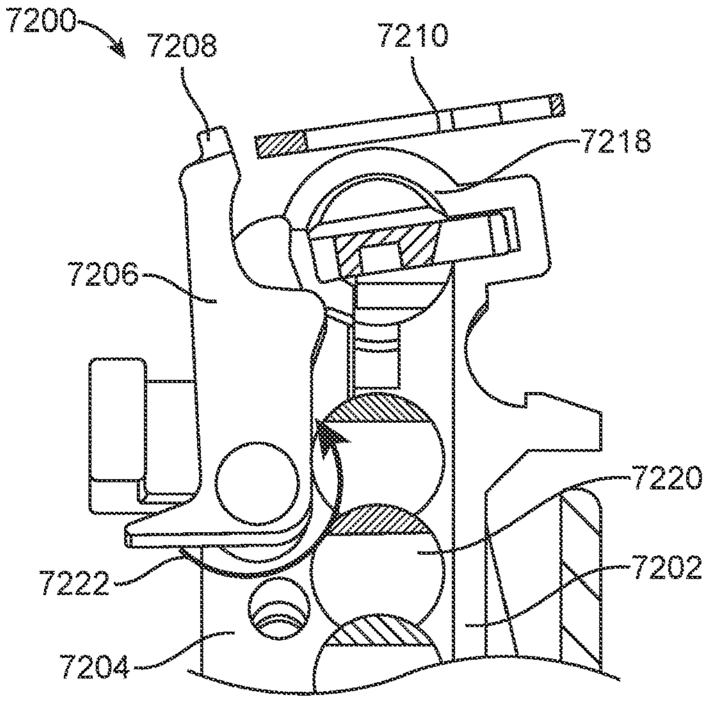
FIG. 115 is a partial end view of the fastener driver of FIG. 113.
Figure 116:
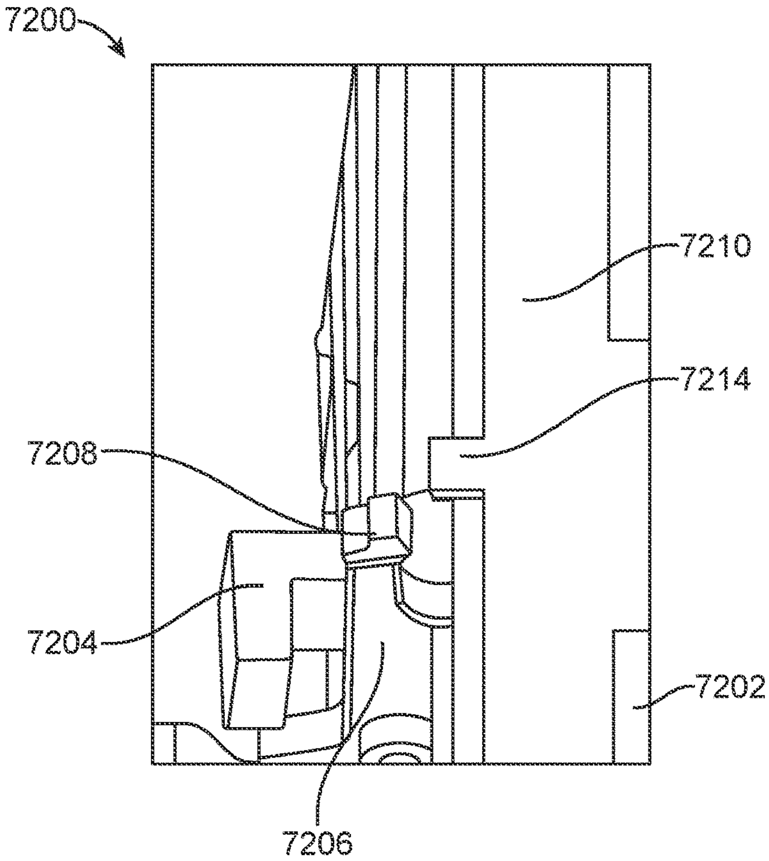
FIG. 116 is a partial top view of the fastener driver of FIG. 113.

When a fastener 7220 moves along the fastener delivery mechanism 7204 toward the barrel 7218 of the nosepiece, as shown in FIG. 115, the fastener 7216 rotates the dry-fire lockout lever 7206 counterclockwise, as indicated by arrow 7222, so that the locking tab 7208 on the dry-fire lockout lever 7206 moves away from the locking tab 7214 on the workpiece contact bracket 7210, as shown in FIG. 116. Thus, the workpiece contact bracket 7210 is able to slide on the nosepiece and a magnet on the workpiece contact bracket 7210 is moveable to a position in which the magnet is detectable by a sensor. When the sensor detects the magnet, a controller operably coupled to the sensor allows the fastener driver 7200 to be fired.

Figure 117:
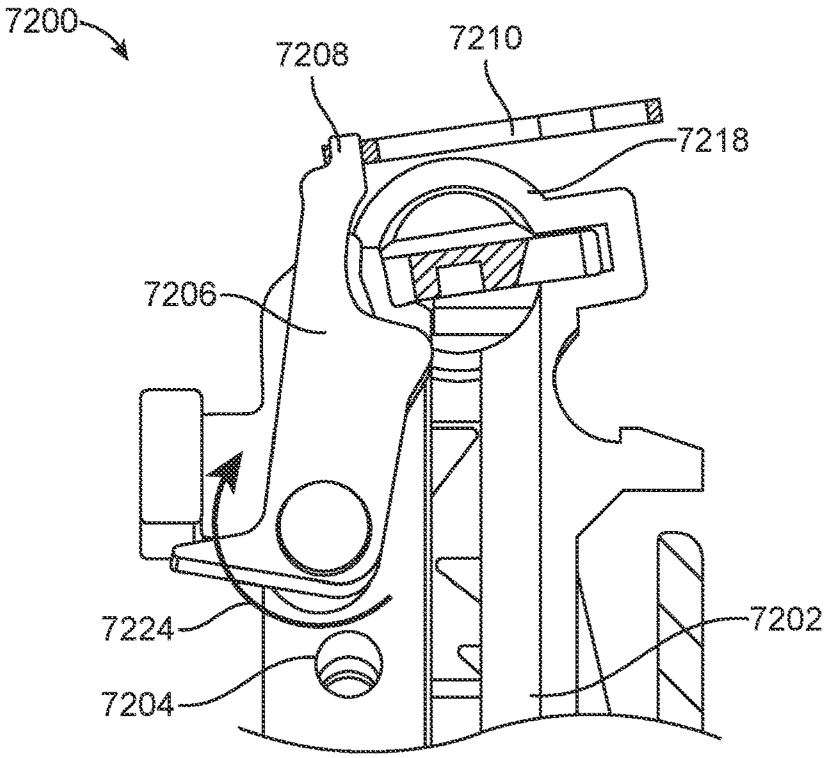
FIG. 117 is a partial end view of the fastener driver of FIG. 113.
Figure 118:
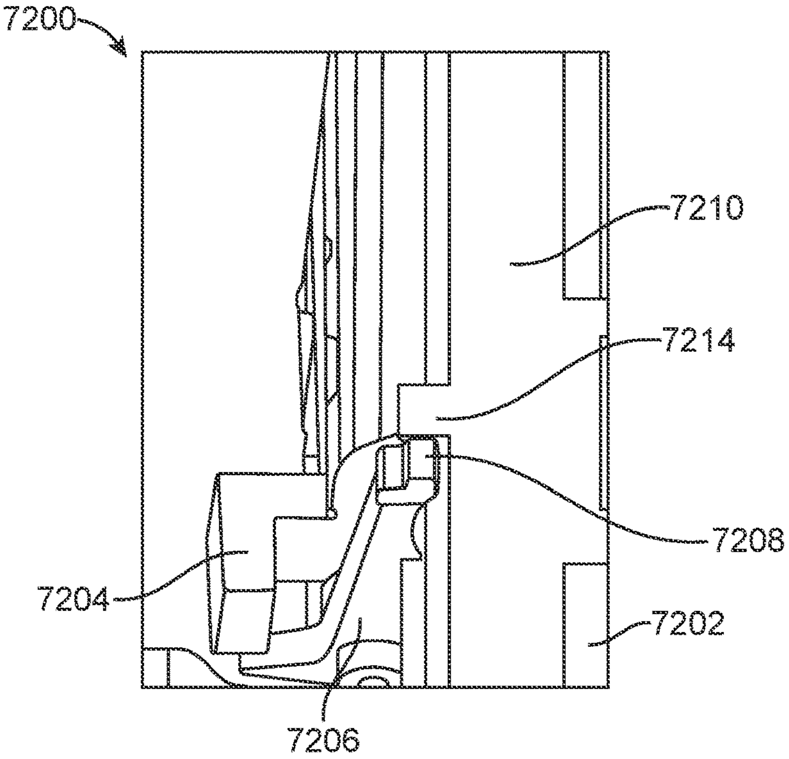
FIG. 118 is a partial top view of the fastener driver of FIG. 113.

On the other hand, when a fastener is not present in the fastener delivery mechanism 7204, as illustrated in FIG. 117, the spring-loaded dry-fire lockout lever 7206 is rotated clockwise, as indicated by arrow 7224, so that the locking tab 7208 moves into a position that blocks the locking tab 7214 of the workpiece contact bracket 7210, as shown in FIG. 118. As such, the workpiece contact bracket 7210 is unable to slide on the nosepiece and a magnet on the workpiece contact bracket 7210 is unable to be detected by a sensor. Accordingly, the fastener driver 7200 is not able to be fired.

Figure 119:
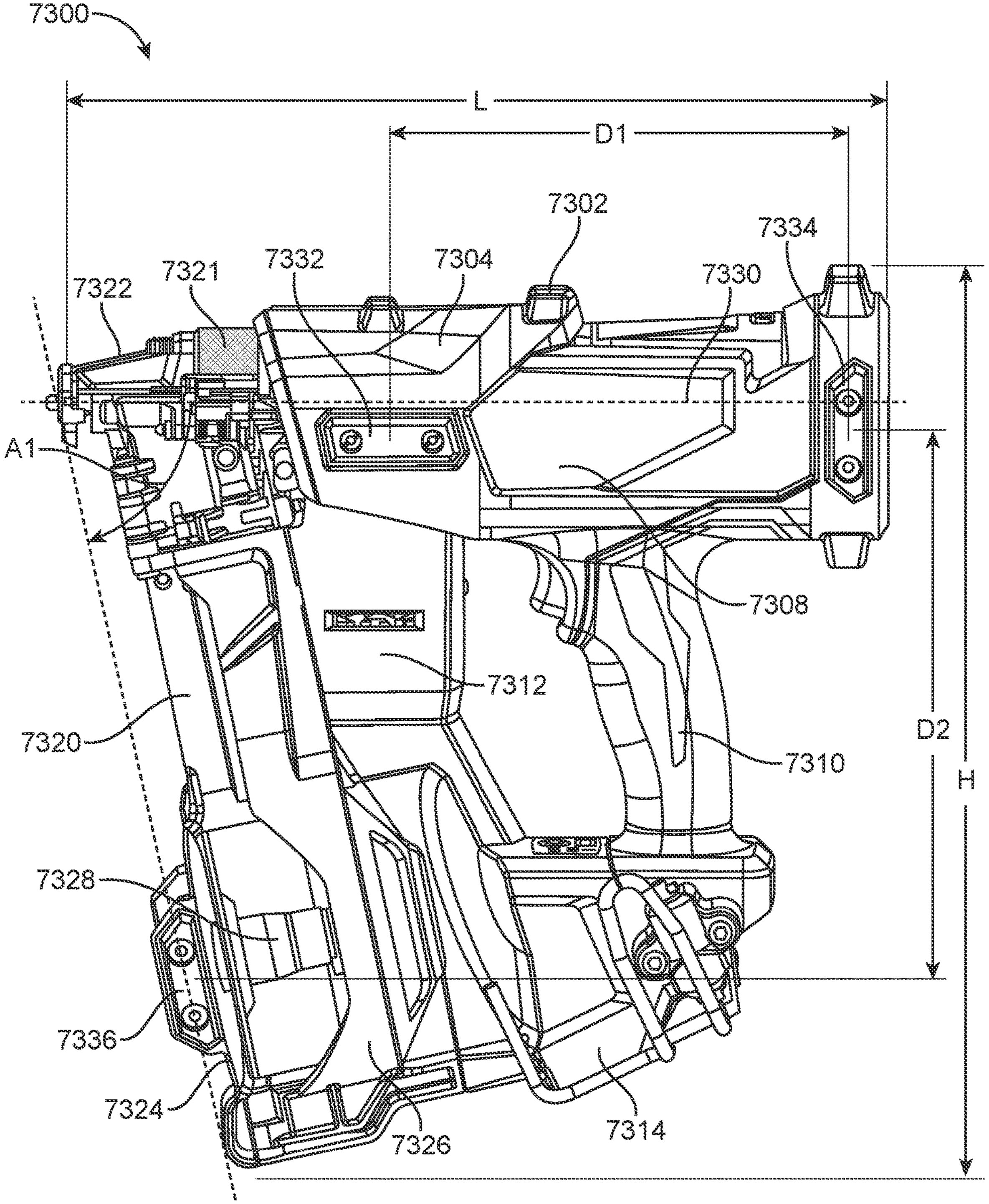
Figure 120:
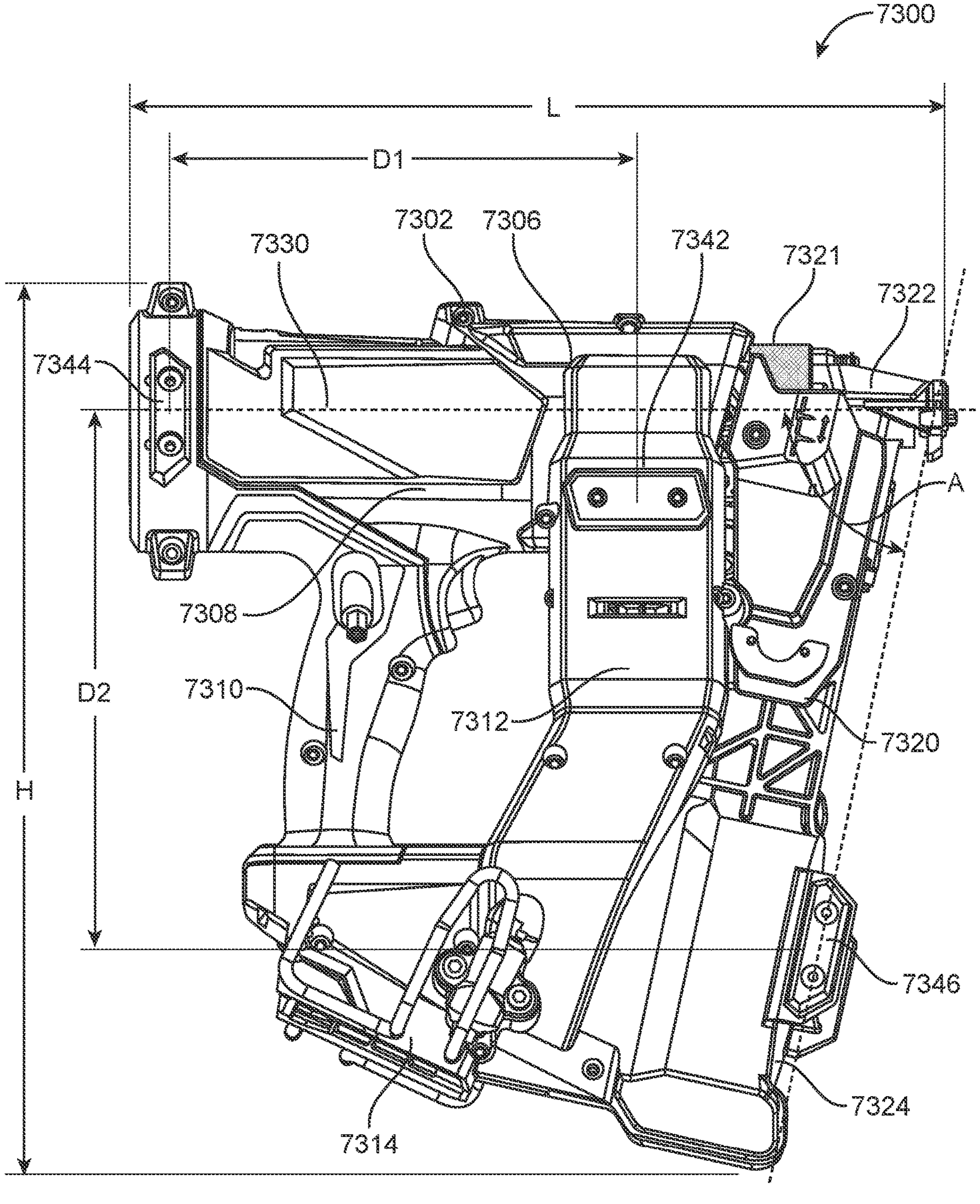
Figure 121:
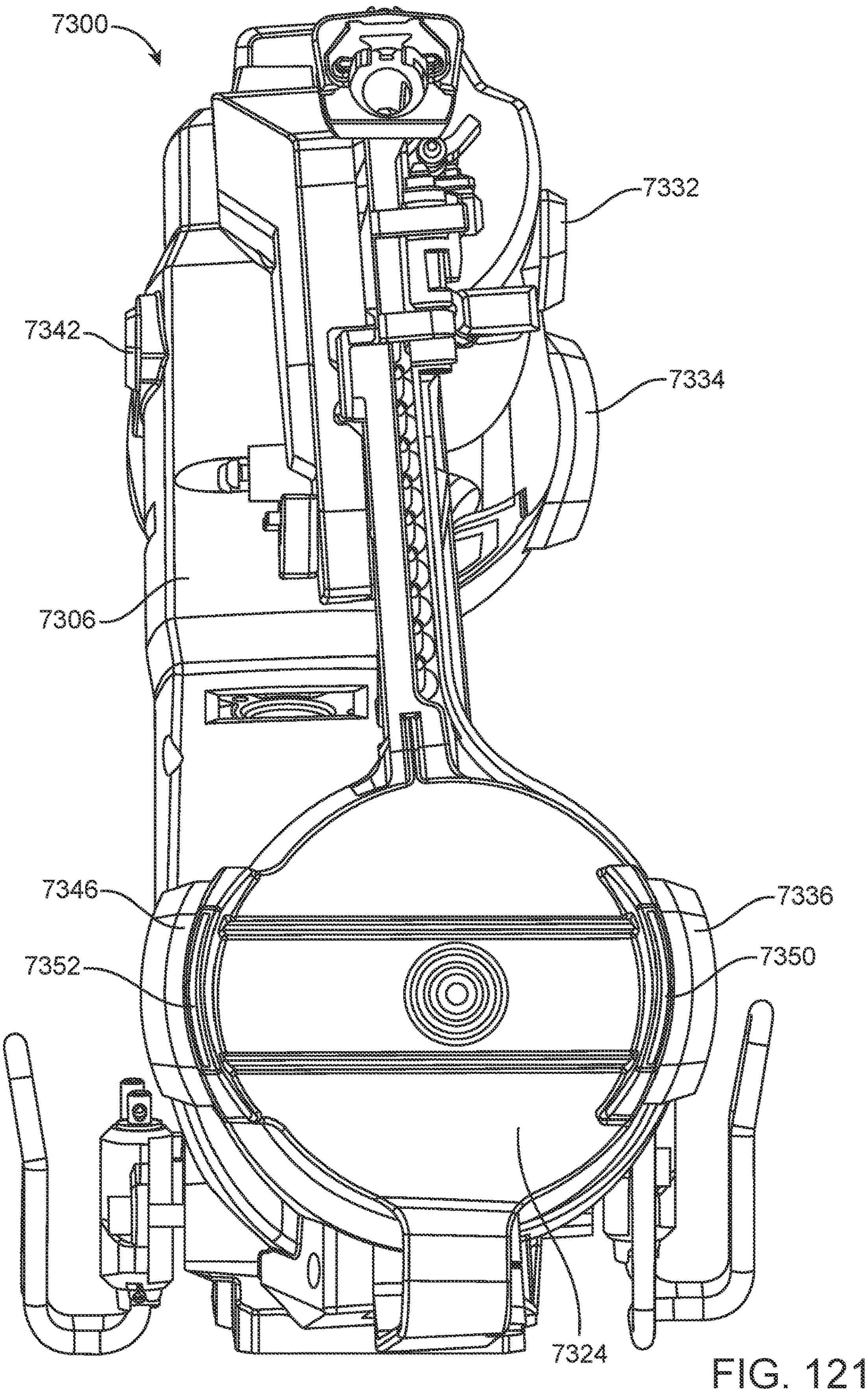

Referring to FIGS. 119-121, another embodiment of a gas spring-powered fastener driver 7300 is illustrated. The fastener driver 7300 illustrated in FIGS. 119-121 may be similar to any of the previously described gas spring-powered fastener drivers 10, 300, 400, 410, 600, 700, 900, 1000, 2000, 5000, 7000, 7100, 7200. The fastener driver 7300 includes a housing 7302 having a first housing shell 7304 joined to a second housing shell 7306. The housing 7302 includes a head portion 7308 having a handle portion 7310 and a drive unit housing portion 7312 extending therefrom. The housing 7302 also includes a battery receptacle portion 7314 that extends from the handle portion 7310 and is sized and shaped to receive a removable battery pack there. Further, the housing 7302 includes a fastener delivery portion 7320 that extends along the drive unit housing portion 7312 from a nosepiece 7321 to a magazine receptacle portion 7324 adjacent the battery receptacle portion 7314. A workpiece contact bracket 7322 is slidably disposed on the nosepiece 7321.

As shown, the magazine receptacle portion 7324 is generally cylindrical and is sized and shaped to receive coiled fasteners therein. A magazine cover 7326 is rotatably disposed on the housing 7302 and provides access to a magazine 7328 that may be removably disposed within the magazine receptacle portion 7324. The magazine 7328 is a canister magazine which contains a coiled strip of collated nails. Individual fasteners are sequentially loaded from the magazine 7328 to the nosepiece 7321 via the fastener delivery portion 7320 during operation of the fastener driver 7300.

As shown in FIG. 119, the fastener driver 7300 defines a driving axis 7330 along which fasteners are driven from the fastener driver 7300 in a workpiece. Further, as depicted, the fastener driver 7300 includes a first sinister wear pad 7332 that is disposed on the head portion 7308 of the first housing shell 7304 near the nosepiece 7321. The first sinister wear pad 7332 extends in a direction that is parallel to the driving axis 7330. The fastener driver 7300 further includes a second sinister wear pad 7334 that is disposed on the head portion 7308 of first housing shell 7304 near the end of the head portion 7308 opposite the nosepiece 7321. The second wear pad 7332 extends in a direction that is perpendicular to the driving axis 7330. Further, the second sinister wear pad 7334 is located a distance D1 from the first sinister wear pad 7332 as measured from center-to-center of the first sinister wear pad 7332 to the second sinister wear pad 7334. In a particular aspect, the distance D1 is less than the overall length L of the fastener driver 7300. Specifically, D1 is less than or equal to 0.75 L, such as less than or equal to 0.70 L, less than or equal to 0.65 L, less than or equal to 0.60 L, or less than or equal to 0.55 L. In another aspect, D1 is greater than or equal to 0.30 L, such as greater than or equal to 0.35 L, greater than or equal to 0.40 L, greater than or equal to 0.45 L, or greater than or equal to 0.50 L. It is to be understood that D1 may be within a range between, and including, any of the maximum and minimum values of D1 described herein.

As further shown in FIG. 119, the fastener driver 7300 includes a third sinister wear pad 7336 that is disposed on the magazine receptable portion 7324. The third sinister wear pad 7336 extends in a direction that is oriented at an angle A1 with respect to the driving axis. For example, the angle A1 is less than or equal to 85.0°, such as less than or equal to 82.5°, less than or equal to 80.0°, or less than or equal to 77.5°. In another aspect, the angle A1 is greater than or equal to 65.0°, such as greater than or equal to 67.5°, greater than or equal to 70.0°, greater than or equal to 72.5°, or greater than or equal to 75.0°. It is to be understood that the angle A1 may be within a range between, and including, any of the maximum and minimum values of A1 disclosed herein.

As illustrated in FIG. 119, the third sinister wear pad 7336 is located a distance D2 from the second sinister wear pad 7334 as measured from center-to-center of the second sinister wear pad 7334 to the third sinister wear pad 7336. In a particular aspect, the distance D2 is less than the overall height H of the fastener driver 7300. Specifically, D2 is less than or equal to 0.80 H, such as less than or equal to 0.75 H, less than or equal to 0.70 H, less than or equal to 0.65 H, or less than or equal to 0.60 H. In another aspect, D2 is greater than or equal to 0.35 H, such as greater than or equal to 0.40 H, greater than or equal to 0.45 H, greater than or equal to 0.50 H, or greater than or equal to 0.55 H. It is to be understood that D2 may be within a range between, and including, any of the maximum and minimum values of D2 described herein.

As shown in FIG. 120, the fastener driver 7300 includes a first dexter wear pad 7342 that is disposed on the head portion 7308 of the second housing shell 7306 near the nosepiece 7321. The first dexter wear pad 7342 extends in a direction that is parallel to the driving axis 7330. The fastener driver 7300 further includes a second dexter wear pad 7344 that is disposed on the head portion 7308 of second housing shell 7306 near the end of the head portion 7308 opposite the nosepiece 7321. The second wear pad 7342 extends in a direction that is perpendicular to the driving axis 7330. Further, the second dexter wear pad 7344 is located a distance D3 from the first dexter wear pad 7342 as measured from center-to-center of the first dexter wear pad 7342 to the second dexter wear pad 7344. In a particular aspect, the distance D3 is less than the overall length L of the fastener driver 7300. Specifically, D3 is less than or equal to 0.75 L, such as less than or equal to 0.70 L, less than or equal to 0.65 L, less than or equal to 0.60 L, or less than or equal to 0.57 L. In another aspect, D3 is greater than or equal to 0.30 L, such as greater than or equal to 0.35 L, greater than or equal to 0.40 L, greater than or equal to 0.45 L, greater than or equal to 0.50 L, or greater than or equal to 0.55 L. It is to be understood that D3 may be within a range between, and including, any of the maximum and minimum values of D3 described herein.

As further shown in FIG. 119, the fastener driver 7300 includes a third dexter wear pad 7346 that is disposed on the magazine receptable portion 7324. The third dexter wear pad 7346 extends in a direction that is oriented at an angle A2 with respect to the driving axis. For example, the angle A2 is less than or equal to 85.0°, such as less than or equal to 82.5°, less than or equal to 80.0°, or less than or equal to 77.5°. In another aspect, the angle A2 is greater than or equal to 65.0°, such as greater than or equal to 67.5°, greater than or equal to 70.0°, greater than or equal to 72.5°, or greater than or equal to 75.0°. It is to be understood that the angle A2 may be within a range between, and including, any of the maximum and minimum values of A2 disclosed herein. It is also to be understood that A2=A1.

As illustrated in FIG. 119, the third dexter wear pad 7346 is located a distance D4 from the second dexter wear pad 7344 as measured from center-to-center of the second dexter wear pad 7344 to the third dexter wear pad 7346. In a particular aspect, the distance D4 is less than the overall height H of the fastener driver 7300. Specifically, D4 is less than or equal to 0.80 H, such as less than or equal to 0.75 H, less than or equal to 0.70 H, less than or equal to 0.65 H, or less than or equal to 0.60 H. In another aspect, D4 is greater than or equal to 0.35 H, such as greater than or equal to 0.40 H, greater than or equal to 0.45 H, greater than or equal to 0.50 H, or greater than or equal to 0.55 H. It is to be understood that D4 may be within a range between, and including, any of the maximum and minimum values of D4 described herein.

Figure 122:
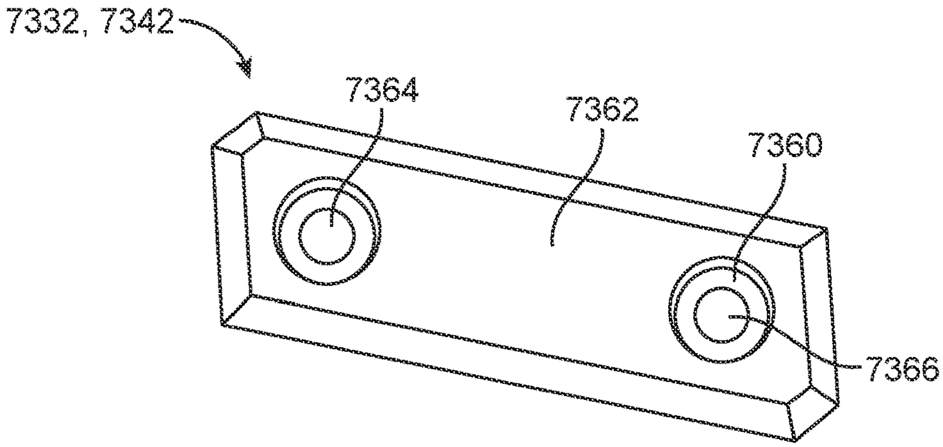
Figure 123:
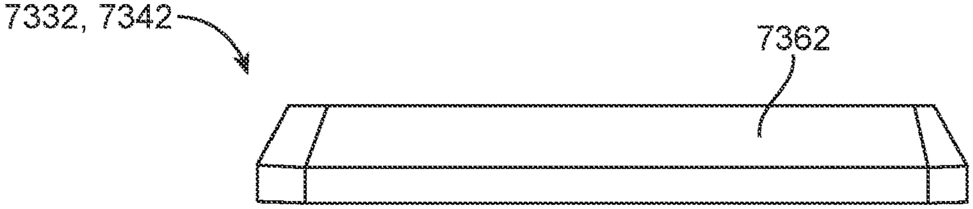

As shown in FIG. 121, the fastener driver 7300 further includes a first abrasion resistant plate 7350 adjacent the third sinister wear pad 7336 and a second abrasion resistant plate 7352 adjacent the third dexter wear pad 7346. The abrasion resistant plates 7350, 7352 are molded into the magazine receptacle portion 7324 so that they face in a forward direction, i.e., in the same direction as the nosepiece 7321 and the same direction in which a fastener is driven from the fastener driver 7300. The abrasion resistant plates 7350, 7352 are constructed from a material having a relatively high hardness and as such, a relatively high resistance to wear. For example, the abrasion resistant plates 7350, 7352 are made from a metal such as a high-carbon alloy steel Referring now to FIGS. 122 and 123, the details of the first sinister wear pad 7332 and the first dexter wear pad 7342 are shown. It is to be understood that the first sinister wear pad 7332 is identical to the first dexter wear pad 7342. As such, it is to be further understood that the first sinister wear pad 7332 is interchangeable with the first dexter wear pad 7342. As shown, the first wear pads 7332, 7342 include a metal core 7360 around which a polymeric shell 7362 is molded. The first wear pads 7332, 7342 include a first bore 7364 and a second bore 7366 through which threaded fasteners are installed, or otherwise disposed, in order to mount the first wear pads 7332, 7342 on the fastener driver 7300 as previously shown. FIG. 123 further shows that the wear pads 7332, 7342 are relatively straight, or flat, and have zero curvature. This allows them to conform to the shape of the fastener driver 7300 at the locations in which they are installed.

Figure 124:
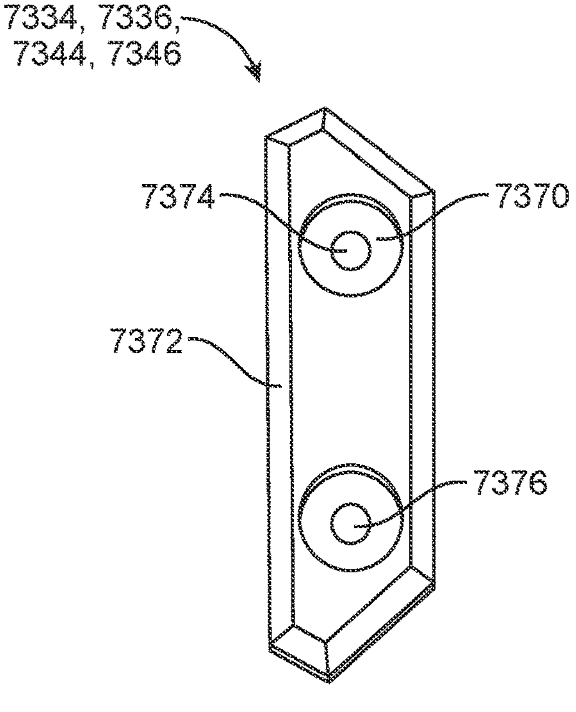
Figure 125:
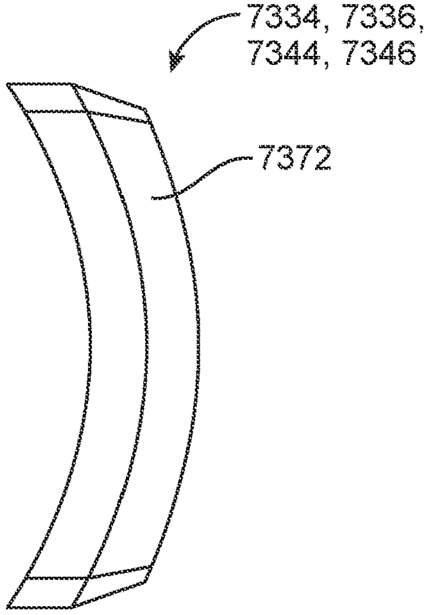

FIGS. 124 and 125 show the details of the second sinister wear pad 7334, the third sinister wear pad 7336, the second dexter wear pad 7344, and the third dexter wear pad 7346 are shown. It is to be understood that the second sinister wear pad 7334, the third sinister wear pad 7336, the second dexter wear pad 7344, and the third dexter wear pad 7346 are identical to each other. As such, it is to be further understood that the second sinister wear pad 7334, the third sinister wear pad 7336, the second dexter wear pad 7344, and the third dexter wear pad 7346 are interchangeable with each other. As shown, the second and third wear pads 7334, 7336, 7344, 7346 include a metal core 7370 around which a polymeric shell 7372 is molded. The second and third wear pads 7334, 7336, 7344, 7346 include a first bore 7374 and a second bore 7376 through which threaded fasteners are installed, or otherwise disposed, in order to mount the second and third wear pads 7334, 7336, 7344, 7346 on the fastener driver 7300 as previously shown. FIG. 125 further shows that the wear pads 7334, 7336, 7344, 7346 are curved. This allows them to conform to the shape of the fastener driver 7300 at the locations in which they are installed.

Figure 126:
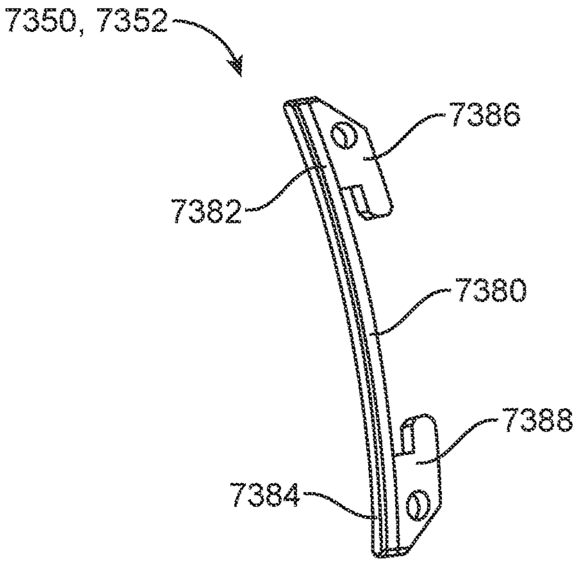
Figure 127:
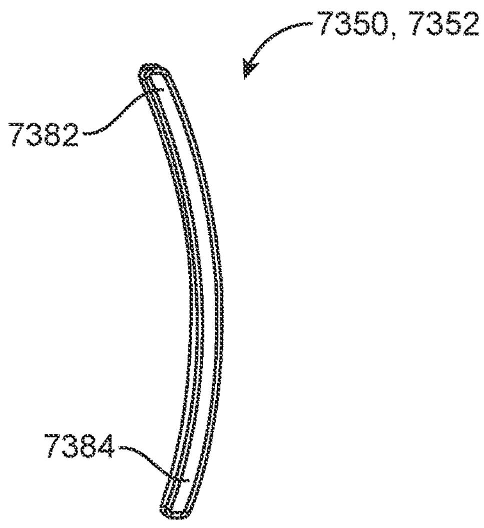
Figure 128:
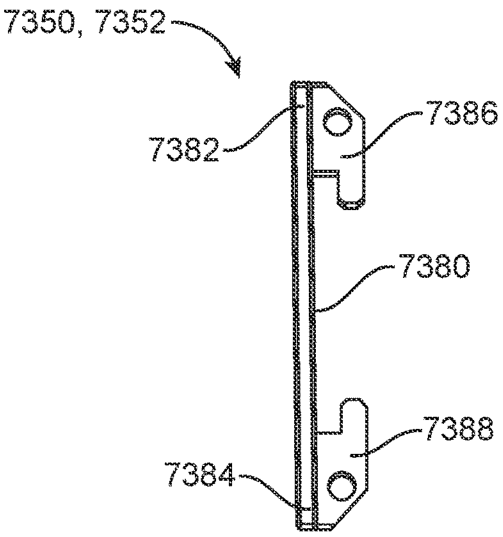

FIGS. 126-128 illustrate the details of the abrasion resistant plates 7350, 7352. As shown, each abrasion resistant plate 7350, 7352 includes a generally curved base 7380 that matches the curvature of the fastener driver 7300 at the locations in which they are installed. The base 7380 of the abrasion resistant plate 7350, 7352 includes a first end 7382 and a second end 7384 opposite the first end 7382. A first ear 7386 extends from the first end 7382 of the curved base 7380 and a second ear 7388 extends from the second end 7384 and is distanced from the first ear 7386. The ears 7386, 7388 provide structure around which polymer may be molded in order to maintain the abrasion resistant plates 7350, 7352 properly within the fastener driver 7300.

Figure 129:
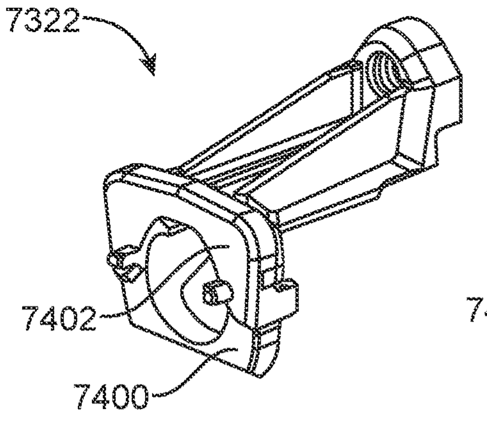
Figure 130:
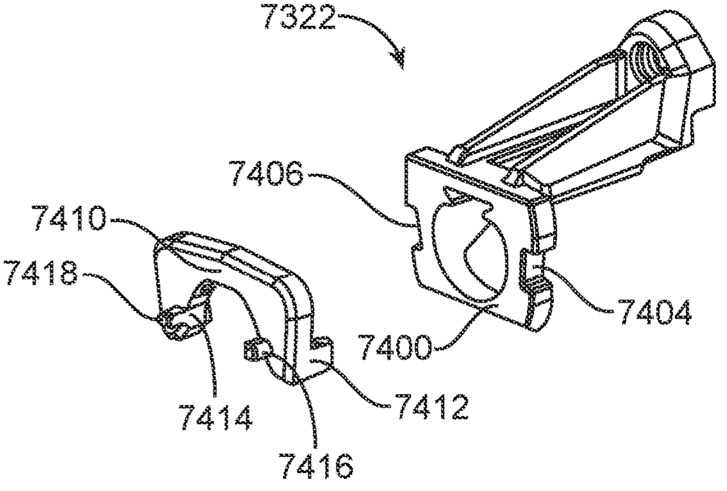

FIGS. 129 and 130 show the details of the workpiece contact bracket 7322. As shown, the workpiece contact bracket 7322 includes a workpiece contact plate 7400. An accessory, e.g., a siding tip 7402, is removably engaged therewith. In particular, the siding tip 7402 slides onto the workpiece contact bracket 7322 from the front. As shown, the workpiece contact plate 7400 includes a first notch 7404 and a second notch 7406 formed in the outer periphery of the workpiece contact plate 7400 on opposite sides thereof. The siding tip 7402 includes a generally U-shaped body 7410 having a first tab 7412 and a second tab 7414 extending in a rearward direction therefrom. A first guidepost 7416 and a second guidepost 7418 extend in a forward direction from the body 7410 of the siding tip 7402 in a direction opposite the tabs 7412, 7414. As shown, the tabs 7412, 7414 fit into the notches 7404, 7406 formed on the workpiece contact plate 7400.

FIG. 131 shows another workpiece contact bracket 7500 in which the siding tip is essentially integrated into the workpiece contact bracket 7500. As such, the workpiece contact bracket 7500 includes a workpiece contact plate 7502 having a first guidepost 7504 and a second guidepost 7506 extending therefrom in a direction parallel to a longitudinal axis 7508 of the workpiece contact bracket 7500. It is to be understood a gas-spring powered fastener driver having a workpiece contact bracket without a siding tip can be removed and replaced with the workpiece contact bracket 7500 with the integrated siding tip.

FIGS. 132-134 depict the details of another workpiece contact bracket 7600. As shown, the workpiece contact bracket 7600 includes a workpiece contact plate 7602 that includes an accessory, e.g., a siding tip 7604, removably engaged therewith. In particular, the siding tip 7604 slides onto the workpiece contact bracket 7600 from the front. The workpiece contact plate 7602 includes a first notch 7612 and a second notch 7614 formed in the outer periphery of the workpiece contact plate 7602 on opposite sides thereof. The siding tip 7604 includes a generally U-shaped body 7616 having a first tab 7622 and a second tab 7624 that are configured to fit into the notches 7612, 7614 of the workpiece contact plate 7602. The notches 7612, 7614 and the tabs 7622, 7624 are integrated male and female features that prevent rotation of the siding tip 7604 on the workpiece contact bracket 7600.

FIGS. 132 and 133 show that the siding top 7604 further includes a first guidepost 7632 and a second guidepost 7634 extend in a forward direction from the body 7616 of the siding tip 7604. Moreover, the siding tip 7604 further includes a first magnet 7642 and a second magnet 7644 embedded, or otherwise formed, in the body 7616 of the siding tip 7604 in a surface that abuts the workpiece contact plate 7602 when the siding tip 7604 is installed on, or otherwise engaged with, the workpiece contact bracket 7600. The magnets 7642, 7644 serve to removably engage the siding tip 7604 on the workpiece contact plate 7602. In a particular embodiment, the magnets 7642, 7644 are rare earth magnets, such as neodymium magnets, samarium-cobalt magnets, or a combination thereof. The body 7616 of the siding top 7606 is made from a plastic material.

FIGS. 135-137 depict the details of yet another workpiece contact bracket 7700. As shown, the workpiece contact bracket 7700 includes a workpiece contact plate 7702 that includes an accessory, e.g. a siding tip 7704 removably engaged therewith. In particular, the siding tip 7702 slides onto the workpiece contact bracket 7700 from the front. Further, as illustrated, the workpiece contact bracket 7700 is installed on a threaded shaft 7706 of a depth adjuster 7707. The workpiece contact bracket 7700 includes a sidewall extension 7708 on each side of the workpiece contact bracket 7700 adjacent the end of the threaded shaft 7706 to prevent the face of the threaded shaft 7706 of the depth adjuster 770 from being exposed to minimize, or substantially prevent, the end of the threaded shaft 7706 from getting snagged on anything during use. This prevents a gas-spring powered fastener driver, e.g., any of the gas-spring powered fastener drivers disclosed herein, that includes the workpiece contact bracket 7700 from being unintentionally fired.

As illustrated in FIGS. 136 and 137, the siding tip 7704 includes a generally U-shaped body 7710 having a first lower tab 7712 and a second lower tab 7714 that are configured to fit into notches of the workpiece contact plate 7702. The siding tip 7704 also includes an upper tab 7716 that is configured to fit into a correspond notch in the workpiece contact plate 7702 or abut a top of the workpiece contact plate 7702. A first guidepost 7722 and a second guidepost 7724 extend in a forward direction from the body 7716 of the siding tip 7704 in a direction opposite the tabs 7712, 7714, 7716. As shown, the siding tip 7704 further includes a first magnet 7732 and a second magnet 7734 embedded, or otherwise formed, in the body 7710 of the siding tip 7704 in a surface that abuts the workpiece contact plate 7702 when the siding tip 7704 is installed on, or otherwise engaged with, the workpiece contact bracket 7700. The magnets 7732, 7734 serve to removably engage the siding tip 7704 on the workpiece contact plate 7702. In a particular embodiment, the magnets 7732, 7734 are rare earth magnets, such as neodymium magnets, samarium-cobalt magnets, or a combination thereof.

FIG. 138 illustrates another embodiment of a gas spring-powered fastener driver 7800. The fastener driver 7800 illustrated in FIG. 138 may be similar to any of the previously described gas spring-powered fastener drivers 10, 300, 400, 410, 600, 700, 900, 1000, 2000, 5000, 7000, 7100, 7200, 7300. The fastener driver 7800 includes a housing having a linkage shroud 7802 that provides access to a fastener delivery mechanism within the housing. The linkage shroud 7802 includes an accessory storage pocket 7804 in which a fastener driver accessory 7806 is stored. The accessory storage pocket 7804 is a depression formed in the linkage shroud 7802 that is sized and shaped to receive the fastener driver accessory 7806. It is to be understood that the fastener driver accessory 7806 includes any of the accessories 2220, 7402, 7604, 7704 described herein. Further, the base, or bottom, of the accessory storage pocket 7804 is ferromagnetic so any of the accessories 2220, 7402, 7604, 7704 with magnets will further engage the accessory storage pocket 7804 to be held securely therein.

FIG. 139 depicts the details of yet another gas-spring fastener driver 7900. The fastener driver 7900 illustrated in FIG. 139 may be similar to any of the previously described gas spring-powered fastener drivers 10, 300, 400, 410, 600, 700, 900, 1000, 2000, 5000, 7000, 7100, 7200, 7300, 7800. As shown, the fastener driver 7900 includes a workpiece contact bracket 7902 installed on a depth adjuster 7904. The fastener driver 7900 includes a retainer 7906, e.g., a removable cotter clip, on the depth adjuster 7904 to prevent the easy removal of the workpiece contact bracket 7902 from the depth adjuster 7904.

FIG. 140 depicts the details of yet another gas-spring fastener driver 8000. The fastener driver 8000 illustrated in FIG. 140 may be similar to any of the previously described gas spring-powered fastener drivers 10, 300, 400, 410, 600, 700, 900, 1000, 2000, 5000, 7000, 7100, 7200, 7300, 7800, 7900. As shown, the fastener driver 8000 includes a workpiece contact bracket 8002 installed on a depth adjuster 8004. The fastener driver 8000 includes a retainer 8006, e.g., an e-clip, on the depth adjuster 8004 to prevent the easy removal of the workpiece contact bracket 8002 from the depth adjuster 8004. The e-clip 8006 includes a pry hole in which a pointed object, e.g., a nail, can be inserted to pry the e-clip 8006 from the depth adjuster 8004. FIGS. 141-143 show additional retainers that may be used on a fastener driver 10, 300, 400, 410, 600, 700, 900, 1000, 2000, 5000, 7000, 7100, 7200, 7300, 7800, 7900, 8000 to retain the workpiece contact bracket 8002 on the depth adjuster 8004. For example, the retainers may include a flange nut 8050 (FIG. 141), a thumb nut 8100 (FIG. 142), a hose clamp 8150 (FIG. 143), or a combination thereof.

FIGS. 144-146 depicts the details of yet still another gas-spring fastener driver 8200. The fastener driver 8000 illustrated in FIG. 140 may be similar to any of the previously described gas spring-powered fastener drivers 10, 300, 400, 410, 600, 700, 900, 1000, 2000, 5000, 7000, 7100, 7200, 7300, 7800, 7900, 8000. As shown, the fastener driver 8200 includes a motor 8202 for driving a lifting mechanism which is operable to move a driver blade from a BDC position toward a TDC position. As shown in FIG. 145, the motor 8202 includes a motor hall board 8204, e.g., a printed circuit board (PCB), on which the various circuitry to control the operation of the motor 8202, and the fastener driver 8000, is disposed. As shown in FIG. 146, the motor hall board 8204 includes a thermistor 8206 disposed on thereon to detect the temperature within the fastener driver 8200. Specifically, the thermistor 8206 measures the air temperature between the motor hall board 8204 and the stator coils within the motor 8202. Based on this temperature, the temperature of the motor 8202 is determined and the speed of the motor 8202 is controlled to protect the motor 8202. For example, as the temperature measured by the thermistor 8206 increases, the pulse width modulation percentage (PWM %) of the motor 8202 is reduced to artificially slow down the fastener driver 8200, e.g., from four fasteners driven per second at a normal operating temperature to two fasteners driven per second.

Various features of the invention are set forth in the following claims.

What is claimed is:

1. A powered fastener driver comprising:

a housing;

a nosepiece extending from the housing;

a driver blade movable within the nosepiece between a ready position and a driven position, the driver blade comprising a plurality of drive teeth on a first side of the driver blade and a plurality of locking projections on a second side of the driver blade;

a piston coupled to the driver blade for movement therewith;

a driver cylinder within which the piston is movable;

a storage chamber cylinder containing pressurized gas therein and in fluid communication with the driver cylinder, a first end of the driver cylinder being affixed to a corresponding first end of the storage chamber cylinder;

a latch actuator assembly adjacent the driver blade, wherein the latch actuator assembly includes a latch to engage one of the plurality of locking projections to prevent the driver blade from moving toward the driven position and a shuttle housing with a shuttle movably disposed therein, wherein the shuttle is movable to rotate the latch away from the plurality of locking projections to allow the driver blade to move to the driven position; and a lifting mechanism having a rotatable lifter with a cam formed thereon, wherein as the lifter rotates the cam moves the shuttle into the shuttle housing to disengage the latch from the plurality of locking projections to allow the driver blade to move to the driven position.

2. The powered fastener driver of claim 1, wherein the cam engages the shuttle over an angle that is greater than or equal to 25.0°.

3. The powered fastener driver of claim 2, wherein the cam engages the shuttle over an angle that is less than or equal to 50.0°.

4. The powered fastener driver of claim 1, wherein the latch actuator assembly includes a first shuttle spring and a second shuttle spring installed in compression between a closed end of the shuttle housing and the shuttle to bias the shuttle outward from an open end of the shuttle housing.

5. The powered fastener driver of claim 4, wherein the first shuttle spring and the second shuttle spring are parallel to each other and parallel to a longitudinal axis of the shuttle housing.

6. The powered fastener driver of claim 1, wherein the lifter includes a peripheral notch below the cam that provides clearance for the driver blade to move to the driven position when the latch is disengaged from the plurality of locking projections.

7. The powered fastener driver of claim 6, wherein the peripheral notch overlaps the cam in an axial direction and extends along an angle that is greater than or equal to 60.0°.

8. The powered fastener driver of claim 7, wherein the peripheral notch extends along an angle that is less than or equal to 120.0°.

9. The powered fastener driver of claim 1, further comprising a canister magazine coupled to the nosepiece and in which fasteners are held, the fasteners configured to be sequentially transferred from the cannister magazine into the driver channel.

10. A powered fastener driver comprising:

a housing;

a nosepiece extending from the housing;

a driver blade movable within the nosepiece between a ready position and a driven position, the driver blade comprising a plurality of drive teeth on a first side of the driver blade and a plurality of locking projections on a second side of the driver blade;

a piston coupled to the driver blade for movement therewith;

a driver cylinder within which the piston is movable;

a storage chamber cylinder containing pressurized gas therein and in fluid communication with the driver cylinder, a first end of the driver cylinder being affixed to a corresponding first end of the storage chamber cylinder;

a latch actuator assembly adjacent the driver blade, wherein the latch actuator assembly includes a latch to engage one of the plurality of locking projections to prevent the driver blade from moving toward the driven position; and a lifting mechanism having a rotatable lifter with a cam formed thereon, wherein as the lifter rotates the cam moves a shuttle operably coupled to the latch to disengage the latch from the plurality of locking projections to allow the driver blade to move to the driven position.

11. The powered fastener driver of claim 10, wherein the lifter includes a central hub with an upper disk radially outward from the central hub and a cam formed on the upper disk to engage the shuttle and move the shuttle into a shuttle housing on the latch actuator assembly as the lifter rotates.

12. The powered fastener driver of claim 11, wherein the lifter further includes a lower disk extending radially outward from the central hub and distanced from the upper disk and a plurality of drive pins extending between the upper disk and the lower disc, wherein the drive pins engage the plurality of drive teeth on the driver blade as the lifter rotates to move the driver blade to the ready position.

13. The powered fastener driver of claim 12, further comprising a magnet disposed on the upper disk adjacent the cam, wherein the magnet is detected by a sensor to de-energize a motor coupled to the lifter when the driver blade is in the ready position.

14. The powered fastener driver of claim 13, wherein the upper disk includes an alignment feature extending therefrom and the lifter further includes a magnet retainer having a first pocket formed therein to fit over the alignment feature and a second pocket radially offset from the first pocket and configured to receive the magnet.

15. The powered fastener driver of claim 14, wherein the first pocket and the second pocket are radially offset by an offset angle that is greater than or equal to 5.0°.

16. The powered fastener driver of claim 15, wherein the offset angle is less than or equal to 20.0°.

17. The powered fastener driver of claim 10, further comprising a canister magazine coupled to the nosepiece and in which fasteners are held, the fasteners configured to be sequentially transferred from the cannister magazine into the driver channel.

18. A powered fastener driver comprising:

a housing;

a nosepiece extending from the housing;

a driver blade movable within the nosepiece between a ready position and a driven position, the driver blade comprising a plurality of drive teeth on a first side of the driver blade and a plurality of locking projections on a second side of the driver blade;

a piston coupled to the driver blade for movement therewith;

a driver cylinder within which the piston is movable;

a storage chamber cylinder containing pressurized gas therein and in fluid communication with the driver cylinder, a first end of the driver cylinder being affixed to a corresponding first end of the storage chamber cylinder;

a latch actuator assembly adjacent the driver blade, wherein the latch actuator assembly includes a latch to engage one of the plurality of locking projections to prevent the driver blade from moving toward the driven position; and a lifting mechanism having a rotatable lifter with a plurality of drive pins that engage the drive teeth on the driver blade to move the driver blade to the ready position, wherein the lifter further comprises a cam formed on an upper surface thereof to actuate the latch assembly and release the driver blade to the driven position, and a magnet nested within the cam, wherein the magnet is sensed by a sensor to de-energize a motor coupled to the lifter when the driver blade is moved to the ready position.

19. The powered fastener driver of claim 18, wherein the lifter includes a central hub with an upper disk radially outward from the central hub and a lower disk extending radially outward from the central hub and distanced from the upper disc, wherein the cam is formed on the upper disk of the lifter.

20. The powered fastener driver of claim 19, wherein the lifter further includes a magnet retainer disposed on the upper disk adjacent the cam.

21. The powered fastener driver of claim 20, wherein the magnet retainer includes a first pocket that fits over an alignment feature on the upper disk and a second pocket in which the magnet is disposed.

22. The powered fastener driver of claim 21, wherein the first pocket and the second pocket are radially offset from each other.

23. The powered fastener driver of claim 18, wherein the driver blade is formed with a guide groove at least partially along a length of the driver blade and the latch actuator assembly includes a guide rib extending perpendicularly from a lower surface of a base plate of the latch actuator assembly.

24. The powered fastener driver of claim 23, wherein the guide rib is sized and shaped to fit into the guide groove of the driver blade and acts as a guide for the driver blade as it moves between the ready position and the driven position.

25. The powered fastener driver of claim 18, wherein the driver blade further includes an actuator tooth extending perpendicular to the plurality of drive teeth.

26. The powered fastener driver of claim 25, wherein the actuator tooth actuates a fastener delivery mechanism and loads a fastener into the nosepiece as the driver blade is returned to the ready position from the driven position.

27. The powered fastener driver of claim 18, further comprising a canister magazine coupled to the nosepiece and in which fasteners are held, the fasteners configured to be sequentially transferred from the cannister magazine into the driver channel.

* * * * *